United States Patent
Duvdevani et al.

(10) Patent No.: US 7,388,978 B2
(45) Date of Patent: Jun. 17, 2008

(54) APPARATUS AND METHODS FOR THE INSPECTION OF OBJECTS

(75) Inventors: Sharon Duvdevani, Mazkeret Batya (IL); Tally Gilat-Bernshtein, Yavne (IL); Eyal Klingbell, Rehovot (IL); Meir Mayo, Rehovot (IL); Shmuel Rippa, Ramat Gan (IL); Zeev Smilansky, Meishar (IL)

(73) Assignee: Orbotech Ltd., Yavne (IL)

( * ) Notice: Subject to any disclaimer, the term of this patent is extended or adjusted under 35 U.S.C. 154(b) by 0 days.

(21) Appl. No.: 10/706,489

(22) Filed: Nov. 12, 2003

(65) Prior Publication Data

US 2004/0120571 A1    Jun. 24, 2004

Related U.S. Application Data

(63) Continuation of application No. 09/633,756, filed on Aug. 7, 2000, now Pat. No. 7,206,443.

(30) Foreign Application Priority Data

Aug. 5, 1999    (IL) .................................... 131282

(51) Int. Cl.
*G06K 9/00* (2006.01)
*G06K 9/48* (2006.01)
*G06K 9/68* (2006.01)

(52) U.S. Cl. ................ 382/145; 382/141; 382/199; 382/218

(58) Field of Classification Search ................ 382/141, 382/144–151, 199, 209, 217, 218, 242, 263, 382/266
See application file for complete search history.

(56) References Cited

U.S. PATENT DOCUMENTS

| 4,532,650 | A | 7/1985 | Wihl et al. |
| 4,758,888 | A | 7/1988 | Lapidot ................ 348/91 |
| 4,958,374 | A | 9/1990 | Tokita et al. |
| 4,989,082 | A | 1/1991 | Hopkins |
| 5,048,094 | A | 9/1991 | Aoyama et al. |
| 5,067,162 | A | 11/1991 | Driscoll, Jr. et al. |
| 5,146,228 | A | 9/1992 | Irani et al. |
| 5,245,671 | A | 9/1993 | Kobayashi et al. |

(Continued)

FOREIGN PATENT DOCUMENTS

FR    2 687 091    8/1993

(Continued)

OTHER PUBLICATIONS

Gonzalez, R.C. et al., *Digital Image Processing*, Addison Wesley, USA, Chapters 7 and 8, pp. 413-569.

(Continued)

*Primary Examiner*—Aaron W Carter
(74) *Attorney, Agent, or Firm*—Ladas and Parry LLP

(57) ABSTRACT

An electrical circuit inspection method including, for each of a plurality of types of local characteristics, each type occurring at least once within electrical circuitry to be inspected, identifying at least one portion of interest within the electrical circuitry whereat the local characteristic is expected to occur, and inspecting an image of each portion of interest, using an inspection task selected in response to the type of local characteristic expected to occur in the portion of interest.

20 Claims, 63 Drawing Sheets

U.S. PATENT DOCUMENTS

| | | | |
|---|---|---|---|
| 5,495,535 A | | 2/1996 | Smilansky et al. .......... 382/145 |
| 5,578,821 A | * | 11/1996 | Meisberger et al. ......... 250/310 |
| 5,586,058 A | | 12/1996 | Aloni et al. ................... 702/35 |
| 5,619,429 A | | 4/1997 | Aloni et al. ................. 700/279 |
| 5,696,838 A | | 12/1997 | Chiu et al. |
| 5,774,572 A | | 6/1998 | Caspi .......................... 382/141 |
| 5,774,573 A | | 6/1998 | Caspi et al. ................. 382/141 |
| 5,815,596 A | | 9/1998 | Ahuja et al. |
| 5,907,628 A | | 5/1999 | Yolles et al. |
| 5,974,169 A | | 10/1999 | Bachelder |
| 6,028,948 A | | 2/2000 | Kil et al. ..................... 383/108 |
| 6,036,091 A | | 3/2000 | Spitz ..................... 235/462.25 |
| 6,366,690 B1 | | 4/2002 | Smilansky et al. ......... 382/149 |
| 6,437,312 B1 | | 8/2002 | Adler et al. ................. 250/216 |
| 6,442,291 B1 | * | 8/2002 | Whitman .................... 382/141 |
| 6,487,307 B1 | | 11/2002 | Hennessey et al. |
| 6,577,757 B1 | * | 6/2003 | DeYong et al. ............. 382/149 |
| 6,714,679 B1 | | 3/2004 | Scola et al. |

FOREIGN PATENT DOCUMENTS

| | | |
|---|---|---|
| JP | 08327560 | 12/1996 |
| WO | WO 00/11454 | 3/2000 |
| WO | WO 00/19372 | 4/2000 |

OTHER PUBLICATIONS

Russ, J.C., *The Image Processing Handbook*, CRC Press, 1995, Chapters 6 and 7, USA, pp. 346-477.

Marr, D. et al, *Theory of Edge Detection*, Proceedings of the Royal Society of London.

Chapron, M., "A new Chromatic Edge-Detector Used for Color Image Segmentation", Apr. 11$^{th}$ International Conference on Pattern Recognition, 1992, pp. 310-315., France.

Baxes, Digital Image Processing Principles and Applications, John Wiley & Sons, (1994) pp. 160-178.

Sohn et al. "Boundary Representation with Lines and Circular Arcs Using Boundary Split-and-Merge Method." IEEE (1991) pp. 707-711.

Pujas, P. et al., "Robust Colour Image Segmentation", 7$^{th}$ International Conference on Advanced Robotics, Spain, Sep. 22, 1995, pp. 1-14.

Shafarenko, L. et al, "Automatic Watershed Segmentation of Randomly Textured Color Images", IEEE Transactions on Image Processing (6)11, Nov. 1997, pp. 1530-1543, U.K.

Comaniciu, D. et al., "Robust Analysis of Feature Spaces: Color Image Segment", SPRING 1998 Invited Submission, Dept. of Electrical and Computer Engineering, USA.

English Translation of FR 2 687 091 Dated Aug. 13, 1993, (46 pages).

* cited by examiner

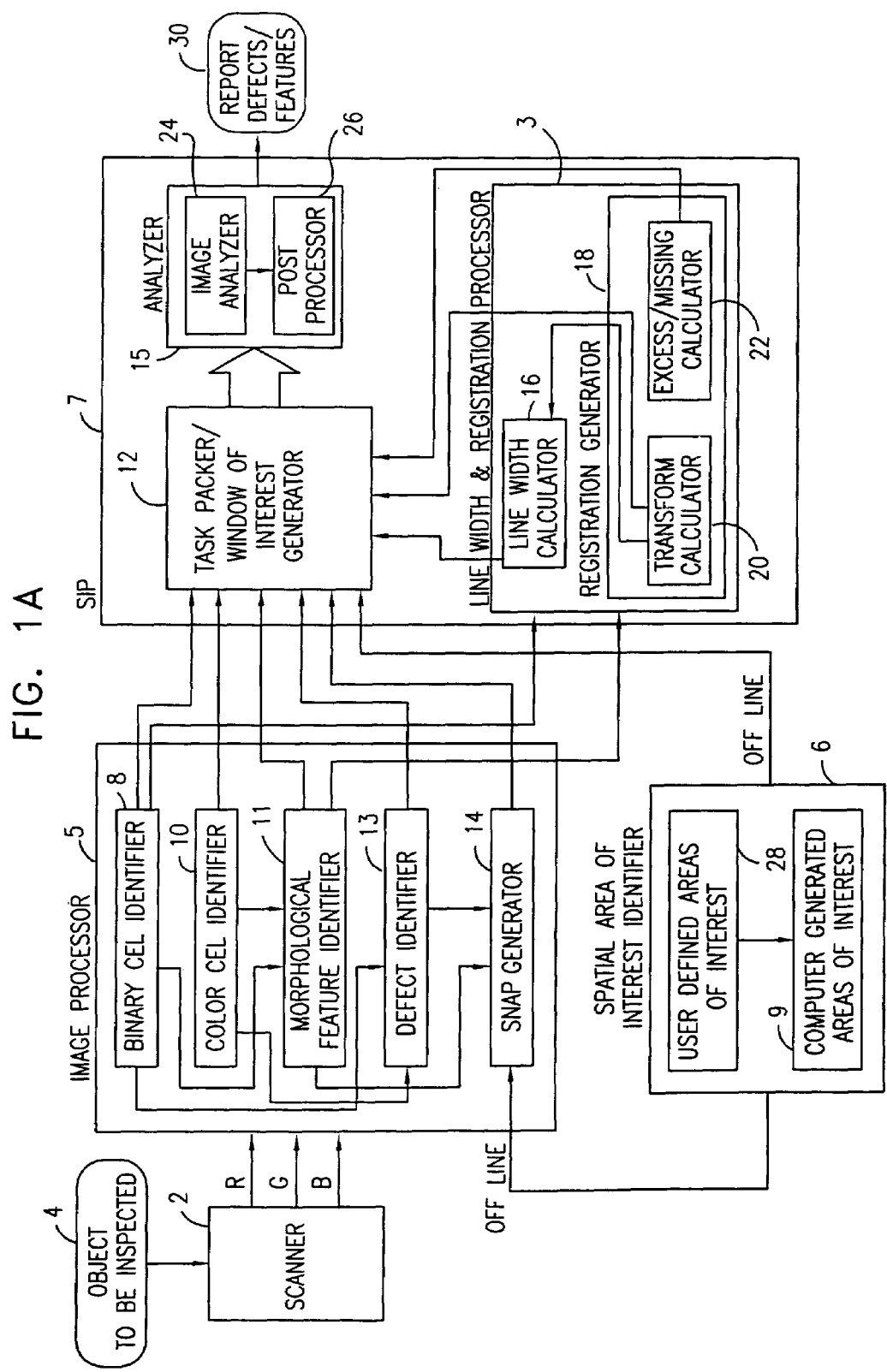

FIG. 7A

| Window type | Functions attached | Remarks |
|---|---|---|
| target | target_lrn:<br><br>connect_closed<br><br>(Func_connected_components<CEL>)<br><br>vectorize<br><br>(Func_angle_vectorizer<Cel>)<br><br>target_reference (currently does nothing)<br><br>trans2ref (Func_trans2ref)<br><br>forward2target_analyze (Func_forward) | Produces connected components of row CELs. Vectorizes them into polylines. Then transforms vectorized polylines into reference aligned coordinated system (removing all non transformable data). Finally the window is forwarded into destination unresolved and the function that is attached to the window at its new destination is target_analyze. |
| bonding _area | ii lrn<br><br>connect_closed<br>(Func_connected_components<CEL>)<br><br>vectorize<br>(Func_angle_vectorizer<CEL>)<br><br>connect_open_color (only in enable_color_masking mode)<br><br>(Func_connected_components<Color_cel>)<br><br>vectorize_color (only in enable_color_masking mode)<br><br>(Func_angle_vectorizer_<Color_cel>)<br><br>stp_reference<br><br>trans2ref (Func_trans2ref)<br><br>forward2bonding_analyze<br>(Func_forward) | Produces connected components of row CELs, vectorizes them into polylines. If in enable_color_masking mode is then connected components of row color CELs are also computed, and then vectorize them into polylines. The function stp_reference of type Func_stp_top_down_ref is called to learn bonding area and to create the single camera component of the reference including bonding pads windows, masks zones and stable features for registration. Then all transformable data is transformed into reference aligned coordinate system (removing all non transformable data). Finally the window is forwarded into destination unresolved and the function that is attached to the window at its new destination is bonding_analyze. |
| chip_area | nop (nop function) | Nothing is done with this window. It is only used within bonding_area window in function stp_reference. |

FIG. 7B

| Window type | Functions attached | Remarks |
|---|---|---|
| balls | balls_ins<br><br>connect_open<br>(Func_connected_components<CEL>)<br><br>vectorize (is needed only for debugging and visualization of balls algorithms)<br>Func_angle_vectorizer<CEL><br><br>circles_process<br>(Func_circles_process)<br><br>trans2ref (Func_trans2ref)<br><br>forward2balls_analyze<br>(Func_forward) | Produces connected components of raw CELs. Then vectorize them into polylines. This step is not really needed for the algorithm but it provides a nice picture to look at when visualizing the outcome of the algorithm. The function circles_process of type Func_circles_process is called to model the connected components as what are called generalized circles (balls).<br>Then all transformable data is transformed into reference aligned coordinate system (removing all non transformable data). Finally the window is forwarded into destination unresolved and the function that is attached to the window at its new destination is balls_analyze. |
| cavity | alarms_lrn<br><br>watchdog-func (Func_watchdog)<br><br>trans2ref (Func_trans2ref)<br><br>forward2ref_if_in_camera<br>(Func_forward) | Function watchdog checks to see if there are CELs inside the window. Any CEL found inside the window is reported as defect. Then all transformable data is transformed into reference aligned coordinate system (removing all non transformable data). Finally, if the window is completely within camera boundary then the window is forwarded into destination reference and the function that is attached to the window at its new destination is nop. If the window is not within camera boundary then the window is not forwarded. |

FIG. 8

| Function name | Functions executed | Remarks |
|---|---|---|
| balls_analyze | analyze_circles<br><br>balls_create_ref<br><br>balls_display (for display and debug only)<br>merge_defects<br><br>forward2balls_ref<br>(Func_forward) | Classifies circles based on data coming from three cameras. Creates circles reference.<br>Merges all defects from cameras into main unified data.<br><br>Finally the window is forwarded into destination unified_balls_reference_defects_queue and the function that is attached to the window at its new destination is strip_balls. |
| bonding_analyze | analyze-bonding-side<br><br>forward2bonding_ref<br>(Func_forward) | Megre data from all three cameras into unified reference format.<br><br>Finally the function is forwarded into destination unified_bonding_reference_defects_queue and the function that is attached to the window at its new destination is strip-bonding. |
| target_analyze | analyze_target<br><br>forward2target_ref<br>(Func_forward) | Megre data from all three cameras into unified reference format.<br><br>Finally the function is forwarded into destination unified_reference_defects_queue and the function that is attached to the window at its new destination is strip_target. |

FIG. 15A

| Window type | Functions attached | Remarks |
|---|---|---|
| target | poly compare target:<br><br>polylines_comp_ooo_target (func_polylines_comp_ooo)<br><br>defects_handler (Func_defects_handler)<br><br>defectsfilter (Func_defects_filter)<br><br>forward2defects (Func_forward) | Function polylines_comp_ooo_target of type func_polylines_comp_ooo do a CEL2VEC comparison between reference polygons and online CELs based on application target tolerances.<br><br>Function defects_handler of type Func_defects_handler is a post processing function that decides which of the defects reported by the various defect detectors (nick, protrusion, width defect CEL2VEC, excess/missing, etc.) are real Sip_defects. Defects found by a detector are rechecked according to zone specific application criteria.<br><br>Function defectsfilter is of type Func_defects_filter is called to filter out any defects. It uses PIM_main and filters out all defects found in one or more regions of the following: unstable, mask_region, power_line_default.<br><br>Finally, if any Sip_defects are inside the window, then the window is forwarded into destination defects and the function that is attached to the window at its new dimension is nop (nothing to do). If no defects are found, then the window is not forwarded at all. |
| pad_ref | poly compare pads<br>polylines_comp_ooo_target (func_polylines_comp_ooo)<br><br>defects_handler (Func_defects_handler)<br><br>defectsfilter(Func_defects_filter)<br><br>forward2defects(Func_forward) | This function connected to this window type is similar to the function connected to the target window above. The only difference is that parameter applications are used for bonding pads to control the behavior of the CEL2VEC function. |

FIG. 15B

| Window type | Functions attached | Remarks |
|---|---|---|
| balls | balls_ins<br><br>connect_open<br>(Func_connected_components<CEL>)<br><br>vectorize (is needed only for debugging and visualization of balls algorithms)<br>Func_angle_vectorizer<CEL><br><br>circles_process<br>(Func_circles_process)<br><br>trans2ref (Func_trans2ref)<br><br>forward2balls_analyze<br>(Func_forward) | Produces connected components of raw CELs. Then they are vectorized into polylines. This step is not really needed for the algorithm but it provides a nice picture to look at when visualizing the outcome of the algorithm. The function circles_process of type Func_circles_process is called to model the connected components and are called generalized circles (balls). Then all the transformable data is transformed into reference aligned coordinate system (removing all non transformable data). Finally the window is forwarded into destination unresolved and the function that is attached to the window at its new destination is balls_analyze. |
| cavity | watchdog<br>watchdog_func (Func_watchdog)<br><br>defectsfilter (Func_defects_filter)<br><br>forward2defects (Func_forward) | Function watchdog checks to see if there are CELs inside the window. Any CEL which is found inside the window is reported as a defect.<br><br>Function defectsfilter is of type Func_defects_filter is called to filter out any defects. It uses PIM_main and filters out all defects found in one or more regions of the following: unstable, mask_region, power_line_default.<br><br>Finally, if any Sip_defects are found inside the window, then the window is forwarded into destination defects and the function that is attached to the window at its new destination is nop (nothing to do). If no defects are found, then the window is not forwarded at all. |

FIG. 15C

| Window type | Functions attached | Remarks |
|---|---|---|
| reject | poly compare and reject<br><br>polylines_comp_and_reject (func_polylines_comp_aaa)<br><br>Forward2defects (Func_forward) | Function polylines_comp_and reject does a CEL2VEC comparison between reference polygons and online CELs based on application target tolerances. This function has a very small limit to the number of excess CELs or missing envelopes permitted. If there is even a small change between reference target and online target overflow type defects are obtained which are interpreted by the application as an indication that this frame should be rejected.<br><br>Finally, if any Sip_defects is found inside the window, then the window is forwarded into destination defects and the function that is attached to the window at its new destination is nop (nothing to do). If no defects are found, then the window is not forwarded at all. |
| disqualified_lw_win | nop | Do nothing |

FIG. 16

| Function name | Functions executed | Remarks |
|---|---|---|
| balls_analyze | analyze_circles (Func_circles_analyze)<br><br>balls_compare2ref (Func_compare2ref)<br><br>balls_display (for display and debug only. Func_display_balls_info)<br><br>Merge_defects (Func_merge_defects)<br><br>forward2defects (Func_forward) | Classify circles based on data coming from three cameras. Compare unified circles to reference. Merge all defects from cameras into main unified data.<br><br>Finally, if any Sip defects are found inside the window, then the function is forwarded into destination defects and the function that is attached to the window as its new destination is nop (nothing to do). If no defects are found, then the window is not forwarded at all. |

FIG. 54
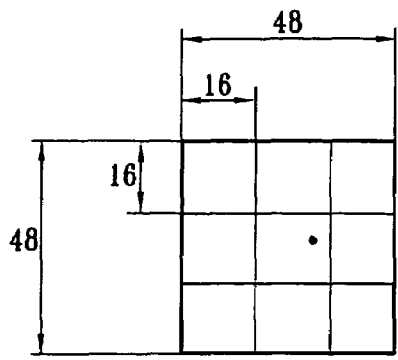
• DENOTES THE COLOUR DEFECT REPORT DUE TO WHICH THE SNAP OF SIZE 48X48 IS RECORDED.
FIG. 55
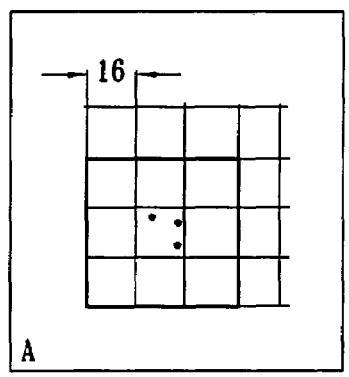
• DENOTES A SIGNAL COLOR_DEFECT REPORT
☐ DENOTES AREA OF THE SNAP.
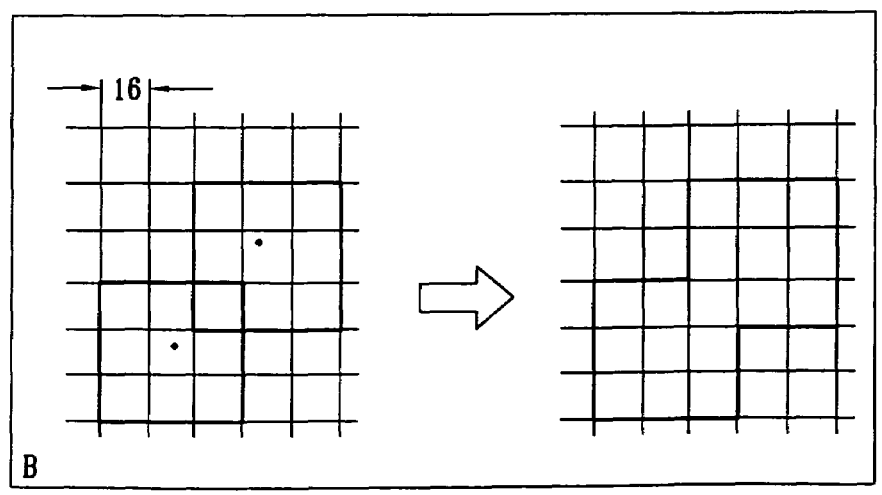

FIG. 56
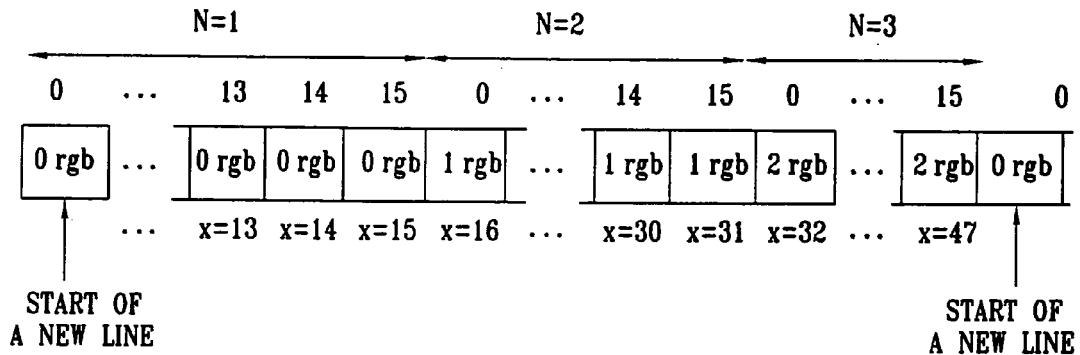
| $X_s$rgb | REPRESENTS A SINGLE 32-BIT SNAP REPORT WORD. WHICH CONTAINS THE 8-BIT X-COORDINATE ($X_s$) AND THE VALUES OF THE RED (r) GREEN (g) AND BLUE (b) |
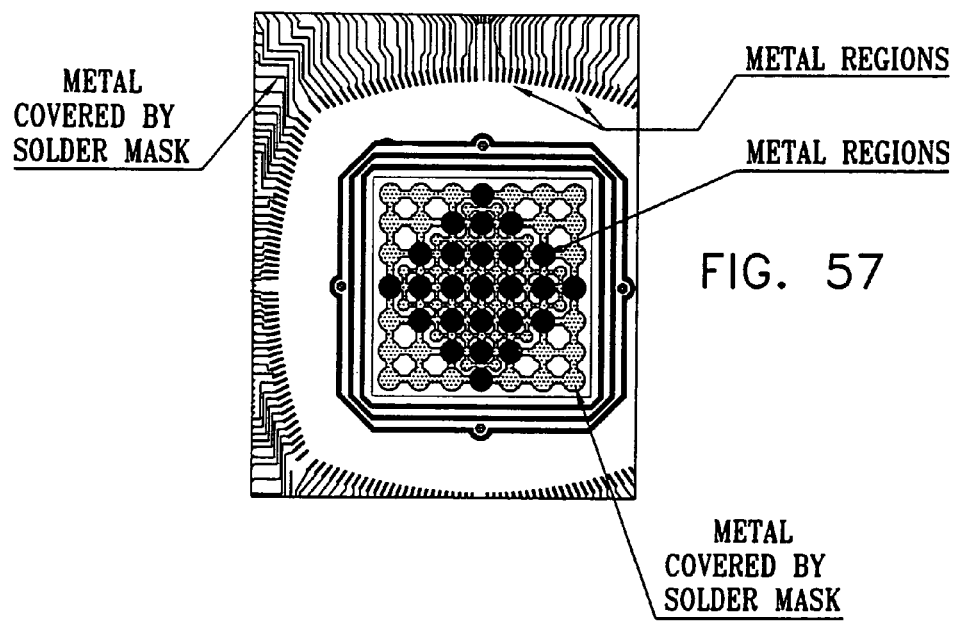
FIG. 57
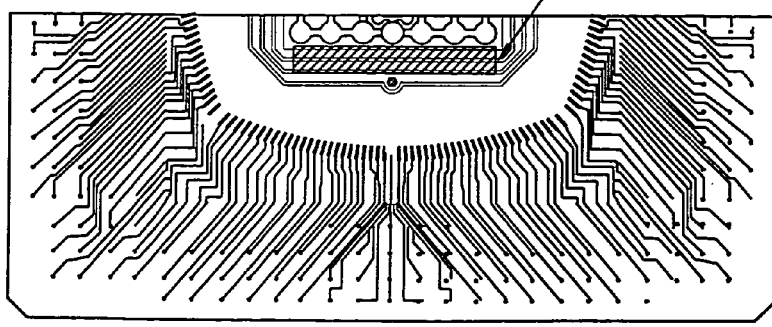
FIG. 58

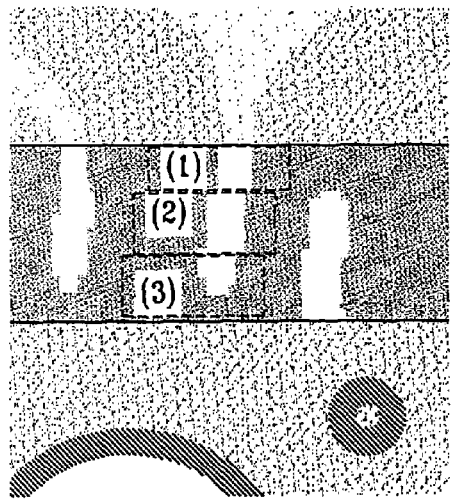
FIG. 59
FIG. 60A
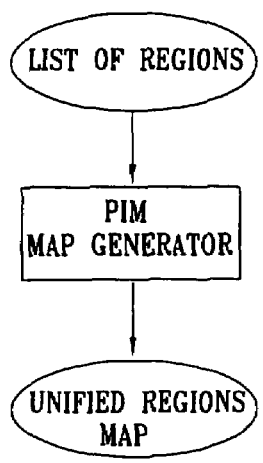
FIG. 60B
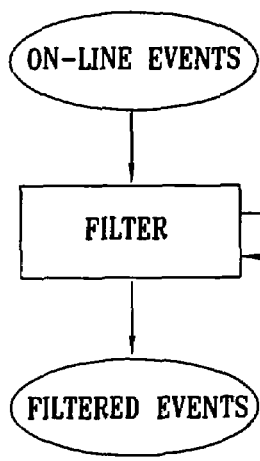
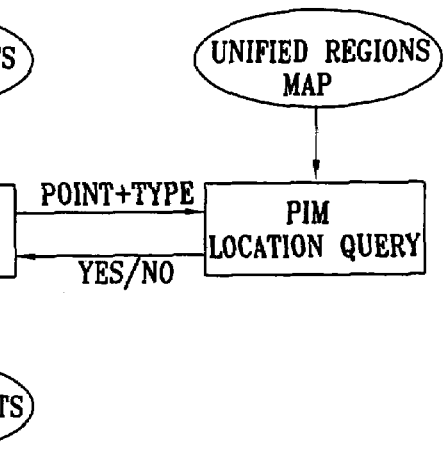
FIG. 61
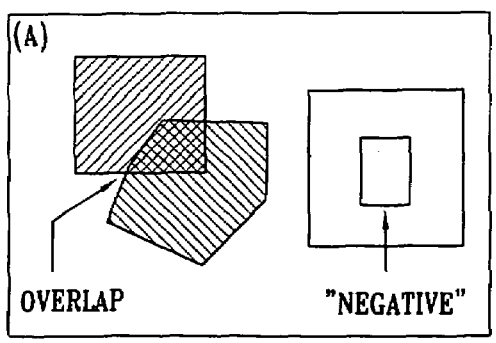
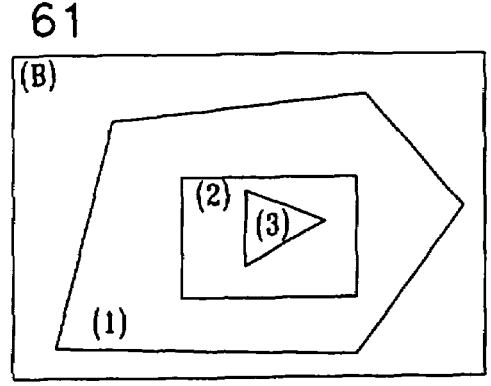

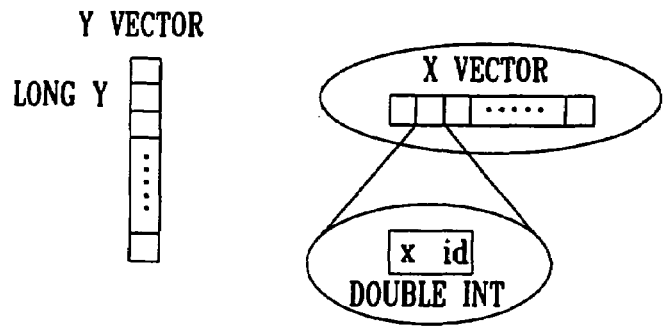
FIG. 62
WHERE THE GRAPHIC INTERPRETATION IS:
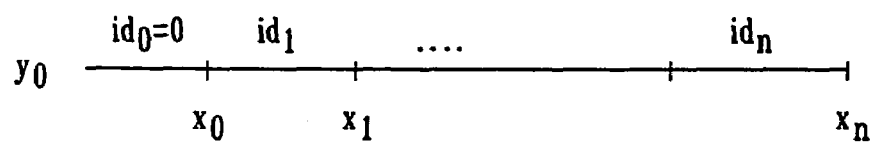
FIG. 63
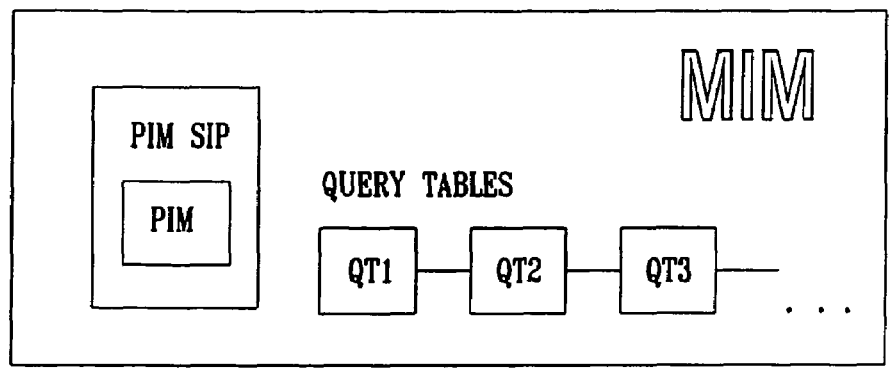
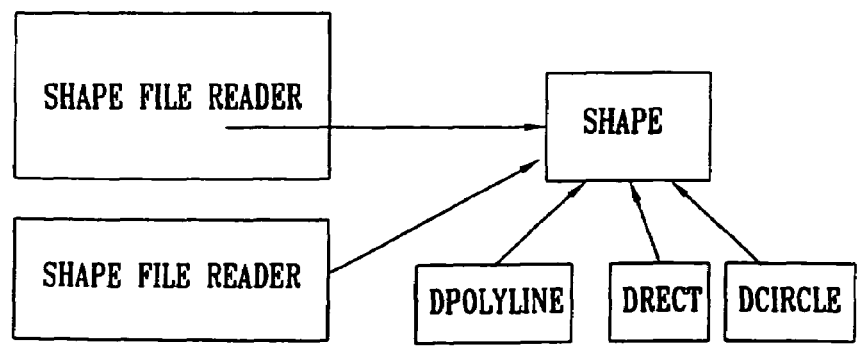

FIG. 66

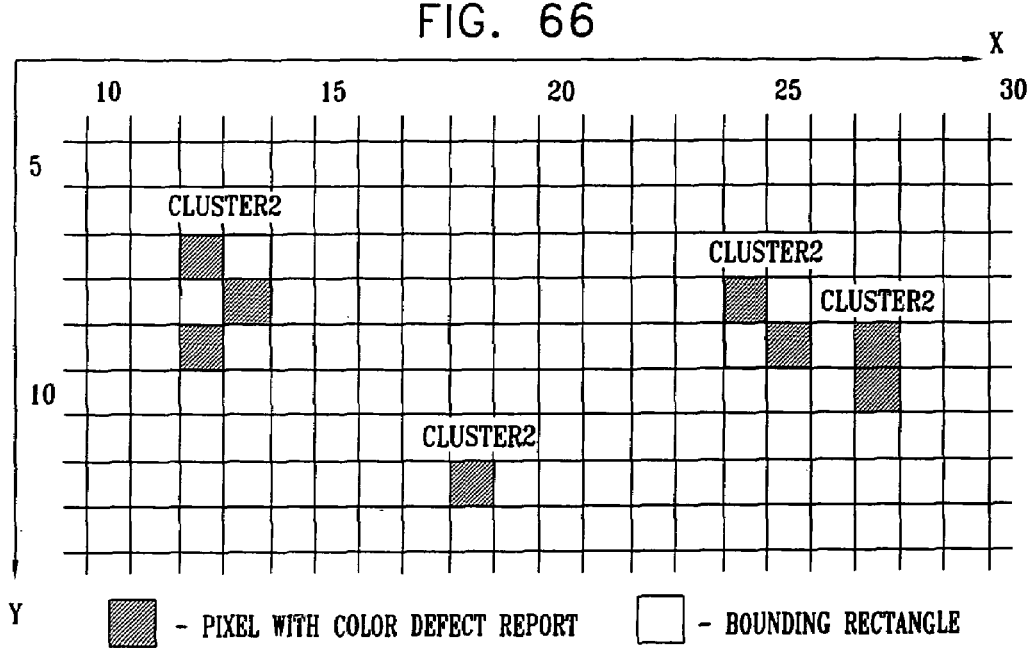

– PIXEL WITH COLOR DEFECT REPORT     – BOUNDING RECTANGLE

THE RUN LENGTH STRUCTURE FOR THE CASE WHERE THE SNAP REGION IS THE BOUNDING RECTANGLE ENLARGED BY TWO PIXELS ON EACH SIDE:

| | | | | | | | |
|---|---|---|---|---|---|---|---|
| Y=5 | 10'o'1 | 15'c'1 | | | | | |
| Y=6 | 10'o'1 | 15'c'1 | 22'o'2 | 26'o'2 | | | |
| Y=7 | 10'o'1 | 15'c'1 | 22'o'2 | 25'o'3 | 26'c'2 | 29'c'3 | |
| Y=8 | 10'o'1 | 15'c'1 | 22'o'2 | 25'o'3 | 26'c'2 | 29'c'3 | |
| Y=9 | 10'o'1 | 15'c'1 | 22'o'2 | 25'o'3 | 26'c'2 | 29'c'3 | |
| Y=10 | 10'o'1 | 15'c'1 | 16'o'4 | 20'c'4 | 22'o'2 | 25'o'3 | 26'c'2 | 29'c'3 |
| Y=11 | 10'o'1 | 15'c'1 | 16'o'4 | 20'c'4 | 22'o'2 | 25'o'3 | 26'c'2 | 29'c'3 |
| Y=12 | 16'o'4 | 20'c'4 | 25'o'3 | 29'c'3 | | | |
| Y=13 | 16'o'4 | 20'c'4 | | | | | |
| Y=14 | 16'o'4 | 20'c'4 | | | | | |
| ... | | | | | | | |

THE SNAP RECTANGULAR REGIONS (COLORED AREAS)
THAT WERE CUT ACCORDING TO THE CLUSTERS

THE RESULT IS 4 WINDOWS, EACH POSSESS THE CLUSTER
AND A RECTANGLE WITH THE RED-DATA.

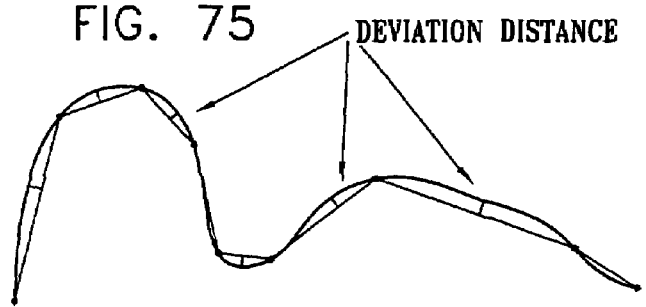
FIG. 75 — DEVIATION DISTANCE
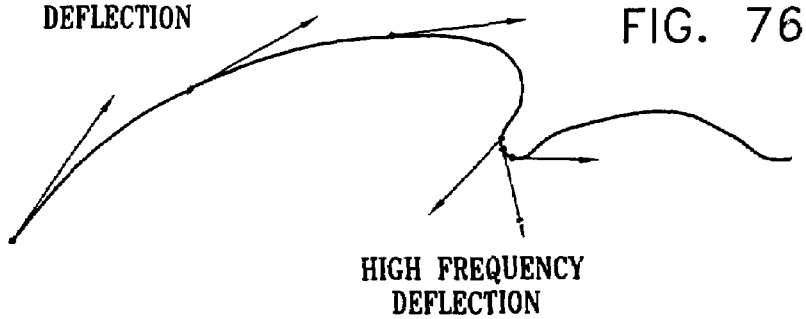
FIG. 76 — LOW FREQUENCY DEFLECTION / HIGH FREQUENCY DEFLECTION
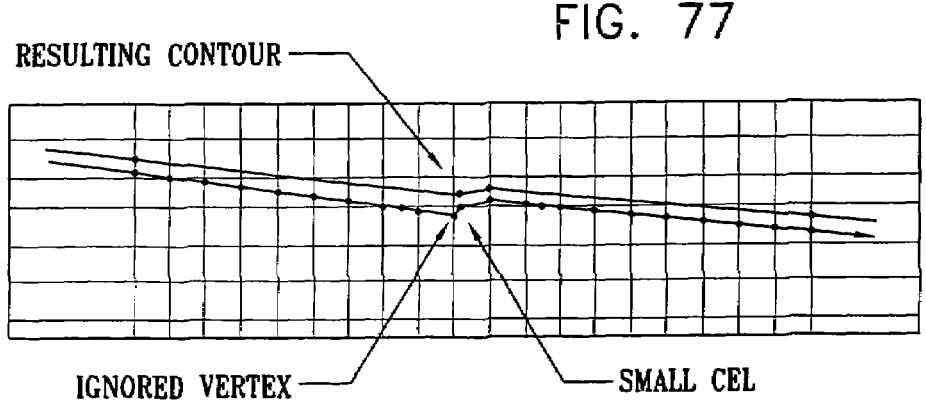
FIG. 77 — RESULTING CONTOUR / IGNORED VERTEX / SMALL CEL
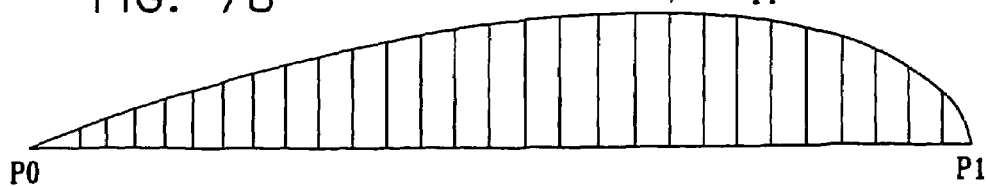
FIG. 78 — MAXIMUM DISTANCE FROM ORIGINAL CONTOUR / P0, Pi, P1

APPARATUS AND METHODS FOR THE INSPECTION OF OBJECTS

This application is a continuation of application Ser. No. 09/633,756 filed on Aug. 7, 2000 now U.S. Pat. No. 7,206,443 claims the benefit thereof and incorporates the same by reference.

FIELD OF THE INVENTION

The present invention relates to apparatus and methods for image processing.

BACKGROUND OF THE INVENTION

Apparatus and methods for analyzing images, and in particular for image processing and analysis, which are useful in inspection of patterned objects, are well known in the art.

The following references describe image processing methods which may be useful in understanding the present invention:

C. Gonzalez and P. Wintz, Digital Image Processing, Addison Wesley, Reading, Mass., 1987; and John C. Russ, The Image Processing Handbook, CRC Press, 1994.

The following references describe edge detection methods which may be useful in understanding the present invention:

D. Marr and E. Hildreth, Theory of Edge Detection, Proceedings of the Royal Society of London; and M. Chapron, "A new chromatic edge-detector used for color image segmentation", 11th APR International Conference on Pattern Recognition.

The following references describe color image segmentation methods which may be useful in understanding the present invention:

Philippe Pujas and Marie-Jose Aldon, "Robust Colour Image Segmentation", 7th International Conference on Advanced Robotics, San Filiu de Guixols, Spain, Sep. 22, 1995, and Leila Shararenko, Maria Petrou, and Josef Kittler, "Automatic Watershed Segmentation of Randomly Textured Colour Images, IEEE.

U.S. Pat. No. 4,758,888 to Lapidot describes a method of and means for inspecting workpieces traveling along a production line, including on-line inspection for flaws without interrupting the progress or workpieces along the production line.

U.S. Pat. No. 5,586,058 and U.S. Pat. No. 5,619,429 to Aloni et al. describe apparatus and methods for inspecting patterned objects and detecting defects therein, including inspecting a binary level representation of the object, inspecting a gray level representation of the object, and preferably reinspecting the grayscale representation of the object to filter false alarms and to classify defects.

U.S. Pat. No. 5,774,572 to Caspi describes an automatic visual inspection system, which is operative to convolve a 2-dimensional digital gray scale image of an object with a filter function related to the second derivative of a Gaussian function forming a 2-dimensional convoluted image have signed values. The location of an edge in the object is achieved by finding zero crossings between adjacent oppositely signed values.

U.S. Pat. No. 5,774,573 to Caspi et al. describes a visual inspection system which uses convolution of a 2-dimensional digital gray scale image of an object with a filter function related to the second derivative of a Gaussian function forming a 2-dimensional convolved imaged having signed values. The convolution of Caspi et al. can be performed with a difference-of-two-Gaussians, one positive and one negative.

PCT Application IL98/00393 describes inspection of printed circuit boards using color, including the use of color to identify certain types of conditions, such as conductor oxidation, using color.

PCT Application IL98/00477 describes methods for analytically representing; an image so that morphological operations such as dilation, erosion, and scale measurement may be performed on non-binary pixels, preferably more efficiently than using previous methods.

Applicant's unpublished Israel Patent Application No. 125929 describes article inspection systems and methods, including an improved image acquisition system. Methods which may be useful in image analysis are described in the following publication:

Dorin Comaniciu and Peter Meer, "Distribution Free Decomposition of Multivariate Date", SPR '98 Invited Submission, Department of Electrical and Computer Engineering, Rutgers University, Piscataway, N.J. 08855, U.S.A.

The disclosures of all publications mentioned above and throughout the specification and of the publications cited therein are hereby incorporated by reference.

SUMMARY OF THE INVENTION

The present invention seeks to provide improved apparatus and methods for image processing.

The present invention is useful in conjunction with the optical inspection system described in Applicant's Israel Patent Application IL 131092 entitled "Optical Inspection System", filed 25 Jul. 1999, the disclosure of which is incorporated herein by reference.

Inputs to the image processing system shown and described herein, typically comprise at least one of the following:

a. Optionally, snapshots of areas or regions of interest, including some or more of the following: areas defined in advance by a user, areas surrounding suspected defects, and areas surrounding predetermined types of features;

b. Binary CEL data (sometimes termed herein "CEL data"), which is data that identifies contour elements which correspond to borders between different regions in a pattern;

c. Color CEL data, namely data identifying contour elements which correspond to borders between different regions in a pattern and identifying a type of region on either side of the CEL;

d. Morphological feature inspection triggers;

e. Color defect inspection triggers;

f. Binary defect inspection triggers (sometimes termed herein "hardware defects"), which are nicks, protrusions, and CELs on skeletons, wherein CELs are located on morphological skeletons; and f. User identified area of interest inspection triggers;

Preferably, theses inputs are provided by an image processing unit substantially as described in Applicant's Israel Patent Application IL 131092.

There is thus provided in accordance with a preferred embodiment of the present invention a method for inspecting objects, the method including creating a reference image for a representative object, the reference image including an at least partially vectorized first representation of boundaries within the image, acquiring an image of an object under inspection including a second representation of boundaries within the image, and comparing the second representation of boundaries to the at least partially vectorized first representation of boundaries, thereby to identify defects.

Further in accordance with a preferred embodiment of the present invention the comparing step employs a user-selected variable threshold for acceptable distance between corresponding portions of the boundaries in the first and second representations.

There is further provided in accordance with another preferred embodiment of the present invention, a system for image processing including a boundary identifier operative to generate a representation of boundaries of known elements in the image, a hardware candidate defect identifier operative to identify candidate defects in the image, in hardware, a software candidate defect inspector receiving an output from the hardware candidate defect identifier and using the representation of boundaries to identify at least one false alarm within the output, in software. Preferably the identification of the at least one false alarm is effected by comparing the boundaries to a reference.

Still further in accordance with a preferred embodiment of the present invention the boundary identifier includes a hardware boundary identifier operative to generate a representation of boundaries of known elements in the image, in hardware.

Additionally in accordance with a preferred embodiment of the present invention the system also includes a software candidate defect identifier operative to identify additional candidate defects in the image, in software.

Also in accordance with a preferred embodiment of the present invention the software candidate defect inspector also receives a second output from the software candidate defect identifier and uses the representation of boundaries to identify at least one false alarm within the second output, in software.

Further in accordance with a preferred embodiment of the present invention the hardware candidate defect identifier employs the representation of boundaries in order to identify at least some candidate defects.

Still further in accordance with a preferred embodiment of the present invention the software candidate defect identifier employs the representation of boundaries in order to identify at least some candidate defects.

There is additionally provided in accordance with another preferred embodiment of the present invention a system for image processing including a learning subsystem operative to define first and second areas in an object under inspection wherein the first areas each include at least one known critical object element and the second areas include no such known critical object elements, and a defect detector operative to inspect the first areas using a first procedure based on prior knowledge regarding the known critical object elements and to inspect the second areas using a second procedure which differs from the first procedure.

Further in accordance with a preferred embodiment of the present invention the second procedure includes a hardware inspection of a second area operative to identify candidate defects in the second area and a subsequent software inspection of the second area, only if at least one candidate defects are found in the second area, and operative to analyze the at least one candidate defects found in the second area and to identify false alarms therewithin.

There is also provided in accordance with another preferred embodiment of the present invention a method for inspecting an object including, in a first stage of inspection, identifying a location of at least one candidate defect, and for each candidate defect, determining of a candidate area, at the location, for inspection at least of the size and shape of the contour area being based, at least in part, on an output of the identifying step, and in a second stage of inspection, inspecting each candidate area to confirm the defect.

Additionally in accordance with a preferred embodiment of the present invention the first stage is carried out in hardware.

Further in accordance with a preferred embodiment of the present invention the second stage is carried out in software.

Still further in accordance with a preferred embodiment of the present invention the step of determining includes determining the size of a candidate area at a known location.

Additionally in accordance with a preferred embodiment of the present invention the second stage includes performing different inspections depending on criteria of the candidate area or of the candidate defect.

Also in accordance with a preferred embodiment of the present invention the second stage includes performing different inspections depending on characteristics of the at least one candidate defect as identified in the identifying step.

Further in accordance with a preferred embodiment of the present invention the second stage includes performing different inspections depending on functionality of the object portion in which the candidate defect resides.

Still further in accordance with a preferred embodiment of the present invention the second stage includes performing different inspections depending on the degree of criticality of the functionality of the object portion in which the candidate defect resides.

There is additionally provided in accordance with another preferred embodiment of the present invention a modular image processing system with user-customizable image analysis functions, for use in conjunction with a scanner, the system including, an image processing engine receiving at least one stream of image data to be analyzed from the scanner, and an engine configurator operative to receive a sequence of definitions of at least one user-customized image analysis function to be performed on the image data by the image processing engine, wherein the image processing engine is operative to analyze at least one channel of image data in accordance with each definition in the sequence of definitions fed into the engine configurator, including performing different image analysis functions, differing from one another more than only as to parameters, depending on a current definition arriving at the engine configurator from among the sequence of definitions.

There is also provided in accordance with another preferred embodiment of the present invention a method for automatically optically inspecting an object, including in a first inspection step, defining a plurality of regions of interest for image processing, the regions of interest including at least one region of interest defined by a user and at least one region of interest automatically defined by optically inspecting the article, and providing to an image information correlating to an area surrounding each region of interest, and in a second inspection step, automatically processing information for the region of interest to determine the presence of defects in the article.

Further in accordance with a preferred embodiment of the present invention the image of an area surrounding a region of interest is smaller than an image of the object.

Still further in accordance with a preferred embodiment of the present invention the region of interest automatically defined by optically inspecting the article includes a candidate defect in a pattern formed on the object.

Additionally in accordance with a preferred embodiment of the present invention the region of interest automatically defined by optically inspecting the article includes a predetermined morphological feature formed in a pattern on the object.

Also in accordance with a preferred embodiment of the present invention, the providing step includes providing to the image processor parsed information relating to boundaries in the region of interest. Preferably, the providing step additionally includes providing a color image of the region of interest to the image processor.

Further in accordance with a preferred embodiment of the present invention the automatically processing step includes applying, to regions of interest defined by a user, at least one image processing method that is different from an image processing method applied to regions of interest automatically defined by optically inspecting the article.

Still further in accordance with a preferred embodiment of the present invention the providing step includes identifying the type of defect in the region of interest, and the automatically processing step includes applying an image processing method that is suited for the type of defect in the region of interest.

Additionally in accordance with a preferred embodiment of the present invention the providing step includes identifying the type of morphological feature in the region of interest, and the automatically processing step includes applying an image processing method that is suited for the type of morphological feature in the region of interest.

Also in accordance with a preferred embodiment of the present invention the at least one region of interest defined by a user is defined prior to optically inspecting the object in a software definition step, the at least one region of interest automatically defined by optically inspecting the article is performed in a hardware inspection step, and the automatically processing each image of a region of interest is performed in a software image processing step.

There is further provided in accordance with another preferred embodiment of the present invention, a method for inspecting ball grid array substrates, the method including generating at least one model for at least one feature in a reference image of a ball grid array substrate, and storing the model in memory, acquiring an image of the ball grid array substrate, and inspecting predetermined regions of the image of the ball grid array substrate to determine whether a feature in the predetermined region fits the model.

Further in accordance with a preferred embodiment of the present invention the feature comprises a circle.

Still further in accordance with a preferred embodiment of the present invention the model of the circle includes a center point at a predetermined location and a radius within a predefined tolerance.

Additionally in accordance with a preferred embodiment of the present invention the parameters of the model are at least partly adjustable in an off-line mode prior to inspection.

Also in accordance with a preferred embodiment of the present invention the feature includes a bonding pad.

BRIEF DESCRIPTION OF THE DRAWINGS AND APPENDICES

The present invention will be understood and appreciated from the following detailed description, taken in conjunction with the drawings and appendices in which:

FIG. 1A is a simplified block diagram of an image processing system constructed and operative in accordance with one preferred embodiment of the present invention;

Figure 5:
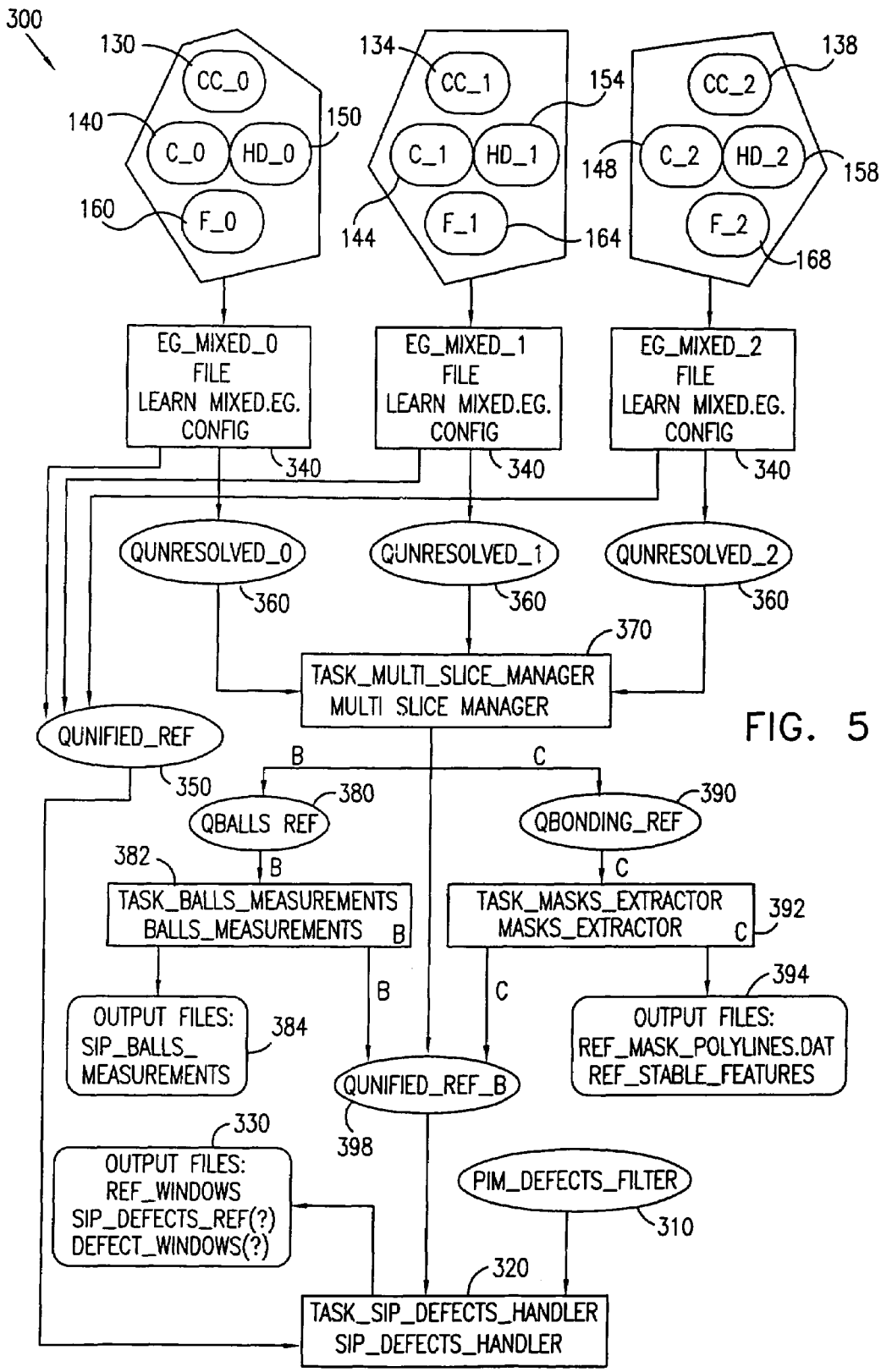
FIG. 5 is a simplified functional block diagram of a preferred implementation of an individual one of the "learn mixed" units of FIG. 4.
Figure 9:
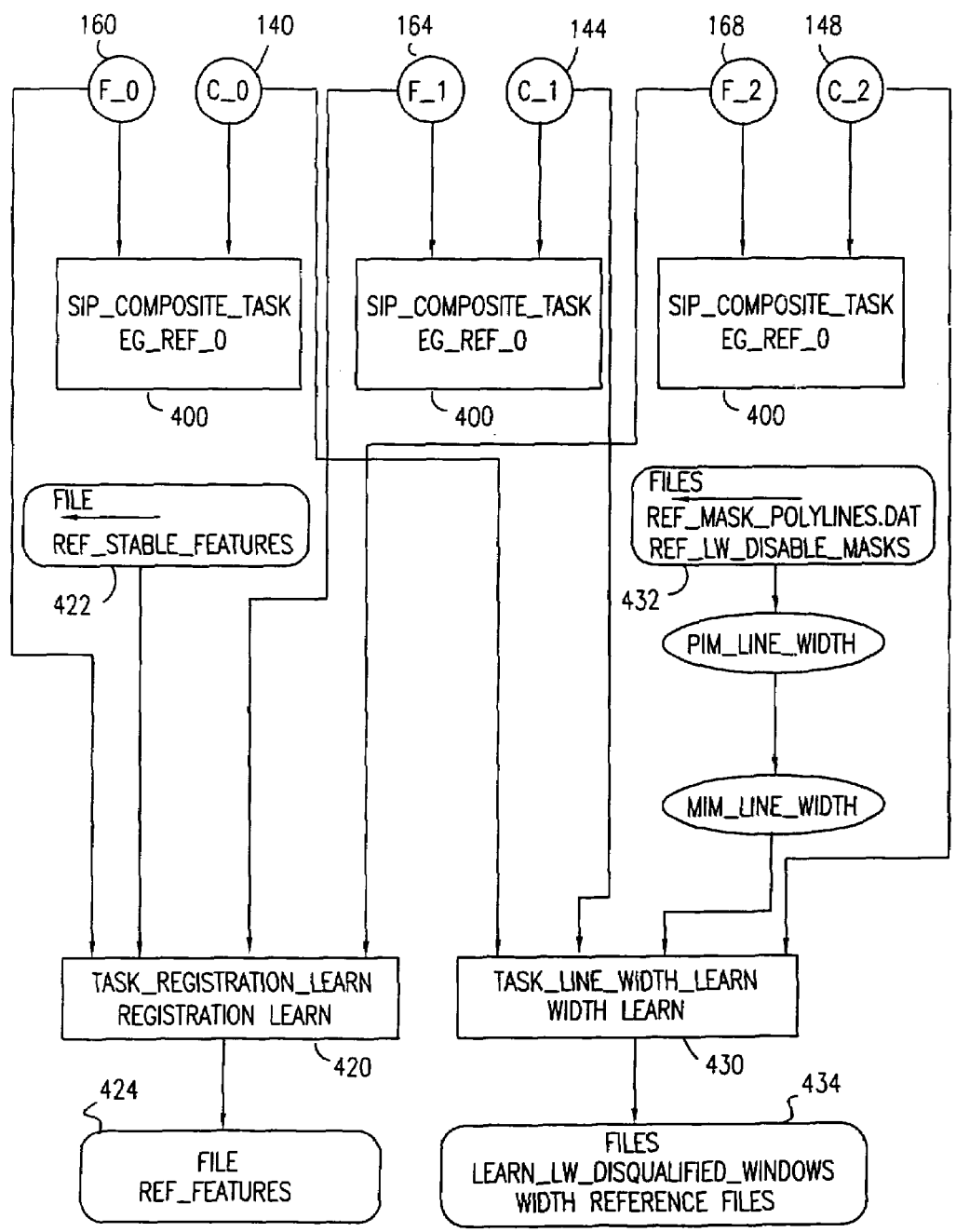
Figure 10:
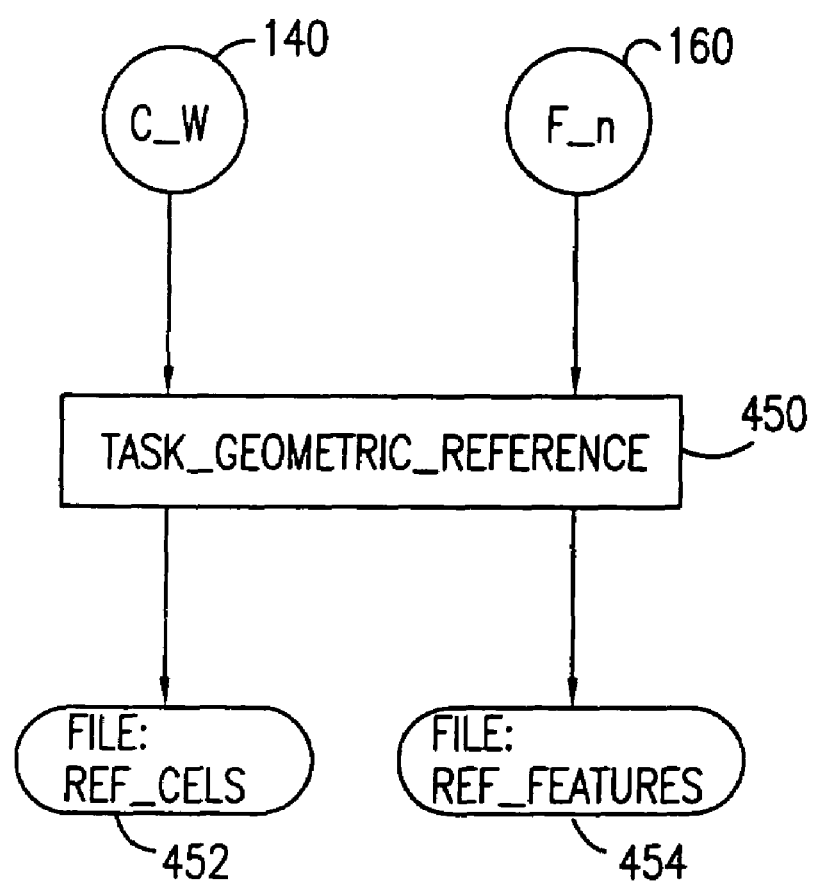
Figure 11:
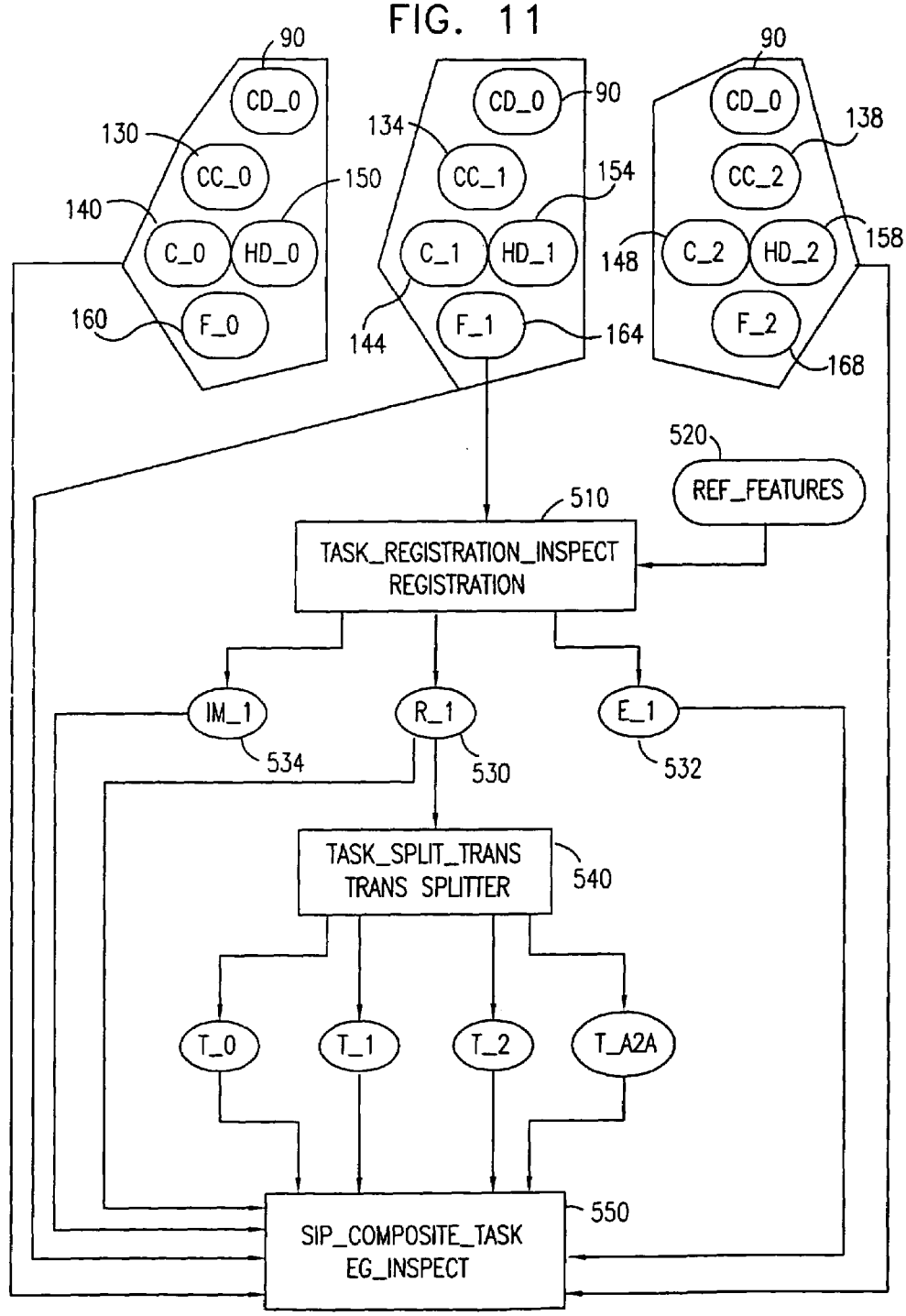
Figure 12:
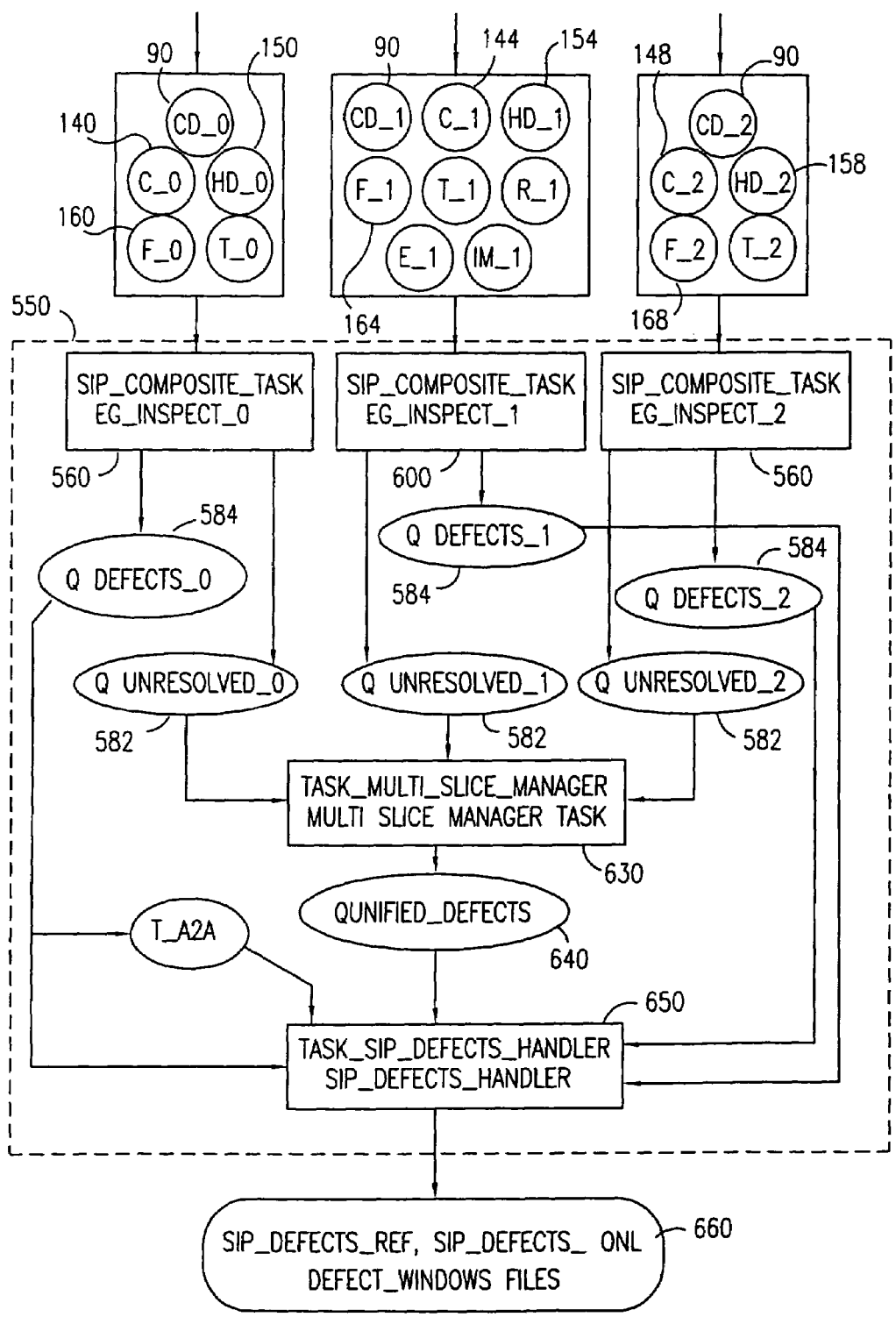
Figure 13:
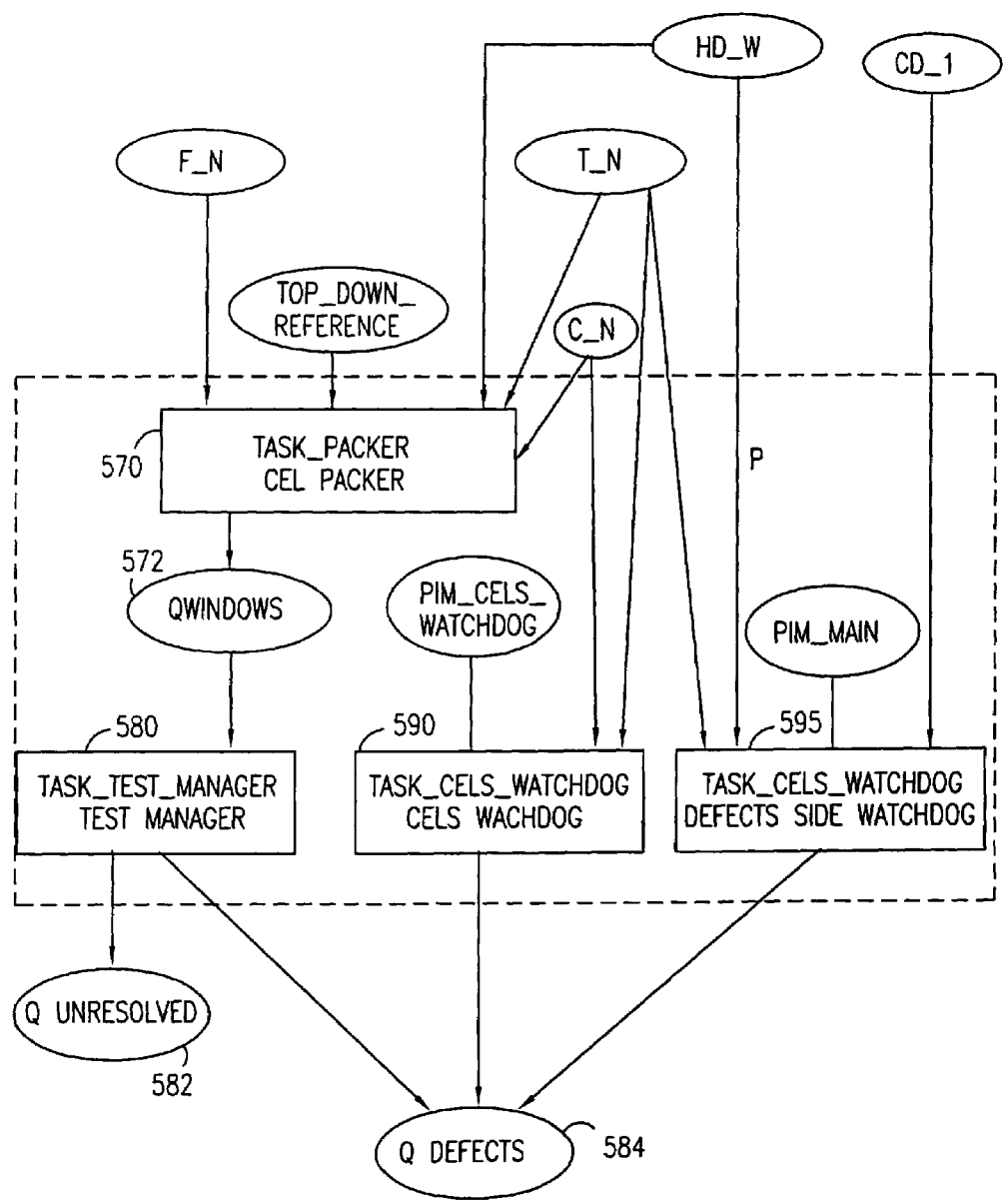
Figure 14:
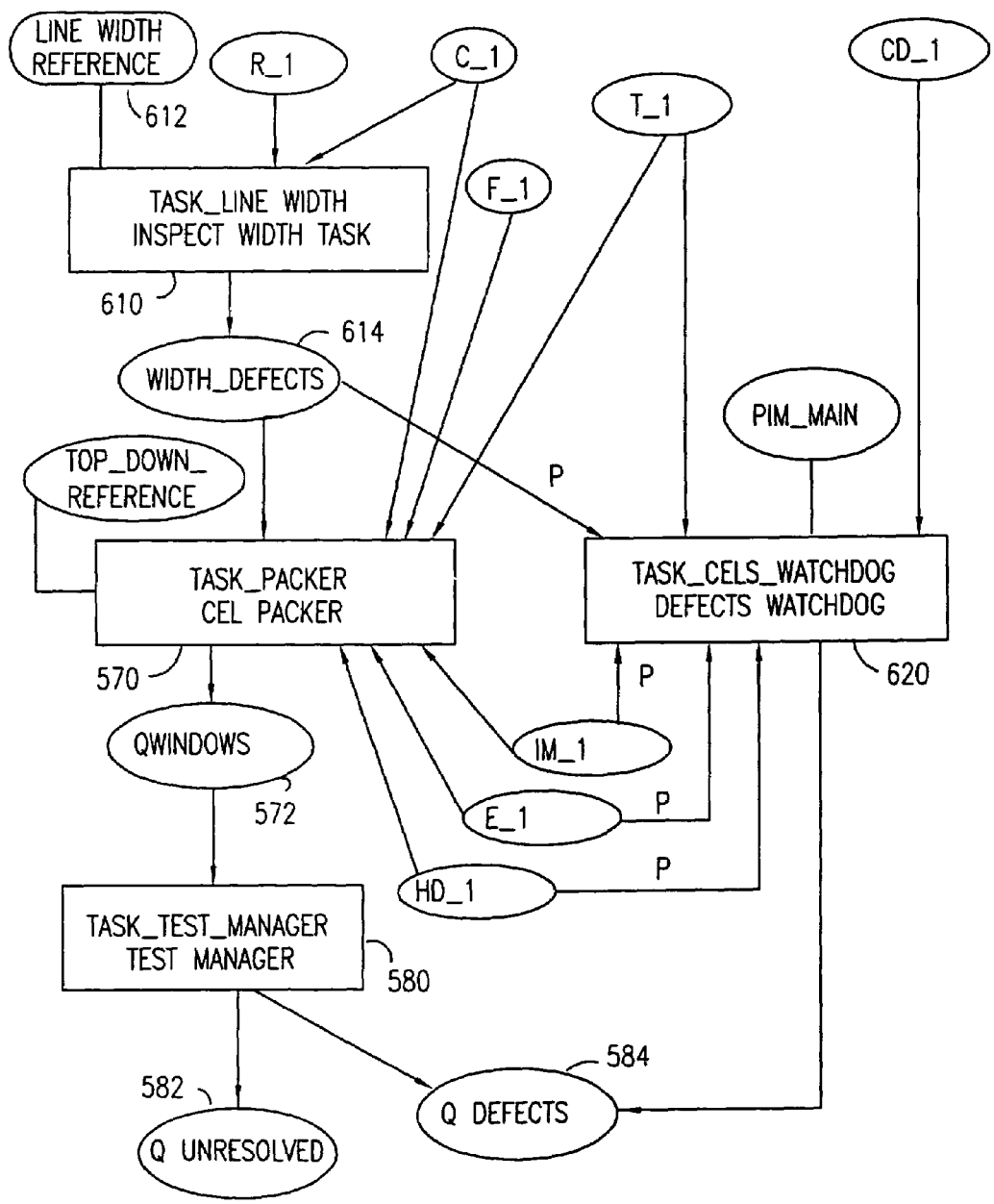
Figure 17:
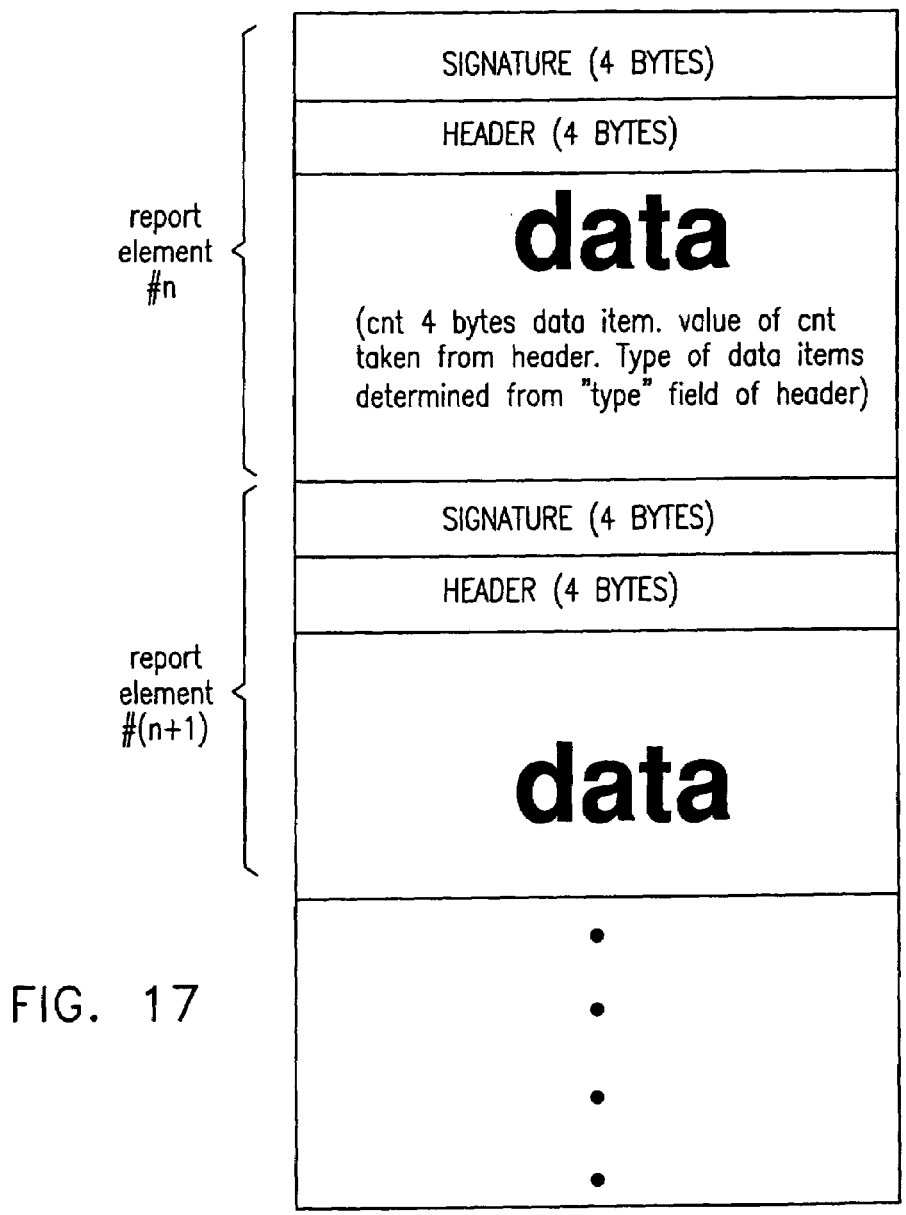
Figure 18:
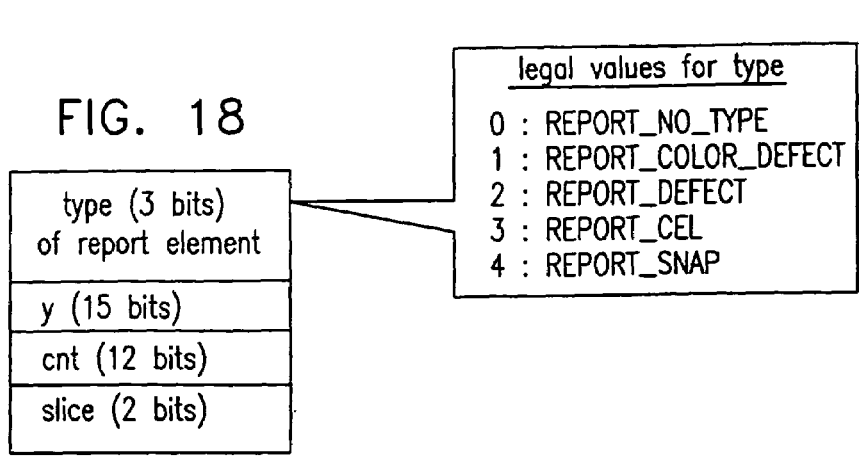
Figure 19:
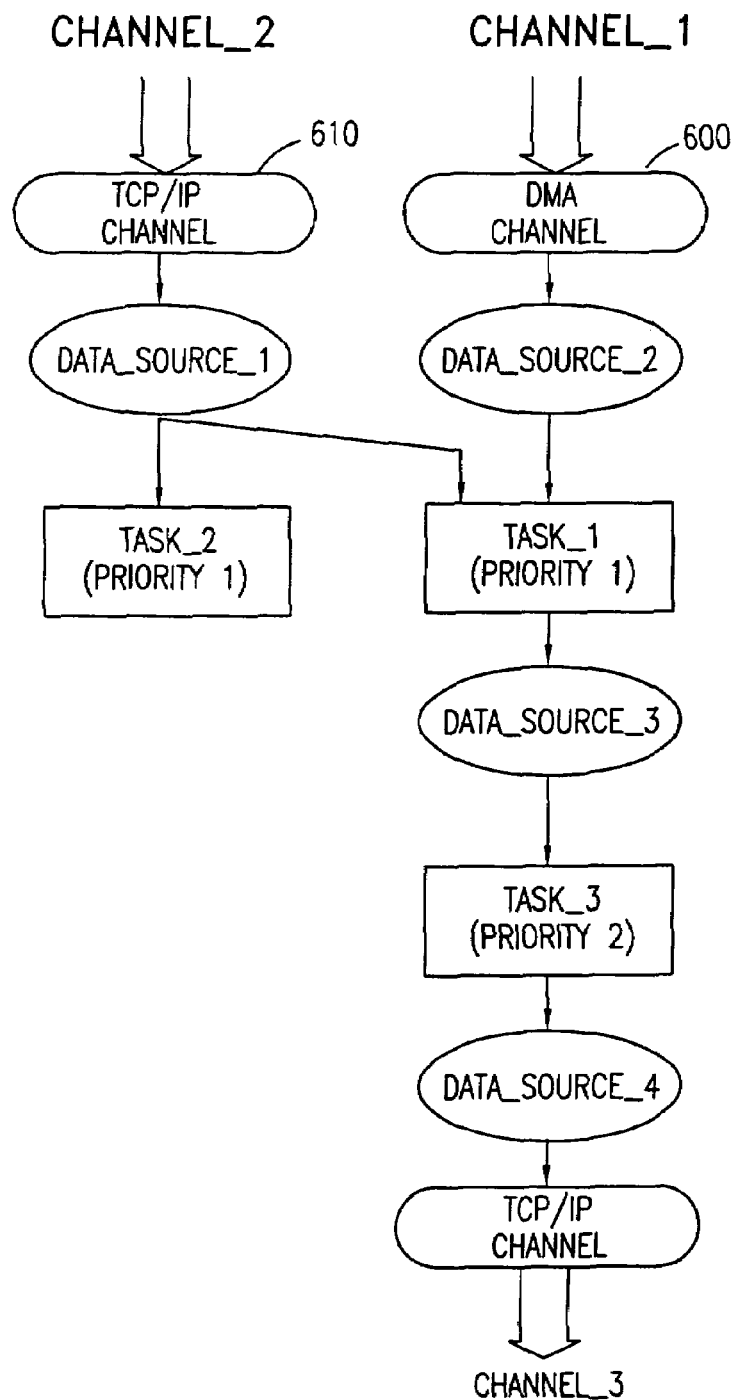
Figure 20:
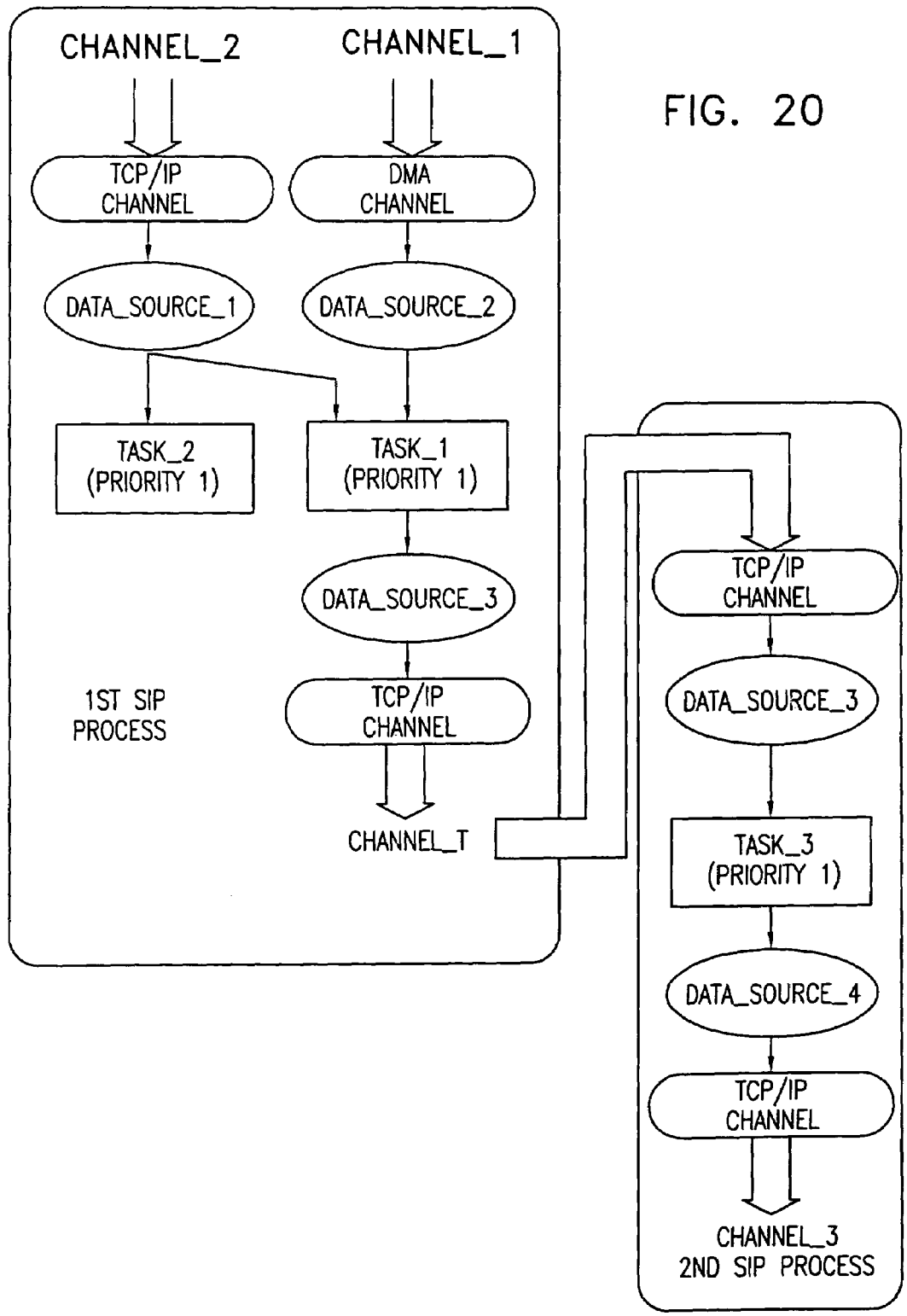
Figure 21A:
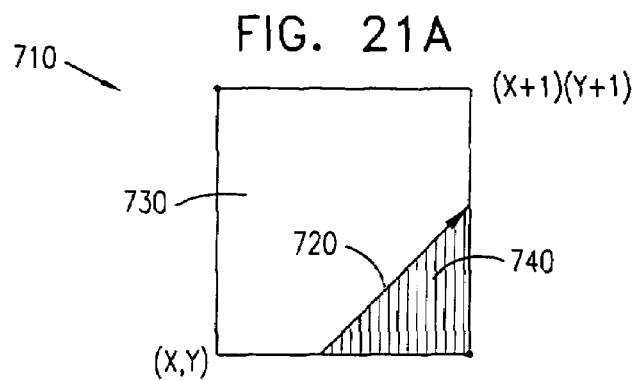
Figure 21B:
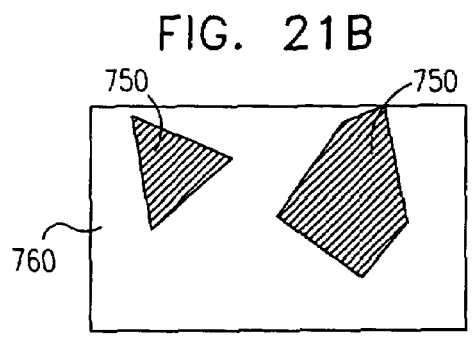
Figure 21C:
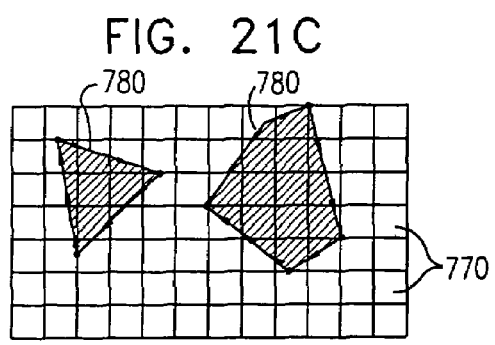
Figure 21D:
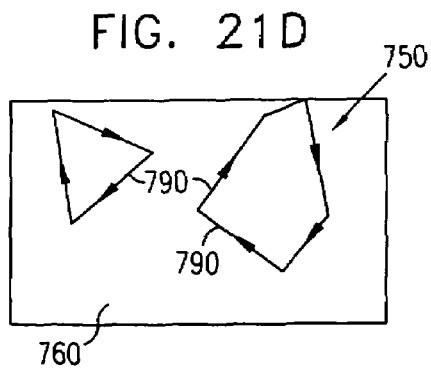

FIGS. 7A-7B, taken together, form a table describing preferred test functions provided for each window type in the course of a learn scenario;

FIG. 8 is a table of preferred functions typically executed by the task multi slice manager of FIG. 5 in the course of a learn scenario;

FIG. 9 is an execution graph of a scan scenario termed herein "learn.ref.config";

FIG. 10 is an execution graph of a scan scenario termed herein "learn.ref.eg.config";

FIG. 11 is an execution graph of a scan scenario termed herein "inspect.mixed.config";

FIG. 12 is an execution graph of a scan scenario termed herein "inspect.mixed.egmain.config";

FIG. 13 is an execution graph of a scan scenario termed herein "inspect.mixed.egside.config";

FIG. 14 is an execution graph of a scan scenario termed herein "inspect.mixed.eg.config";

FIGS. 15A-15C, taken together, form a table describing preferred test functions provided for each window type in the course of an inspect scenario;

FIG. 16 is a table of preferred functions typically executed by the task multi slice manager of FIG. 12 in the course of an inspect scenario;

FIG. 17 is a diagram of a preferred data structure for a report element as may be received from the hardware image analysis system of copending Israel Patent Application No. 131092;

FIG. 18 is a preferred data structure for the header of FIG. 17;

FIG. 19 is an example of a simplified execution graph for the image processing operating system SIP of FIG. 1;

FIG. 20 is another example of a simplified execution graph which differs from the graph of FIG. 19 in that it is adapted for execution by a computer farm comprising at least two simultaneous parallel processors;

FIG. 21A is a conceptual illustration of a pixel including one CEL;

FIGS. 21B-21D is a conceptual illustration of the relationship between features and their analytical representation by CELs and vectorized line components.

Figure 24:
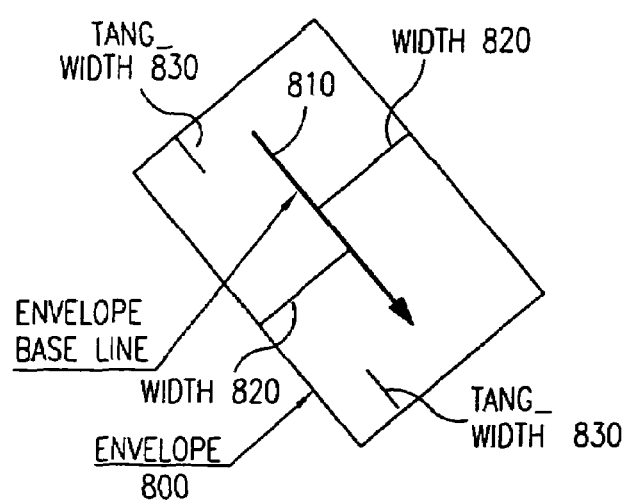
Figure 25:
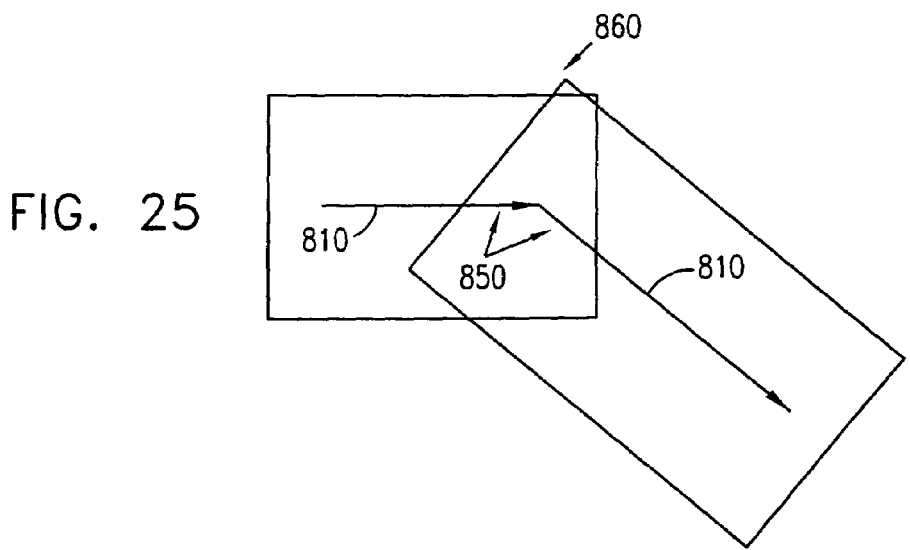
Figure 26:
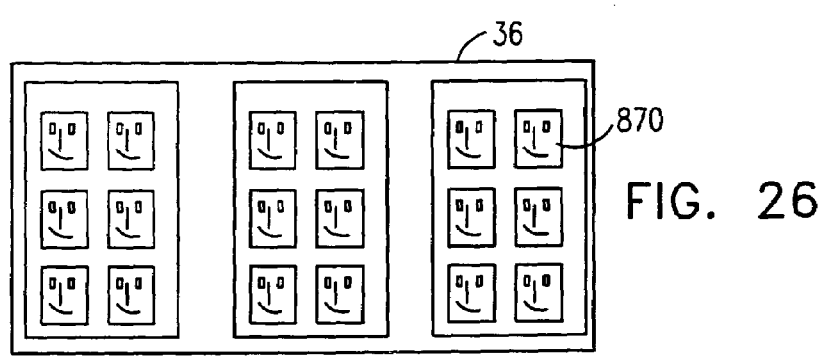
Figure 27:
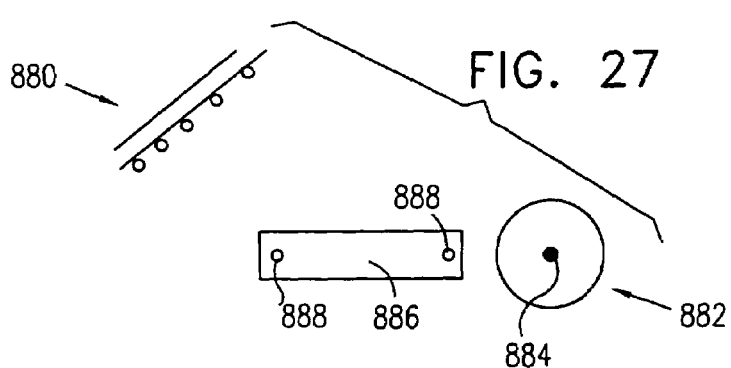
Figure 28A:
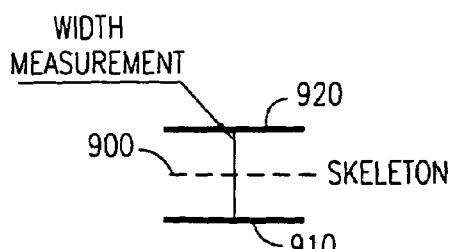
Figure 28B:
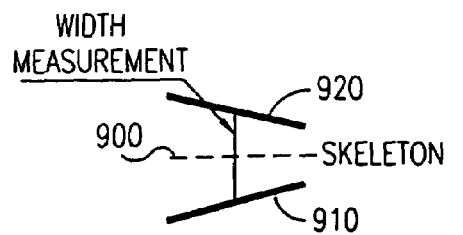
Figure 29:
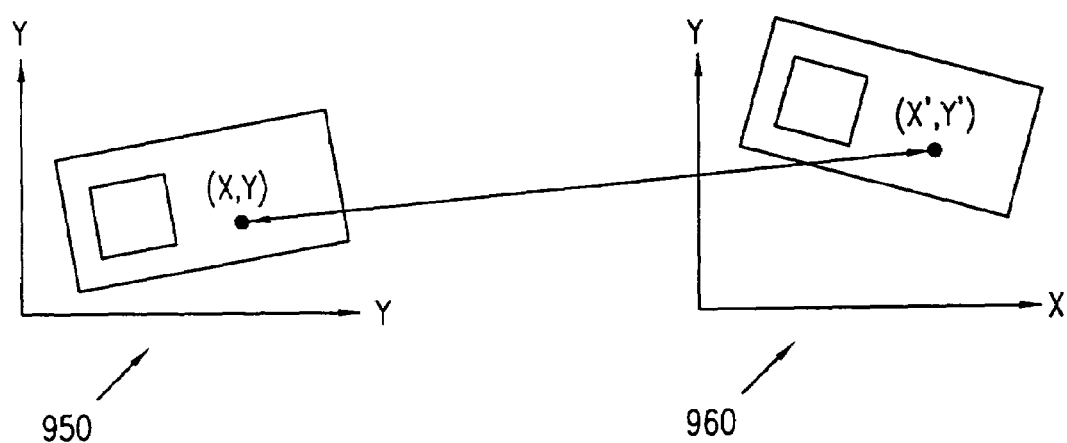
Figure 30A:
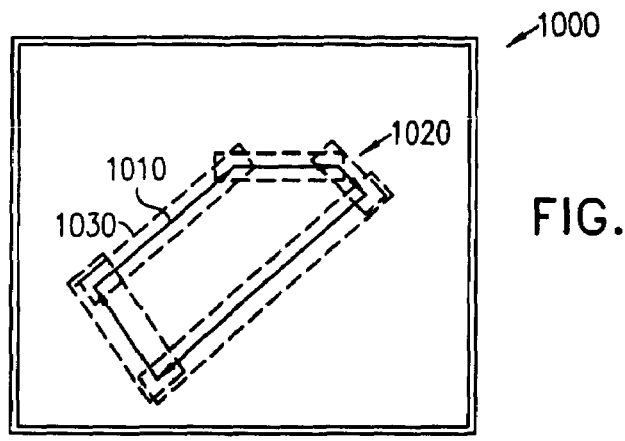
Figure 30B:
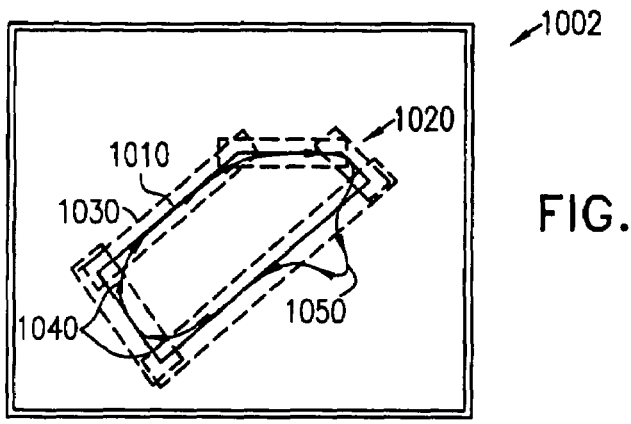
Figure 30C:
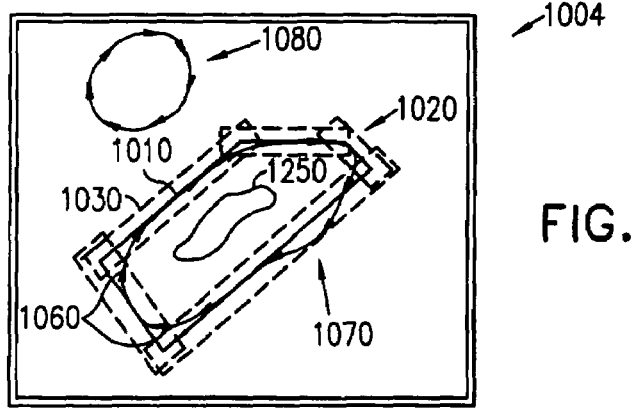
Figure 31:
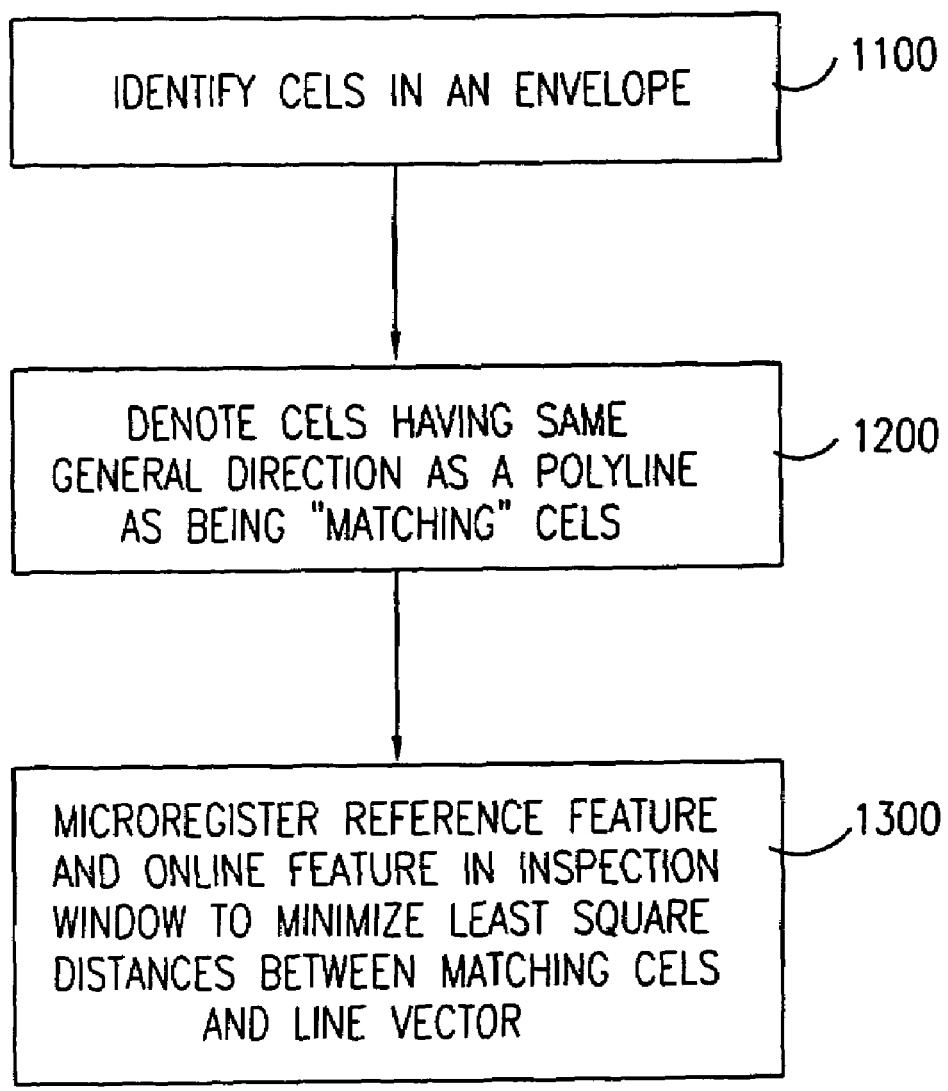
Figure 32A:
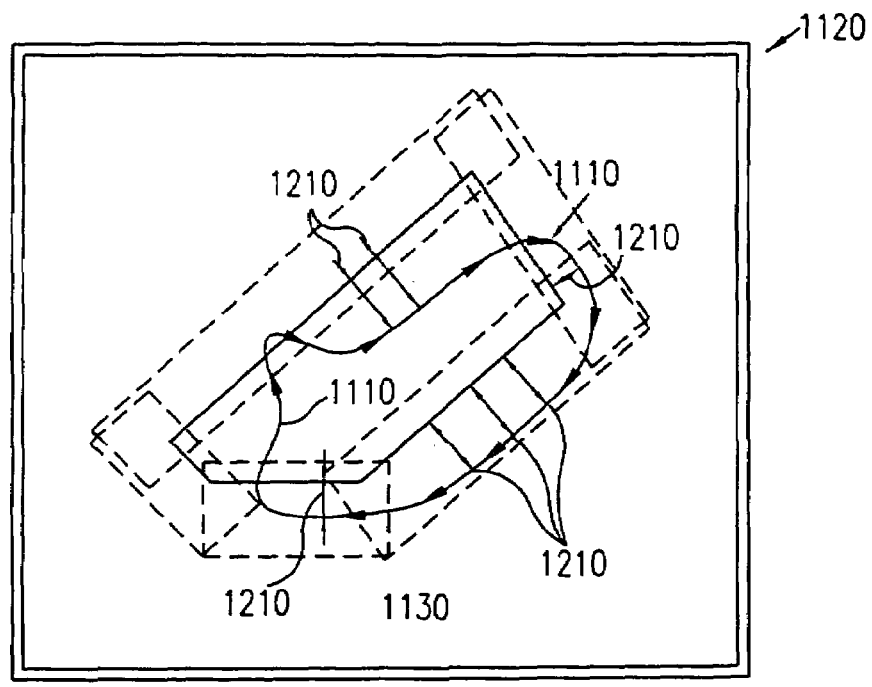
Figure 32B:
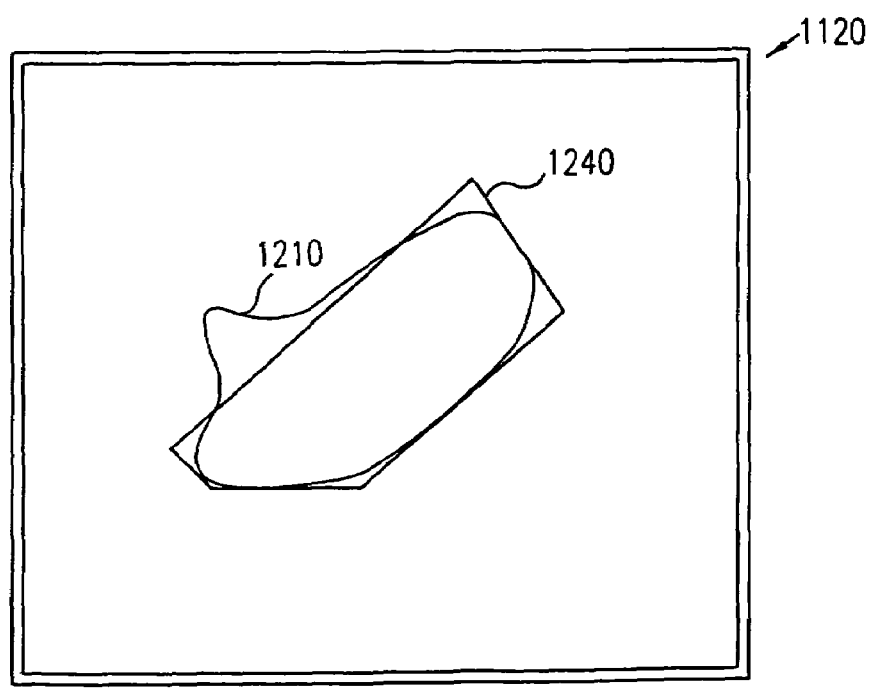
Figure 33:
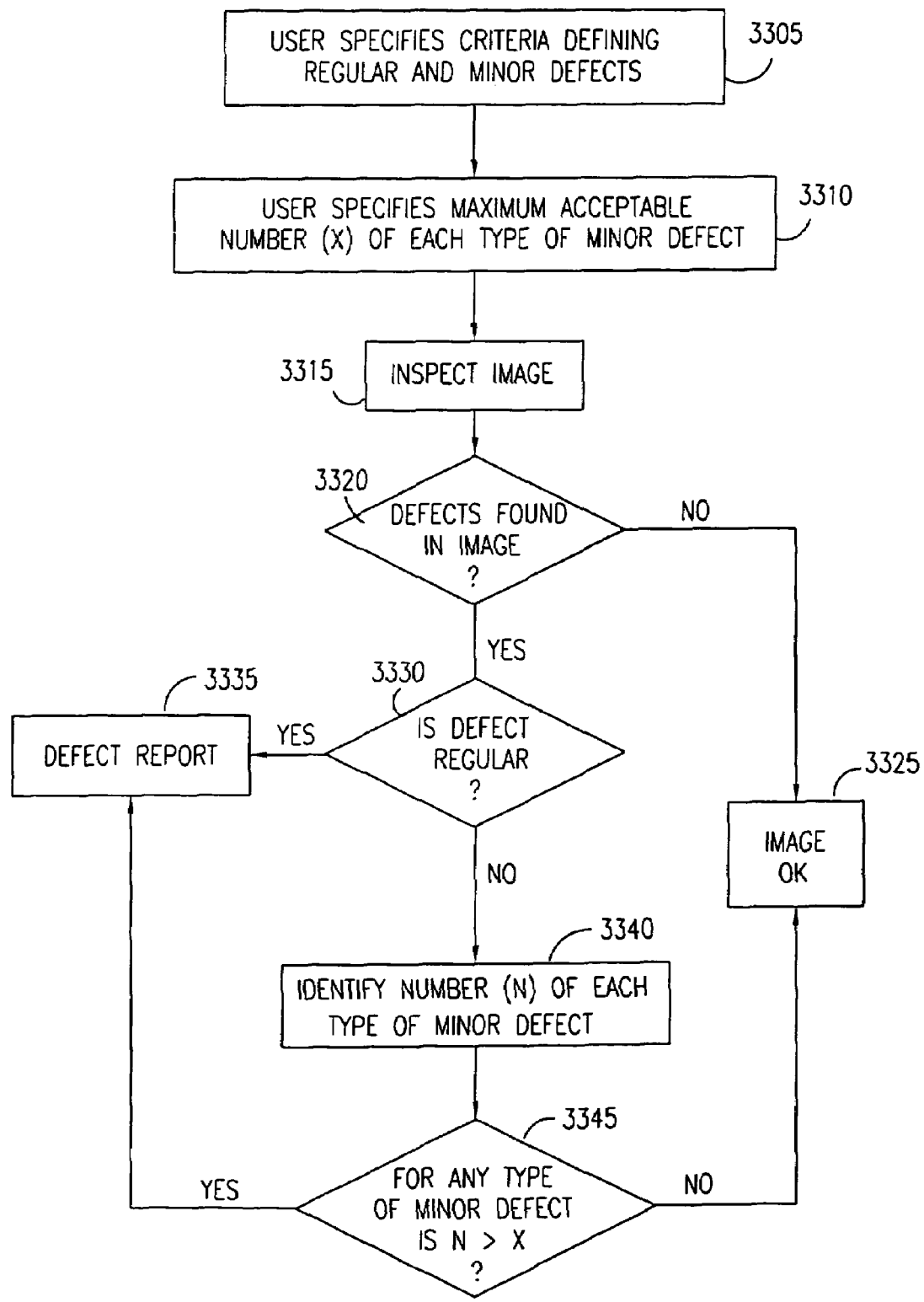
Figure 43:
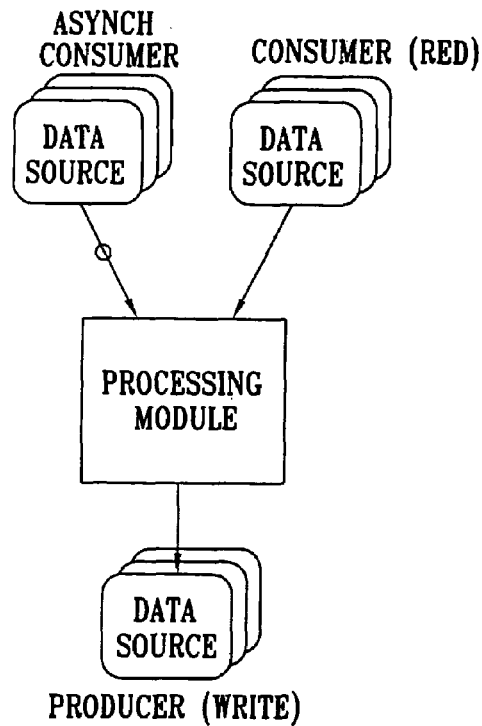
Figure 44:
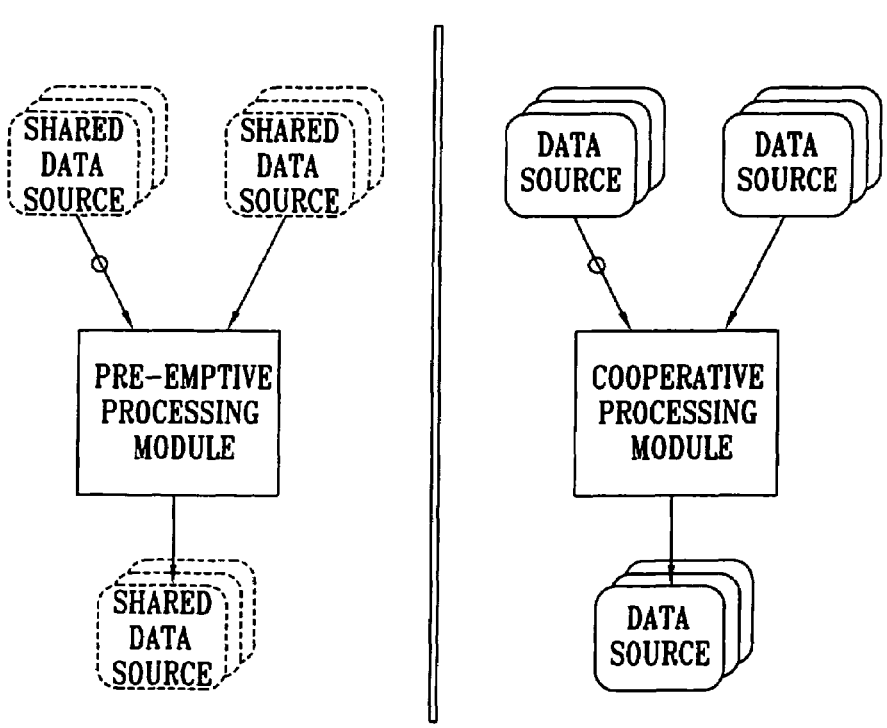
Figure 45:
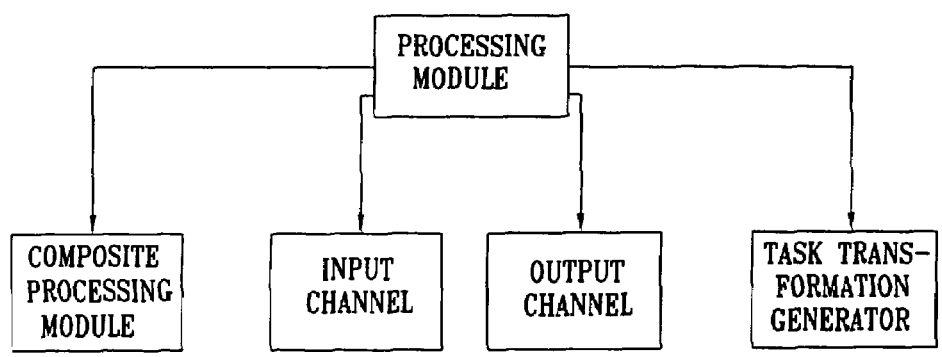
Figure 46:
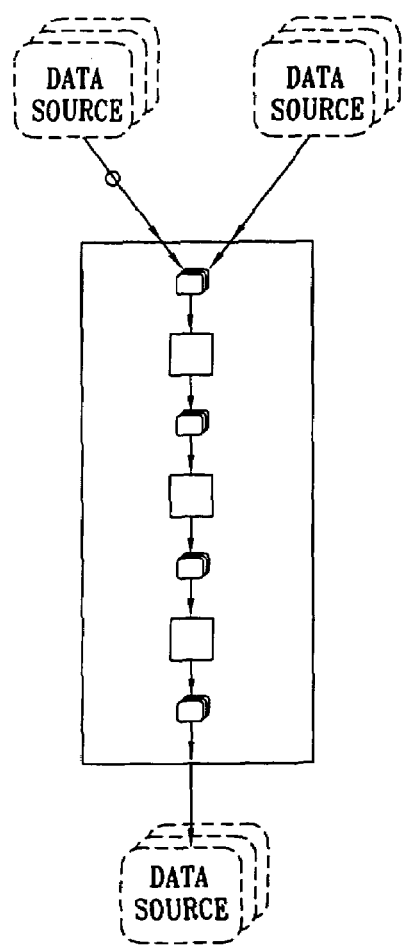
Figure 47:
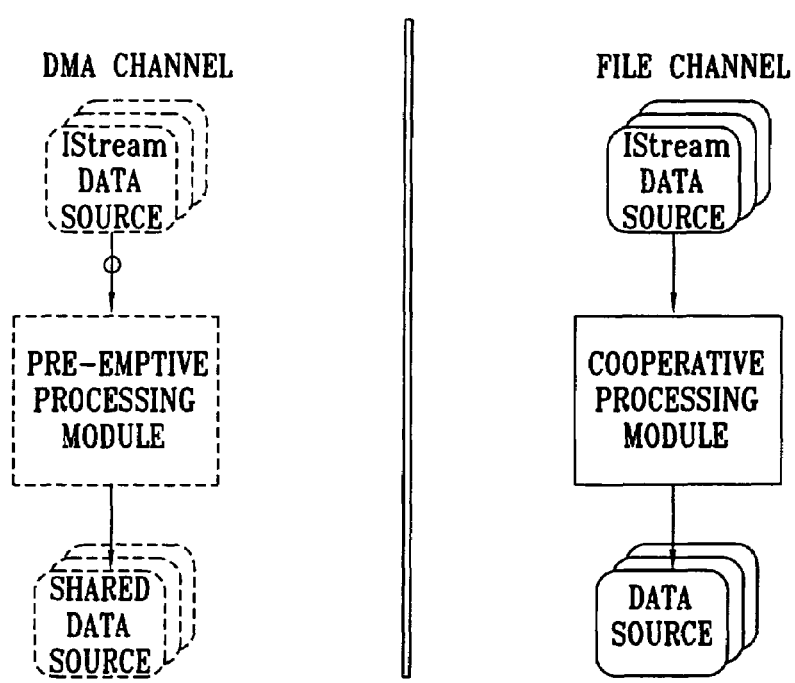
Figure 48:
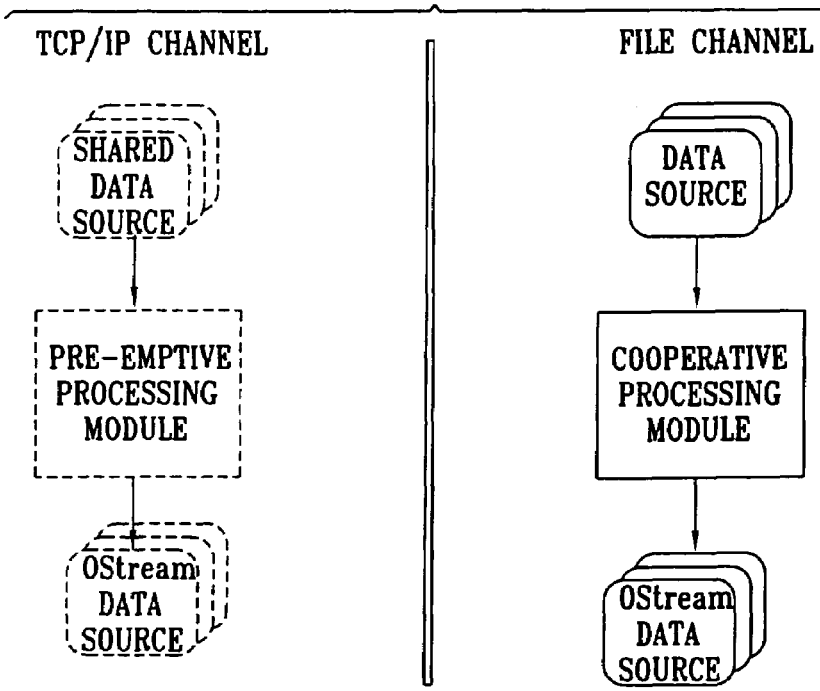
Figure 49:
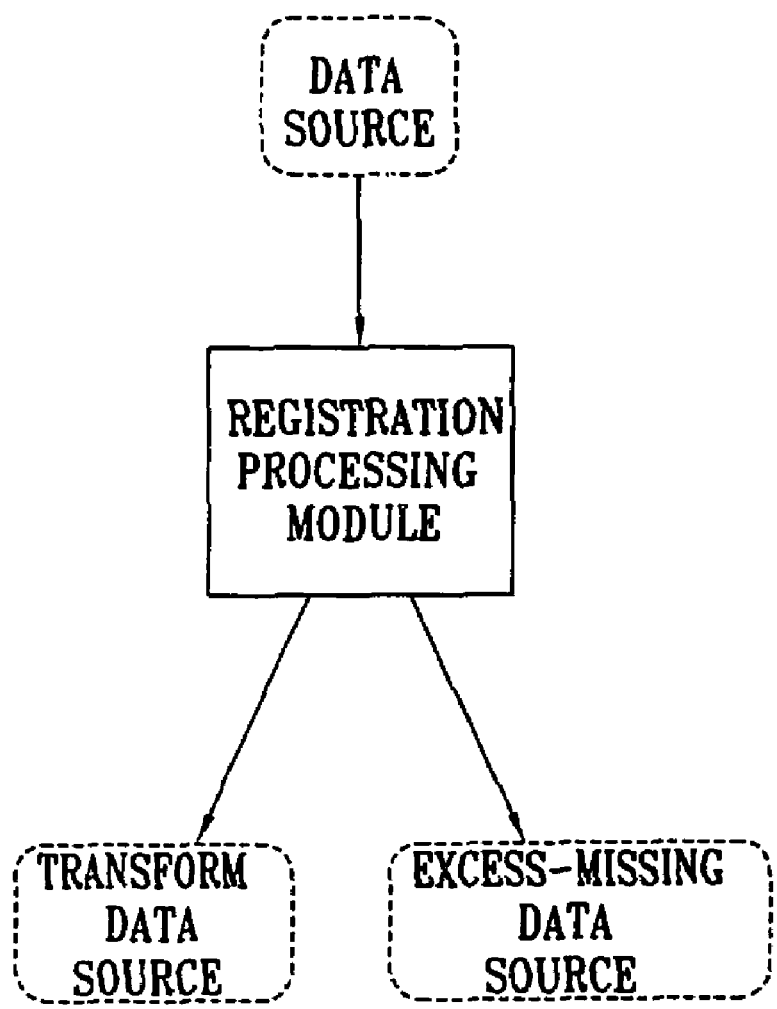
Figure 50:
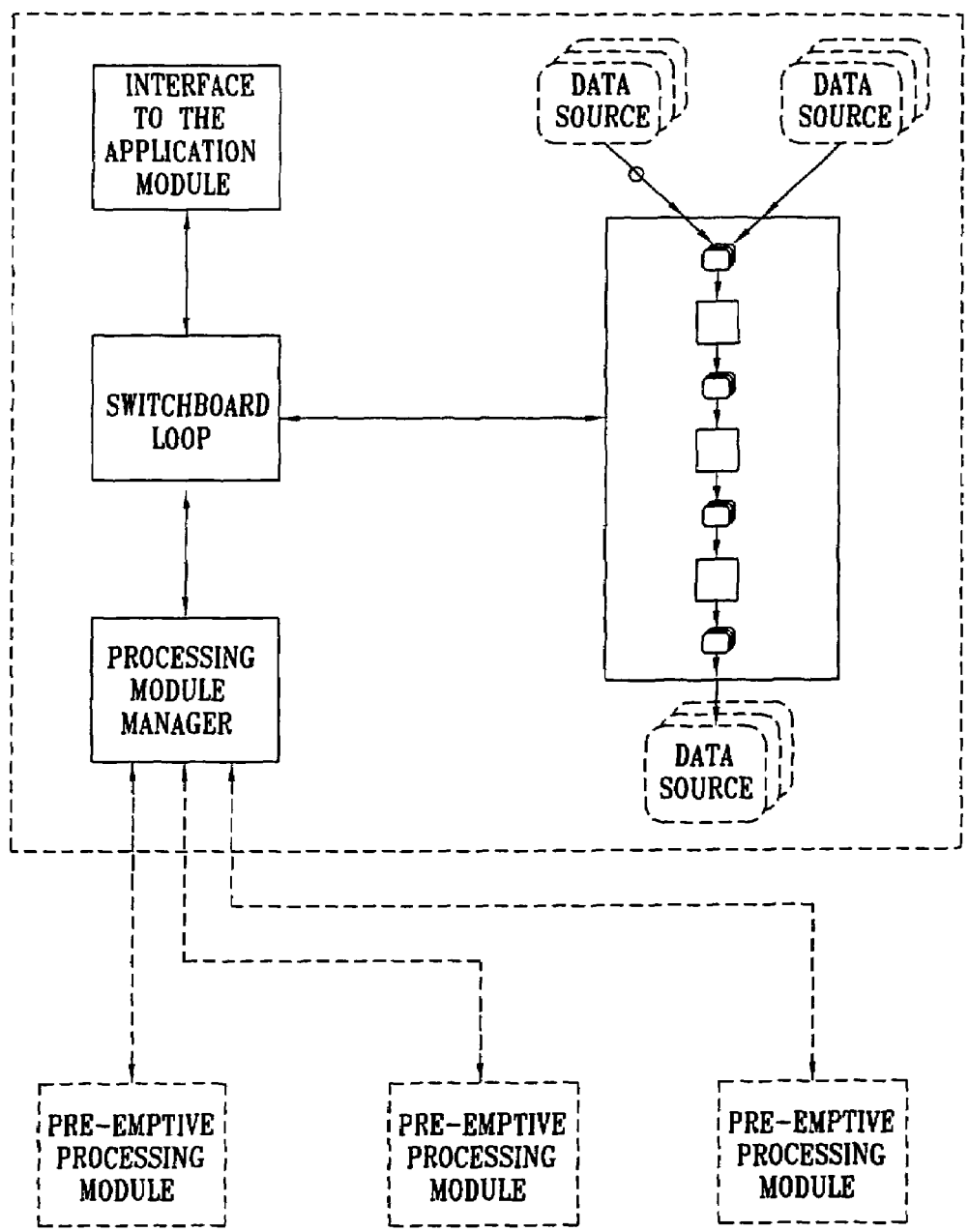
Figure 51:
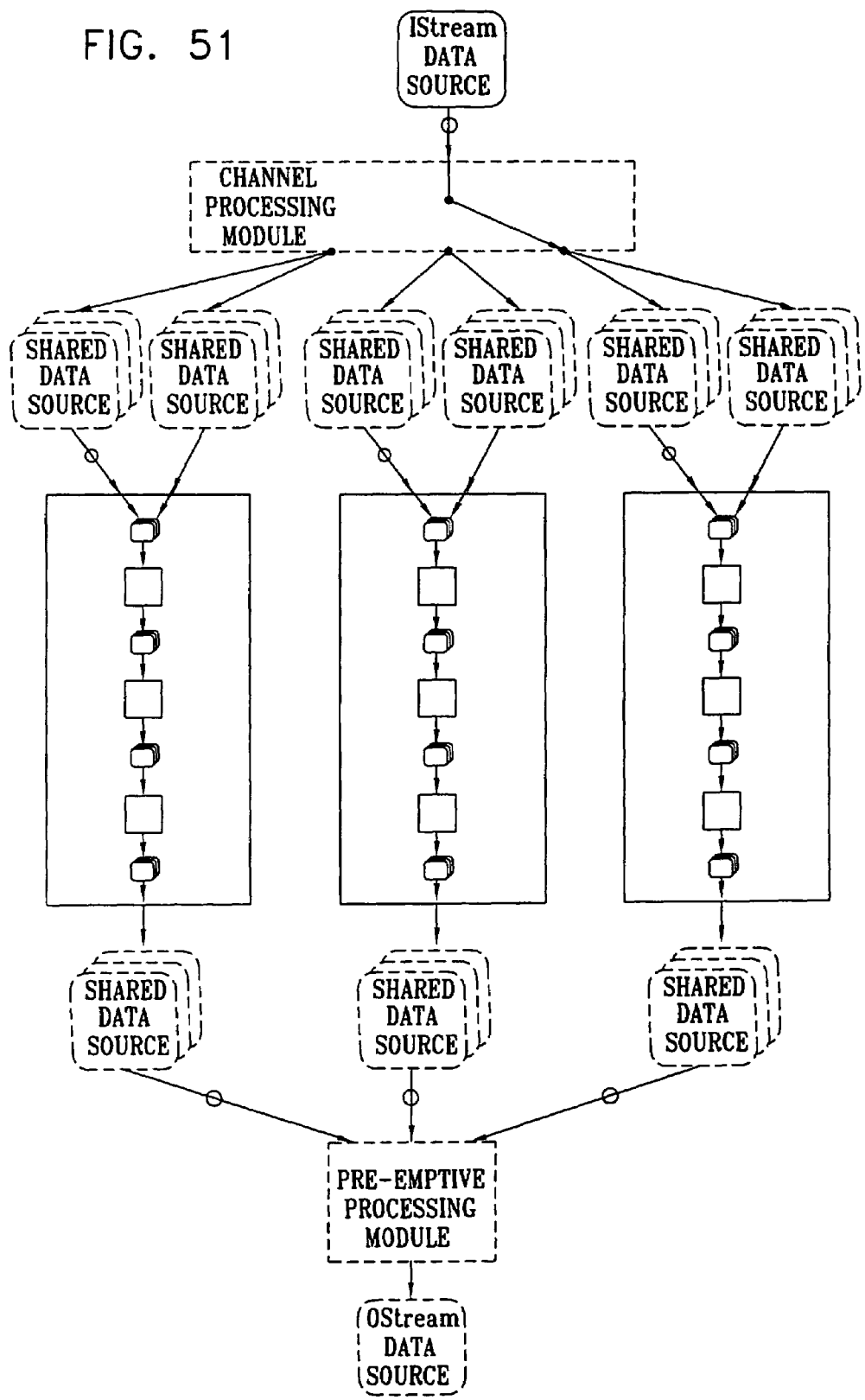
Figure 52:
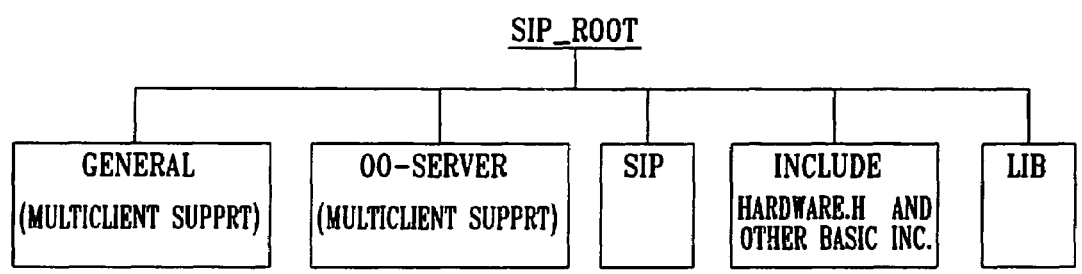
Figure 53:
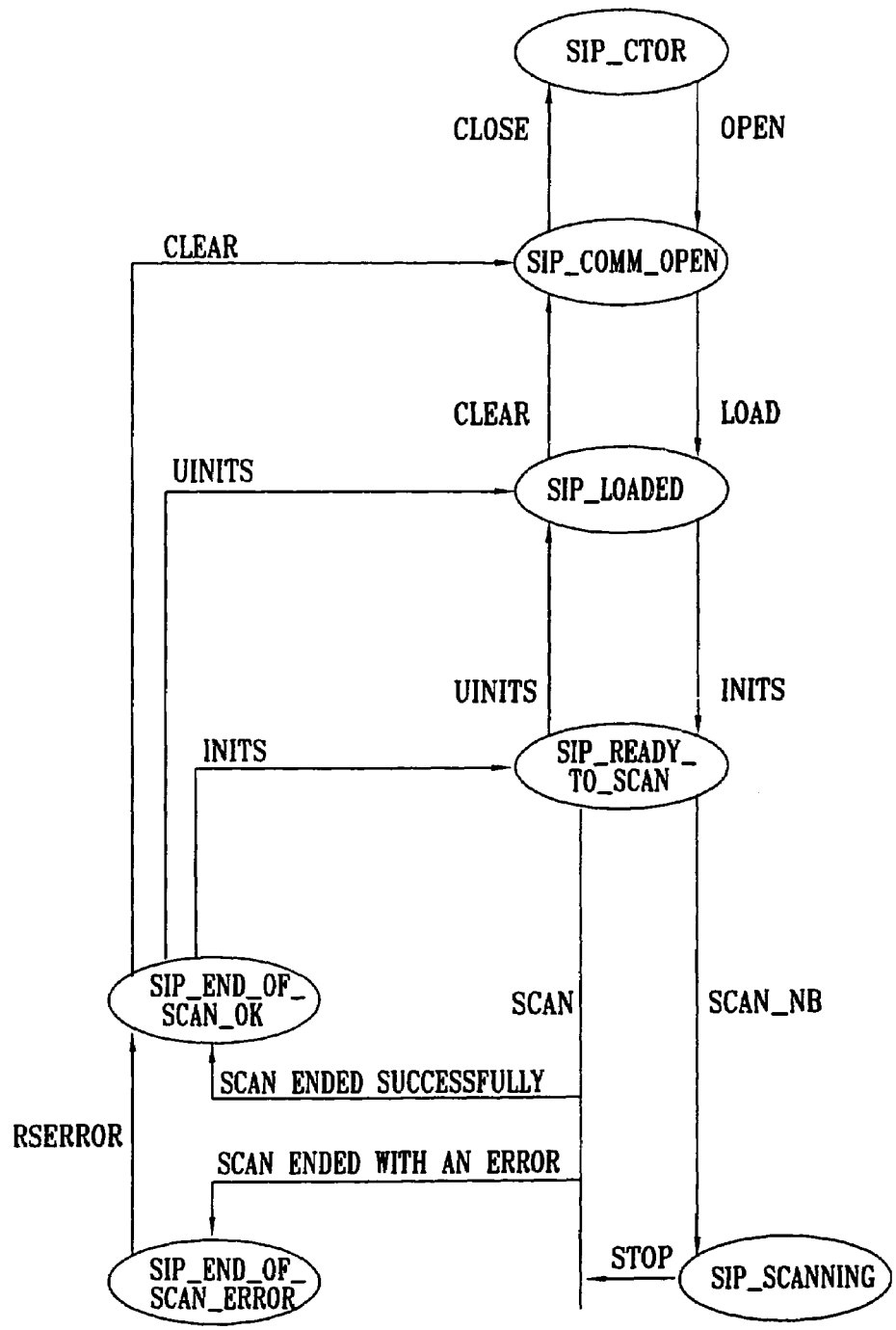
Figure 64:
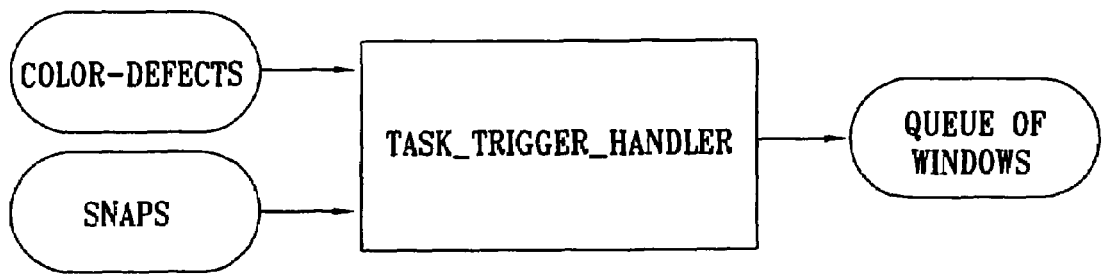
Figure 65:
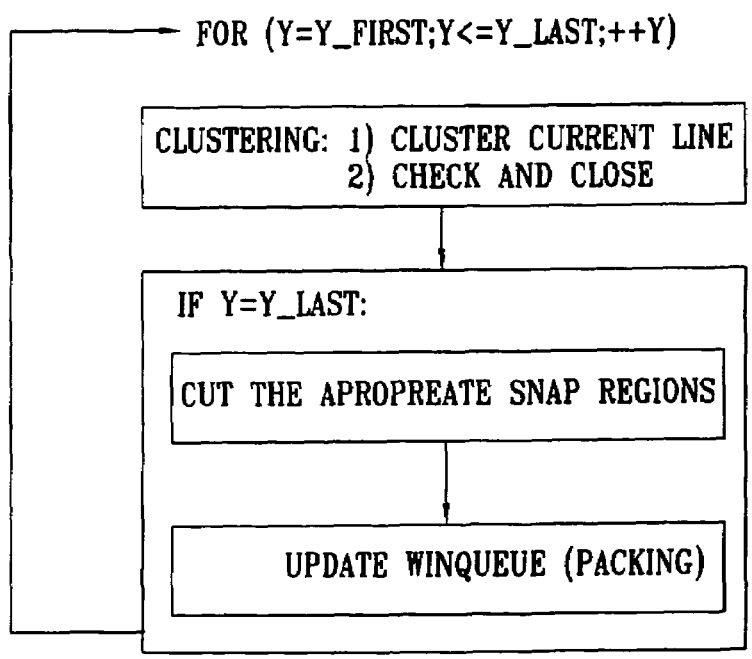
Figure 67A:
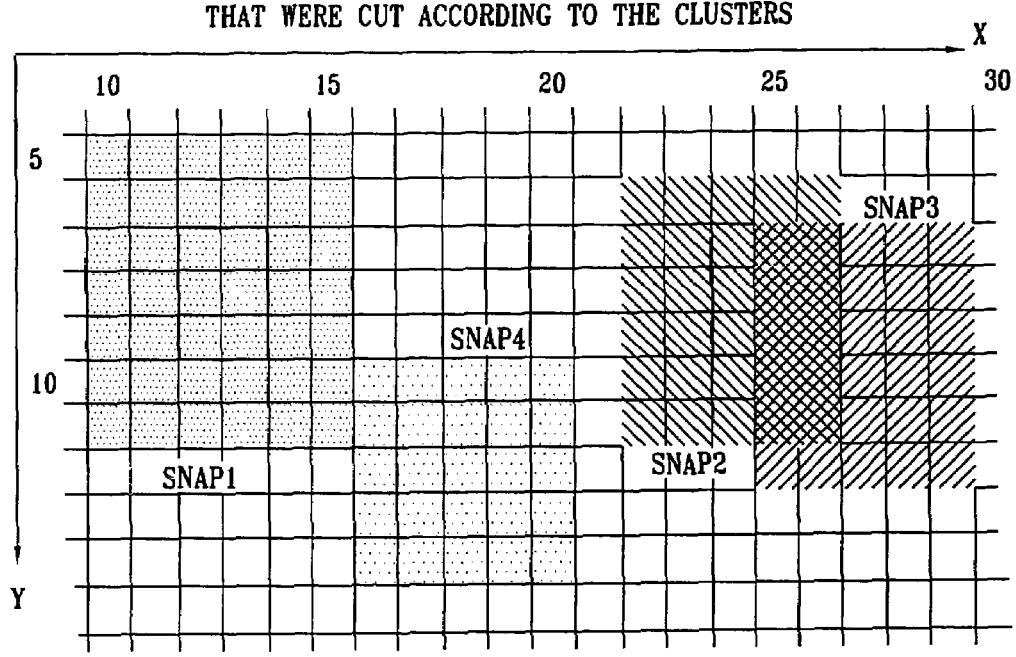
Figure 67B:
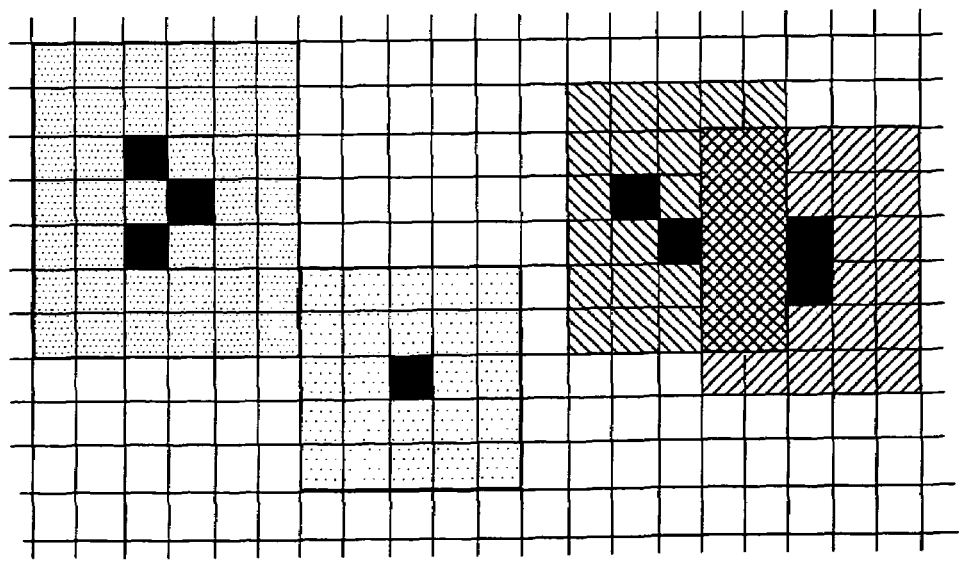
Figure 68:
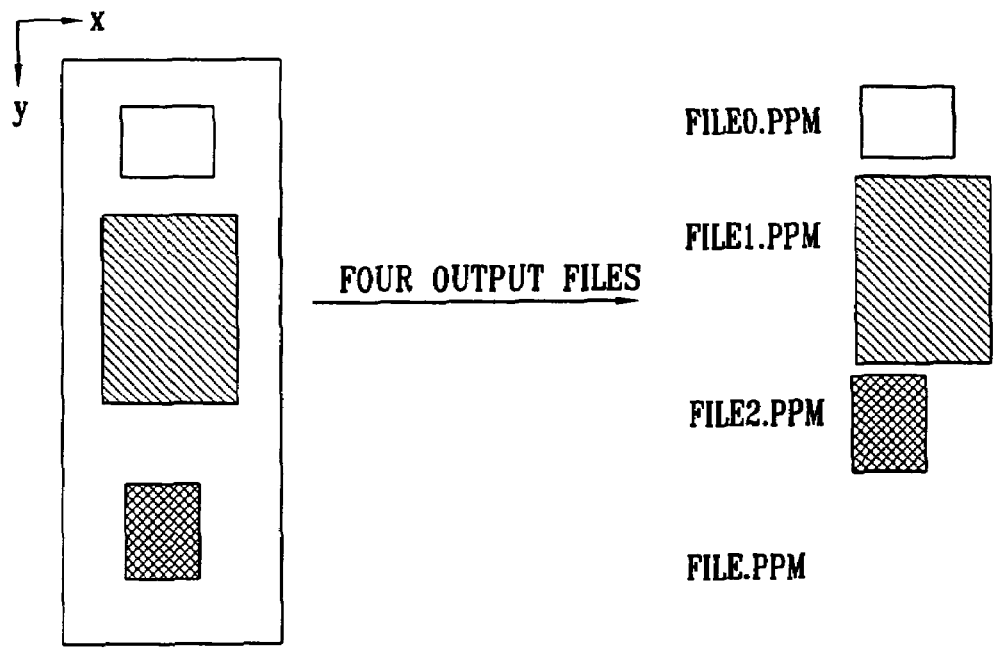
Figure 69:
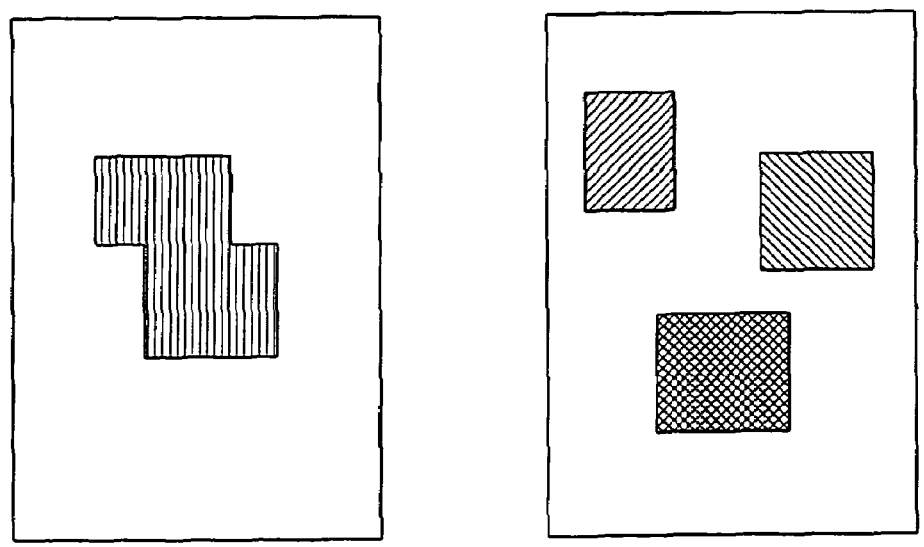
Figure 70:
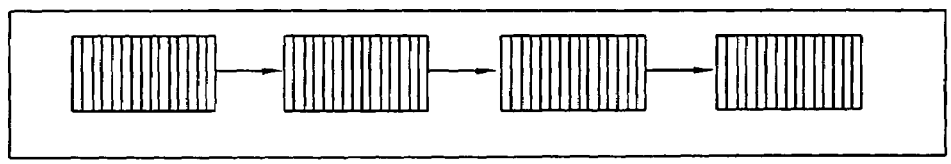
Figure 71:
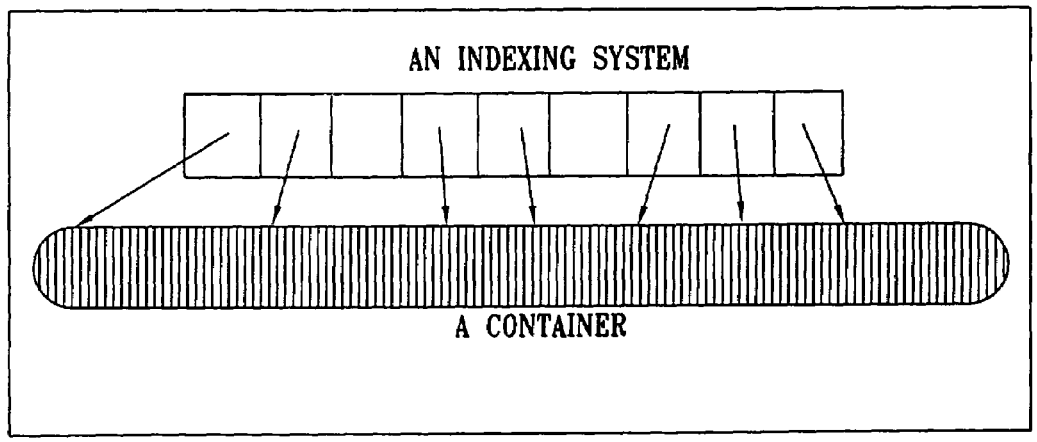
Figure 72:
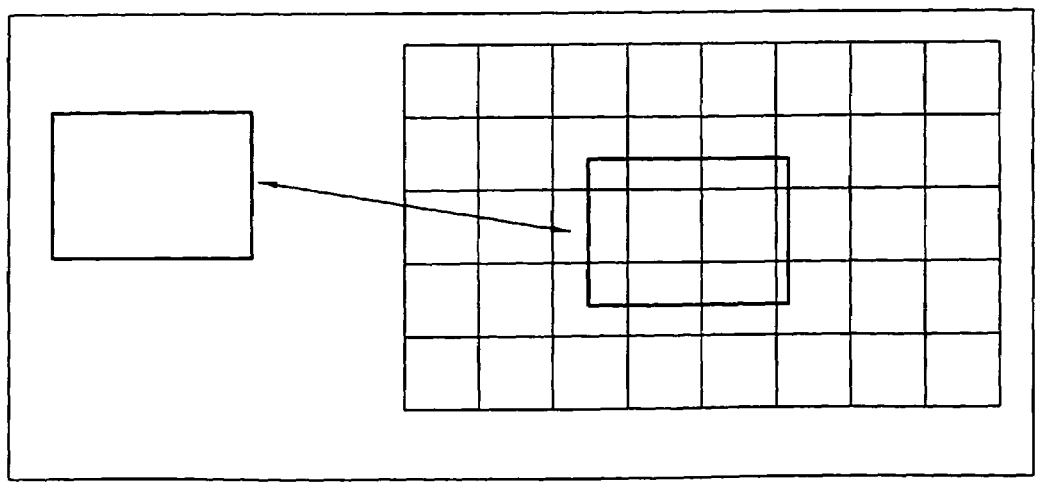
Figure 73:
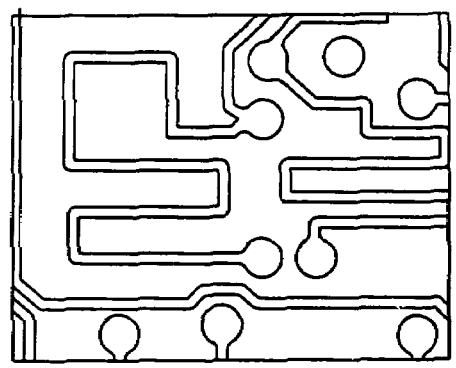
Figure 74:
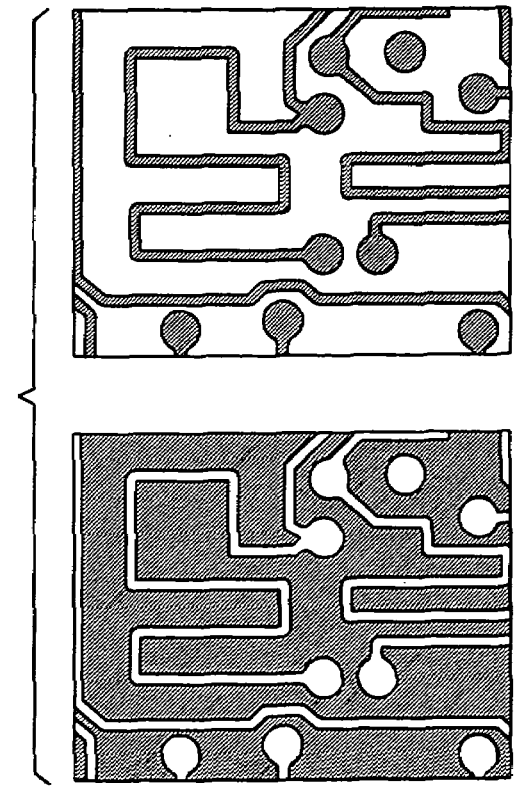

FIGS. 22A-22H is an illustration of an edge code preferably used to define the type of edge or edges included in an individual record;

FIGS. 23A-23H is an illustration depicting cell orientations for edge code values 0 to 9 respectively, and dir=1;

FIG. 23I is illustration of a CEL defined by the following parameters: edgecode=0, first=14, last=0;

FIG. 24 is a pictorial illustration of an envelope data structure surrounding a CEL;

FIG. 25 is a pictorial illustration of two envelopes enveloping two consecutive line segments respectively;

FIG. 26 is a simplified pictorial illustration of a collection of identical frames collected on a panel for inspection in accordance with a preferred embodiment of the present invention;

FIG. 27 is a pictorial illustration of an example of data that may exist inside a window;

FIGS. 28A-28B are pictorial illustrations of preferred form of line width measurement for parallel and non-parallel lines respectively;

FIG. 29 is a pictorial illustration of a transformation between an on-line and a reference coordinate system;

FIG. 30A is a pictorial illustration of a vectorized polygonal reference correlating to edge contours;

FIG. 30B is a pictorial illustration of on-line CELs overlaid over the polygonal reference of FIG. 30A, with perfect registration between on-line and reference data;

FIG. 30C is a pictorial illustration of on-line CELs, different from on-line CELs in FIG. 30B, overlaid over the polygonal reference of FIG. 30A, with perfect registration between on-line and reference data;

FIG. 31 is a simplified flow chart showing and describing a preferred method of micro-registration in accordance with a preferred embodiment of the present invention;

FIG. 32A is a pictorial illustration of on-line CELs overlaid over polygonal reference, with non-perfect registration between on-line data and the reference data;

FIG. 32B is a pictorial illustration of the structure of FIG. 31A after performance of a registration method in accordance with a preferred embodiment of the present invention;

FIG. 33 is a flow chart showing the function of an image processing system constructed and operative in accordance with another preferred embodiment of the present invention;

FIGS. 34-42 are screen displays from a general user interface used to define of parameters for inspection of an image by an image processing system constructed and operative in accordance with a preferred embodiment of the present invention;

FIG. 43 is a simplified block diagram showing relationships between data sources and a processing module constructed and operative in accordance with a preferred embodiment of the present invention;

FIG. 44 is a simplified block diagram showing relationships between data sources and a pre-emptive processing module constructed and operative in accordance with a preferred embodiment of the present invention;

FIG. 45 is a simplified block diagram showing user defined tasks of a processing module, constructed and operative in accordance with a preferred embodiment of the present invention;

FIG. 46 is a simplified block diagram illustrating a composite processing module constructed and operative in accordance with a preferred embodiment of the present invention;

FIG. 47 is a simplified block diagram illustrating input channels into a pre-emptive processing module and a cooperative processing module, constructed and operative in accordance with a preferred embodiment of the present invention;

FIG. 48 is a simplified block diagram illustrating output channels from a pre-emptive processing module and a cooperative processing module, constructed and operative in accordance with a preferred embodiment of the present invention;

FIG. 49 is a simplified block diagram illustrating a registration processing module constructed and operative in accordance with a preferred embodiment of the present invention;

FIG. 50 is a simplified block diagram illustrating root process manager, constructed and operative in accordance with a preferred embodiment of the present invention;

FIG. 51 is a simplified block diagram illustrating an execution graph scenario constructed and operative in accordance with a preferred embodiment of the present invention;

FIG. 52 is a simplified block diagram illustrating a root directory tree from which the SIP begins, constructed and operative in accordance with a preferred embodiment of the present invention;

FIG. 53 is a simplified flow chart illustrating SIP states and the commands that effect them, constructed and operative in accordance with a preferred embodiment of the present invention;

FIG. 54 is a simplified illustration of a single snap covering the area around a single Color_defect report, constructed and operative in accordance with a preferred embodiment of the present invention;

FIG. 55 is a simplified illustration of snaps covering the area around multiple Color_defect reports, constructed and operative in accordance with a preferred embodiment of the present invention;

FIG. 56 is a simplified schematic illustration of the structure of a line of 48 snap reports, constructed and operative in accordance with a preferred embodiment of the present invention;

FIG. 57 is an example of part of a Ball Grid Array substrate to be inspected by an inspection system constructed and operative in accordance with a preferred embodiment of the present invention;

FIG. 58 is a close-up view of the lower end of the Ball Grid Array Substrate of FIG. 57;

FIG. 59 is a close-up view of a bond finger on the Ball Grid Array substrate of FIG. 57 as viewed by an inspection system constructed and operative in accordance with a preferred embodiment of the present invention;

FIG. 60A is a flow chart illustrating data flow through a PIM map generator during the Learn stage of an inspection scan, constructed and operative in accordance with a preferred embodiment of the present. invention;

FIG. 60B is a flow chart illustrating data flow through a filter during the Inspect stage of an inspection scan, constructed and operative in accordance with a preferred embodiment of the present invention;

FIG. 61 is a simplified block diagram illustrating subtraction of regions by the map generator, constructed and operative in accordance with a preferred embodiment of the present invention;

FIG. 62 is a simplified block diagram illustrating the data structure of a PIM stored in runlength format, constructed and operative in accordance with a preferred embodiment of the present invention;

FIG. 63 is a simplified block diagram of the general structure of the PIM system, constructed and operative in. accordance with a preferred embodiment of the present invention;

FIG. 64 is a simplified block diagram illustrating inputs and outputs of a task trigger handler, constructed and operative in accordance with a preferred embodiment of the present invention;

FIG. 65 is a simplified flow chart illustrating the function of a task trigger handler, constructed and operative in accordance with a preferred embodiment of the present invention;

FIG. 66 is a simplified illustration of the run length structure of a task trigger handler where the map region is the bounding rectangle enlarged by two pixels on either side, constructed and operative in accordance with a preferred embodiment of the present invention;

FIG. 67A is a simplified illustration of the snap rectangular regions cut according to the clusters defined in FIG. 66;

FIG. 67B is a simplified illustration of the snap rectangular windows possessing the cluster, and a rectangle with RGB data, after processing of the clusters defined in FIG. 66;

FIG. 68 is a simplified illustration of the general configuration of a snap area treated by the process termed herein "task snap2ppm" that enables the separation of snap data into separate files each containing only one snap, constructed and operative in accordance with a preferred embodiment of the present invention;

FIG. 69 is a simplified illustration of examples of configurations of snap areas not treated by the task snap2ppm, constructed and operative in accordance with a preferred embodiment of the present invention;

FIG. 70 is a simplified illustration of a chain of blocks structure in a windowing reference management tool, constructed and operative in accordance with a preferred embodiment of the present invention;

FIG. 71 is a simplified illustration of the indexing main structure of a windowing reference management tool, constructed and operative in accordance with a preferred embodiment of the present invention;

FIG. 72 is a simplified illustration of fast retrieval of data via a windowing query, constructed and operative in accordance with a preferred embodiment of the present invention;

FIG. 73 is a simplified illustration of an electrical circuit on a board whose image is to be analyzed;

FIG. 74 is two additional simplified illustrations of a the board of FIG. 73

Figure 79:
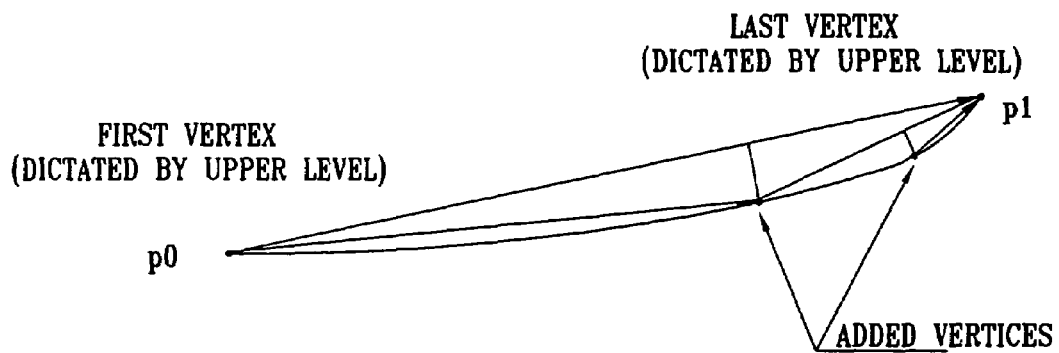
Figure 80:
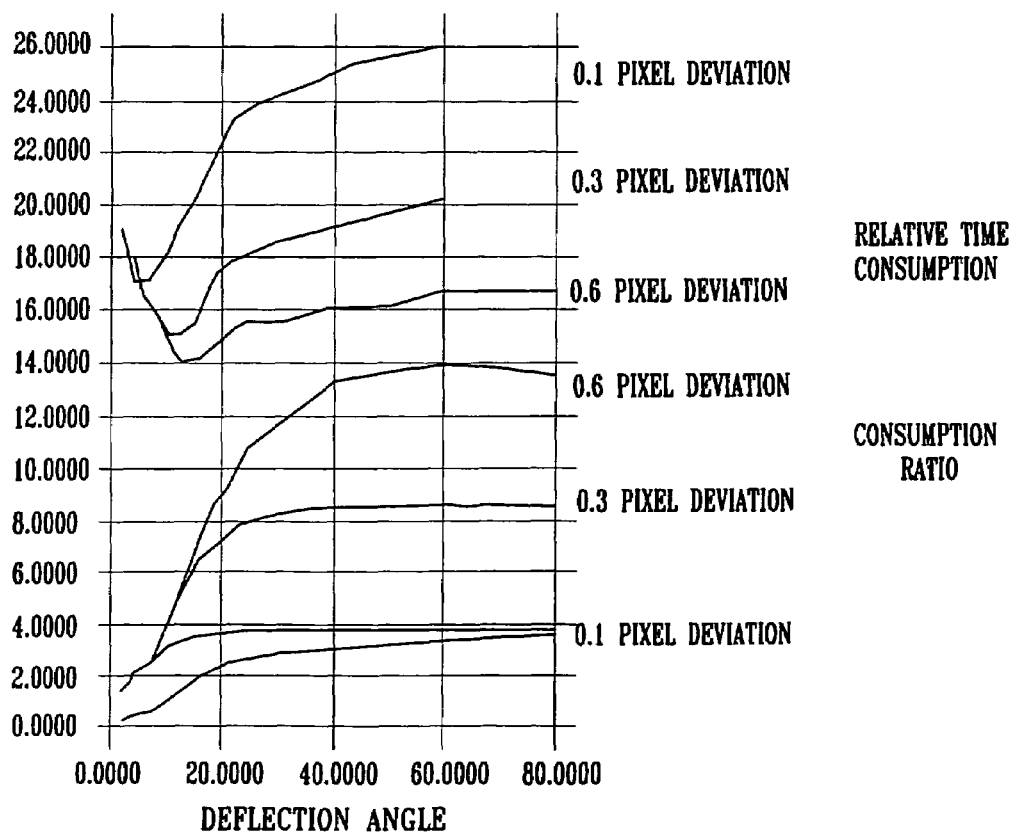
Figure 81:
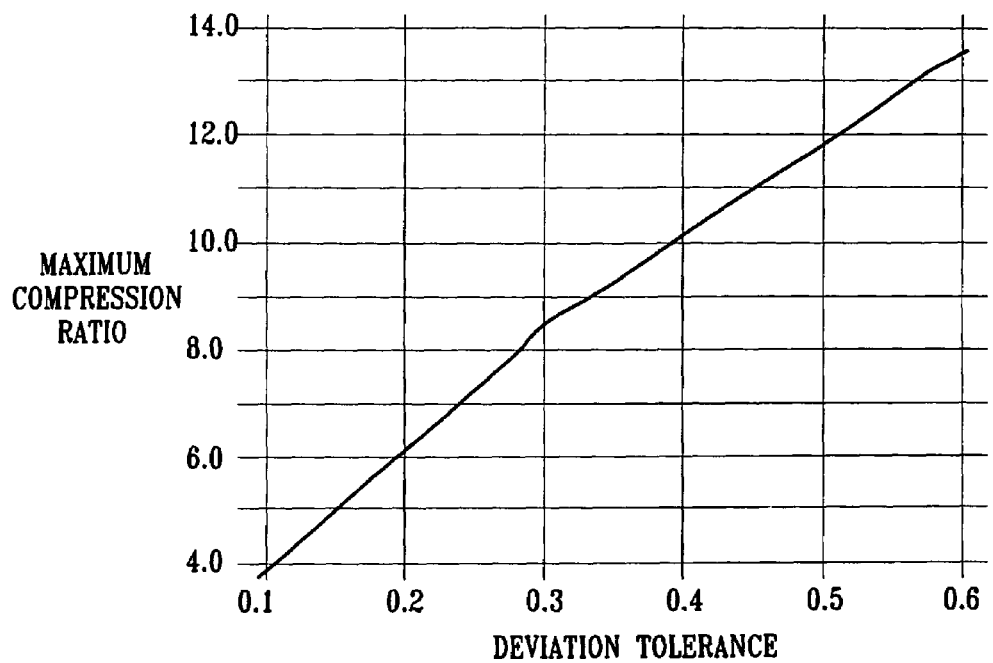
Figure 82:
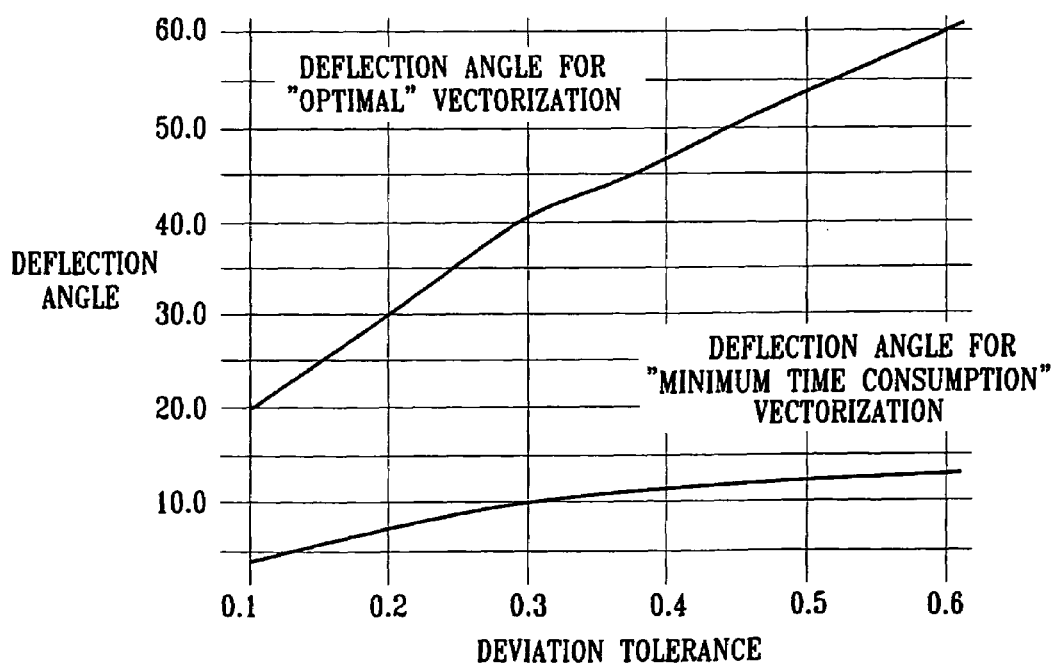

FIG. 75 is a polyline object illustrating the deviation parameter of a process for straight line approximation of connected components composed of CELs, constructed and operative in accordance with a preferred embodiment of the present invention;

FIG. 76 is a polyline object illustrating the deflection parameter of a process for straight line approximation of connected components composed of CELs, constructed and operative in accordance with a preferred embodiment of the present invention;

FIG. 77 is a graph illustrating the small CEL length parameter of a process for straight line approximation of connected components composed of CELs, constructed and operative in accordance with a preferred embodiment of the present invention;

FIG. 78 is a polyline object illustrating a 'quality assurance' mechanism in a process for straight line approximation of connected components composed of CELs, constructed and operative in accordance with a preferred embodiment of the present invention;

FIG. 79 is a polyline object illustrating an advanced 'quality assurance' mechanism in a process for straight line approximation of connected components composed of CELs, constructed and operative in accordance with a preferred embodiment of the present invention;

FIG. 80 is a graph illustrating the results of a performance test in a process for straight line approximation of connected components composed of CELs, constructed and operative in accordance with a preferred embodiment of the present invention;

FIG. 81 is a graph derived from the graph of FIG. 80 by examining the situation where the compression ratio (as a function of deflection angle) becomes constant for every vectorization style; and FIG. 82 is a graph derived from the graph of FIG. 80 by examining the deflection angle where the compression ratio (as a function of deflection angle) becomes constant for every vectorization style, and the deflection angle that produces minimum time vectorization.

Attached herewith are the following appendices which aid in the understanding and appreciation of one preferred embodiment of the invention shown and described herein:

Appendix A is a description of a preferred OOD design of symmetric multi-processing (SMP) capable SIP;

Appendix B is a description of a preferred structure of snap reports;

Appendix C is a description of a filter tolerance setting PIM constructed and operative in accordance with a preferred embodiment of the present invention;

Appendix D is a description of a SIP camera model, constructed and operative in accordance with a preferred embodiment of the present invention;

Appendix E is a description of registration and line width measurements constructed and operative in accordance with a preferred embodiment of the present invention;

Appendix F is a description of a preferred method for packing snap data;

Appendix G is a description of a preferred method for building PPM files for viewing snap data;

Appendices H and I, taken together are a description of structures and methods associated with the windowing of reference raw data, constructed and operative in accordance with a preferred embodiment of the present invention;

Appendix J is a description of a preferred method for performing the balls measurement task;

Appendix K is a description of a preferred. method for creating connected components from CELs; and Appendix L is a description of a preferred method for approximating connected components by straight lines.

DETAILED DESCRIPTION OF PREFERRED EMBODIMENTS

Overview

In the following specification, although reference is extensively made to BGAs (ball grid array substrates) for the purposes of illustrating the present invention, it is readily appreciated that the invention is applicable to the inspection of any suitable patterned object. Thus, the term BGA, as used hereinbelow, shall not be limited solely to ball grid array substrates, but rather shall be considered exemplary and deemed to refer to include any suitable form of patterned object, such as printed circuit board substrates, laminated printed circuit boards, lead frames, flat panel displays, hybrid chip packaging substrates, tape automated bonding substrates, and any other suitable patterned object including various etched and engraved metal substrates as may be used, for example, in medical implants.

In the drawings, unless indicated otherwise, rectangles denote functional units whereas rounded blocks denote data processed by the functional units.

Reference is now made to FIG. 1A which is a simplified block diagram of an image processing system constructed and operative in accordance with a preferred embodiment of the present invention.

In this embodiment, scanner 2 preferably optically scans object 4 and generates an RGB (Red, Green and Blue) two-dimensional image representing the object 4, and transmits RGB image information to an image processor 5. Preferably a spatial area of interest identifier 6 is provided, and image processor 5, spatial area of interest identifier 6 and line width and registration processor 3 output additional inspection triggers and other data to a SIP unit 7 located downstream which performs additional inspection functionalities not provided by image processor 5, preferably inspection functionalities that are dynamically adapted to an inspection trigger input so that each different type of inspection trigger causes a region associated with the trigger to be inspected with an inspection routine that is best suited for inspecting the region triggered.

Scanner 2 is preferably an image illumination and acquisition system as described in Applicant's copending U.S. patent application Ser. No. 09/565,500 entitled Illumination for Inspecting Surfaces of Articles", and filed on May 5, 2000, now issued as U.S. Pat. No. 6,437,312. Although scanner 2 is preferably operative to acquire RGB optical images, it is readily appreciated that scanner may be operative to acquire other forms of image, for example monochrome gray level images, images in HIS (Hue, Saturation and Intensity) format, or images correlating to non-optical properties of the object such as electric fields surrounding a printed circuit boards which define certain electrical properties relating to electrical circuits on the printed circuit board. It is appreciated that the present invention may relate to image processing of any suitable optical or non-optical image.

In accordance with a preferred embodiment of the invention, image processor 5 preferably is operative to receive image information data, to parse image information data into fundamental image data and to provide triggers based on the detection of suspected defects and predetermined features for additional inspection in a downstream inspection unit. Image processor 5 preferably is a multi-module processing unit that comprises one or more of the following modules:

(i) A binary CEL identifier 8 module. Binary CELs are contour elements that represent edge boundaries between bordering regions in an object 4, for which a high gradient in the level of reflective intensity exists between darker and lighter regions in a monochrome image. Binary CELs are referred to hereinbelow either as "CELs" or "binary CELs". Binary CEL identifier 8 receives and processes image data from scanner 2 and outputs a report of binary CELs existing in an image of object 4.

(ii) A color CEL identifier 10. Color CELs represent edge contours between bordering regions or different color populations in a pattern on the surface of object 4. A color population is region of substantially homogeneous color, and is preferably correlated to a material. Color CELs are generated with respect to color populations chosen from among a number of predetermined color populations, and which identify which of the color populations exist on either side of the edge. Color CEL identifier 10 preferably processes image data received from scanner 2 to identify the different color populations in the image data, correlates the color populations to materials known to be in the object, and outputs a report of color CELs existing in an image of object 4 which define regions of different materials and the borders between the regions.

(iii) A morphological feature identifier 11. Morphological features are predetermined features which are identifiable in a pattern. Morphological feature identifier 11 preferably is operative to receive inputs from one or more of image data from scanner 2, binary CEL information from binary CEL identifier 8, and color CEL information from color CEL identifier 10. Morphological feature identifier 11 processes these inputs, and outputs a report of morphological features, which trigger further inspection in a downstream inspection unit. Preferably, at least some of the morphological features are related to materials in object 4. In the context of BGA inspection, morphological features include for example: conductor pads, open ends, shorts, junctions, islands and other similar features as may be selected by an operator.

(iv) A Defect Identifier 13. Defects are predefined types of suspected defects which are identifiable in a pattern. Defect identifier 13 is operative to receive inputs from one or more of image data from scanner 2, binary CEL identifier 8 and color CEL identifier 10. Defect identifier 13 processes these inputs and outputs a report of suspected defects which trigger additional inspection in a downstream inspection unit. Preferably, suspected defects that are reported by defect identifier 13 are defects that are identified with reference to a set of predetermined design rules, and are identified without comparing the input data to a reference. In the context of BGA inspection, suspected defects comprise, for example: unevenness in contours defining conductors which exceed a predefined parameter of evenness, oxidation, low contrast color surface defects such as chemical residues, and high contrast surface defects such as scratches.

(v) An optional snap generator 14. When present, snap generator 14 preferably is operative, in response to feature and defect triggers received from morphological feature identifier 11 and defect identifier 13, to generate snapshot images of selected areas in the image. Snap images are portions of images received from the scanner 2 which preferably are generated as a 'window of interest' surrounding each inspection trigger received from morphological feature identifier 11 and defect identifier 13. Additionally, snap generator 14 may generate snap images for spatial regions of interest in accordance with triggers received from a spatial area of interest identifier 6 as described in greater detail hereinbelow.

Preferably, the shape and dimension of snap images output by snap generator 14 are dynamically structured in response to a trigger according to the specific type of region of interest. Snap generator 14 preferably is operative to output image data which is readily converted into a dynamic image in a downstream process. A preferred hardware implementation of an image processor suitable for use as image processor 5 is described in Applicant's copending patent application IL 131092. It is readily appreciated that the above description is organized around the preferred image processing functionalities existing in image processor 5. However, the function of image processor 5 may in fact be grouped into modules, for example binary processing, color processing and morphological processing, which issue functional reports grouped as described above.

Reports may be grouped into various reporting channels depending on hardware architecture. Accordingly, in a preferred embodiment of the invention, image processor 5 generates reports which are provided to the SIP 7 in two channels, wherein each report channel comprises a number of reports. Preferably, a first channel, designated the "Snap Channel" comprises a report of defect data relating to color surface defects from the defect identifier 13 and a report which comprises snap images of regions of interest from snap generator 14. A second channel, designated the "CEL" channel, preferably comprises a report of binary CELs from binary CEL identifier 8, and report called a defect report which reports color CELs from color CEL identifier 10, morphological features from morphological feature identifier 11, and binary defects, such as nicks and protrusions, also from defect identifier 13.

In accordance with a preferred embodiment of the present invention, a spatial area of interest identifier 6 is provided to define recurring spatial areas of interest in an inspected object. Spatial areas of interest are regions existing in object 4, in which a specific type of feature is expected to be present, and for which a predefined inspection routine tailored to the specific type of feature is typically performed.

Preferably, the spatial area of interest generator 6 is operative, in an off-line "learn" mode, described in greater detail below, prior to defect inspection. In a preferred embodiment, spatial area of interest identifier 6 comprises two modules: a user defined areas of interest module 28 and a computer generated area of interest module 9.

Preferably, in the learn mode, via a general user interface described in greater detail with respect to FIGS. 34-42 hereinbelow, which is part of user defined area of interest module 28, a user defines general regions of inspection interest which are located on objects to be inspected 4 in a batch of objects. Preferably, the user also identifies a type of structure which is expected to be located in area of interest. Accordingly, in the context of inspection of BGAs, the user may define a general region that comprises bonding pads, targets, chip areas or balls.

In computer generated areas of interest module 9, a computer processor, which may in an alternative embodiment comprise a part of the image analyzer 24 in the SIP 7, "learns" the location of the structures identified by the user as structures of interest in the spatial region defined by the user in the user defined area of interest module 28. Computer generated areas of interest module 9 preferably generates a report which specifies a localized spatial area around closely surrounding each of the structures in the area defined by the user. Accordingly, in the context of BGA inspection, if the user defines a general region including bonding pads, the computer generated area of interest module "learns" the structure and location of each bonding pad in the region defined by the user, and wherever a bonding pad is expected to be located, the computer generated area of interest module defines a localized region of interest. The localized spatial areas of interest defined around each structure in the user defined area are saved in a memory, preferably associated with the SIP 7 (not shown) for later access during inspection.

In accordance with a preferred embodiment of the present invention, SIP 7 is provided downstream of image processor 5, and is operative to receive image data from image processor 5 and to perform inspection routines that are not provided by image processor 5. For example, SIP 7 is operative in part to provide a comparison mode inspection in which parsed image data from an object being inspected 4 is compared to reference data for the object. Additionally, SIP is operative in part to dynamically adapt inspection routines according to predefined rules correlating to spatial regions according to stored information from the spatial area of interest identifier 6, to types of features that are detected during image processing by image processor 5, and to types of defects that are detected during image processing by image processor 5.

Preferably SIP 7 is a software based image processor unit running customized software image processing routines on a dedicated workstation, e.g. a microcomputer workstation operating in a LINUX™ environment, and comprises the following modules: (i) a line width and registration processor module 3, (ii) a task packer and window of interest generator module 12, and (iii) an analyzer module 15.

In accordance with a preferred embodiment of the invention, line width and registration processor 3 receives binary CEL information from binary CEL identifier 8 and morphological feature data from morphological feature identifier 11, and processes the input information in the following modules: (i) a registration generator module 18 operative to perform registration transformations in a transform calculator 20 to register an image of an object under inspections to a reference image, and to determine the presence and absence of features in an excess/missing calculator 22 to determine whether all the expected features, and only those expected features, are present in an object under inspection 4; and (ii) a line width calculator 16 operative to receive registration transform data from transform calculator 20 to calculate line widths for conductors and to verify that the line width at each particular location is within a permitted range for the location, and to verify that the space between conductors is not smaller than a predetermined global value.

The configuration and operation of a preferred registration generator 18 and its respective transform calculator 20 and excess/missing calculator modules 22 are described in greater detail below. The configuration and operation of a preferred line widths calculator 16 is described in greater detail with reference to Appendix E In accordance with a preferred embodiment of the present invention, the task packer/window of interest generator unit 12 of SIP 7 preferably receives inputs from each of the following modules: binary CEL identifier 8, color CEL identifier 10, morphological feature identifier 11, defect identifier 13, transform calculator 20, excess missing calculator 22, and line width calculator 16. In addition task packer 12 receives spatial areas of interest that were defined in a learn mode by spatial area of interest identifier 6, and subsequently stored in memory.

Task packer 12 is operative to generate a window of interest surrounding various inspection triggers. Inspection triggers preferably are predetermined types of features received from morphological feature identifier 11, predetermined types of defects received from defect identifier 13, and predetermined spatial areas of interest identified by spatial area of interest identifier 6, and predetermined line width defects, excess/missing defects received from line width and registration processor 3, and stored in memory. Optionally, each inspection trigger is provided with a snap image from snap generator 14 of a region surrounding the trigger. Preferably, the shape and dimensions of the snap image are produced dynamically in response to the type and/or the location of a trigger in accordance with a predetermined rule. The shape and dimensions of the snap image may also be standard for generally all inspection triggers.

For each inspection trigger, task packer 12 preferably generates a package which comprises the identification of an appropriate inspection task which is chosen dynamically in order to perform a particular inspection task in response to a particular type of inspection trigger that is received, and the appropriate image information data necessary to perform the task chosen. For example, in the context of BGA inspection, a package for a bonding area defined as a spatial area of interest preferably comprises identification of an appropriate bonding area inspection task along with a complete set of binary CEL, color CEL and morphological feature date for the spatial region. A package for regions identified as having a color surface defect preferably comprises an identification of a color surface defect inspection task and a snap image of the affected area, but no CEL information. A package for a region identified as having a nick/protrusion defect preferably comprises an identification of an appropriate nick/protrusion inspection method, binary CELs for the affected region and optionally a snap image.

Figure 1B:
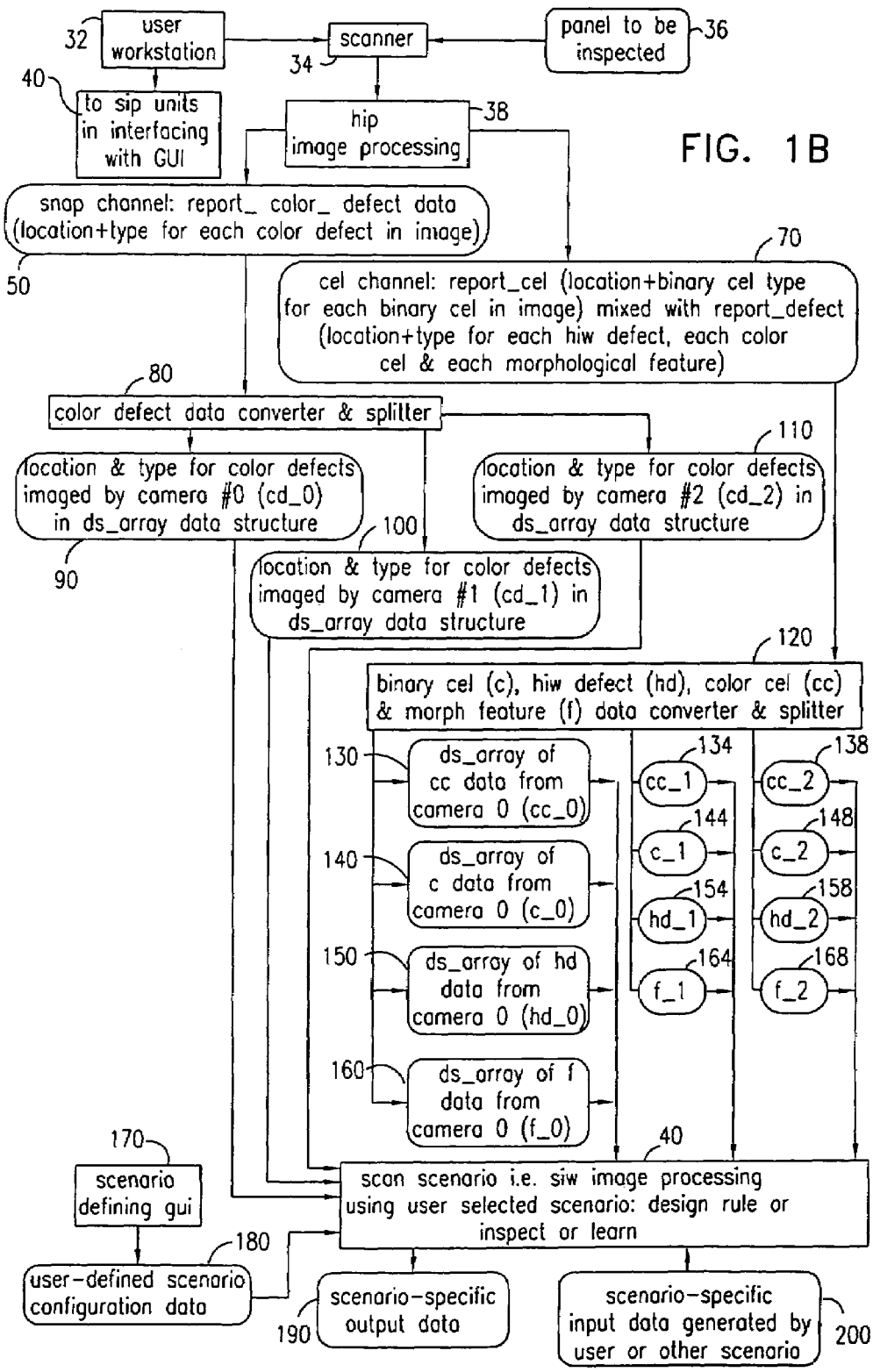
FIG. 1B is a simplified functional block diagram of an image processing system constructed and operative in accordance with another preferred embodiment of the present invention.

Task packer 12 typically transmits a dynamic processing package, comprising image and method information, represented by a large arrow, as seen in FIG. 1B, to the analyzer unit 15. Dynamic information is preferably only transmitted to analyzer 15 for specific, defined regions of the image, based upon defect, feature and area of interest information received by the task packer 12. This "pre-processing" significantly reduces the amount of image data to be analyzed by analyzer unit 15, and hence lowers the computational load, which ultimately reduces inspection time costs associated with analyzing an object.

In accordance with a preferred embodiment of the present invention analyzer unit 15 preferably comprises two units: an image analyzer module 24, and a post processor module 26.

Image analyzer module 24 preferably is operative to receive the dynamic processing package and analyze the information contained therein by employing the method identified by task packer 12. Typically, the inspection methods identified by task packer 12 and performed by image analyzer 24 are comparison based inspection tasks in which a region in the image surrounding each inspection trigger is analyzed and compared to a reference. Comparison is preferably based on a comparison of CELs in the image of the object being inspected 4 to CELs in a reference image for the region correlating to the region triggered as having a suspected defect.

The post processor 26 preferably is operative to implement the defect filter of FIG. 33, described below. It is also preferably operative to analyze snapshot images from scratch with respect to regions that are determined by image analyzer 24 to comprise defects of a predetermined type for which there is a high probability of the suspected defect being a false positive.

SIP 7 functions substantially as described herein, and preferably provides an output report 30 of defects and features of the object based upon the windows of interest provided by the window of interest generator.

Reference is now made to FIG. 1B which is a simplified functional block diagram view of a BGA (ball grid array) substrate inspection system constructed and operative in accordance with another preferred embodiment of the present invention. The BGA inspection system of FIG. 1B is similar to the preferred embodiment described with respect to FIG. 1A, however it is notably different in that the BGA inspection system seen in FIG. 1B shows inputs from three sensors, or cameras, which are part of scanner 34 (corresponding to scanner 2 in FIG. 1A), and does not include a snap generator 14. It is appreciated that reference to an inspection system for inspection of BGAs is intended for illustration purposes, and that any suitable object may be inspected.

As seen, the inspection system of FIG. 1B comprises a user workstation 32, a scanner 34 which typically generates an RGB image or other digital image of a given panel to be inspected 36, and an HIP (Hardware Image Processing) unit 38, typically comprising dedicated hardware that processes images generated by the scanner 34. It is appreciated that while HIP is preferably implemented in dedicated hardware, HIP may also be implemented in a DSP environment, or in custom software running on a general purpose computer workstation. As discussed HIP unit 38 (which corresponds to image processor 5 in FIG. 1A) typically generates the following outputs, as described in detail below:

a. Binary CELS
b. Morphological features
c. Color CELS;
d. Color defects;
e. Snapshots of RGB images around selected defects.

Downstream of the HIP unit 38 is a SIP (Software Image Processing) unit 40 which receives the above 5 inputs from the HIP 38 unit and performs image processing operations as described in detail below. It is appreciated that while SIP is preferably implemented in software, it may be implemented in other at least partially programmable environments, such as DSPs and the like. The output of the SIP typically comprises a plurality of images and defect reports (corresponding to defect report 30 in FIG. 1A) which may be displayed to the user on the screen of his workstation 32.

Typically, the system of FIG. 1B is operative in at least three scan scenarios or modes, as described in detail below: learn mode, design rule mode, and inspect mode. "Learn" mode typically comprises two sub-scenarios: "learn mixed" and "learn ref", which are preferably performed in an off-line inspection preparation step prior to processing a batch of panels. In the learn mode, information about panels to be inspected in a design rule and/or inspection mode are input to the system, or "learned" in order to serve as a reference for later processing.

As seen, two principal channels of input data (a snap data input channel from 50 and a CEL data input channel from 70) are typically received by SIP 40. Each of the two data input channels preferably comprises two subchannels: (i) a snap report sub-channel, designated. herein "report snap", and a color-defect report sub-channel, designated herein "report color defect"; and (ii) a CEL report sub-channel, designated herein "report-CEL" and a defect report sub-channel, designated herein "report defect". These input data channels are supplied, as seen in FIG. 1B, by HIP 38, a preferred embodiment of which is described in Applicant's above-referenced copending Israel Patent Application 131092.

The report defect sub-channel is preferably demultiplexed (unit 120) to obtain, as seen in FIG. 1B, four raw data arrays which are described in detail below: morphological feature (f), a hardware defect (hd), a binary CEL (c) and a color-CEL (cc). Generally, the channel task converter and splitter units 80 and 120 are operative to demultiplex raw data in order to separate out input data for use by the SIP 40. Demultiplexed data is termed herein "SIP raw data". The SIP raw data typically comprises several arrays of information. Each array is typically stored in a data structure termed herein a "ds_array" and described below in detail.

The following abbreviations are used to present demultiplexed data sources in a compact form in FIG. 1B and in the figures that follow:

C_0, C_1, C_2: denote data sources of type "Data structure array Cel" which relates to binary CELs. Each of the numerals correlates a data source to one of the three cameras in the preferred embodiment, 0, 1 and 2 respectively, from which it was obtained.

HD_0, HD_1, HD_2: denote data sources of type "Data structure array Defect" which relates to hardware defects, such as nick protrusion defects which are an unevenness found by the HIP in binary CELS. Each of the numerals correlates a data source to one of the three cameras in the preferred embodiment, 0, 1 and 2 respectively, from which it was obtained.

F_0, F_1, and F_2: denote data sources of type "Data structure array Feature" which relates to morphological features. Each of the numerals correlates to a data source to one of the three cameras in the preferred embodiment, 0, 1 and 2 respectively, from which it was obtained.

CC_0, CC_1, CC_2 denote data sources of type "Data structure array Color CEL" which relates to color CELs. Each of the numerals correlates a data source to one of the three cameras in the preferred embodiment, 0, 1 and 2 respectively, from which it was obtained.

CD_0, CD_1, CD_2: denote data sources of type "Data structure array Color Defect" which relates to a color defect, such as oxidation or a color surface defect, for example resulting from a chemical remnant or residue remaining on the surface of a BGA. Each of the numerals correlates a data source to one of the three cameras in the preferred embodiment, 0, 1 and 2 respectively, from which it was obtained.

S_0, S_1, S_2: denote an SDD (small defect detector) data source which are small high contrast surface defects, such as scratches and pinholes. Each of the numerals correlates a data source to one of the three cameras in the preferred embodiment, 0, 1 and 2 respectively, from which it was obtained.

Qname: denotes the name of a data source queue of the type Window queue, which is a queue of windows created in response to inspection triggers that are waiting for image processing by SIP 40 (equivalent to analyzer 24 FIG. 1A).

WD: denotes a data source of type Width defects, which are defects in line widths in conductors and spaces between conductors in a BGA.

PIM mask: denotes a data source of type PIM services. A PIM is a point in map and Pim-services are collections of PIMs that are used to define a locations in an image being inspected in order to ensure correlation between a point being inspected and the application of appropriate inspection rules and methods for the particular location. PIM masks are zones that are drawn by the user, or that are created in a learn stage of inspection as described hereinbelow, and related to particular inspection execution sequences.

As shown in FIG. 1B, one of the inputs to the SIP 40 is user defined configuration data 180 which typically specifies a SIP scenario, for example one of learn, design rule or inspect mode scenarios.

Execution Scenarios for BGA Inspection with SIP

The SIP is a multipurpose flexible image processing unit that may be readily adapted to inspection needs of various objects, and may be operated in the context of various inspection scenarios. For the purpose of illustration, various inspection scenarios under which the SIP may be operated are described with reference to the inspection of BGA panels 36.

Preferred scan scenarios, illustrated with respect to BGA inspection, are represented graphically herein as execution graphs, and are not intended to be limiting to BGA inspection, but rather representative of suitable objects that may be inspected using the SIP. Each of the preferred inspection scenarios or modes is operative to perform a different inspection functionality which are generally as follows:

a. Design rule scenario in which a panel is inspected with reference to a set of general design rules. Inspection in the design rule scenario is intended to provide a fast view of hardware defects (nicks and protrusions) and of minimum line width violations relating to conductor widths on BGAs and minimum space violations relating to the minimum space between conductors on BGAs. Execution of a design rule scenario will be described in greater detail with reference to FIGS. 2 and 3;

b. Learn scenario in which the contents and structure of the design of a panel is learned in order to generate a reference for use during the inspection of a batch of like panels. Learn scenario includes learning general attributes of a panel of a reference panel, such as actual line widths along each section of a conductor, and learning the location of areas of particular interest in the panel as generally described hereinabove with reference to FIG. 1A. Execution of a learn scenario will be described in greater detail with reference to FIGS. 4-10;

c. Inspect scenario in which a panel is inspected to determine defects with reference to a golden panel having known desired attributes. Inspect scenario is the scenario that is typically used to inspect batches of BGAs for manufacturing and process defects. Execution of an inspect scenario will be described in greater detail with reference to, FIGS. 11-16;

It is appreciated that each of the SIP execution graphs is connected to at least one of the data input channels 50 and 70 of FIG. 1B. The input of channel data from channels 50 and 70 is dynamic and adapted to the particular needs of each inspection scenario. Data in each of channels 50 and 70 may preferably be provided in a file format for off-line inspection, or TCP/IP (Transport Control Protocol/Internet Protocol) format. Configuration variables are typically provided in advance of performing an inspection scenario to determine if the data from input channels 50 and 70 is from a FILE channel or from a TCP/IP channel.

Scan scenarios are generally described herein in the context of SIP configuration files, each of which defines a collection of inspection functionalities that are performed in the context of the respective scenario. Whenever applicable, the name of a configuration file containing an execution graph is stipulated herein. The following set of preferred scan scenarios is now described in more detail:

A preferred SIP scenario entitled "design rule" (having a configuration file denoted dr.config) is now described with reference to FIG. 2.

This scan scenario is intended to provide fast viewing of hardware defects and of minimum line width and minimum space violations, and may be performed either from a file or on-line as decided by a user prior to execution of the scenario. This scenario is typically run on a panel being considered for use during the learn scenario described in greater detail below.

Typically, the design rule scenario requires minimum setup time, provides an initial rough indication of whether the quality of the image of a panel to be inspected and quality of the inspected panel. are sufficiently acceptable to enable a particular panel to be used as a golden panel from which a comparison reference can be constructed for use in an inspect scenario. The scenario preferably identifies all predetermined hardware (nick and protrusion, CEL on Skeleton, etc.) defects, all color surface defects, all minimum line width violations on conductor regions in BGA panels, and minimum space violations between conductors in BGA panels, and outputs a report of all such as defects.

The aforementioned defects are preferably identified without correlation to any external reference. It is readily appreciated that if a BGA panel exhibits a preponderance of the previous defects, it is not suitable to be used as a reference. However, the fact that a BGA panel passes all of the above tests, does not necessarily ensure that the panel can be used as a suitable reference, and it is preferably inspected to ensure that all of the features exist, and that the features are properly positioned on the panel in accordance with design specifications.

Figure 2:
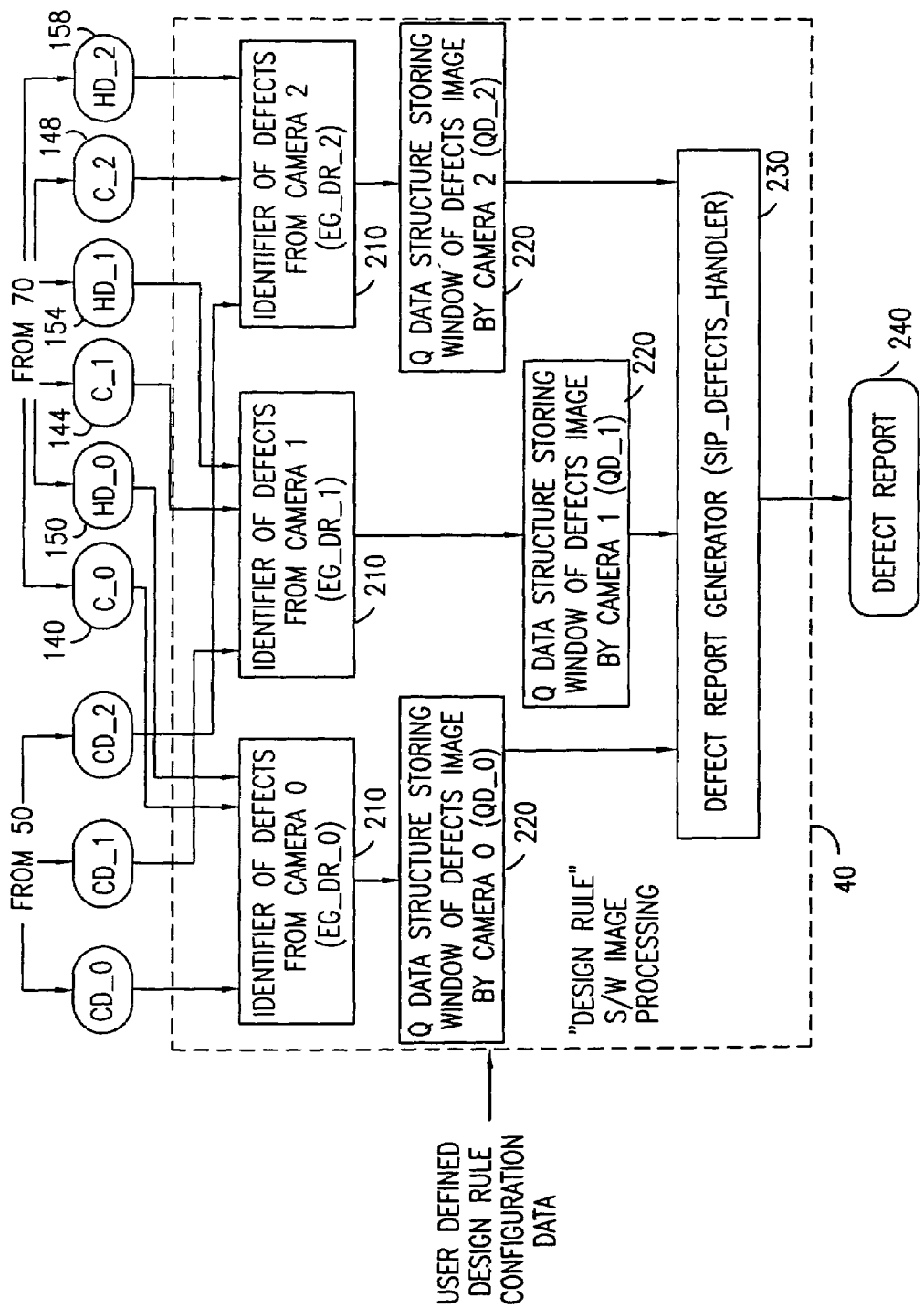
FIG. 2 is a simplified functional block diagram of the apparatus of FIG. 1B when the user-selected scenario is "design rule" mode.

As seen in FIG. 2, user defined design rule configuration data is input into SIP 40. Such data typically comprises the minimum used distance between conductors, and the minimum line width thickness of conductors. Input image data regarding a panel 36 is received from snap channel 50 and CEL channel 70, and is demultiplexed into the following image information data: color defect data for each camera, binary CEL data, and hardware defect (nick and protrusion) data.

Suspected defects for the image data input for each camera 0-2 is identified by an identifier of defects 210, an appropriate inspection method is identified for each suspected defect, is packaged into a window including image data for the region of suspected defect, and is operated by a data structure storing window 220 operative to package data methods and place them into a data queue for processing. Defect report generator 230 (analyzer 15 in FIG. 1A) inspects the image data in the window according to the identified method. If an actual defect is found, then the defect is reported in defect report 240.

Figure 3:
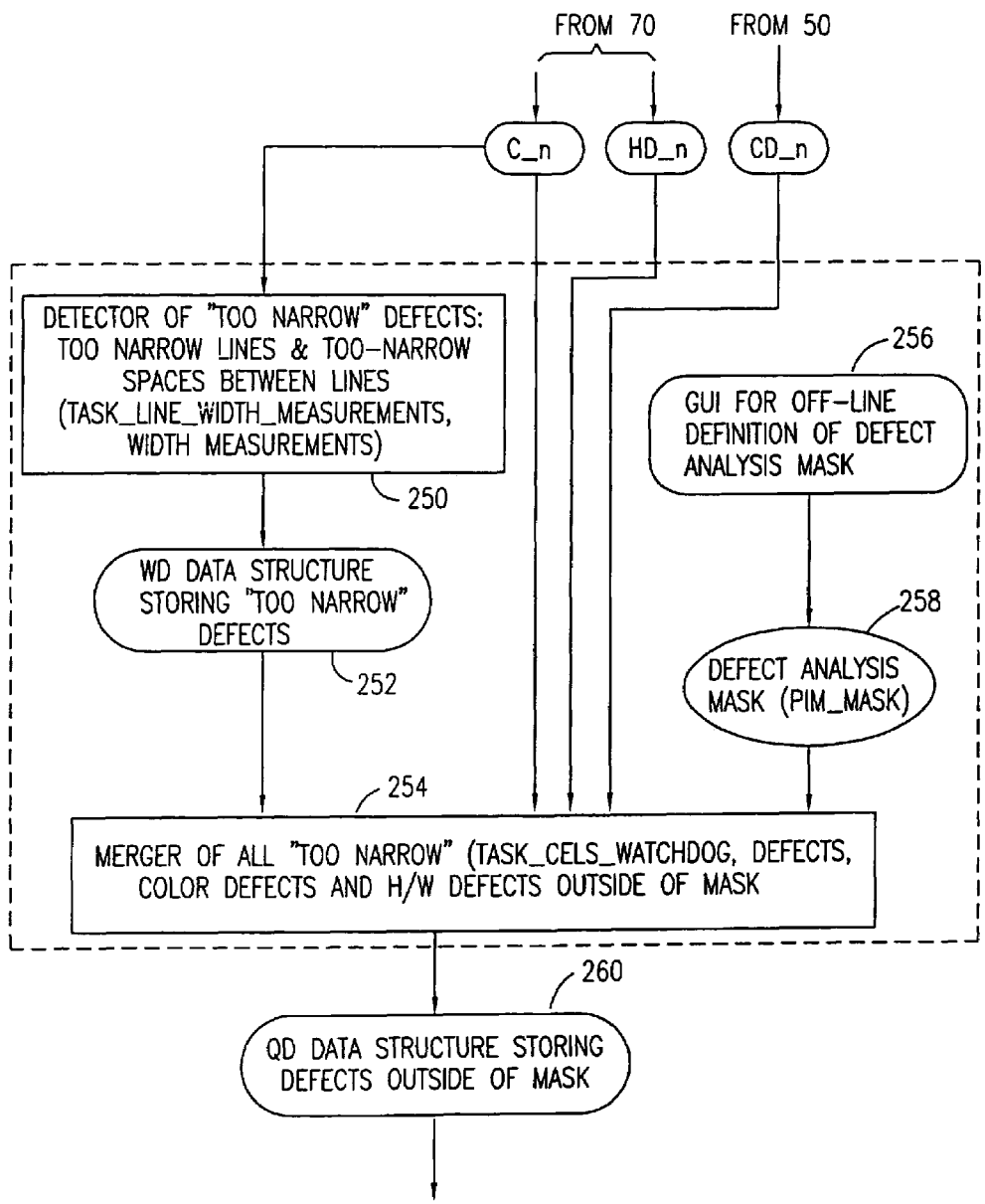
FIG. 3 is a simplified functional block diagram of a preferred implementation of unit 210 of FIG. 2.

Reference is made to FIG. 3 which is a sub-execution graph illustrating the flow of image data in and between identifier of defects 210 and data structure storing window 220 in FIG. 2. As seen, binary CELs from channel 70 are provided to a detector of defects 250 which is operative to detect defects correlating to too narrow conductors or lines and too narrow spaces between conductors or lines. An output of "too narrow" defects is provided to a width defects data report (WD Data Structure) 252, and report 252 is provided to a merger unit 254. In addition to report 252, merger unit receives a report of color surface defects from channel 50, a report of hardware defects from channel 70, and input data from GUI for off-line definitions of defect analysis mask 256. Merger unit 254 merges the reports, filters out reports that are found inside mask areas 258 and outputs a unified data report 260 in the form of a defect data queue which is queued for downstream processing. Mask areas 258 are generated through a user interface.

Once a BGA panel is inspected in the design rule scenario and is determined to be suitable to serve as a reference against which inspected panels may be compared, it is necessary to perform a learn scenario of inspection in which the particular structure of the panel is learned and stored in memory. Information about the learned panel is subsequently used in the inspection scenario discussed hereinbelow with reference to FIGS. 11-16, as a reference against which inspected panels may be compared to determine the presence of defects.

The learn scenario is now described with reference to FIGS. 4-10.

Figure 4:
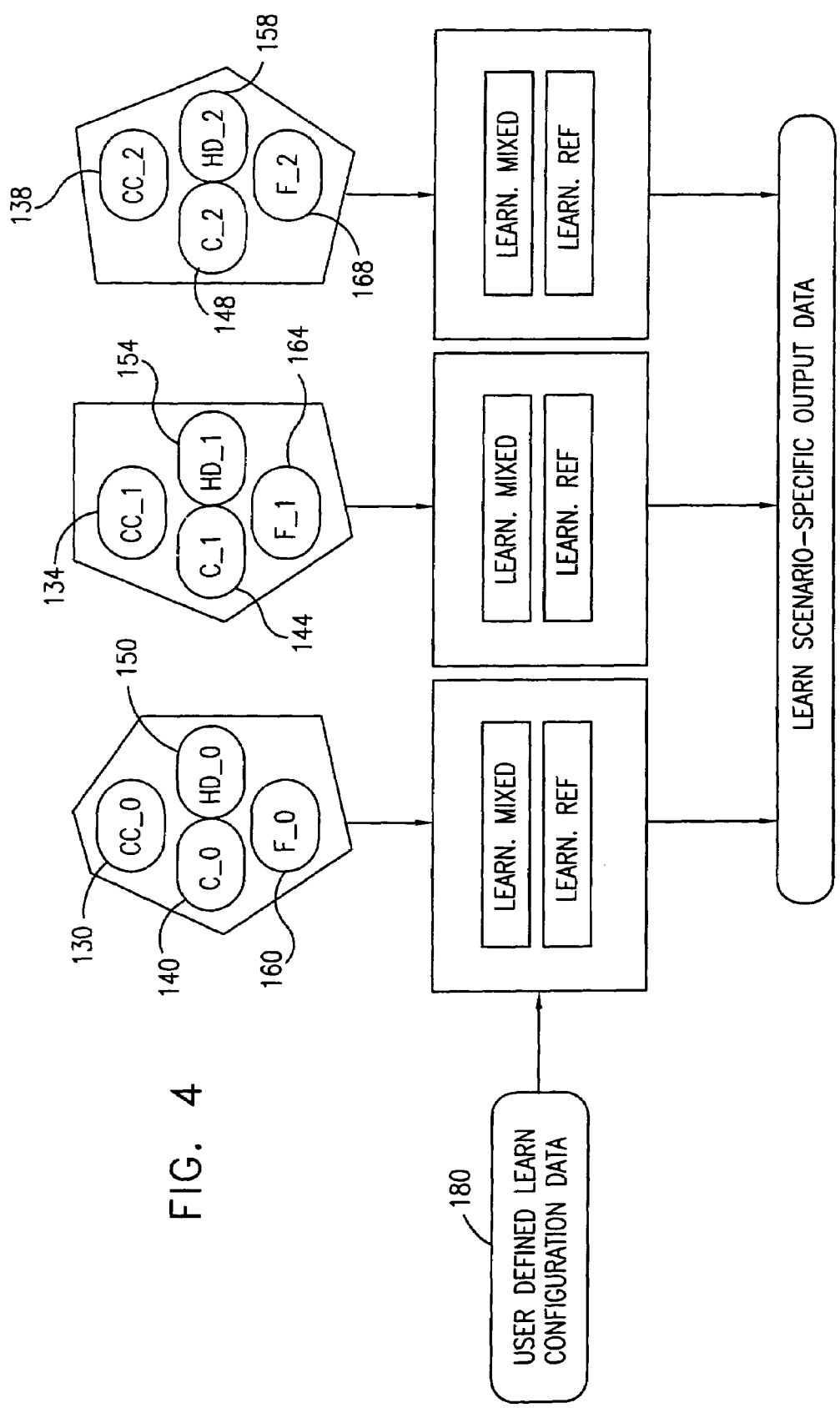
FIG. 4 is a simplified functional block diagram of the apparatus of FIG. 1B when the user-selected scenario is "learn" mode.

Reference is made to FIG. 4 which shows a simplified functional block diagram of a learn mode selected by a user. User defined learn configuration data 180 is input, preferably via a general user interface 170 (FIG. 1B). A panel 36 is scanned, and image data is generated. The following image data from each one of the cameras is used: color CEL data 130, 134 and 138; binary CEL data 140, 144 and 148; hardware (nick and protrusion) defect data 150, 154 and 158 and morphological feature data 160, 164 and 168.

Learning is typically performed on image data arriving from each separate camera, by applying three execution graphs in this order:

"Learn mixed", the particulars of which are contained in a configuration file called learn.mixed.config, and is described with reference to FIGS. 5-8;

"Learn reference" the particulars of which are contained in a configuration file called learn.ref.config, and is described with reference to FIGS. 9 and 10;

At the end of the learn scenario, scenario specific output data is received and stored for use during the inspection scenario.

Typically, each of the scan scenarios receives raw data from an off line FILE channel. The raw data is extracted from a DMA (direct memory access) type data input channel with a grabber program activated by the application. The program reads information from DMA channels and writes the raw data into files. The learn scenarios then read the data from those files. A preferred embodiment of each learn execution graph (or scenario) is now described in detail.

Reference is now made to FIG. 5, which shows an execution graph 300 for the learn mixed scenario. The configuration of the learn mixed scenario is preferably stored in a configuration file.

In the learn mixed scenario, a window is defined around each of the features characterizing a mask zone. The execution graph for the learn mixed scenario, typically uses each of the windows which are defined by a user, for example as defined through a GUI in an off-line process prior to running the learn mixed scenario. The input files into PIM defects filter 310 are thus user defined windows. PIM defects filter 310 outputs to a defects handler 320 which is operative to generate windows of interest in the form of SIP defects reference and defect windows reference windows 330, that are later used in the inspect scenario.

User defined windows that may be defined in the learn mixed scenario with respect to BGA type inspection comprise one or more of the following types of zones:
  target—is an area that has a feature of undefined shape that a user desires to ensure that particular shape is maintained in inspected BGAs;
  balls—is an area characterized by numerous circular shaped pads on a BGA;
  bonding area—is an area which is characterized by numerous bonding pads or power lines on a BGA;
  cavity—is an area that needs to be clear of any morphological features or CELs;
  chip area—is an area on a BGA where a chip is to be located.

The type of functions that are executed for each window type are defined in a definition file.

The execution graph of FIG. 5 receives the following demultiplexed image data:
  a. color CELs from each of cameras 0-2, reference numerals 130, 134 and 138
  b. binary CELs from each of cameras 0-2, reference numerals 140, 144 and 148
  c. hardware defects from each of cameras 0-2, reference numerals 150, 154 and 158
  d. morphological features from each of cameras 0-2, reference numerals 160, 164 and 168

Figure 6:
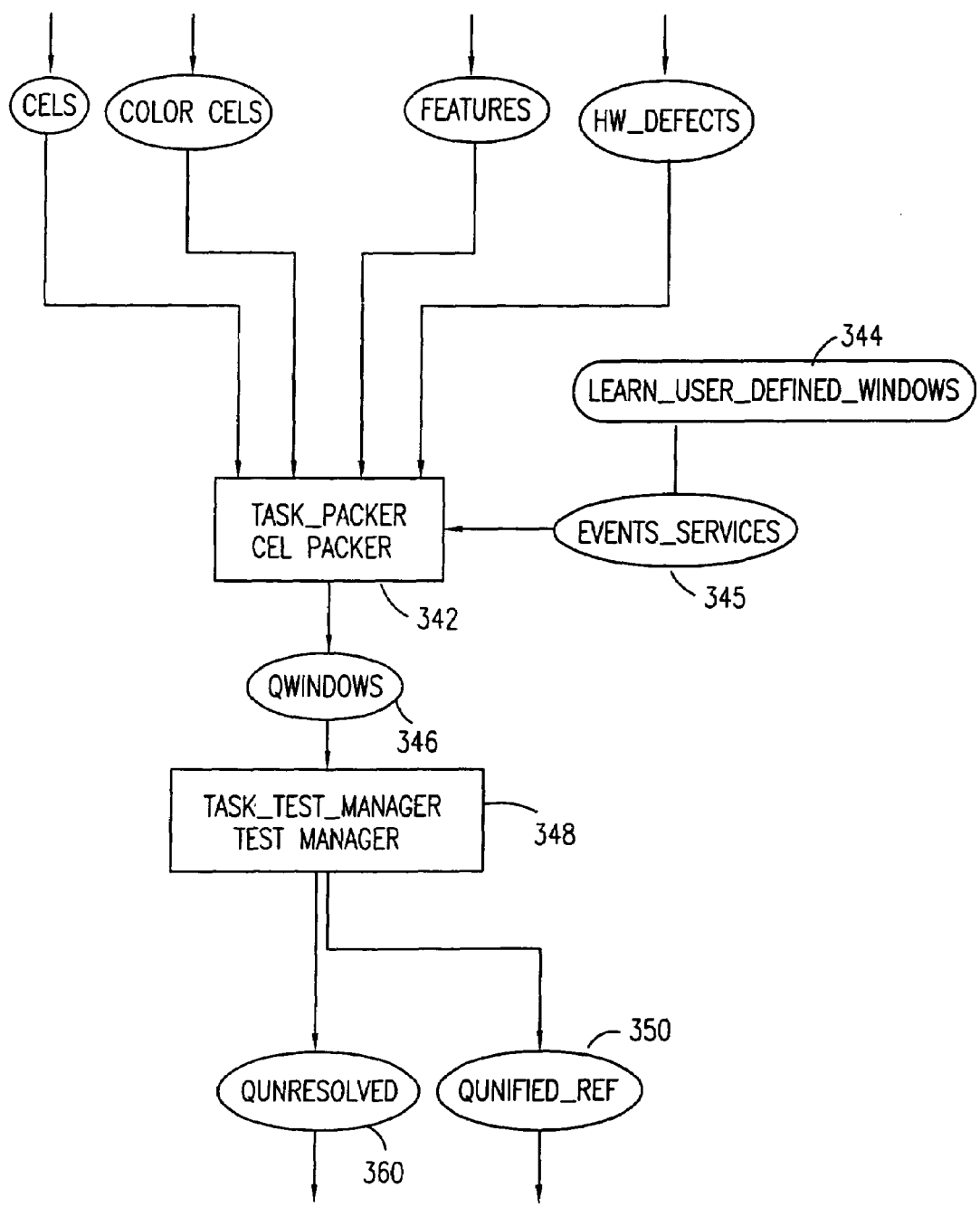
FIG. 6 is a simplified functional block diagram of a preferred implementation of an individual one of the three blocks in FIG. 5.

Demultiplexed data is provided to execution units 340 which are associated with each camera and which define the following execution sequence:

Reference is made to FIG. 6 which is a preferred sub-execution graph illustrating the execution sequence performed in each of execution units 340. The execution graph of FIG. 6, which relates to each execution unit 340, deals with raw data coming from one camera. The Task Packer/Cel Packer task 342 packs raw image information data into inspection windows according to user defined windows 344, which are defined in the general user interface of workstation 32 (FIG. 1B) and passed to task packer 342 as an event service 345. Each inspection window comprises raw image information data and identifies a test function in response to the type of user defined window 344. The window is pushed into a queue of windows 346 by the task packer 342 and is taken from the queue by the test manager 348. The test manager pops a window from the queue, executes the function that is associated with this window and pushes the window into one of the output queues according to the forward destination of the window. If test manager 348 is able to complete the test on the window, the window is forwarded to a unified reference queue 350, and then joined in the SIP defects handler 320 (FIG. 5).

If the test manager 348 is unable to complete the test function based solely on the raw image information received for a single camera, then the window is pushed into unresolved queue 360. This may occur, for example, if a user defined is located so that it is not entirely imaged by a single sensor.

Returning now to FIG. 5, it is seen that unresolved queues 360 from each of execution units 340 are pushed in the appropriate order into a multi slice manager 370 which is operative to join each of the unresolved windows with the appropriate window to generate a joined inspection upon which an inspection task may be performed.

Multi-slice manager allocates information according to the following sequence, in order to provide one or more of the functions detailed in FIG. 8.

All of the fundamental image data for corresponding unresolved windows coming from neighboring slices, acquired by neighboring image sensors, is unified into a unified window, and an appropriate function is applied to the unified window according to its type.

If incoming image data comprises data for balls, then the data is provided to a balls reference queue 380. In the appropriate order, a balls measurement unit 382 receives the data measures the balls in the region and outputs a data file SIP balls measurement data 384, which indicates the nominal balls measurement. A preferred method for measuring balls is described in Appendix J.

If incoming image data comprises data for bonding areas, then the data is provided to a bonding areas reference queue 390. In the appropriate order, a mask extractor 392 receives the data and extracts from the data masks which surround each various inspection regions in the window, such as bonding pads and power lines in the context of BGA inspection, and outputs a data file called polylines reference mask and stable features reference 394. A preferred method for identifying regions of interest and distinguishing them from other regions is described in Appendix C If the incoming data for a slice does not contain either a ball nor requires mask extraction, the information is provided to a unified queue 398, along with any balls measurements and extracted masks. The unified queue is provided to defects handler 320 for additional processing.

It is readily appreciated that the functionality and sub-execution graph of test manager 348 (FIG. 6) is substantially similar with respect to raw data relating to a single camera as is the functionality performed by multi-slice manage 370 with respect to a combination of slices received from multiple camera inputs.

The functions which are executed in each inspection window in the learn scenario are defined in a file. The table of FIGS. 7A-7B lists window types and their corresponding test function (or list of functions when the window is attached to a composite function), and provides a brief description of the functionality. The table also describes the action of the functions on the window and the return status, including the destination string that determines to which of the output queues the window will be sent.

Both unified queues 350 and 398 go to SIP defect handler task which writes defects and produces a top down reference. A top down reference is a reference that ultimately functions as a spatial area of interest during the inspect scenario, as described with reference to FIG. 1A. A function that is attached to each top down window is performed at each spatial location associated with the top down window on the basis of location. The following functions may be executed before a top down reference is created:

a. Strip balls leaves only circle shaped data structure in the top down window to define spatial regions of interest around each circle shaped data structure.

b. Strip bonding returns a sub window directive that instructs the task to write a different reference window for each sub window which is associated with a respective bonding pad feature in the window.

c. Strip target does nothing in the top down window.

d. nop. Does nothing.

It is noted that in the learn stage, parts of the panel which are known ahead of time to be of particular interest from an inspection point of view, for example balls area, pad areas and target areas in a BGA inspection application, may be identified so that each part can serve as a trigger for additional inspection in the inspection scenario described hereinbelow.

When a window is constructed by task packer 342, the data stored inside each window is whatever data is necessary to model the part in the window and to perform each of the inspection functions that is necessary to inspect the content of the window with a robust inspection method. For example, in BGA inspection, for balls areas a list of each ball in the area, including center point and radius is stored. For target areas, a compressed polygon describing the boundary of the target is typically stored.

Reference is now made to FIG. 9 which is a preferred execution graph for the learn reference scan scenario. In the learn reference scenario, general reference data is learned for an entire panel, without correlation to any particular spatial region interest. The execution graph of FIG. 9 is operative in BGA inspection to define reference data for the following attributes of a BGA:

a. line widths data, which is the nominal width of conductors and spaces between conductors on a BGA;

b. Registration data, which is set of morphological features in the image of a reference object along with an identification of features determined to be stable in the learn scenario;

c. CEL data which is data on the location of CELs in the reference image;

d. Feature data which is data on the type and location of features in the reference image.

The execution graph of FIG. 9 uses the following input data:

a. Demultiplexed raw image data for morphological features;

b. Demultiplexed raw image data for CELs.

c. Polylines reference data developed in the learn mixed scan scenario, described with reference to FIG. 5;

d. Disable masks data, which define zones which serve as masks in which line width computation are not performed, for example in BGA inspection, "target", "balls" and "mask" zones.

e. Stable features reference, in which defines areas in which features are deemed to be stable, namely that they have a stable location.

The execution graph of FIG. 9 generates the following outputs for the learn reference scenario:

a. Rectangles around areas on which line width can not be computed. The information is stored in a learn line width disqualified window file;

b. Line width reference which, in BGA inspection, stores information about the widths of conductors and spaces between conductors;

c. Reference features for registration. in a reference feature file;

d. Raw reference of CELs and features in CEL and morphological feature files, each of which is indexed and comprises reference data relating the feature information to a camera from which obtained.

As seen in the execution graph of FIG. 9, demultiplexed raw image data for binary CELs from each camera 140, 144 and 148 and for morphological features from each camera 160, 164 and 168 is provided to a SIP composite task unit 400. Each composite task unit 400 is associated with a camera. The execution graph with respect to composite task unit 400 is described in detail with reference to FIG. 10.

Additionally, demultiplexed raw data information for morphological features, preferably information for each camera although information from only one of the cameras may be used, is provided to a task learn registration unit 420, which receives stable features data 422 which are features having a known and stable location on panel 36. Stable feature data is developed in the learn mixed scenario.

Learn registration unit 420 is operative to learn the type and location of stable features on panel 36 (FIG. 1B) and to generate a reference file 424 (FILE REF_FEATURES) that is used in the inspect scenario as a reference for determining excess and missing features, and for registering an inspected panel against the reference panel.

Additionally, demultiplexed raw data information for CELs, preferably information for each camera although information from only one of the cameras may be used, is provided to a task learn line width unit 430, which receives a mask of polylines data disable mask data 432 generated in the learn mixed scenario. Polyline data and disable mask data 432 is place in PIM, point in map, and 'MIM', something in map, references that relate line widths to regions on a panel 36 which is inspected in the learn reference scenario.

Learn line widths unit 430 is operative to learn line widths, correlate line widths to locations on panel 36 (FIG. 1B) and to generate a reference file 434 (FILE LEARN_L-W_DISQAULIFIED_WINDOWS WIDTH REFERENCE FILE) that is used in the inspect scenario as a reference for determining whether a given calculated line width measurement falls within a predetermined range of acceptable measurements.

Reference is now made to FIG. 10 which is a sub-execution graph for the task performed in composite task unit 400. The sub-execution graph relates to the task performed on raw image data information for each camera.

The sub-execution graph comprises a geometric reference task unit 450 which is operative on demultiplexed raw image data input for CELs and for morphological features to compute a geometrical reference which identifies CELs and morphological features, correlates them to a location in the reference image and outputs reference files. A first file is CEL type and location reference 452, and second file is morphological feature type and location 454.

Reference is now made to FIGS. 11-16 which show execution graphs of the inspect scenario, and describe inspection tests applied therein.

The following terminology is used in the ensuing description, and is helpful in understanding FIGS. 11-16:

In the execution graph of FIG. 11, the following data sources are generated:

R_1: is a registration transformation between an image slice associated with the central cameras of reference and online images.

E_1, IM_1: Excess and illegal matches, respectively, for morphological features acquired by the central camera. An excess match is a morphological feature which exists in an online image but does not exist in the reference image. An illegal match is a morphological feature that exists in the online image, but whose coordinates match up to a different morphological feature in the reference image.

T_XX, where XX=0,1,2: are transformations from coordinate system of camera XX into a reference aligned coordinate system; derived from R_1.

T_a2a: is a transformation from a reference aligned coordinate system into an online aligned coordinate system, derived from R_1.

Reference is now made to FIG. 11, which is an execution graph for a registration and determination of excess and missing features task. The execution graph of FIG. 11 is performed during an inspection scenario in registration generator 18 of FIG. 1A.

This execution graph gets raw image data, comprising color CELs 130, 134 and 138, binary CELs 140, 144 and 148, hardware defects 150, 154 and 158, morphological features 160, 164 and 168, and color defects 90 from each of the cameras in scanner 34 (FIG. 1B; for the sake of simplicity only data from camera 0 is shown).

The registration task unit 510 is, in the illustrated embodiment, for simplicity, operative to register features of camera 1, which is the central camera. Registration task unit 510 receives features 164, along with reference features 520 from memory, and is operative to produce an output of a registration transform 530 with respect to camera 1, an excess morphological feature report 532 with respect to camera 1, and an illegal matches report 534 with respect to camera 1. A preferred method for generating reports 530, 532 and 534 is described in detail with reference to Appendix E.

The transformation computed is split by a transform splitter unit 540 into three camera-to-reference aligned transformations, T_0, T_1 and T_2, one for each camera, and to a transformation between the two aligned coordinate systems T_A2A, which is a transform between the reference data and online data from a panel being inspected. All of the data sources, raw image data and computed data with respect to registration transformation, excess and missing features, and illegal matches are the input to inspect task unit 550, the execution graph with respect to which is shown in detail in FIG. 12.

Reference is made to FIG. 12 which is an execution graph for inspection unit 550. Inspection unit 550 receives inputs as slices, one for each camera, as described with respect to the execution graph shown in FIG. 11. Inspect task unit 550, comprises first composite task inspection task units 560 which are operative on the outboard image slices, as which are provided by cameras 0 and 2, and a second inspection task unit 600 which is operative on the central image slice which is provided by camera 1.

Reference is now made to FIG. 13 which is an execution graph showing the functionality of outboard composite task inspection units 560. Each outboard composite task inspection unit 560 comprises a task packer unit 570, which corresponds to task packer/window of interest generator in FIG. 1A, and which is operative to receive inputs as described with reference to FIG. 12, and in addition a top down reference. The top down reference comprises spatial areas of interest generated, for example by a spatial area of interest identifier during the learn scenario as described. For each inspection trigger, for example a top down window, or hardware defect, or morphological feature and which are not inside any of the top-down windows, that require additional inspection, task packer 570 is operative to generate an inspection window that identifies an inspection method and includes the used image data in order to perform the inspection method. The inspection window is pushed into an inspection window queue 572. A test manager 580 is operative to take inspection windows from inspection window queue 572 and apply the test method to the image data in the window. It is readily appreciated that test manager is operative on data with respect to a single camera. Thus, features, regions and top-down windows that extend outside the camera boundaries, or which cover regions that are overlapped by more than one camera are unresolvable, and are pushed into an unresolved queue 582, while fully resolved defects are pushed into defects queue 584.

In parallel to the operation of task packer 570 and test manager 580, two additional functional test units a CEL watchdog unit 590 and side defects watchdog unit 595 are operative in composite task inspection unit 560. CEL watchdog unit 590 is operative to receive binary CEL and transform inputs along with a PIM CELs reference which defines regions that are to be free of Cels. CEL watchdog unit 590 watches CELs to ensure that no CELs are located in areas which have been designated by PIM CEL reference to be free of CELs. If a CEL is found in a regions designated to be free of CELs, a defect report is pushed into defect queue 584.

Side defect watchdog 595 operates as a filter for hardware defects and color defects. PIM Main defines a masked area. If a color defect or hardware defect is located in a region masked by PIM Main, no defect report is issued. If a color defect or hardware defect is located outside of a masked area, then a defect report is pushed into defect queue 584.

It is noted that hardware defect data source typically provides inputs to both side defect watchdog 595 and task packer 570, and a switch P. Typically switch P is turned off so that data from the hardware defect data source does not arrive to side defect watchdog 595, so that defect reports are received only after hardware defects have been run through further inspection facilities provided by task packer 570 and test manager 580. If switch P is on, then a double report is issued which is useful for control and testing of the effectiveness of test manager 580 in filtering real and false defects.

Reference is now made to FIG. 14 which is an execution graph showing the functionality of inboard composite task inspection unit 600, which is provided with respect to image data from the central camera, camera 1. The operation of inboard composite task inspection unit 600 is similar to the operation of outboard composite task inspection units 560, however it is operational to process additional information arriving with respect to line width defects as shown with respect to FIG. 11.

A line width inspect task unit 610, which corresponds to line width calculator in FIG. 1A, is provided to calculate line widths in online images of a panel under inspection 36 (FIG. 1B). Line width inspect task unit 610 is operative to receive line width reference data 612, and in the embodiment described, registration data and binary CEL data for the central camera, designated camera 1, as shown. Line width inspect task unit 610 applies the input registration data to the binary CELs, and compares the result with a reference. If a line width defect is detected, a line width defect report 614 is issued.

A task packer unit 570, which corresponds to task packer/window of interest generator 12 of FIG. 1A, and which is operative to receive inputs as described with reference to FIG. 12, and in addition a top down reference. It is noted that in addition to the inputs received by the task packer unit 570 shown in FIG. 14, additional inputs are received, namely width defect report 614, excess missing report for the central camera E_1, and illegal match defect report for the central camera IM_1.

For each inspection trigger, for example a top down window, hardware defect, or morphological feature, or line width defect, or excess/missing or illegal match, and which are not inside any of the top-down windows, which necessitates additional inspection, task packer 570 is operative to generate an inspection window that identifies an inspection method and includes the used image data in order to perform the method. The inspection window is pushed into an inspection window queue 572. A test manager 580 is operative to take inspection windows from inspection window queue 572 and apply the test method to the image data in the window. It is readily appreciated that test manager 580 is operative on data with respect to a single camera. Thus, features, defects, and top-down windows that extend beyond the camera boundaries, or which cover regions that are overlapped by more than one camera, are deemed unresolvable, and are pushed into an unresolved queue 582, while fully resolved defects are pushed into defects queue 584.

In parallel to the operation of task packer 570 and test manager 580, a CEL watchdog and defect watchdog unit 620 is provided. Watchdog unit 620 operates as a filter for line width defects, color defects, hardware defects, excess/missing defects and illegal match defects. PIM Main defines masked areas, and transform information for the central camera T_1 is provided for registration. If a line width defect, color defect, hardware defect, excess/missing defect or illegal match defect is located in a region masked by PIM Main, no defect report is issued. If a line width defect, color defect, hardware defect, excess/missing defect or illegal match defect is located outside of a masked area, then a defect report is pushed into defect queue 584.

It is noted that hardware defect data source, excess missing data source E_1, illegal match data source IM_1 and line width data source 614 each provide inputs to both to watchdog 620 and task packer 570, and include a switch P. Typically switch P is turned off so that data from the above data sources does not arrive to watchdog 620. When turned off, defect reports are received only after hardware defects have been run through further inspection facilities provided by task packer 570 and test manager 580. If switch P is turned on, then a double report is issued which is useful for control and testing of the effectiveness of test manager 580 in filtering real and false defects.

It is noted that inspection windows generated by task packer 570 may be of one of two classes of windows:

(1) predefined (top down) inspection windows taken from the input reference file, and (2) windows around defect (hardware, excess/missing, line width) and feature triggers that are not within the top down windows.

In a preferred embodiment of the present invention, top down windows are provided for features for which a robust model has been created. For example, in BGA inspection, robust models have been generated for balls, bonding pads, targets and cavities. Preferably the models are dynamic and are capable of intelligently identifying shapes that may not precisely fit a predefined model, but rather that deviate in various ways, according to a generalized inspection routine.

Preferably, inspection windows are provided for features that have an unknown shape or a shape that is not predefined according to a model. For such windows, inspection is preferably performed by comparing a general method that directly compares the shape in the online image of the panel being inspected to the shape of a corresponding feature existing in the corresponding region of a reference. Preferably a comparison mode employing comparison of edge contours is employed as described below.

It is readily appreciated that by combining region dependent localized modeling functions and comparison to reference functions, inspection capabilities are generally optimized to enable detection of defects in objects having predefined characteristics and objects that do not have predefined characteristics.

Functions that are executed for each top-down inspection window type are defined and stored in a file. The table of FIGS. 15A-15C lists each window type and its corresponding test function (or list of functions when the window is attached to a composite function). The table of FIGS. 15A-15C also describes the action of the functions on the window and the return status, including the destination string that determines to which of the output queues the window will be sent.

Referring again to the execution graph shown in FIG. 12, unresolved queues 582 from all three cameras are pushed to task multi slice manager 630. This taskcollects all unresolved windows having the same identification tag and combines inspection windows from joining slices, executes their function and pushes defects into a unified defect queue 640. The table of FIG. 16 lists possible functions executed the multi-slice manage 630 in the course of an inspect scenario.

Defect handler task unit 650 preferably is operative to receive alignment transform data to register between a reference image and an online image of panel being inspected 36 (FIG. 1B) and a unified defect report from the unified defect queue 640. Defect handler task 650 outputs a list of defects 660, that is extracted from windows in the unified defect queue 640. Optionally, if instructed in a configuration file, defect task handler 650 outputs file of defective windows, accompanied by its relevant data; for example CELs, color CELs, morphological features, defects in response the type of window. The file of defective windows is useful, for example to debug operation of defect handler 650.

Windowing Inspection Environment

It is appreciated that SIP based image processing assumes that "interesting" occurrences, from an image processing point of view, typically happen within rectangular Regions Of Interest (ROI) or windows that occupy only a relatively small portion of the surface area of an object under inspection. Accordingly, SIP inspection comprises at least some inspection routines that are preferably limited to areas of interest. This avoids having to perform complicated inspection methods over extended images in order to identify inspectable characteristics that are believed to located inside a region of interest that surrounds an identifiable inspection trigger.

In order to accelerate computation and allow more complex image understanding, preferably a three part image processing process is employed.

In the first stage of the process, predefined spatial regions of interest, e.g. top down windows, are defined as additional inspection triggers and are stored in an off line memory. The top down windows define reference image information for the region of interest included in the top down window, and identify an image processing function, or sequence of image processing functions, that are to be applied to analyze regions of interest at the same spatial location as the top down window in online images of objects under inspection.

In the second stage of the process, a fast "quick and dirty", preferably (but necessarily limited to) hardware based image processing is used to identify additional inspection triggers and to generate parsed fundamental image data for online images of an entire object under inspection. The parsed fundamental image data is passed to the SIP for SIP image processing and analysis.

In the third stage a three part image processing execution is preferably performed. First, computational tasks are globally applied to the parsed fundamental image data to compute various computational information about the image, for example computation of line widths, excess features, missing features, illegally matched features and registration transformation. Second, windows of interest are defined around additional inspection triggers, for example predetermined features and candidate defects output from the second stage and the first part of the third stage. Third, windows of additional inspection are received for top-down windows created in the first stage, and for additional inspection triggers located outside top down windows, windows of additional inspection are generated.

Additional windows, including both top-down windows and windows defined around additional inspection triggers, are dynamically packed to comprise fundamental image data from an online image of an object under inspection for the region of interest, identification of an appropriate image processing function, or sequence of image processing functions, necessary to inspect the region of interest and any reference data that is needed by the image processing function for image processing. The image processing function is preferably chosen in response to the type of region of interest in order to provide optimum image inspection for the type of region or inspection trigger in the inspection window.

In the aforementioned preferred architecture, intelligent (and resource demanding) image processing computations may be applied only to specified inspection windows on particular regions of interest, rather than over the entire object.

A "window inspection trigger" which triggers additional inspection is the center point of an ROI or window. As noted, window inspection triggers can be a. Defects, e.g. defects detected by hardware (for example, nick/protrusion report) or by software (for example, excess/missing or line width reports),
b. Features, e.g. morphological events (islands and open-ends in an electrical circuit)
c. Top down triggers, e.g. a predefined locations that are defined by a user. For example—top down triggers may by rectangle ROIs drawn by a user around all balls in a ball area, or alternatively, locations that are pre-specified as a result of running a learn scenario as described above.

A specification of the dimension of an inspection window that is to be created around a trigger is typically attached to each type of window trigger. In addition, window triggers preferably comprise data expected to be found in the window and a definition of the type of computation that is to be performed for data inside the window. Such definitions are typically specified in special configuration files.

Once fundamental image data is packed inside the window, the inspection window is ready to be processed. A typical processing function operates on an inspection window and uses the data inside the window. Sometimes, processing functions generate additional data that is appended to the window. Several processing functions on windows are described below.

A particular feature of a preferred embodiment of the invention is that different functions can be locally applied to regions of interest inside various windows. Accordingly, for example, for regions of interest associated with top down windows, intelligent and robust feature modeling functions may be applied to the region of interest without applying these functions indiscriminately to the entire image. Feature modeling in top down windows is particularly suited for features having a known shape that can be readily represented and inspected by an appropriate method, for example a ball pad geometrically defined as a two dimensional circle may be represented by a center point and radius.

For regions of interest associated with other non-top down reference window inspection triggers, a comparison based image processing function preferably may be applied. For example a comparison based image processing function is preferably suited to inspect features and candidate defects that are characterized by shape and dimensions which are not stable and which can not be readily modeled ahead of time.

In accordance with a preferred method of comparison, in the learn stage binary CELs are combined and converted into vector lines comprising directed components. The directed components represent edges or contours between morphological features and substrate in reference image, and are stored in memory for use during inspection of online images of objects under inspection. CELs and the generation of vectorized line components to represent collections of CELs are described hereinbelow in greater detail with reference to FIGS. 21A-21D, and the CELs to vector comparison function is described hereinbelow in greater detail with reference to FIGS. 30A-32B.

The following preferred steps are helpful in understanding operation of windowing STEP I: A user defines a window in a reference object around a spatial area that typically comprises at least one unit of a predetermined model shape. It is expected that in inspected objects, such as panel 36 (FIG. 1B), at least one shape defined by the model will be situated in a spatial region corresponding to the region defined by the user in the reference object. An appropriate model shape is preferably chosen from a library of modeled geometric shapes which is stored off line. Preferably, each model shape is defined mathematically. For example, a circular "ball" 882 (FIG. 27), such as are typically found on BGAs, may be defined by a center point 884 and a radius.

STEP II: Attributes for the reference region are defined. For example, a user may set parameters for permitted deviation in an inspected image with respect to the location, size and other aspects of circular ball 882. Accordingly, center point 884 may be defined as having to be located within an acceptable distance from a predetermined coordinate, and the radius at various locations along the circumference may be defined as having to be within a predetermined range of acceptable radii. Other additional parameters may be set, such as whether any other features, shapes or image elements, such as a line, or edge, are permitted within a region surrounding the modeled shape. Steps I and II are preferably performed in a learn stage as described hereinabove.

STEP III: Images of an inspected object are acquired in an inspection stage. Preferably, images are acquired using apparatus in accordance with a preferred embodiment of the present invention as described herein, and are preprocessed to produce one or more forms of fundamental image data, such as CELs, color CELs, morphological feature information and other information about the image.

STEP IV: In an online image of an object which is inspected, additional inspection regions are isolated. Each of the additional inspection regions preferably spatially corresponds to one of the reference regions defined in Step II, or alternatively to a spatial region that surrounds some form of predetermined inspection trigger such as a defect or feature which the user defines during set-up as necessitating additional inspection.

Preferably, each of the additional inspection regions is packaged into an additional inspection window that comprises the stored shape model and fundamental image data, identifies one or more inspection functions that is to be performed on the window and specifies any user defined parameters that may be needed by the image processing function. For example, if the additional inspection region includes a ball 882, the window preferably includes all of the CELs for the region in the additional inspection window, any morphological features found therein, line width information and the like. Additionally the inspection window typically specifies the inspection functions that will operate on the ball, and user defined parameters for the ball, such as permitted deviation from the center from a desired location, and permitted ranges of radii for different sections of the circumference.

Accordingly, if an inspection window is generated for a region surrounding a candidate defect, a function operative to particularly identify the candidate defect, typically different than the function used to identify a modeled shape, is included in the additional inspection window.

STEP V: Image processing functions packaged with the additional inspection window are executed on the fundamental data in the window and evaluated according to the user defined parameters.

Preferably, if the additional inspection window includes a modeled shape, fundamental image data included in the additional inspection window is processed to generate a geometric object that represents a feature. It is appreciated that the fundamental image data is derived from an online image of the object being inspected in a spatial location correlating to the reference window. For example, if the feature being inspected in an additional inspection window is a ball 882, then all of the CELs in the inspection window may be combined to generate a line which represents the circumference of the ball. Once the geometric shape is generated, then the geometric shape in the window is compared to the model in the reference window.

It is appreciated while a library of many possible shapes may be created, it is not feasible to anticipate all possible shapes, particularly those shapes that are representative of defects, which are by their nature random.

Accordingly, in preferred embodiments of the invention there are provided functions that analyze the shape of geometrical features without reference to a mathematical model, but rather by direct comparison of a geometrical shape in the object being inspected at a particular location in the image, to the shape which is expected to be present at that location according to a reference. Direct comparison may be accomplished, for example, by generating and comparing geometrical shape representations, preferably by CEL to vector comparison functions as described hereinbelow, or by bit map comparison as is conventionally known in the art.

STEP VI: Reports are made to indicate the presence, absence and location of features and attributes in an inspection and whether any of the features are defective.

Preferred General Data Structure in SIP

Reference is now made to FIG. 17 which is a diagram of a preferred data structure of incoming data imported, from an image processor 5 (FIG. 1A) which may be used in the context of inspecting BGAs. The raw data which serves as input in FIG. 1 typically comprises a stream of data words organized as shown in FIG. 17. Typically, the SIP channel task converts incoming raw data into a data structure array element type representation in which an element is defined as one of the following: a binary CEL, a Color CEL, a Snap image, a morphological Feature, a Defect, or a Color defect. The structure of a data structure array and the structure of each element type in the data structure array are described in detail below.

In the preferred embodiment of the invention, raw data is received in a data structure as described in FIG. 17 and is split and converted into a data structure which can be included in a data structure array, for example by a data converter and splitter unit 120 shown in FIG. 1B.

A header for a typical report element, describing one row y of a scanned image, as received from one camera in scanner 34 (FIG. 1) is illustrated in FIG. 18. As shown, the header typically designates the type of the report element, for example, the type of event that occurred in some row y, how many (cnt) times, and for which camera or slice.

One preferred typing scheme for identifying the type of report element is the following 3 bit scheme:

0—report no type
1—report color defect
2—report defect
3—report CEL which pertains to an edge
4—report snap "Slice" refers to the number of the camera from among, say, 3 cameras which are employed to image the panel. Multiple camera and slice considerations are discussed herein below.

One preferred SIP data structure array is a data source called a "Data structure array Element". This data structure considers the data as being organized into lines, ordered by increasing Y coordinate. Each line contains zero or more data items (4 bytes in case of all SIP raw data items) of a particular type or element. The range of accessible lines comprises all lines from smallest line in an image up to the largest line in the image. An empty data source is identified when the following condition is met:

smallest line>largest line

When a data source is created, the value of the smallest line is set to 0, and the value of the largest line is set to −1. The data source specifies the number of the largest line in a scan, which is preferably greater than or equal to the coordinate of the largest line produced by the scanner.

Accordingly, each row in a scanned image corresponds to a row specified in a data structure. At any moment, the number of rows between the smallest line and the largest line in a data structure correspond to the scanned image rows which are ready for processing.

Each element in a data structure array typically has only one producer and at least one consumer. Lines can be added to the data source only by the producer and only if the y coordinate of the added line is greater than largest line in the data source. When a line is added, all lines between largest line and the new line (not including the new line) are added as empty lines, each of which contains zero data items. If the new line is not empty, the new line with all its elements is added and the largest line is updated to be equal to the new total number of lines. A producer of a data source needs to ensure that at the end of scan, the largest line of the data source will be equal to largest line in the scan. It is appreciated that the largest line may be empty.

Preferred Data and Queue Management in SIP

Typically, the SIP comprises a plurality of tasks which are managed by a SIP manager that takes care of the flow of data from a front end image processor such as image processor 5 in FIG. 1, and between the tasks. The SIP manager takes care of the synchronization between reading data from external raw data channels and performing computations. The manager typically does not care about the specific types of data in the system nor about the sort of computations that are performed by the various computational tasks.

The SIP manager typically manages data and computation flow between tasks, manages input and output of data from and to external channels, provides a uniform error and logging mechanism, and provides timing and memory consumption statistics.

Basic building blocks of the SIP comprise data sources, tasks, execution graphs, and configuration file, all of which are now described:

1 Data Sources

All data used by more than one computational unit is typically in the form of a data source. Each data source preferably has producers and consumers (tasks or channels, see description below). The producers generate the data source and the consumers use data from the data source. Each consumer is responsible for notifying the data source of data that is no longer needed by that consumer. Data not needed by any of the consumers can be safely removed from the data source to free up memory space and resources for more incoming data. It is the task of the SIP manager to remove data to free up space.

2 Tasks

Preferably a task is a computational unit that is operative to perform some computation on at least one input data source. The result of the computation is pushed into at least one output data source. An individual task is preferably not involved with data handling (for example—overflow of internal buffers or synchronization between data and computation), but works on some data. Data handling issues are typically handled by the SIP manager.

A channel task is responsible for the connection of the SIP as a process running on a computer to the outside world, for example operating on input data to demultiplex the input data and convert it into a format that is usable by the SIP. Each data channel is typically attached to a physical channel (DMA, TCP/IP or file channel). Input channels convert incoming data into data sources. Output channels are attached to data sources and they write the data source (as soon as it is updated) into the designated channel. Use of a file channel allows easy simulation of a scan without the need to actually connect to a DMA or to a TCP/IP channel. Incoming data may simply be injected from a file containing data in the same format as data arriving from DMA or TCP/IP channels.

Some tasks, notably inspection tasks, call functions that perform image processing computations on data.

3 Execution Graphs

A given execution graph (also termed herein a "scan scenario") is defined by the set of data sources and tasks participating in the scenario.

Reference is now made to FIG. 19, from which it is noted that a scan scenario may be generally represented by a graph as shown therein.

In the scenario of FIG. 19, the SIP is connected to two input channels and one output channel. There is one DMA channel 600 producing data source 2 and one TCP/IP channel 610 producing data source 1. There are three computational units (tasks): task 1 which uses data source 2 and data source 1 and produces data source 3; task 2 which uses data source 1 and does not produce any data source; and task 3 which uses data source 3 and produces data source 4. Data source 4 feeds into a TCP/IP channel (CHANNEL 3) and is written into it as soon as it is updated by task 3.

Preferred runtime behavior of an execution graph, including a description of how data may be processed during scan is described in Appendix A.

4 Configuration Files

Execution graphs and all the parameters employed by channels, tasks and data sources are typically specified in configuration files. This allows many different scan scenarios to be run without needing to recompile or relink.

Inclusion of scan scenarios in configuration files makes expanding and changing the SIP relatively easy. From a software development point of view, one of the most time-consuming aspects of a SIP typically includes data handling and synchronization between data acquisition and computation which, however, may be very similar or even identical for many AOI (automated optical inspection) applications. Preferably, the SIP is constructed such that it is easy to add tasks, and easy to add data sources that are instantiation of built-in templated data sources. Accordingly, to add new data sources or task channels, a suitable class of data sources or tasks is derived from a corresponding base class of data sources and tasks already in existence. As much as possible of the work typically is thereby transformed to the base class (by extensive use of a template pattern).

Reference is now made to FIG. 20 which is an execution graph for two processes. A given execution graph can typically be processed by more than one SIP. To do this, the execution graph may be divided into several execution graphs, each running on a different SIP. Data sources produced by a task in one SIP may be used by the task in another SIP. As seen in FIG. 19, a data source is written into a TCP/IP channel by the first SIP and read from the TCP/IP channel by the second SIP. Minimal cross talk provides short computation time between the two SIP processes.

Principal Forms of Fundamental Image Data—CELs and Events

The following section describes preferred methods by which data is represented in data structures in SIP for fundamental image data, with respect to a preferred embodiment of the invention employed in the inspection of BGAs.

Binary CEL Representation

In the following discussion the following definition of a CEL (Contour Element) is used: a CEL is a single directed line defined within a pixel. The location and orientation of a CEL in a pixel is calculated as a function of the difference in gradients of reflection intensity as registered on neighboring pixels. Collections of CELs generally define boundaries between two populations within a pattern formed by a binary image (namely an image that comprises only two populations), and are operative to define the boundary to with a sub-pixel accuracy. If each CEL within an image is oriented in a direction, then the orientation of each CEL is defined so that the "white" area in a binary image comprising only white and black areas always lies to the left of an oriented, or directed, CEL.

CELs are calculated as a function of the zero crossing point of DoGs (Difference of Gaussians) as described in U.S. Pat. Nos. 5,774,572 and 5,774,573 to Caspi et al., incorporated herein by reference. Other suitable edge detection techniques are described in: C. Gonzalez and P. Wintz, *Digital Image Processing*, Addison Wesley, Reading, Mass., 1987.

In the present invention, the CELs are preferably calculated for pattern edges in the Red band of an RGB image. "White" area is the area in which the values of DoGs are negative.

Reference is now made to FIG. 21A which illustrates a pixel 710 having therein a CEL 720. Pixel 710, is, for example, a pixel in an image of an object to be inspected 4 (FIG. 1A), having one corner located at an origin (X,Y) and a diagonal corner located (X+1, Y+1). CEL 720 is located in pixel 710. Pixel 710 straddles a "white" area 730 and a "black" area 740. As shown in the figure, CEL 720 is vectorized so that white area 730 lies to the left of CEL 720.

A preferred 24 bit data structure for representing CELs, as elements in a CEL data structure array for use in SIP comprises the following fields:

x (12 bits) is the X coordinate of a CEL. Note that inasmuch as each line in an image are grouped into a data array, the y coordinate of a CEL is specified from the line in a CEL data array in which a CEL is contained.

direction (1 bit) and edge code—(3 bits) define the orientation and direction of a CEL.

last or "L"—(4 bits) defines the location of the last endpoint of a CEL along an edge of a pixel. An endpoint is the point along the edge of a pixel where intersected by a CEL.

first or "F"—(4 bits) defines the location of the first endpoint of a CEL along an edge of the pixel.

Reference is now made to FIGS. 22A-22F which depict possible CEL orientations corresponding to edge code values of 0 to 5 respectively, in which the direction value is 0, and are generally self-explanatory. Accordingly, an edge code value 0 is assigned to the CEL of FIG. 22A, an edge code value 1 is assigned to the CEL of FIG. 22B, an edge code value 2 is assigned to the CEL of FIG. 22C, an edge code value 3 is assigned to the CEL of FIG. 22D, an edge code value 4 is assigned to the CEL of FIG. 22E, and an edge code value 5 is assigned to the CEL of FIG. 22F.

Figure 22A:
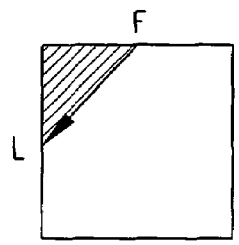
Figure 22B:
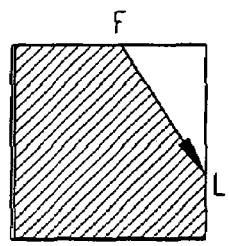
Figure 22C:
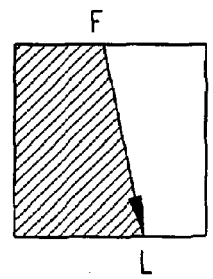
Figure 22D:
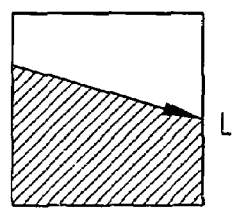
Figure 22E:
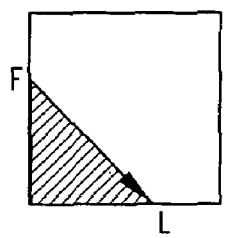
Figure 22F:
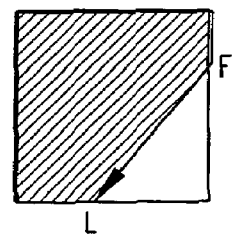
Figure 22G:
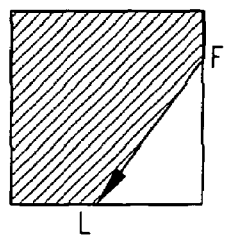
Figure 22H:
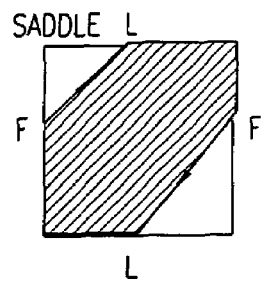

Reference is made to FIGS. 22G and 22H which illustrate edge code value of 6 in which the direction value is 0. A saddle occurs when two CELs exist in a pixel as shown in FIG. 22H. In the case of a saddle, individual CEL information is represented in a manner similar to FIG. 22F. An edge code value of 6 nevertheless differs from an edge code of 5 in that during a later stage of combining CELs in order to calculate a contour representing an edge, an edge code of 6 enables reconstruction of the saddle based on an evaluation of neighboring pixels. Typically, code values are assigned to represent each of the situations of FIGS. 22A-22F, and 22H and an additional "illegal" code value is reserved to indicate skeleton events.

Figure 23A:
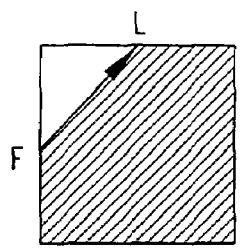
Figure 23B:
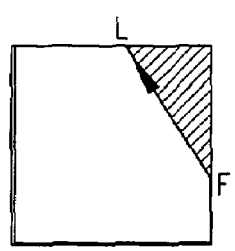
Figure 23C:
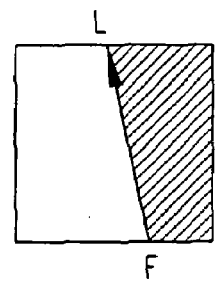
Figure 23D:
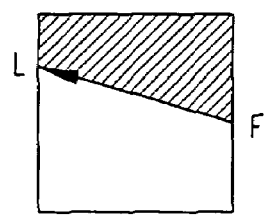
Figure 23E:
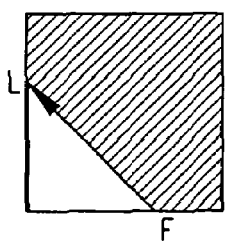
Figure 23F:
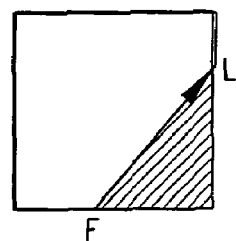
Figure 23G:
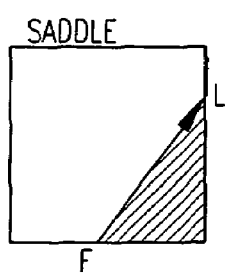
Figure 23H:
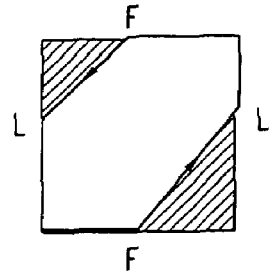
Figure 231:
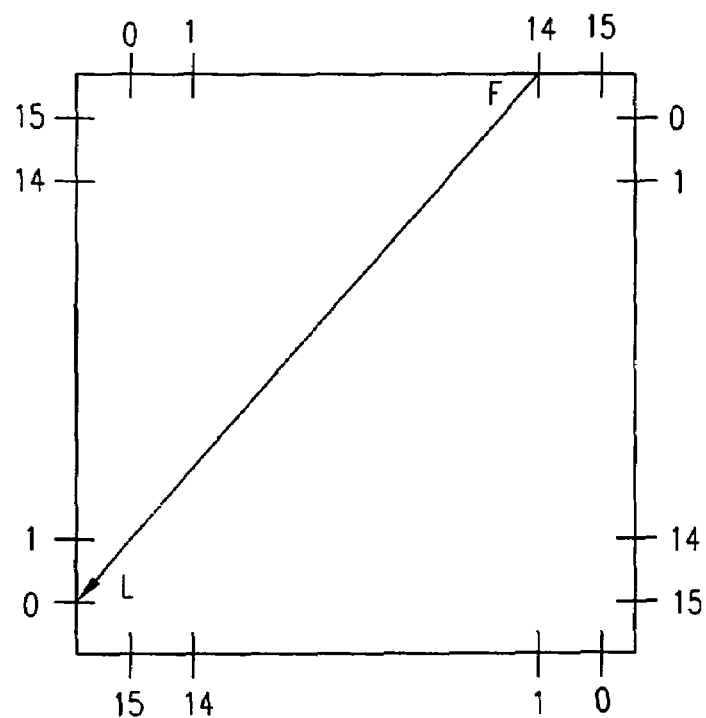

Reference is now made to FIGS. 23A-23F which depict possible CEL orientations corresponding to edge code values of 0 to 5 respectively, in which the direction value is 1, and are generally self-explanatory. FIGS. 23G and 23H represent a saddle situation existing when direction value is 1, and are generally analogous to FIGS. 22G and 22H, except that the relationship of "white" areas and "black" areas is reversed.

Once an edge code and direction code are defined, the orientation of a CEL with respect to edges of pixel are known, and the first and last points of a CEL can also be defined. The first point is the point denoted by "F" in FIGS. 22A-23H while the last point is the point denoted by "L".

The first field and last field of the CEL type preferably denote the locations of the first point and last point on a cyclic coordinate system. This coordinate system is best seen in FIG. 23I.

Preferably, each edge of a CEL is divided into units of 1/16 for representation in 4 bits. Thus in the example of FIG. 23I, the value of "F" is 14 and the value of "L" is zero.

Vectorized Representation of Edges of Features

Reference is made to FIGS. 21B-21D which illustrate the relationship between features and their analytical representation as CELs and vectorized line components. FIG. 21B shows first and second features 750 against a substrate background 760. FIG. 21C shows a map comprising a collection of pixels 770, in which CELs 780 are seen in each of the Pixels 770. CELs represent a sub-pixel crossing of edges between feature 750 and substrate 760. Features are shown as a "black" region because it typically has a relatively high coefficient of reflectivity and exhibits negative DoG. Substrate which is shown as a "white" region because it typically has a relatively low coefficient of reflectivity and exhibits a positive DoG.

Reference is now made to FIG. 21D which shows a representation of the edges of features 750 (FIG. 21B) in which the edges of features 750 are represented as edge vectors 790. In accordance with a preferred embodiment of the present invention, during the learn reference scenario described above, the location and orientation of CELs in individual pixels, for example CELs 780, are calculated for an image of an object under inspection 4 (FIG. 1A), and recorded. Collections of CELs that are substantially in the same direction are combined into connected components, and converted into edge vectors 790, and which are stored for use as a reference during the inspection scenario described hereinabove.

A preferred method for generating connected components from CELs is described in greater detail in Appendix J. A preferred method for generating edge vectors from connected components is described in greater detail in Appendix K.

Color CEL Representation

Color CELs are extensions of binary CELs. Color CELs differ from binary CELs in that they identify and define borders between two different regions in an image in which each region is one of a number of known regions having a substantially homogeneous color. Color CELs indicate the location of the border to a sub-pixel accuracy and in addition indicate which of the regions lies on either side of the CEL. The data structure of color CELs is generally understood in view of the foregoing description of binary CELs.

Each color CEL typically comprises the following fields:

x (12 bits) is the X coordinate of a CEL. Note that inasmuch as each line in an image are grouped into a data array, the y coordinate of a CEL is specified from the line in a CEL data array in which a CEL is contained.

Direction (1 bit) and edge code (3 bits) define the orientation and direction of a CEL.

last or "L"—(2 bits) defines the location of the last endpoint of a CEL along an edge of a pixel. An endpoint is the point along the edge of a pixel where intersected by a CEL.

first or "F"—(2 bits) defines the location of the first endpoint of a CEL along an edge of the pixel.

Material edge—(4 bits) defines which homogeneous color or material population exists on each side of the CEL.

It is noted that in the preferred 24 bit data structure, resolution is sacrificed (as compared to a binary CEL) in favor of identifying color populations. This is however a design choice and higher resolution may be obtained by employing a data structure having a larger number of bits. Additionally, a different. meaning is assigned to edge code=7. In this case, this edge code 7 denotes a color junction. A color junction is a pixel separating between two color CELs having material edges with different values.

Morphological Feature Representation

Each morphological feature is preferably represented by the following fields:

x (12 bits) is the X coordinate of a morphological feature. Note that inasmuch as each line in an image are grouped into a data array, the y coordinate of a morphological feature is specified from the line in a feature type data array in which a feature is contained.

data—(20 bits) typically represents one of the following types of morphological features:

OPEN END
ISLAND
3 WAY JUNCTION
4 WAY JUNCTION
5 WAY JUNCTION
BLOB JUNCTION
PIN HOLE
AN "IN" CORNER
AN "OUT" CORNER

Hardware Defect Representation

Each defect is preferably represented by the following fields:

x (12 bits) is the X coordinate of a defect feature. Note that inasmuch as elements in each line in an image are grouped into a data array, the Y coordinate of a defect is specified from the line in a defect type data array in which a defect is specified.

data—(20 bits) typically represents one of the following types of defects:

Small CEL Defects
STRONG NICK
STRONG PROT
GENERAL SMALL CEL DEFECT
CEL ON SKELETON—which is a CEL located on a morphological skeleton, which is a defect typically resulting from a line being too thin Match Defects
EXCESS FEATURE—is a feature in the image of an object which is detected in an online inspection scenario (for example "inspect") which does not have a matching feature in the reference;

ILLEGAL MATCH—is a feature detected in an online inspection mode that matches to a feature in a reference, but for which the reference feature is different. For example, the online feature is JUNCTION but the reference feature is an OPEN END;

MISSING—is a feature in the reference image which does not have a matching feature in the image of an object obtained in an online inspection scenario.

Color Defect Representation

Each color defect is preferably represented by the following fields:
- x (12 bits) is the X coordinate of a color defect. Note that inasmuch as elements in each line in an image are grouped into a data array, the Y coordinate of a color defect is specified from the line in a color defect type data array in which a color defect is specified.
- Color defect data (20) bits. In preferred embodiments of the invention color defects are filtered by watchdog tasks, for example watchdog 620 in FIG. 14, and passed directly to a defect report.

Width Defect Report

A width defect report outputs from a line width inspection process. The report is in the form of a data source which contains line width defects detected by the process. Collections of width defects are provided in a width defect data structure array.

A single width defect data structure contains the following fields:
- x (12 bits) is the X coordinate of a width defect. Note that inasmuch as elements in each line in an image are grouped into a data array, the Y coordinate of a width defect is specified from the line in a width defect type data array in which a width defect is specified.
- type (1 bit) specifies the type of width measurement as being one of either
  SPACE SKELETON, which is a space measurement; or
  LINE SKELELETON, which is a line width measurement.
- direction—(4 bits) specifies the direction of the measurement preferably from among one of the following possible directions:
  Unknown direction,
  East direction,
  South direction,
  South-east direction
  South-west direction
- width (15 bits) specifies the width measurement of the width defect.

Other Principal Forms of Data in SIP

The following section describes various other principal forms of data that are used in the SIP.

Snap Image Representation

Each snap image is preferably represented by the following fields:
- x (8 bits) is the X coordinate of a snap image. Note that inasmuch as elements in each line in an image are grouped into a data array, the Y coordinate of a snap image is specified from the line in a snap data array in which a snap image is specified.
  - r—(8 bits) which is the intensity of the Red RGB band.
  - g—(8 bits) which is the intensity of the Green RGB band.
  - b—(8 bits) which is the intensity of the Blue RGB band.

A preferred method for computing using a snap data structure is described in Appendix B.

Line Envelopes

A line envelope is an envelope structure that surrounds a line, such as an edge contour, and is generally employed in the CEL to Vector comparison function, described hereinbelow with reference to FIGS. 30A-32B.

Reference is now made to FIG. 24 which illustrates a line envelope construct 800 which is termed herein an "envelope of an oriented line". An envelope of a line is a rectangle, constructed around that line. Line envelope 800 has the same orientation as that of line 810. The perpendicular distance from the line 810 to both sides of the rectangle is denoted by a parameter, denoted width 820, while the distance from each of the endpoints of line 810 to the ends of the envelope is denoted by the parameter tang width 830. Another parameter used in the definition of an envelope is the angle tolerance parameter, which is a parameter in a CEL to Vector comparison function that ensures that the direction of a CEL is close to the direction of a line.

Reference is now made to FIG. 25, which shows line envelopes for a polyline 850. A polyline 850 is simply a collection of lines 810. As seen in the figure, a polyline envelope 860 is merely a collection of all the envelopes for each line segment 810 that makes up polyline 850.

PIM

The PIM (Point In Map) is a collection of data structures and processes that is useful for solving point in map queries. A point in map query is a query that identifies where a particular point in an image is located, and is useful to ensure that a task or function is performed on or at an appropriate point or region in the image. A description of a filter tolerance setting PIM constructed and operative in accordance with a preferred embodiment of the present invention is provided in Appendix C.

The PIM is preferably used by SIP filtering and watchdog tasks

MIM

Is a data structure that is preferably based on the PIM. It adds an additional functionality of attaching different data items to different regions. Those data items may represent, for example a threshold for computation. Use of MIM enable different events, for example features and defects, to be treated differently, as a function of location in addition to event type.

For example, a computational process that measures the area of a cluster of surface defects. If the defect is inside some predefined critical area, then a small value of the area may suffice to declare the location as being defective. However, if the defect is located outside the predefined critical area, then the same value may be passed through the MIM filter so that it is not declared as being defective. By way of additional example, assume that a nick is indicated as an additional inspection trigger. A nick is characterized by having a height and or a width that exceed a predetermined threshold. In SIP inspection, the height and width thresholds may be dynamically adjusted using MIM, as a function of the location of the nick additional inspection trigger in the pattern of an object under inspection. It is readily appreciated that the thresholds may be input by a user through a general user interface.

Top Down Reference

A top down reference is used to define a Top Down (TD) trigger. A top down trigger holds image and type information for a region or interest around a point, as is learned during the learn scenario, and directs the SIP to inspect the region of interest in a predetermined way using an inspection function that depends on the type of top down trigger. For example, a top down trigger for a bonding pad will direct the SIP to perform a set of inspection functions on a spatial region of interest defined in the top down report which surrounds the bonding pad.

A top down report preferably comprises the following fields:

X sub-pixel (4 bits): defines a sub pixel shift of a top down report in the X direction, within the pixel for which a top down report is defined.

Y sub-pixel (4 bits): defines a sub pixel shift of a top down report in the Y direction, within the pixel for which a top down report is defined.

Index (24 bits): Defines an index of a top down report within an array of all top down windows for an object to be inspected.

Reference is made to FIG. 27 which is a simplified pictorial illustration of contours of selected elements that may exist in a typical top down window, and the shapes that they represent: a line segment 880, a circular "ball" 882, indicating a center point 884, and a rectangular pad 886, indicating open ends 888. Each of the shapes have been derived from CELs as described with reference to FIGS. 21A-21D.

Once the raw data is packed into a window, it is ready for processing. Preferably, processing functions, as described hereinbelow, operate on a window that data located in a window.

Sip Defect Report

A Sip Defect Report determines the structure of a single SIP defect. A SIP defect report contains:

A coordinate (X,Y) of the location of the defect.

A descriptive string.

Enumerated type of the defect

Unified Event

Unified events are events that are derived from multiple cameras, and that are packed into unified windows.

Each unified event preferably identifies an (X,Y) location of the pixel on which the report is defined and specifies an event type chosen from among one of the following event types:

Top Down Report

Feature

Defect

Width defect

The data associated with each unified event depends on the type of the event, and comprises the data as described above with respect to each event.

Affine Transformation

The Affine Transformation is a data source that contains information about the affine transformation used to register cameras between themselves and in the inspect mode to register between the online image of the object under inspection and its reference image. The affine 2D transformation is described above.

Window Queues

Window queues are queues of windows that are ordered and waiting for the performance of some computation by a task. Window queues the principal data source used for moving windows between tasks. A window may be pushed into the queue by one task, and after a task finishes working on a window and then it placed in another queue until popped by another task that wishes to work with that window.

Registration and Multiple Camera Considerations

Figure 34:
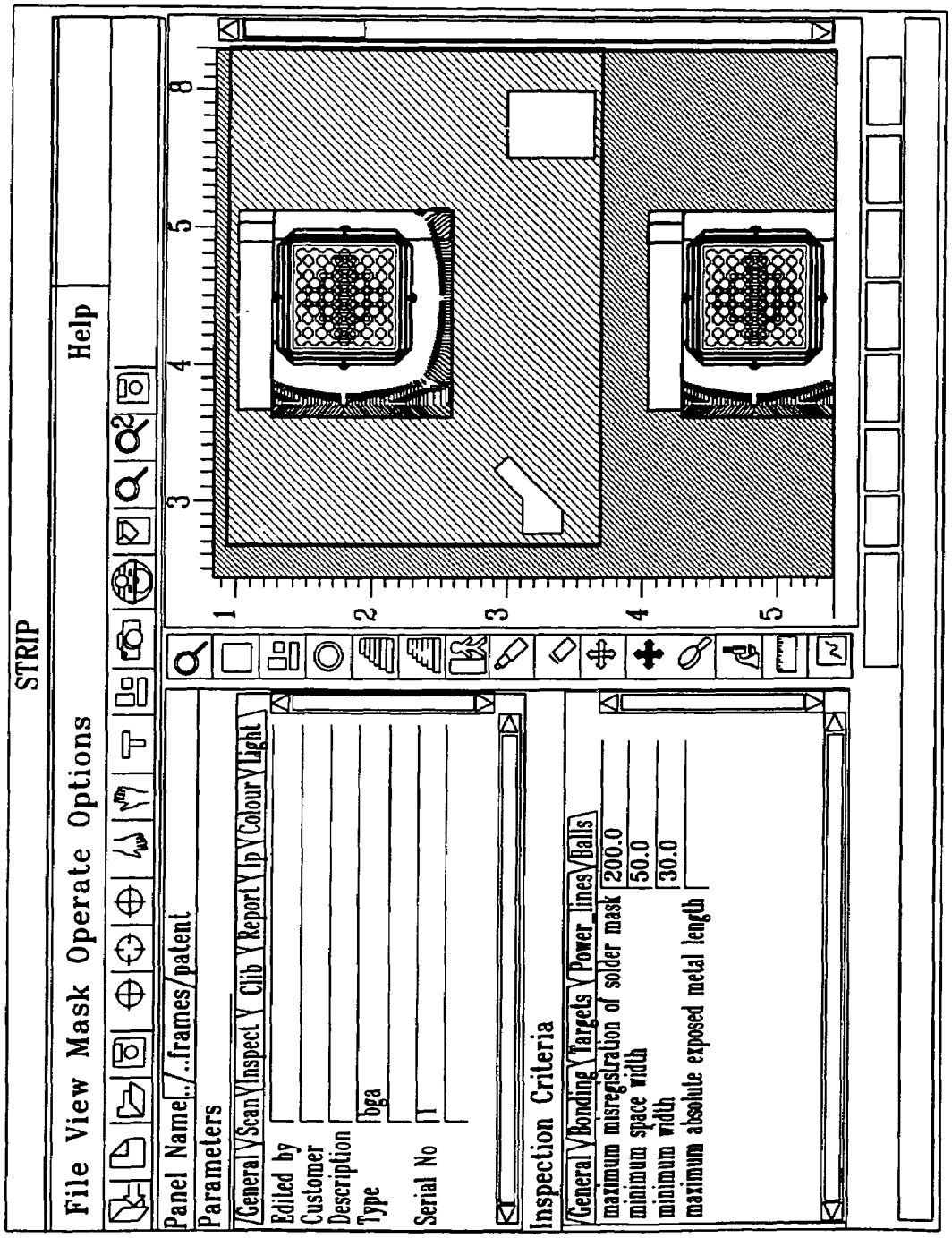

In accordance with a preferred embodiment of the invention, scanner 2 in the embodiment of FIG. 1A, and 34 in the embodiment of FIG. 1B, employ multiple cameras to acquire images of an objects under inspection 4 (FIG. 1A) or panel 36 (FIG. 1B). Use of multiple cameras necessitates transforming the input of each camera by a corresponding alignment transformation. The alignment transformation is an affine transformation computed so that every point in the panel that is observed by more than one camera is mapped by the alignment transformation to the same point in the aligned coordinate system. Preferably, the aligned coordinate system is set so that a unit in this coordinate system equals about 15 microns. A point in this coordinate system is denoted by (Xa,Ya)

Scanning with many cameras obviously has consequences when designing processes that find defects. For example, a preliminary step in the inspection of a large object that is not viewed entirely by any single camera is to operate on pieces of the object that are entirely viewed in each different cameras. Then, unresolved pieces are unified and inspected. Finally, each piece from the coordinate system of a camera in which a task is performed is transformed to a unified aligned coordinate system, and the partial images are stitched together into one large object represented in an aligned coordinate system.

In accordance with a preferred embodiment of the invention, a camera model is provided that specifies the geometry of the optical head: including, for example, the number of cameras, the width of each camera (preferably expressed as a number of diodes or pixels), the overlap between adjacent cameras and an alignment transformation needed to transform a point in a given camera into a unified, camera independent coordinate system. The unified coordinate system is called the aligned coordinate system.

A description of a SIP camera model, constructed and operative in accordance with a preferred embodiment of the present invention is provided in Appendix D.

Preferably, two camera models are stored:

CAMERA MODEL, which is the camera model alignment information for a particular inspection machine at the time of inspection; and CAMERA MODEL REFERENCE, which is the camera model of an inspection system at time of performing a learn scenario. The camera model reference may or may not be the same as the camera model at the time of inspection. Use of the double reference enables, for example, to perform learn and inspection scenarios on separate inspection systems.

In the preferred inspection scenario of the present invention, when a unified image of an object being inspected is compared to a reference, an additional registration transformation is used to register the reference and online [camera/aligned] images respectively. A preferred method for registering between images is described in U.S. Pat. No. 5,495,535 to Harel et. al., incorporated herein by reference, which is generally adapted to identify clusters of features and to perform dynamic registration among clusters rather than by registration between individual features.

Reference is now made to FIG. 26 which is a simplified pictorial illustration of a collection of like frames 870, for example as may be collected together on a panel 36 (FIG. 1B), for inspection in accordance with a preferred embodiment of the present invention. Each of the frames is identical one to the other. Parameters and attributes preferably are learned for a single frame 870 only, and global registration coordinates are changed so that each frame may be inspected and compared to a reference individually.

Tasks

The following section discusses principal tasks that are performed by the SIP. Tasks are represented as functional blocks in the execution graphs of FIGS. 19 and 20.

Input Output Tasks

Input output tasks connect the SIP process to the outside world. A more full description of input output tasks may be found in Appendix A.

Input Channel Task

An input channel task is connected to a FILE or TCP/IP channel. The input channel taskreads incoming raw data and converts the raw data into data sources. In the preferred embodiment of FIG. 1B, the input channel task is associated with data converter and splitters 80 and 120.

Output Channel Task

An output channel task writes data sources into a designated channel, either FILE or TCP/IP. For example, in the execution graph of FIG. 2 an output channel task is associated with defect report generator 230.

Composite Task

A composite task is a task that manages a collection of tasks and data sources. When a composite task is executed it decides the order in which tasks will be executed. The selected task is the task with the highest priority among any of the tasks that are available to work when a call is made to perform the task A more full description of the runtime behavior of composite tasks is presented in Appendix A.

Measure Line Widths

Reference is made to FIGS. 28A-28B which are illustrative of a preferred method for measuring line widths. The line width of a feature, such as a bonding pad, is preferably measured with reference to a morphological skeleton 900. A line is defined by two lines 920 and 910 each of which is formed of a collection of CELs that are located on either side of skeleton 900. Line width is defined as the length of a line that is perpendicular to skeleton 900 and which touches two opposite lines 910 and 920. FIG. 28A shows line width measurement for a skeleton having substantially parallel edges. FIG. 28B shows width measurement for a skeleton having non-parallel edges.

A preferred line width method is described in Appendix E.

Line width measurement tasks are performed in each of the design rule, learn and inspect scenarios described above.

Preferably, line width measurement outputs statistics of line widths and spaces between lines for all locations in an object being inspected, and issues and error report in the event that a minimum line width is violated. Typically, line widths are associated to a line and a location, while minimum space violations are applied globally.

Learn Line Widths

A line width reference comprises a set of rectangles, each of which encloses an area in an image within which all line width measurements have approximately of the same value. In areas where the widths of the lines have a high degree of change, it is typically not possible to create a suitable line width reference. The learn line width task preferably is operative to identify the regions where a high level of change in line widths makes it impractical to form a line width reference. These areas are enclosed in rectangular areas which are identified as areas for which line widths can not be learned.

Inspect Line Widths

Inspect line widths measures the width of lines and the spaces between lines in the image of an object under inspection. Computed widths are compared to the width of lines and spaces between lines for the corresponding position in a reference image. A registration transformation is used to correlate between the respective positions in inspected and reference images. Any mismatch between a computed line width in an online image of an object, and a corresponding acceptable range for line widths as designated in the line width reference for the given location, is reported as a line width defect.

Registration

The registration task produces a transformation between an online coordinate system for images of objects under inspection and a reference coordinate system. Preferably, if a number of cameras are used, a transform is provided for each camera, although it is appreciated that for ease computation only one camera, for example the central camera, may be used to perform registration operations.

Reference is made to FIG. 29 which is a pictorial illustration of an example of a transformation from an online coordinate system to a reference coordinate systems, and the inverse from reference coordinate system to an online coordinate systems. The left-hand coordinate system 950 is an on-line coordinate system and the right hand coordinate system 960 is a reference coordinate system. The illustrated example shows a rigid transformation comprising only rotation and shift. It is appreciated, however, that the registration transformation need not be rigid and that it may generally comprise any suitable transformation.

A preferred registration method is also described in Appendix E.

Learn Registration

The learn registration task creates a reference of features that serves as reference for registration. The (X,Y) coordinates for each morphological feature, and its respective feature type are preferably stored. Certain types of features are defined as "stable" meaning that their location in an object to be inspected preferably is constant to within a very small margin, and registration is preferably performed using stable features.

Inspect Registration

The inspect registration receives as an input an input array data structure, and outputs a transform data structure for an affine transformation. In addition, data structures are output for excess defects, missing defects, and illegal matches.

Objects being inspected are preferably at least partly inspected using a compare to reference approach in which during the learn scenario, prior to inspection, a reference is created for a believed-to-be "perfect" object. The perfect object is preferably obtained either by scanning a golden board chosen to be particularly free of defects or by learning from CAM data. During an inspection scenario, an online image from a scanned object is compared against the perfect reference, and a decision is typically made as to whether errors on the online panel cause is to be too different to the reference panel.

Typically it is not possible to do a straightforward comparison between images of the reference and online panels since the location of the online panel on the scanner may differ slightly from the location at which the reference image was generated. Thus the coordinate of a given feature on the golden panel is typically different from the coordinate of the same feature on the online panel.

The registration task uses features to compute a registration transformation that maps points from the on-line coordinate system to the reference coordinate system.

A brief explanation of a preferred method used in the inspection of BGAs follows. First the input features are unified into clusters of generalized features, which tries to overcome an inherent instability of morphological features on BGAs. The same feature (say, a circle) for example may result in one island feature in one scan and in two, very close together, open end features in another scan. Two open ends can be defined as a single generalized feature, and a matching rule can be defined that specifies that it is legal to match this generalized feature with an island feature. The set of generalized features and the match rules are typically specified in a special configuration file called a matcher table. It is also possible to define in configuration files the unifying distance for unification of different morphological features into one generalized feature.

The registration module also is preferably operative to identify reference features that are not found in the set of on-line features as being "missing", and on-line features that not found in the set of reference features as "excess". The registration task preferably also identifies illegal matches. An illegal match occurs when a feature is detected in the online coordinate system that is matched to a reference feature (i.e., after transforming the reference feature using the registration transformation, the feature is found to be close to an online feature that has a very different type). A typical example of illegal match is a match between Junction and island.

Excess/missing/and illegal match features are reported as excess/missing defects.

Split Registration Transformation

In one preferred embodiment of the present invention, the registration task works only on camera features that are located in the field of view of the central camera. The split transformation task takes the registration transformation and splits it into three registration transformations, one for each camera. In another embodiment, in which registration data is obtained for each of the cameras, this task is not be needed and the registration task is capable of working on aligned features.

Snap Data Packing

In the snap data packing task, input image data is processed and windows are constructed which comprise full image data for a desired region. The windows are computed by clustering together input color defects so that each snap window will contain snap data around a specific cluster of color defects. After snap data is packaged into a window that preferably also comprises color defect data, the window is pushed onto an output queue. A preferred method for packing snap data is described in greater detail in Appendix F.

Building PPM File for Viewing Snap Data

In a preferred embodiment of the present invention, a snap image is constructed for selected defects. Input data is processed and a set of output files containing RGB images of contiguous snap areas are produced. A preferred description of this process is provided in Appendix G.

Watchdogs

Watchdogs compare data inside input data sources against a specified PIM. If certain types of predetermined data are found to exist inside prohibited areas as described in the PIM, then the offending data is converted into SIP defect. SIP defects are accumulated in SIP defects data structure which are packaged into a window, and the window, with all its defects, is pushed to an output queue of windows. One or more of the following features and defects are preferably watched by watchdogs: color defects, hardware defects, line width defects, morphological features.

Task Packer

The packer packs features, CELs and defects into specified windows (rectangular areas) that form a region of interest for additional downstream processing. Windows are preferably specified for each top down event as well as each width defect, excess/missing defect, and hardware defect.

Top down windows that form part of the top down reference are preferably constructed during the learn scenario, and are preferably transformed into the on-line coordinate system (using registration transformation) before CELs and features are packed inside of the top down windows.

In order to minimize the number of windows created and yet enclose ALL the interesting information (top down windows and windows around defected areas) the following scheme is typically used:

First pack data for all top down windows add each packed window to the queue of packed windows.

Consider all defect and line width defect reports:

1. Take the first defect not inside a previously created window (ordering is done in increased y and then increased x coordinates).
2. Create a window centered at the chosen defect, pack all data inside this window and add it to the queue of packed windows.
3. If there are more defects not within previously created windows—go to step 1.

At the end of the packing process all data (CELs, Color CELs, Defects, Features, Width defects) is packed in one or more windows, and the windows are output to a window queue. It is noted that windows may overlap, in which event data items within the overlap region are packed onto each of the overlapping window.

Raw Data Reference Building

This task takes the input raw data and creates a reference of the raw data that is suitable for fast access during the inspect scenario. Further details of preferred structures and methods associated with the windowing of reference raw data are provided in Appendices H and I.

Filter

This task is attached to a PIM for filtering. We assume that the PIM is defined in reference aligned coordinates. The task receives input data for color CELs, features, width defects, defects and affine transfers, and considers each element of the input data sources. First the element is transformed into reference (aligned) coordinate system using the input Affine transformation. If no input transformation is specified, the alignment transformation is used to transform element from camera to aligned coordinate systems.

Next each element from the input data is considered. This element is transformed into the reference aligned coordinate system and checked if the element is inside designated filter zones of the PIM. A configuration file determines whether to filter this element or not. If the element is not filtered, it is pushed into output data source. The value of the configuration variable typically controls whether to filter if an element is inside a designated zone, or to filter if an element is outside a designated zone.

Extract Info from Windows

This task is operative to pop windows out of an input data queue, and to extract data from that window as needed. Upon completion, then the window is pushed into the output queue.

Produce Reference of Zones and of Stable Features

This task writes auxiliary data from an input window with respect to data that typically comprises: (a) PIM regions of various types and (b) All features declared as "stable" features by previous functions that operated on a window.

Balls Measurements

This task writes auxiliary data from an input window. The data typically comprises a file containing information on all circles found in windows and the two others contains statistics on distribution of circles in the panel. Further details of a preferred method for performing this task is provided in Appendix J.

Test Manager

This task preferably pops a window from an input window queue and runs a function associated with that window using fundamental image information data included in the window. Based on the output of the function it decides what to do as follows:

TABLE 1

Action of test manager for each return status from function.

| return code | action |
| --- | --- |
| ERROR | Window deleted and task return with an error. |
| OK | Window is deleted. Task continue to pop next window |
| FORWARD | Window is sent to forward queue. |
| FORWARD SUB WINDOWS | After completion of the task each of the sub-windows with a main window is sent to a forward queue, while the original input window is preferably deleted. In a preferred embodiment of the present invention, a sub-window may be formed, for example around individual bonding pads in a bonding area window. |

Preferably, if no function is attached to a window, then the return status is OK.

Multi Slice Manager

The multi slice manager is preferably operative to receives windows including unresolved data from different cameras. Preferably, the windows are located in an aligned coordinate system. The multi slice manager unifies all windows having the same window identification number and stores the unified window in memory. A unified window that encloses all sub windows is created and then a function attached to the unified window is executed. Based on the output of the inspection function, it decides what to do as follows:

TABLE 2

Action of multi slicer manager for each return status from function.

| return code | action |
| --- | --- |
| ERROR | Window deleted and task return with an error. |
| OK | Window is deleted. Task continue to pop next window |
| FORWARD | Window is send to forward queue. |
| FORWARD SUB WINDOWS | As in ERROR |
| none of the above | As in ERROR. |

It is appreciated that, typically, if no function is attached to the window, the return status is OK.

Defect Writer

The defect writer task preferably accepts four file names from configuration files:
(a) Output window file name: which is a file containing windows. A value of "none" indicates that the file name is not a valid file name and that this file is typically not produced.
(b) Defect window file name: which is a file containing defective windows. A value of "none" indicates that this is not a valid file name and that this file is typically not produced.
(c) Defects file reference coordinates: which is a file containing defects in reference aligned coordinates. A value of "none" indicates that this is not a valid file name and that this file is typically not produced.
(d) Defects file online coordinates: which is a file containing defects in online aligned coordinates. A value of "none" indicates that this is not a valid file name and that this file is typically not produced.

The Defect Writer pops windows out of an input queue and preferably proceed as follows 1. If the window contains defects:

If it is desired to produce file with defective windows or an output file then the window is stored for later processing. Otherwise, the window is stripped from all its data except defects and is stored for later processing.

2. If the window does not contain defects:

If it is desired to produce an output window file then the window is stored for later processing, otherwise the window is deleted.

At the end of a scan all windows previously stored are processed as follows:

First, all defects from all windows are accumulated. In the accumulation step, two vectors of defects are created:

1. A first vector containing defects in reference aligned coordinates.

The defects inside each window are transformed into reference coordinate system by using a Self to reference affine transformation which preferably exists for each window and transfers content of the window to a reference aligned coordinate system. Defects are added to the vector only if they do not fall inside the mask area defined by the PIM specified in an input PIM data source. If no PIM is defined, all defects are added to the vector.

2. Vector containing the same defects in online aligned coordinates.

This vector is produced from the first vector by applying the registration transformation specified as input to the task. Note that the identity transformation is used when no input affine transformation is defined.

If a valid output file containing reference coordinates is defined then the first vector is written to that file. If a valid output file containing online coordinates is defined then the second vector is written to that file.

Each of the defect files contains a set of lines, one line for each defect. Each line typically has the following format:

X Y-defect type-frame index where X,Y are the coordinate of the defect (either in reference aligned or in online aligned coordinate systems);

defect type is the enumeration of the defect; and and frame index is the index of the frame containing the defect.

Next, if there is a valid defects window file for the named file, then we write all defective windows into that file. This is particularly useful to visualize defective windows.

Finally, in the case of a valid output window file for the name file, the function attached to the window is first run, after which a decision on how to proceed is made by considering the return status of the function:

TABLE 3

Action for each return status from function

| return | code action |
|---|---|
| ERROR | Task return with an error. All windows are deleted. |
| OK | Window is written into the used file. |
| FORWARD | As in the OK case. |
| FORWARD SUB WINDOWS | All sub windows within the window are written to the used file. |
| none of the above | As in ERROR. |

It is appreciated that if no function is attached to the window, the return status is typically OK.

Draw Aligned CELs

The draw aligned CELs task considers each input CEL. If the CEL is not inside a clipped region that is specified in a configuration file, then it is converted from camera to aligned coordinates and written into a file in a special graphic format that makes the file suitable for viewing.

This task is useful for checking alignment transformation within an inspection system. Preferably, the task is run for all cameras and output files are displayed one over the other. A good alignment transformation is a transformation that transforms CELs from two overlapping cameras so that the CELs from the first camera are located exactly over CELs from the second camera in regions where the two cameras overlap.

Functions

A function is an encapsulation of an inspection method for use on image information contained in an inspection window. Functions are activated by a window oriented task, preferably either a test manager task or multi slice manager task as explained above, preferably in a predetermined order in order to inspect the image data contents of a window. The activating task applies a function to data in the window and executes the function with the specified window as an argument. The function performs its computational task on the window and returns one of three return codes described below. Based on the return code the calling task decides what to do next.

Each function preferably receives all of the parameters needed for computation from a configuration file, and extracts from the window whatever image data information that it needs for computation. Preferably, functions are modular and chained together when more complex computations on a given window are necessary.

A function preferably returns one of three possible values:
OK, which indicates that the function succeeded in its computation.
ERROR, which indicates that the function failed in computation (for example because of a bug or other serious problem); or
FORWARD, which indicates that the function succeeded in its computation but indicates that additional computation is needed in order to complete the computational task. Completion of the task is performed by forwarding the window to a forward destination and assigning to the window an additional function to the window. The activating task typically knows how to send the window to its forward destination and how to activate the forward function.
FORWARD SUB WIDOWS, which indicates that the function succeeded in its computation but indicates that additional computation is needed in order to complete the computational task. Completion of the task is performed by forwarding all sub windows in the window to a forward destination and assigning to each sub-window an additional function to that sub-window. The activating task typically knows how to send the sub-windows to their forward destination and how to activate the forward functions.

No Operation (NOP) Function

This function does nothing, and preferably returns an OK value.

Composite Function

This function preferably runs a list of functions provided in a configuration file. The functions are executed in the order specified in a configuration file.

Forwarding Function

This function obtains the name of a forward function and a forward destination for additional processing from a configuration file. The forwarding function preferably accepts flags that specify special exceptions to forwarding, typically including:

Forward Only if Inside Camera exception, which is operative to ensure that a window is forwarded only if it is completely within camera boundaries.

Forward Only if Defects Found exception, which is operative to ensure that a window is forwarded only if it contains defects.

Forward Sub Windows exception, which has a true/false flag and is operative to return status such that if the value of the flag is true, then a forward sub-window status is returned. Otherwise a forward status is returned.

Windows are preferably not forwarded if the following conditions are met:
1. There are no defects in the window, provided however that the window is flagged to be forwarded only if defects are present in the window;
2. The window is not located fully inside camera boundaries, provided however that the window is flagged to be forwarded only if the window is fully inside a camera boundary.

Transform Window to Reference Coordinates Function

The transform window to reference coordinates function removes non-transformable data items from window and transforms the coordinates of a window from online image coordinates to a reference coordinate system.

Remove Non Transformable Data from Window Function

The remove non transformable data from window function preferably removes non transformable image data, for example CELs, that exist in a window.

Watchdog Function

The watchdog function scans all input CELs within a window. Every CEL that is found inside a quadrilateral enclosing a reference window is reported as a defect. This function is typically used for regions in which it is desired to ensure the absence of any features. For example, in the context of BGA inspection, a watchdog function may be applied to region defined in a top down window as having to be absolutely clear of any features.

Defect Filtering Inside a Window Function

The defect filtering inside a window function is attached to a PIM data source. The function receives a PIM referenced to an aligned coordinate. When executed, the function transforms input defects to reference aligned coordinate system, and checks the aligned defect against a PIM. If the defect is found inside a mask zone (or zones) specified by a PIM, then the defect is filtered out, otherwise it is pushed into an output list of defects.

Connected Components Function

The connected components function creates connected components from CELs, (including both binary CELs and color CELs) that exist inside the window. The resulting connected components are placed in placed in a window, preferably for further processing by the Vectorizer Function, the description of which follows. A preferred method for performing this task is described in Appendix K.

Vectorizer Function

The vectorizer function takes connected components and approximates each connected component by straight lines so that the deviation of the connected component and the straight line approximation is no more than a prescribed tolerance that is specified from a configuration file. A full description of a preferred method for performing this task is provided in Appendix L.

Ball (Circle) Modeling and Inspecting Functions

Ball modeling functions as are preferably used in the context of BGA inspection are generally described below and in Appendix J. Ball modeling is exemplary of a type of modeling that is suitable for use in inspecting online images of objects under inspection in the context of top-down windows.

Ball Modeling with Connected Components

Ball modeling processes connected components that are found inside an inspection window. The function is operative in the learn stage to prepare a reference model, and in the inspect stage to determine the characteristics of balls in an online image of an object under inspection. If connected components do not already exist, then the function produces connected components from CELs. An inspection window is supposed to contain only balls. Accordingly, if a connected component in a window is closed it is assumed to be a single ball, however if the connected component is open, it is assumed to be a part of a ball. The function analyses the connected component to see if it is indeed a ball, for example by testing for a center point and then measuring a radius along the contour of the connected component to determine if it is within a predetermined tolerance. Information on the circularity of a single connected component is held in a data structure denoted a generalized circle.

Prepare Ball Window for Reference

Prepare Ball Window for Reference removes from the window all objects other than the balls.

Compare Reference Balls to Online Balls

The Compare Reference Balls to Online Balls functions compares balls in a reference image to balls in an online image for an object being inspected. Preferably, the location and radius of online balls is compared to reference information for the balls. Balls in an online image are deemed to match balls in the reference image, if the online ball has a similar radius, with a prescribed tolerance, and is found to be within a prescribed distance from the reference. Any excess balls, and any missing circles are recorded as defects.

CEL to Vector Comparison

The CEL to Vector comparison function compares reference vectors (polylines) obtained from a reference window to CELs existing in an online image of an object 4 (FIG. 1A) under inspection, and based on the comparison determines whether a putative defect is a real defect or a false alarm. CEL to Vector comparison is particularly suited for the inspection of hardware defects, excess/missing defects, illegal matches defects, and morphological features. Additionally, it is used in the inspection of certain top-down windows, for example bonding pads.

Reference is now made to FIG. 30A which is a pictorial illustration of an inspection window 1000 in which reference vectors, or polylines 1010, defining a reference feature 1020, are seen. Polylines 1010 are each associated with envelopes 1030.

Reference is additionally made to FIGS. 30B which is a pictorial illustration of an inspection window 1002 in which a collection of online CELs 1040 calculated from an online image of an inspected object 4 (FIG. 1A) are superimposed over the polylines 1010 of FIG. 30A. It is readily appreciated that the collection of CELs 1040 is registered to be in alignment with reference polylines 1010. The collection of CELs 1040 is identified as a candidate defect, for example by defect identifier 13, because of a putative protrusion 1050, and the CEL to Vector function is applied in order to verify whether the putative protrusion is a candidate defect or a real defect.

As is seen in the illustration, putative protrusion 1050 extends outside the region defined by envelopes 1030. Accordingly, in accordance with a preferred embodiment of the invention, the CEL to Vector outputs a defect flag for inspection window 1002.

Reference is additionally made to FIG. 30C which is a pictorial illustration of an inspection window 1004 in which a collection of online CELs 1060 is calculated from an online image of an inspected object 4 (FIG. 1A), which is different than the inspected object 4 (FIG. 1A) from which CELs 1040 (FIG. 30B) are calculated. It is readily appreciated that the collection of CELs 1060 is registered to be in alignment with reference polylines 1010. The collection of CELs 1060 is identified as a candidate defect, for example by defect identifier 13, because of a putative protrusion 1070. The CEL to Vector function is applied in order to verify if the putative protrusion is merely a candidate defect or a real defect.

As is seen in the illustration, despite putative protrusion 1070, all of the collection of CELs 1060 lies within the region defined by envelopes 1030. Accordingly, in accordance with a preferred embodiment of the invention, the CEL to Vector function does not output a defect for CELs 1060 since they are not outside envelope 1030.

However, in FIG. 30C there is also seen a second collection of CELs 1080 which lies entirely outside envelopes 1030. Each of the CELs in second collection 1080 is flagged as a defect. It is readily appreciated that CELs located outside envelopes, such as CELs 1080, may be filtered through a defect handler function, and reported as a defect or filtered as being not of interest.

The CEL to Vector function preferably proceeds according to the following sequence:

An inspection window, for example inspection window 1000, is checked for the presence of CELs and to ensure that the number of CELs in the window does not exceed the number of CELs exceed a maximum number of CELs that is permitted to be contained in the inspection window. Preferably, the number of CELs is calculated by counting the midpoint of each CEL. It is appreciated that the parameter is variable and may be set or changed in response to the location of the window in an image.

Inspection window 1000 is checked for the presence of a reference polyline 1010. If inspection window 1000 does not include a polyline 1010, then a defect is returned.

Preferably, polyline 1010 and collections of CELs 1030, 1040 and 1060 are microregistered. Reference is now made to FIGS. 31-32B which show and describe a preferred method of micro-registration.

Micro registration preferably proceeds as follows:

Step 1100: each CEL 1110 located in an inspection window 1120 is checked, and those CELs 1110 that are inside one or more envelopes 1130 surrounding reference polyline 1240 are identified and appropriately tagged;

Step 1200: each of the CELs 1110 that are inside an envelope 1130 are checked for direction. Each CEL whose direction, within an angular tolerance range provided by a configuration file based on inspection requirements, is the same as a polyline 1240, is denoted as a "matching" CEL 1210.

Step 1300: A least squares calculation is performed on the distance between each matching CEL 1210 and its neighboring polyline, and the collection of CELs 1210 in the online image is moved relative to polyline 1140 until the value is minimized. When the value is minimized, the images are microregistered, as seen in FIG. 32B.

Following microregistration, a CEL to Vector comparison is conducted as follows:

Envelopes 1030 (FIG. 30A) are constructed around the reference polylines with width and equal to the value of a configuration variable.

Subsequently, CELs 1040 are compared to envelopes 1030. If a CEL 1040 is not found in any envelope a defect is reported. Preferably, each envelope records the number and length of all CELs 1040 that are present inside the envelope 1030. If no CELs are recorded in a given envelope in an inspection window 1000, a defect indicating that the affected envelope is empty is reported for the midpoint of the envelope.

Create Reference Windows from a Bonding Area

A function to create reference for bonding area is preferably performed in BGA inspection. The create reference for bonding area function is operative to analyze connected components and to find connected components that are part of a functional entity called "power line". User defined configuration variables, adapted to the particular structure of power lines, are used in the decision making process. Upon the detection of power lines, calculations are made with respect to three zones of inspection interest:

critical, which are zones that preferably exhibit strictly defined attributes such as location and material non critical which are zones that have a large degree of latitude with respect to necessary attributes and location unstable which are zones whose position is likely to change without being considered defective. Unstable zones are inspected only if requested by a configuration variable.

A function to create bonding pad reference sub-windows is also preferably operative in BGA inspection, and is suitably employed to detect whether an inspection window encloses any bonding pad. The function analyzes all connected components in a window, and identifies those connected components that are part of bonding pad. Critical, non-critical and unstable zones are preferably identified.

In the absence of a configuration variably requiring computation of unstable zones, contours for homogeneous color populations (identified from color CELs) are morphologically dilated, in a preferred embodiment for BGA inspection, to separate solder mask regions from all other materials.

Cell to Vector Error Classification

Typically all CEL to Vector errors are considered as defects. However, sometimes a CEL to vector may indicate the presence of a "surface defect". A surface defect is an extraneous connected component which that was present in the reference data.

Reference is again made to FIG. 30C. Assume that reference polyline 1010 is a bonding pad. In accordance with a preferred embodiment, if a collection of CELs, such as collection 1250, is detected to have a polarity that is opposite to the polarity of a polyline 1010 which corresponds to the desired bonding pad in a reference image, then a "pinhole" is indicated. Polarity is the orientation of the CELs or polyline respectively.

Post Processing

Reference is now made to FIG. 33 which is a flow chart in accordance with a preferred embodiment showing the operation incorporating image post processing system, such as may be operative as a task in image post processor 26 (FIG. 1A). The image post processor task depicted in FIG. 33 operates as a defect filter that outputs a defect in the event that small defects are found by virtue of their quantity, as opposed to their quality, necessitate issuance of a defect report. For example in the context of BGA inspection, individual pinholes in metal coatings on bonding pads may be acceptable, however if the quantity of pinholes exceeds a threshold, then the BGA is deemed defective.

In this embodiment defects in an image of an object are specified as either regular or minor defects. Regular defects in an image, corresponding to regular defects in the object, are typically not tolerated, while a small number of minor defects, corresponding to minor defects in the object, typically are tolerated. In the example provided above, a pinhole defect may be considered a small defect, while a missing feature, such as a missing bonding pad, may be considered a regular defect.

Step 3305: A user specifies the criteria used for defining defects in an image. Screen displays similar to those of FIGS. 34-42 allow a user to specify defect criteria.

Step 3310: If any type of minor defect is tolerable up to some multiple, then for each type of minor defect a user specifies the maximum number (x) of each type of minor defect than can be tolerated. The number (x) may be one defect or more than one defect. In effect, an amount of x+1 of any particular type of minor is not tolerated.

Step 3315: The image is inspected, preferably in accordance using one or more the image processing methods shown and described with reference to FIGS. 1A-32B of the present invention.

Step 3320: A decision tree determines whether defects were found.

Step 3325: If no defect is found, then the image is deemed OK.

Step 3330: A further decision tree is followed to classify the defect as either a regular or minor defect.

Step 3335: If a regular defect is present, then a defect report is issued.

Step 3340: Each type of minor defect is counted.

Step 3345: If the number (n) of a minor defect type is less than the number of permitted minor defects of the given type, then no defect report issues. However if the number of the type of minor defect is greater than the tolerated number of permitted minor defects of that type, i.e. n>x then a defect report is returned at step 3335.

It is readily appreciated that a user of an image processing system including a minor defects post processor as described with reference to FIG. 33 typically determines the parameters and criteria for inspection of an image, and the same or separate parameters may be employed for inspection of user specified areas of interest, and for identification of defects by the signal processor.

It is appreciated that the aforementioned description of a post processing unit is not intended to be limiting to the aforementioned method, but rather other post processing methods may be employed. Suitable post processing methods may include, for example, functions to further analyze regions of interest surrounding candidate color defects, functions operative to identify and classify defects resulting from oxidation and photoresist residue, and other suitable defect candidates that may be filtered by additional image processing of selected sections of a robust image.

General User Interface (GUI)

It is appreciated that an image processing system in accordance with the present invention is particularly flexible, and enables numerous inspection parameters to be identified and controlled, including by way of example only and not by limitation, general parameters, calibration, repeat, Ip, color and light.

Inspection criteria are also preferably specified by the user. Such parameters may comprise, by way of example and not by limitation, the type, location and contents of top-down windows for balls, targets, bonding pads and cavities, power lines and the like. Additional parameters may also be provided such as minimum line widths. In accordance with the present invention, the various parameters are preferably correlated to particular regions on an object to be inspected.

Reference is now made to FIGS. 34-42 which are examples of screen displays generated during user definition of criteria for inspection of an image by an image processing system constructed and operative in accordance with a preferred embodiment of the present invention.

FIG. 34 is a screen display allowing a user to specify general inspection criteria.

Figure 35:
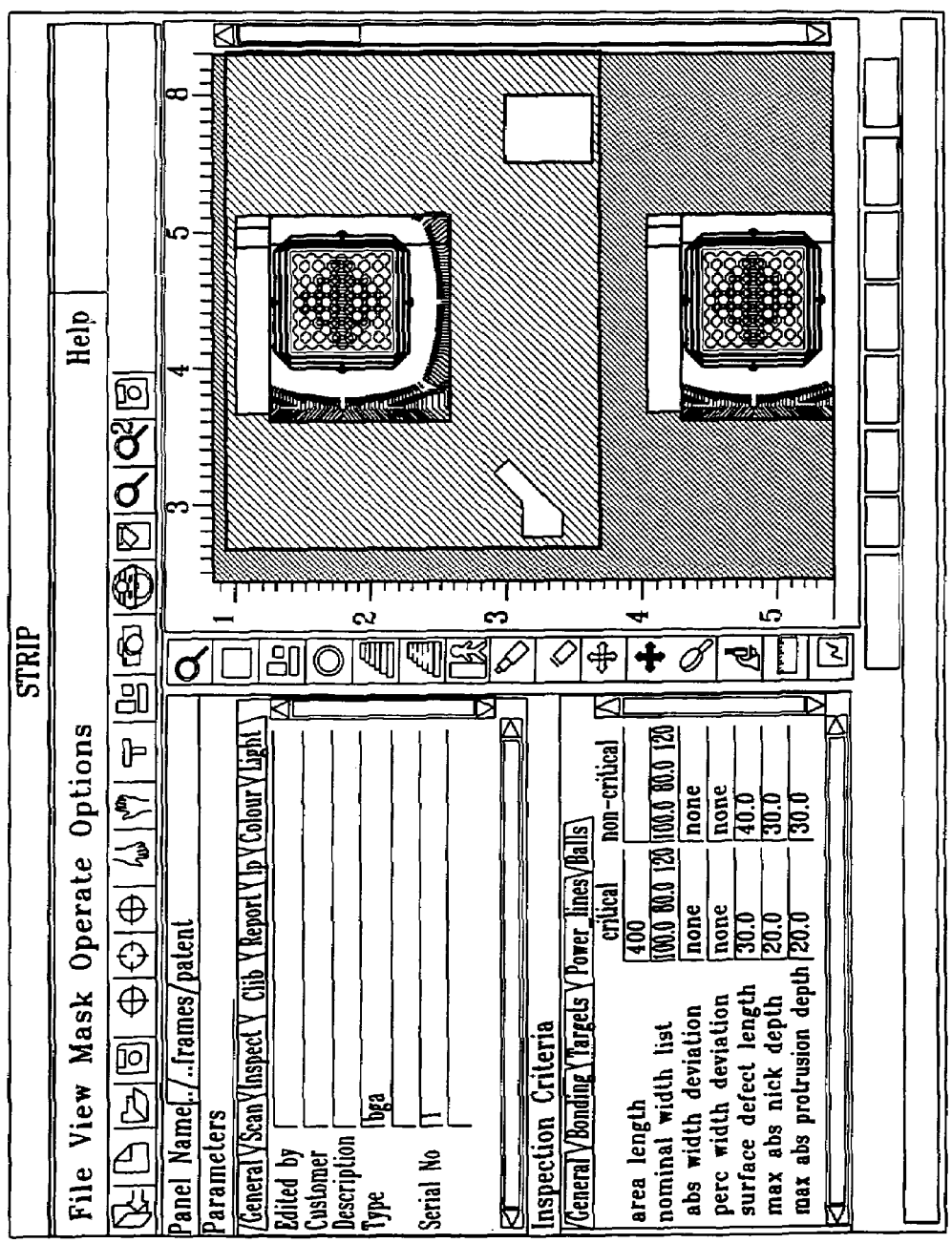

FIG. 35 is a screen display allowing a user to specify bonding inspection criteria.

Figure 36:
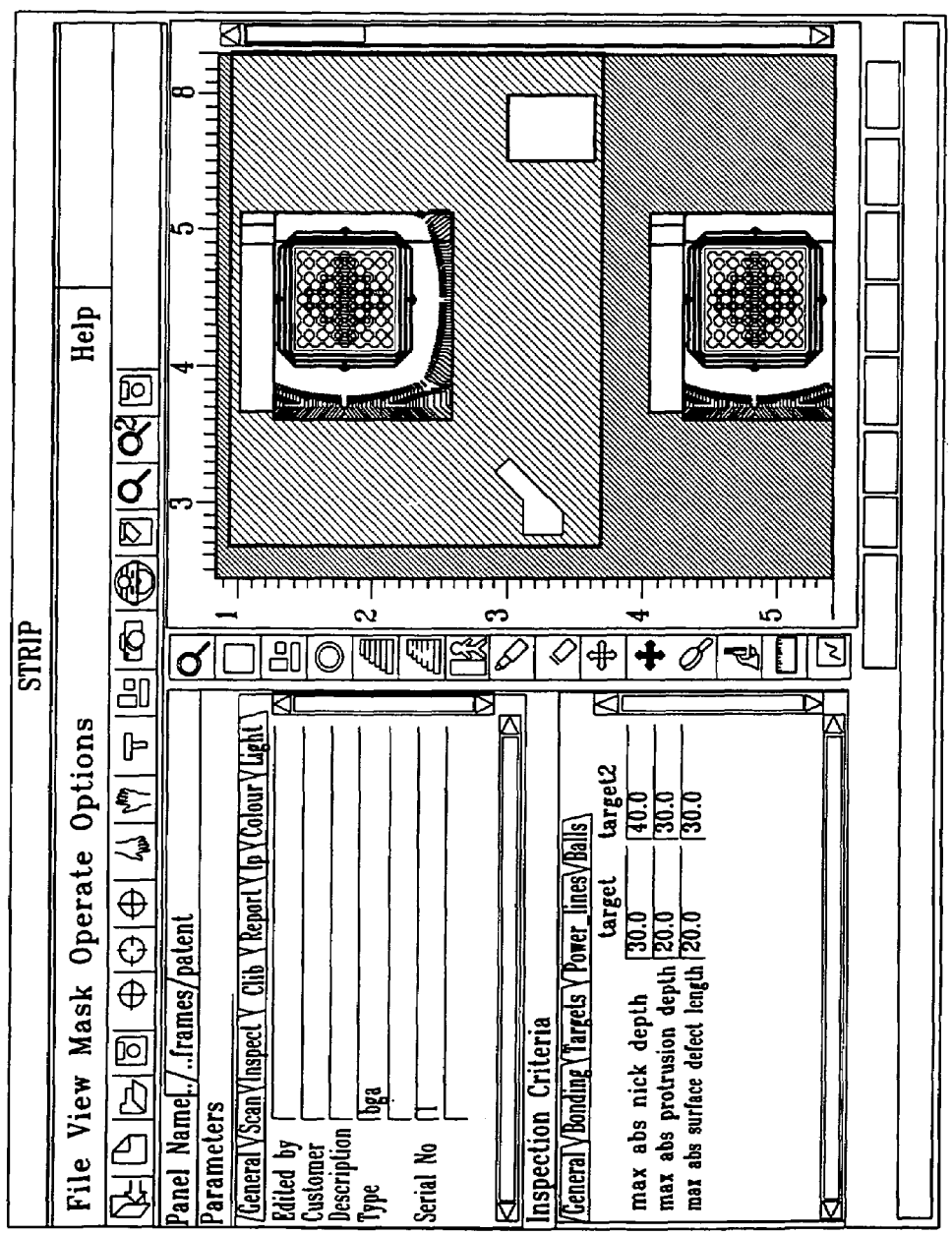

FIG. 36 is a screen display allowing a user to specify target inspection criteria.

Figure 37:
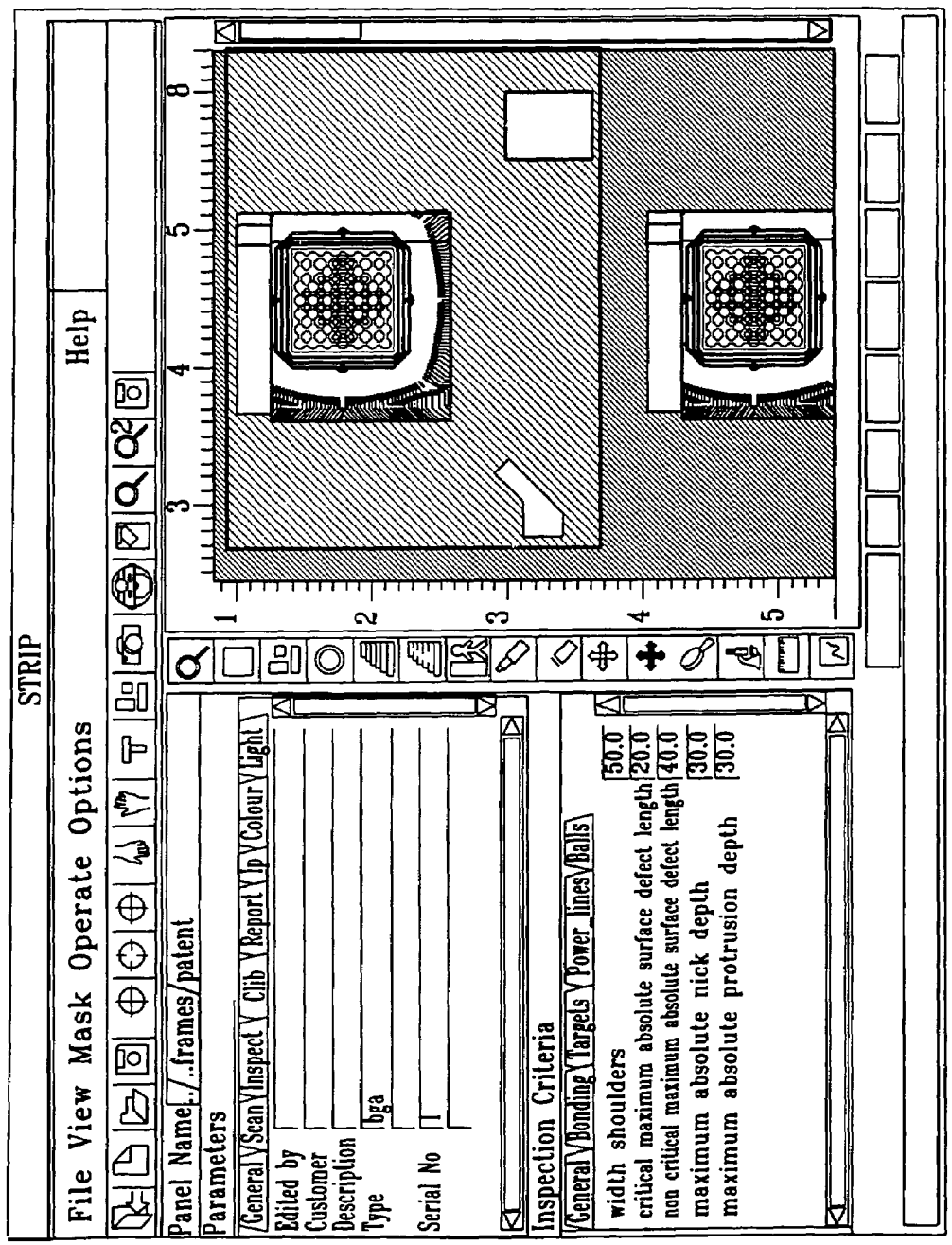

FIG. 37 is an example of a screen display allowing a user to specify criteria for inspection of power lines.

Figure 38:
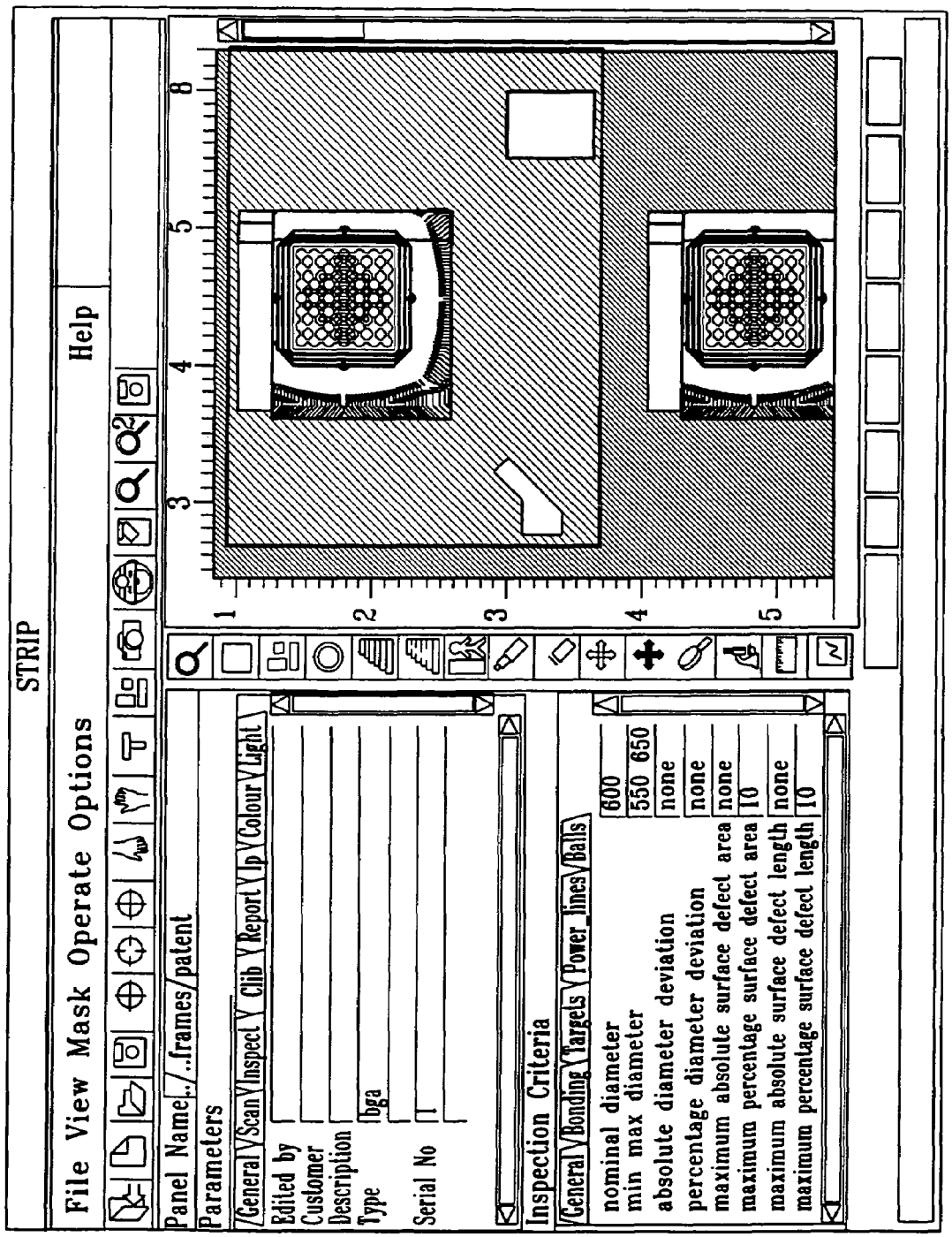
Figure 39:
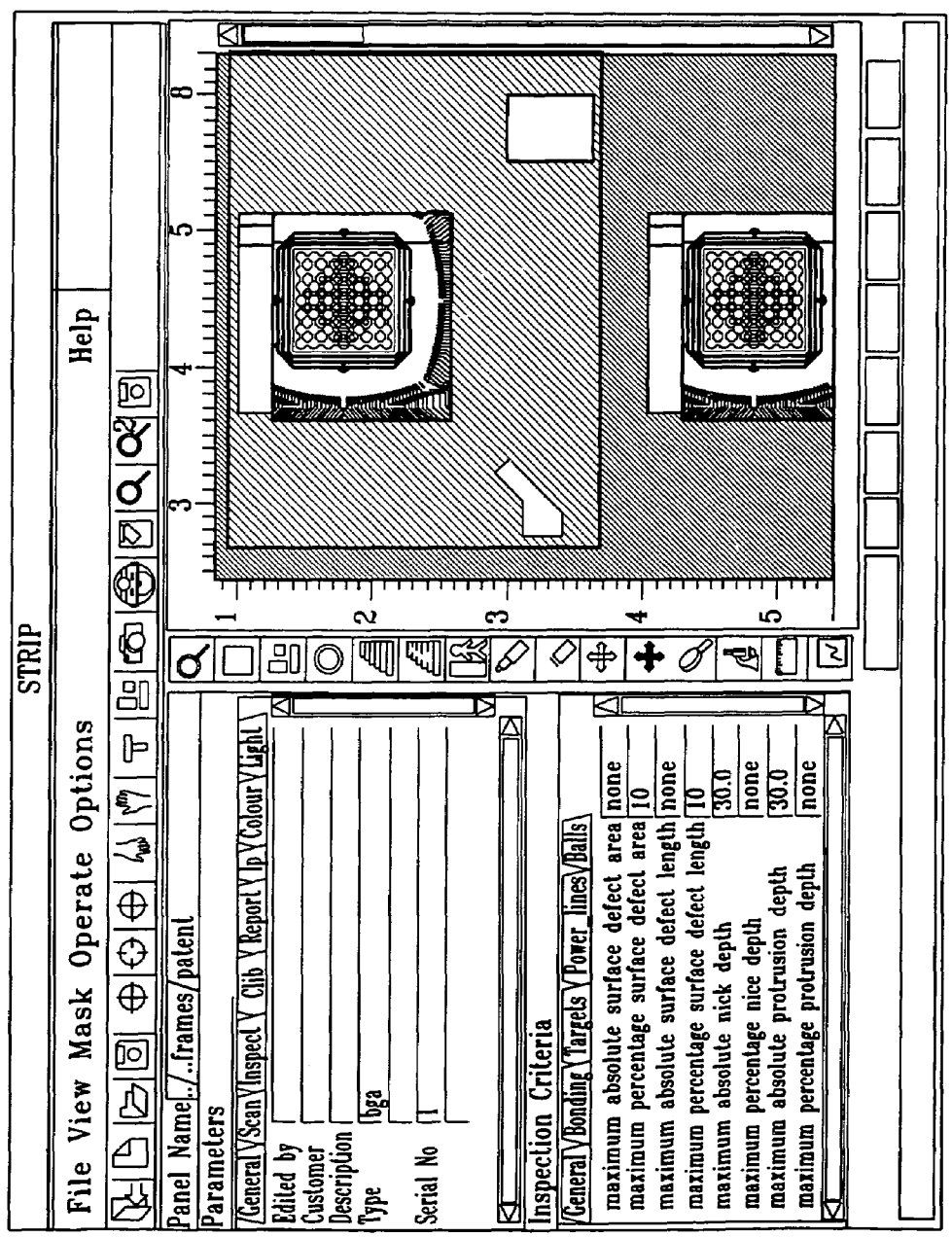

FIGS. 38-39 are examples of screen displays allowing a user to specify criteria for inspection of balls.

Figure 40:
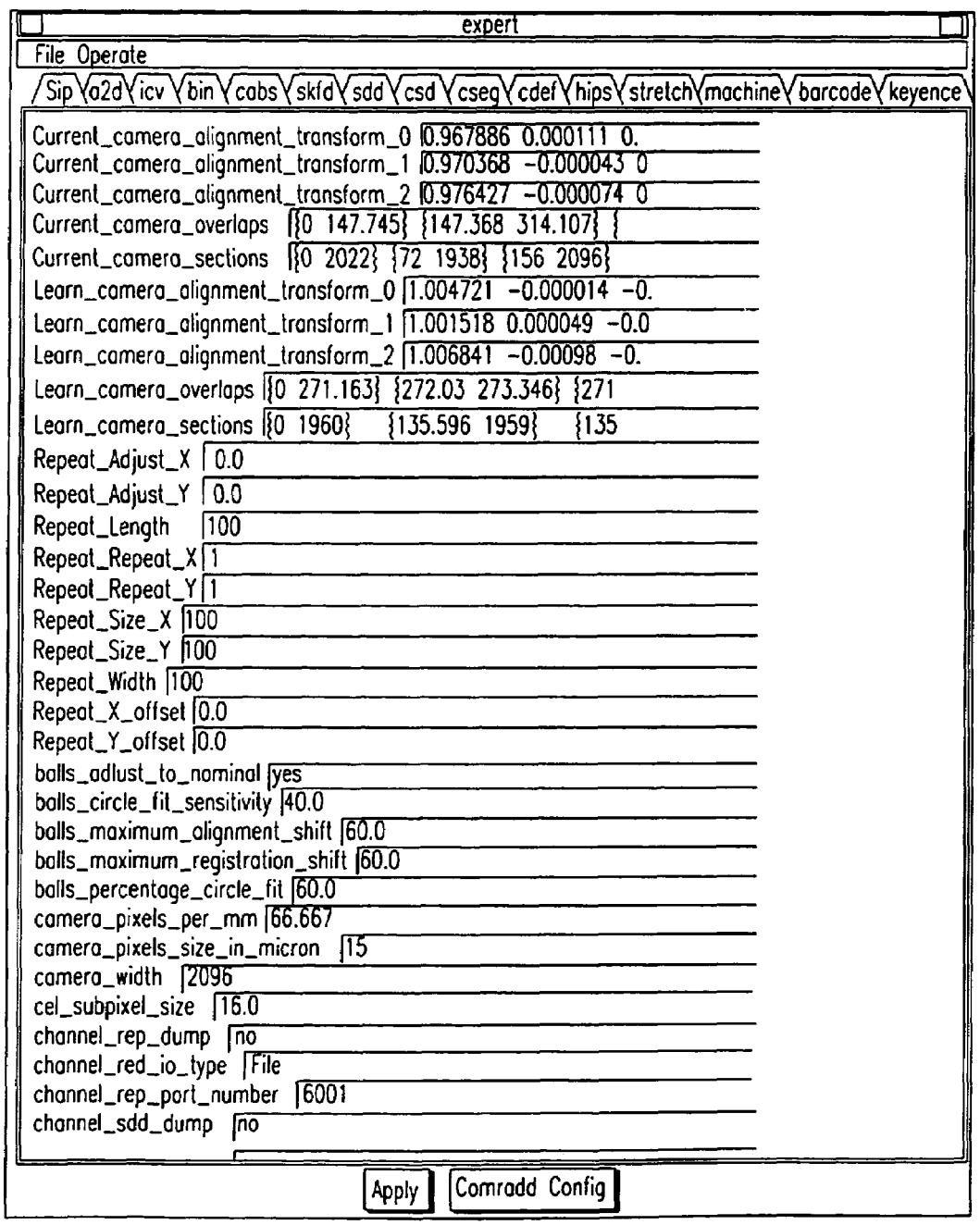
Figure 41:
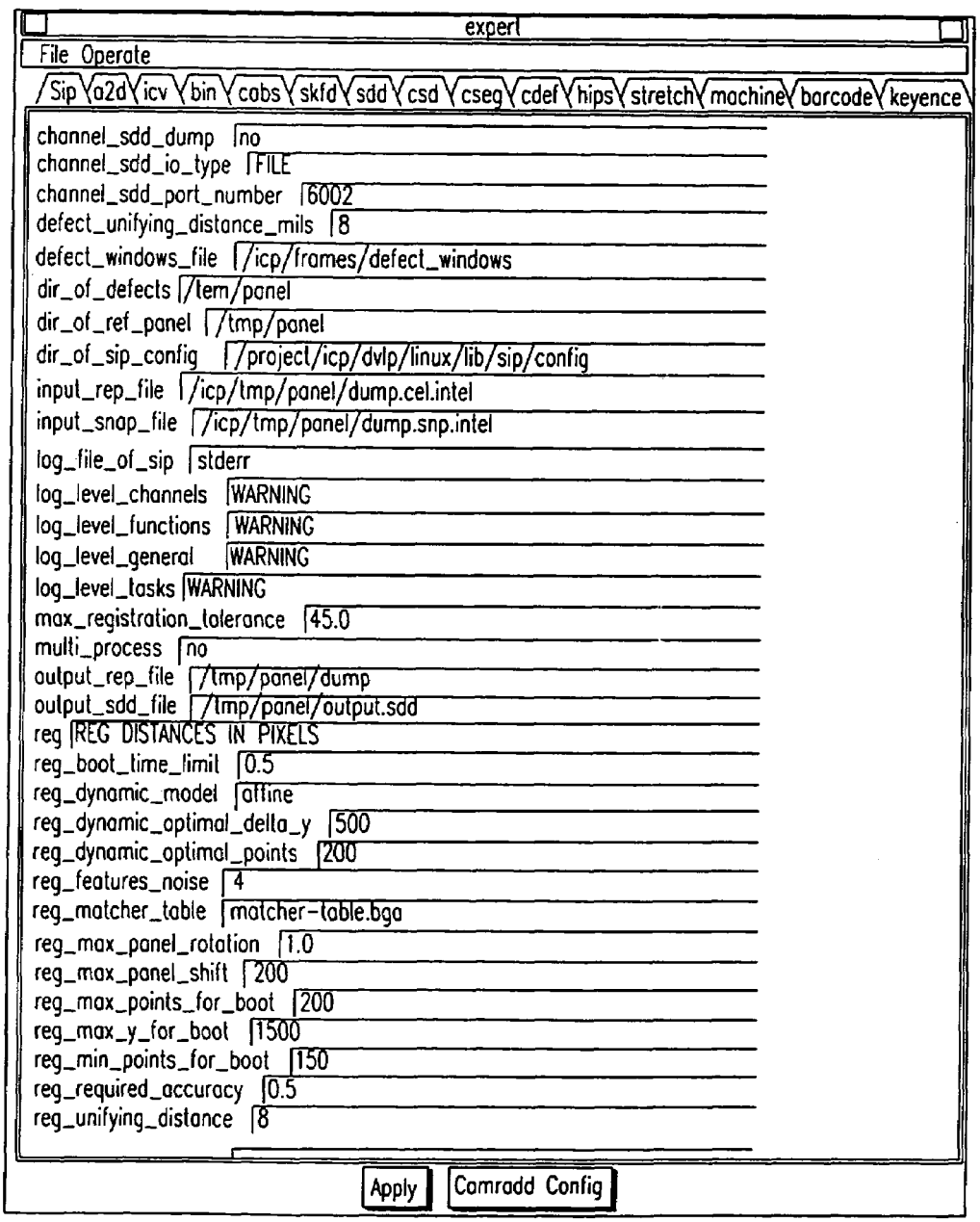
Figure 42:
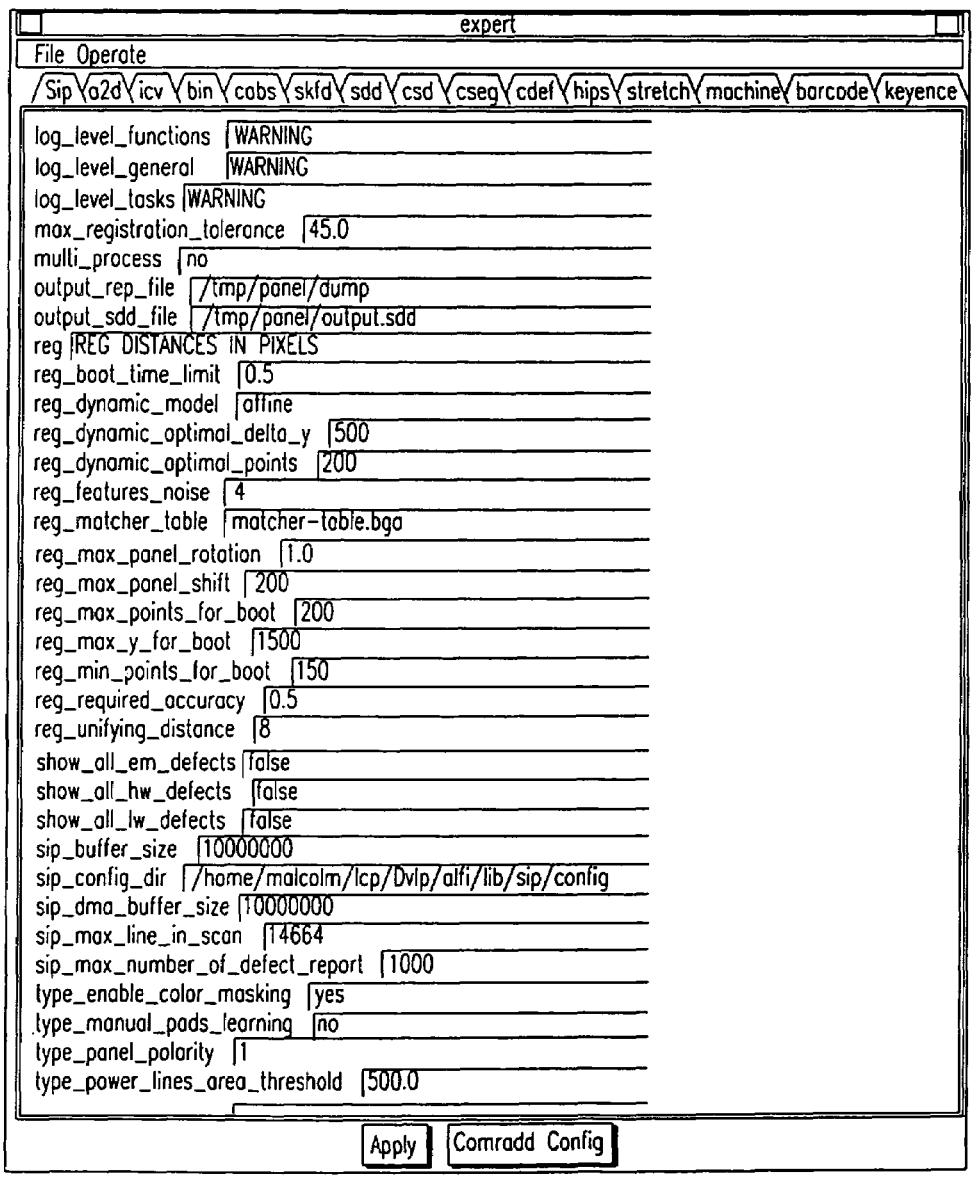

FIGS. 40-42 are examples of screen displays allowing a user to specify advanced criteria and parameters for inspection of an image of an object.

In accordance with a preferred embodiment if the invention, a two part general user interface is provided for defining regions of interest in an object to be inspected, such as a BGA. In one part of the user interface, a graphic interface is provided in which a graphic representation of the object to be inspected is provided, and the user with the assistance of a pointing device, typically a mouse, designates on the graphic representation types of regions of spatial interest for inspection. In the second part, parameters are provided for each of the regions of spatial interest that are designated.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

It is appreciated that the software components of the present invention may, if desired, be implemented in ROM (read-only memory) form. The software components may, generally, be implemented in hardware and/or DSP units, if desired, using conventional techniques.

It is appreciated that the particular embodiment described in the Appendices is intended only to provide an extremely detailed disclosure of the present invention and is not intended to be limiting.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather, the scope of the present invention is defined only by the claims that follow:

APPENDIX A

Introduction

Appendix A will be understood and appreciated from the following detailed description, taken in conjunction with the drawings in which:

FIG. 43 is a simplified block diagram showing relationships between data sources and a processing module constructed and operative in accordance with a preferred embodiment of the present invention;

FIG. 44 is a simplified block diagram showing relationships between data sources and a pre-emptive processing module constructed and operative in accordance with a preferred embodiment of the present invention;

FIG. 45 is a simplified block diagram showing user defined tasks of a processing module, constructed and operative in accordance with a preferred embodiment of the present invention;

FIG. 46 is a simplified block diagram illustrating a composite processing module constructed and operative in accordance with a preferred embodiment of the present invention;

FIG. 47 is a simplified block diagram illustrating input channels into a pre-emptive processing module and a cooperative processing module, constructed and operative in accordance with a preferred embodiment of the present invention;

FIG. 48 is a simplified block diagram illustrating output channels from a pre-emptive processing module and a cooperative processing module, constructed and operative in accordance with a preferred embodiment of the present invention;

FIG. 49 is a simplified block diagram illustrating a registration processing module constructed and operative in accordance with a preferred embodiment of the present invention;

FIG. 50 is a simplified block diagram illustrating a root process manager, constructed and operative in accordance with a preferred embodiment of the present invention;

FIG. 51 is a simplified block diagram illustrating an execution graph scenario constructed and operative in accordance with a preferred embodiment of the present invention;

FIG. 52 is a simplified block diagram illustrating a root directory tree from which the SIP begins, constructed and operative in accordance with a preferred embodiment of the present invention; and FIG. 53 is a simplified flow chart illustrating SIP states and the commands that effect them, constructed and operative in accordance with a preferred embodiment of the present invention;

Presented is an architecture of the kernel of the SIP (software image processing) that is capable of running efficiently on SMP (symmetric multi-processing) machines (e.g., a multiprocessor Intel based machines), and on a single processor machine. The implementations of object oriented techniques to implement multiprocessing in a platform independent way is discussed.

The goal of the SIP kernel is to allow easy and efficient processing of different scan scenarios. A scan scenario usually involves connection of the scanner's hardware, reading incoming information about the scanned board and processing this information in different ways. For example, in a learn scan scenario we create a reference of the board from the incoming data, and while in the inspect scenario we compare this reference to the actual data coming from the scanner. If the inspected board is too different from the reference board, we decide that the board is defective. The scan scenario may involve only off-line computations, without connecting to any scanner. We may look at the SIP as a tiny operating system that is responsible for carrying out efficiently many different scan scenarios.

The SIP schedule is a set of processing modules. Each processing module consumes zero or more data sources and produces zero or more data sources. A data source is any data structure shared by more than one processing module.

In this appendix changes to two basic entities in the SIP—the task/channel and the data source—are discussed. The separate task and channel objects are preferably joined as a new "meta-task" object which can function both as a task and as a channel. The channel capabilities of this new object are provided by a new kind of data source which encapsulates the access to data via hardware—the Stream_ data_source. A preferred modification to the data sources is the capability to allocate a data source in shared memory, thus allowing "meta-tasks" executing in more than one process to share data efficiently and transparently.

Definition of an Abstract Processing Module

This abstract base class represents the most basic computational element that can be defined within the SIP. A Processing module preferably comprises a manager which is a method/program that initiates and manages it.

Reference is now made to FIG. 43 which is useful in understanding a preferred embodiment of the present invention.

A processing_module may have up to three kinds of "relationships" with data sources:

Consumer of a data source (reader)—reads and processes data from these data source(s).

Asynch Consumer of a data source (reader)—the processing module registers to be notified by the data source whenever new data is available for reading and processing.

Producer of a data source (writer)—writes produced data to produced data sources.

A processing module typically has at least one consumed data source to be correctly configured. If a processing module does not consume any data source, it will not get scheduled to process.

The basic Processing Module performs some sort of processing on consumed data. Following are several examples of concrete derived classes (which are discussed in greater detail in the following sections):

Some sort of computation performed on input DS (data source) with results written to the output DS.

A parsing operation on input data, with parsed data written to selected data source.

A formatting operation on input data, to write it to an output stream data source.

The Processing Module is defined in the SIP configuration file.

Another basic trait of the abstract base class is now defined:

Definition of a pre-emptive processing module versus cooperative.

Reference is now made to FIG. 44 which is useful in understanding a preferred embodiment of the present invention.

A pre-emptive processing module (denoted by the broken lines in FIG. 44) exists within an independent operating system process thread. As such, it is scheduled to be run by the operating system according to system level events. A cooperative Processing_Module is scheduled by it's manager, usually a higher level composite processing module scheduler.

All data sources referenced by a pre-emptive processing module are preferably placed in shared memory, denoted by the broken lines. This is preferably done automatically by the configuration file loader.

Indication of data available for processing end of data etc. is typically signalled in the following manner by the updated data source:

For pre-emptive processing modules, communication will be through pipes which are to established by every pre-emptive processing module.

For a cooperative processing module active signalling is not typically needed. The update of more data ready to process.

Every pre-emptive processing module processing module has a unique ID which is its operating system process ID. To this ID the file descriptor associated with the pre-emptive process pipe is attached. Data sources which are dependent on streams external to the SIP will also provide an external file descriptor to which the owning pre-emptive processing module will be attached.

The attachment of file descriptors to pre-emptive processing modules is performed after the load configuration process. This may be a portability issue because there are platforms which allow only one un-named pipe per processes.

The consumer registration process preferably works as follows:

The consuming processing module calls Register_Consumer( ) of the data source, providing the data source with its pipe object.

The data source method Register_Consumer( ) will return a pipe object on which the consuming processing module is to sleep. If the data source is an internal SIP data source, it will return the same pipe object with which it was called, indicating that it will send a wake up call to the registered consumer's wake up pipe. If the data source is a representation of an external data stream, it will return a different "pipe object" to which the external file descriptor is attached.

The Register_Consumer( ) method accepts a grain size parameter, which determines how often data available notifications will be sent. If a gain size of zero is selected, than notifications will get sent only for the following events: The data source has reached end_of_data status (end of scan), or by an explicit notification call made by a producer.

Data sources produced by a processing module now fall into two categories—shared and local. Writing data to a local data source is effected without making changes. It gets more interesting when writing data into a shared data source: if a pointer to data allocated by the task on a heap is provided, then it needs to be ensured that data is allocated on the shared memory heap, otherwise the pointer will be invalid in the context of a different pre-emptive processing module.

When a data source determines that it has sufficient data for filling a data grain as registered by one of it's consumers, it sends an alert to the consumer. The alert does nothing if the consumer is a local task, and sends a notice to the consumer pre-emptive processing module's pipe.

A data source's producer may call a flush( ) method of the data source which will cause it to wake up all of its consumers. This will occur either at end of scan or when the processing of a big chunk of data has been completed.

Concrete Derived Classes—a Sample Taxonomy

Reference is now made to FIG. 45 which is useful in understanding a preferred embodiment of the present invention.

Following are several examples of processing modules:

The user defined task may be of several types:

Composite processing Module—Execution graph—Some sort of computation performed on input data with results written to the output, and two types are typically available—cooperative and pre-emptive.

Input Channel—A parsing operation on input data, with parsed data written to selected data source. The input data will come from an input stream data source, which will be attached to either a file, TCP/IP or a DMA (Direct Memory Access) channel. Writing to a selected data source will allow step and repeat processing in the future, with data from different repeats dispatched to different output data sources which each serve as input to independent execution graphs.

Output Channel—A formatting operation on input data, in preparation to writing the input data to an output stream data source. The output stream may end up in a file or in a remote computer via a TCP/IP connection.

Registration Transform Producing Task—A computational task which consumes input scan data source non-Asynchronously and writes both an updated transform to a scan line transform data source and excess-missing reports to an excess-missing data source.

A detailed description of these processing module derived classes follows.

Definition of a Composite Processing Module

Reference is now made to FIG. 46 which is useful in understanding a preferred embodiment of the present invention.

A composite processing module typically consists of several processing modules which are mostly interconnected between each other. All data sources which are used locally only are placed in local scope and their names are not available globally.

Only data sources which are external to the local processing modules are connected to the external scope processing modules. The connection is maintained through the composite processing module which schedules the internal processing modules when notified by the external data sources.

Because a pre-emptive processing module cannot be scheduled by a SIP scheduler object, a composite processing module may not have pre-emptive processing modules in it's execution graph.

Every processing module may be a composite (and thus have many processing modules "embedded" in it). A preferred limitation is that all "embedded" processing modules of a pre-emptive composite processing module are typically cooperative so that they may be managed by it.

This limitation defines a constrained general processing module structure: all of the first level processing modules are preferably pre-emptive, and all these embedded in a first level composite pre-emptive processing module are preferably cooperative.

An Input Channel

Reference is now made to FIG. 47 which is useful in understanding a preferred embodiment of the present invention.

An input channel from DMA is constructed by coupling a local Input Stream data source as the single consumed data source of a processing module parsing task.

When the processing module is pre-emptive, the parsing task is awakened to work only when input data is available in the stream data source, which is local to the context of the input channel process. When the processing module is cooperative it will work continuously on the input stream.

The input channel process sleeps both on the command pipe (for commands from the root SIP process) and on the underlying stream system level File Descriptive.

This design assumes that whenever data is available on the input stream, the channel process will read as much data as possible, parse it and write it to the produced data sources. This design works well when the input stream is based on an external data provider such as either DMA or a TCP/IP stream.

When working with a local file, reading the entire file in may cause the produced data sources to overflow. Obviously, working with a local file typically requires some scheduling beyond that provided by the operating system.

The solution is to place local file input stream data sources within a cooperative composite processing module which will schedule reading of data in well sized chunks. This solution will work well, since a local file may be considered synchronous and typically does not require a separate operating system process to handle access to it.

An Output Channel

Reference is now made to FIG. 48 which is useful in understanding a preferred embodiment of the present invention.

An output channel is constructed by coupling a local Output Stream as the single produced data source of a processing module which formats (or serializes) it's input Asynch shared data sources into the output stream.

The processing module may be either pre-emptive or composite:

A pre-emptive processing module typically is used when the output stream is directed to- some "blocking" system device such as a TCP/IP connection, or when output to a file is under very low priority and is to be scheduled only when the system is idle.

When the stream is directed to a regular file, the operating system is preferably able to handle the write requests without blocking the writing process. Therefore, an Ostream data source which writes to a file could be placed within a cooperative composite processing module without significant loss of performance (except that related to the actual write to file).

A Registration Transform Cooperative Processing Module.

Reference is now made to FIG. 49, which is useful in understanding a preferred embodiment of the present invention.

The registration task is implemented as a "Registration processing module", which may be implemented as a pre-emptive or cooperative module. This task consumes a scan line data source, and produces a transform scan line data source and an Excess-Missing data source.

When the registration task is cooperative, it is implemented within a composite processing module and is scheduled to process data by it's composite owner's scheduler.

When the registration task is pre-emptive, it sets up a either timer which awakens it at timeout or defines a large data grain for notification and wake up.

Definition of the Root Processing Module (the Process Manager).

Reference is now made to FIG. 50, which is useful in understanding a preferred embodiment of the present invention.

The root process has three objects which are activated by a main ioop which is entered after the SIP has been configured by the application. Prior to configuration, the only active object is the interface to the application. The SIP typically has at least one of the two processing objects— either a Processing Module Manager and/or a local composite cooperative processing module.

The three objects are:

Interface to the application—an object which handles all communication and parsing of the commands sent to the SIP by the application.

Local single composite cooperative processing module. This module is made available in the root process for the following reasons:

To allow easy debugging of new execution graph modules by developers. This is by letting a complete execution graph run in one debuggable process.

For allowing the running of "stand-alone" SIP programs (such as a background learn-update).

Backwards compatibility during the development phase of multi-processing capabilities.

Processing Module Manager—an object which handles all communication with the stand alone pre-emptive processing modules.

Every pre-emptive processing module sets up one pipe on which it listens for messages from the other processes in the SIP group of processes. The root manager process sets up a similar pipe to listen to acknowledgements/messages from the managed pre-emptive processing modules.

The following kinds of messages may pass in the system between the processes in the group:

Stop/Status Query commands from the root processing_module manager to the pre-ernptive processing modules.

Command acknowledgement and error state/end of scan reporting back to the root process.

Indication of data gain availability/end of data/error in data in a shared data source—the data source notifies all consumers which had registered with it for notification.

The message is typically passed as a stream of characters. The basic message format is:

| Field Position [char] | Field Type | Description |
| --- | --- | --- |
| 1 | message character | Message represented by character: commands from root: 's' - stop scan; 'q' - query status (ping); 't' terminate child process; 'r' - reset to initscan condition, 'u' - do uninitscan, 'b' - start scan, 'f' - go to endscan(ok), 'g' - endscan (error) acknowledgement to root: 'k' - child killed; 'x' - child in error mode; 'v' - child running; 'i' - child idle in scan } child in INIT state 'e' - child at end of scan state 'y' - child in OK state. message from other SIP process: 'd' - notification of change of status in a registered consumed data source to pre-emptive consumer. |
| 2:6 | sender SPID | The message sender's system process ID in ascii (00000-99999) |

The Root process will typically "barrier sync" all child processes so that when a new command is issued they all start out in the same state.

Data Source Modifications

There are two main changes which are to performed on current SIP data source objects.

One change is typically used by selecting Multi-Processing—the capability to allocate a data source is shared memory which is visible in all the SIP group of processes. The data source preferably implements the minimal level of access protection/mutual exclusion used by the current spec for access to this data source.

The second change is typically used due to the merging of the single process SIP task and channel objects to the "Processing_module" object—the adding of stream data sources.

Also, the helper classes Sip_mem, chain_of_blocks and reservoir which manage memory (Such as a memory model for a DS_Array type of data source) is preferably shared memory compatible. This compatibility means:

1. ALL allocations are typically made in the shared memory heap.

2. Mutex/Reader-Writer access locks—to be used sparingly as possible, with a single writer-multiple reader atomic write capability allowing no mutex's to be utilized.

Data Sources in Shared Memory

The allocation of data sources in shared memory is typically directed by the SIP class configuration file reader, which selects the correct allocation mode according to the context.

Data sources placed in the top-level configuration file are typically allocated in shared memory. When loading configuration files for subsequent composite Processing_module(s) the data sources are preferably built locally.

A data source is typically created in shared memory by the sip_factory by specifying an optional second parameter to its clone method as "true". The parameter defaults to false for default objects constructed on the local heap.

The writer of a data source preferably provides an extra implementation of a shared memory creator method;

A task which interacts with a shared data source (and provides the data source with pointers to data which the task allocates) typically checks if any of the data sources are in shared memory, and allocates its data accordingly.

A shared memory data source preferably allocates all its dynamic storage on the shared memory. This does not necessarily mean that a different implementation is used for a local heap/shared heap data source. Some alternative options include:

1. Turn, current data source into an abstract class, and provide two derived classes—one for shared memory and one for local. Define two not valid methods in the derived classes to return errors. This forces the execution graph creator to specify a different kind of class.

2. Allocate data source to dynamic allocations in shared memory, which then allows the user to safely use the interface described above to select shared/local data sources. This using the shared heap may be slower than using the local heap, due to the mutex lock used by the shared new operator to protect its own internal data.

Following from the previous solution, foregoing direct memory allocations and using private memory pools which manage the shared/non shared issues is probably the most robust solution.

A third approach, which seems more robust and user friendly, is selected for the initial implementation.

It is appreciated that shared data sources may get pointers to data allocated by the producing task. Any data which is passed this way is preferably allocated in shared memory by the task. Tasks are preferably checked to see if they are shared memory compatible. An example of an item which is affected by this is the memory model which allocates and handles data for ds_array class objects.

Stream Data Sources

A stream data source is an encapsulation of a SIP i/o utility object, which provides it with an interface compatible with a generic data source. This interface allows the coupling of a Stream_data_source object to a processing module and the creation of an I/O (input/output) channel.

The basic abstract class would be Stream_data_source which is inherited from data_source. This basic class provides a generic I/O wrapper for io_util. Concrete derived classes include:

IStream_data_source—An encapsulation for an input from FILE, TCP/IP or (future) DMA.

OStream_data_source—An encapsulation for output to a file or TCP/IP.

Step and Repeat Considerations

A preferred method for handling step and repeat situations is to define the small reference data base, create several execution graphs (the number being defined by how many repeats can be handled in parallel) and to have the input channel send the incoming scan data to the execution graph corresponding to a certain repeat.

Reference is now made to FIG. 51, which is useful in understanding a preferred embodiment of the present invention.

The execution graph scenario typically appears as in FIG. 51 with at least five pre-emptive processing modules. If a decision is made to split up the per-repeat execution graph, then there typically will be eight or more pre-emptive processing modules.

The logic typically used to handle the step and repeats are typically incorporated into three modules in the system:

The root process is preferably aware of the current scan data repeat number, and which execution graphs are busy on which repeats. The root process manages the execution graph priorities so that the oldest scan still processed will be of the highest system priority.

The input channel pre-emptive processing module will know how to detect a change in repeat number from the incoming scan data, and switch the output of parsed scan data into the appropriate data sources. It typically selects the data sources according to the table of free execution graphs maintained by the root process.

The output channel pre-emptive processing module preferably knows which execution graph is processing which repeat, in order to buffer and format its output of data to the application.

End of scan is typically handled in a slightly more complex way: An end of scan condition reported by an execution graph will typically be interpreted as "end of repeat processing" by the root process, which then sends the execution graph a "InitRepeat" message which will reset it for handling the next repeat. The SIP typically switches to end of strip-scan condition when the input channel pre-emptive processing module signals "end of scan" and after all the execution graphs and the output channel pre-emptive processing module have signalled "end of scan".

In a more complex scenario, several kinds of execution graphs may be supported concurrently: e.g., in a learn—scan -scan . . . scenario. The above mentioned architecture scales well to this preferred requirement: The table of free execution graphs is preferably extended to hold the type of execution graph, so that any number of classes of execution graphs can be handled by the root process.

Detailed Class Definitions:

Documentation is typically generated on-line automatically for various classes (FIG. 53).

APPENDIX B

Appendix B will be understood and appreciated from the following detailed description, taken in conjunction with the drawings in which:

FIG. 54 is a simplified illustration of a single snapshot image (referred to herein is a "Snap") covering the area around a single Color_defect report, constructed and operative in accordance with a preferred embodiment of the present invention;

FIG. 55 is a simplified illustration of snaps covering the area around multiple Color_defect reports, constructed and operative in accordance with a preferred embodiment of the present invention; and FIG. 56 is a simplified schematic illustration of the structure of a line of 48 snap reports, constructed and operative in accordance with a preferred embodiment of the present invention.

A Snap is a rectangular or modular-rectangular region that contains RGB (red, green, blue)-information of the pixels of that region. The RGB-information is collected from a certain area that surrounds a report of the type Color_defect. The minimal region in which the RGB data is collected around a single report is of size n×n (pixels). In the case of the present embodiment n=48.

Reference is now made to FIG. 54 which is an illustration of a single snap covering the area around a single Color_defect report, which is useful in the understanding of a preferred embodiment of the present invention.

Single Snap Report

The single snap report is a 32-bit word. Its internal structure is the following:

8 bit: $x_s$—x coordinate in 8-bit representation.

8 bit: r—value of red.

8 bit: g—value of green.

8 bit: b—value of blue.

The 8-bit representation of the x-coordinate is faithful provided that the snap reports in a given line are ordered by their 12-bit value of the x-coordinate. The conversion from the 8-bit representation of the x-coordinate to a 12-bit representation is explained below.

The Origin and Structure of Snap Data

Snaps are typically created "on-line", during a scan, for example during the inspection scenario. Each slice is treated separately and is divided into basic block units. The basic unit is a square of size 16=16. Each Color_defect report leads to the recording of 9 blocks of RGB data: the block which contains the Color_defect report itself and its 8 neighboring blocks, as illustrated in FIG. 54.

A snap area that is recorded due to several Color_defect reports, is determined according to the following rules:

1. The minimal snap is typically of size 48=48 (pixels)$^2$, and it consists of nine blocks of size 16=16 (pixels)$^2$ each.

2. Each snap report preferably appears only once, even if it was originated due to several Color_defect reports (see FIG. 55).

Snap reports are typically ordered in lines, according to their y and x coordinates. Each line contains a sequence of 16*N single snap reports, accompanied by information about the slice in which the reports were originated, and the number of the reports in the line. The reports in the are divided into N groups of 16 reports all of which have the same value of x in the 8-bit representation. FIG. 56 shows schematically the structure of the line of snap reports, with the minimal value of N (N=3).

The 8-bit to 12-bit Conversion of the x Coordinate

The conversion from the 8-bit representation to the full 12-bit representation of the x coordinate is done in the following manner:

Let $x_s$ be the x-coordinate in the 8-bit representation of a given snap report.

Let $n_b$ be the number of the snap report within the relevant group of 16 reports, all carrying the same 8-bit value of $x_s$. The numbering is done in the following way: the first report in the group has $n_b=0$, the second $n_b=1$, etc.

Then the 12-bit representation of the snap report's x-coordinate is given by:

$$x=x_s*16+n_b$$

Ds_array<Snap>

Ds_array<Snap> contains Snap reports ordered by their y and x coordinates. The structure of the single Snap report is as mentioned earlier. The x coordinate is given in 8-bit representation, and is preferably converted to a 12-bit representation. As in the case of all data sources, a pointer to the beginning of each ds_array_line is available, as well as the information about the slice in which the data source was originated.

APPENDIX C

1. PIM-FILTER

Appendix C will be understood and appreciated from the following detailed description, taken in conjunction with the drawings in which:

FIG. 57 is an example of a BGA (ball grid array) board to be inspected by a system constructed and operative in accordance with a preferred embodiment of the present invention;

FIG. 58 is a close-up view of the lower end of the BGA board of FIG. 57;

FIG. 59 is a close-up view of a bond finger on a BGA board, constructed and operative in accordance with a preferred embodiment of the present invention;

FIG. 60A is a flow chart illustrating data flow through a PIM map generator during the Learn stage of an inspection scan, constructed and operative in accordance with a preferred embodiment of the present invention;

FIG. 60B is a flow chart illustrating data flow through a filter during the Inspect stage of an inspection scan, constructed and operative in accordance with a preferred embodiment of the present invention;

FIG. 61 is a simplified block diagram illustrating subtraction of regions by the map generator, constructed and operative in accordance with a preferred embodiment of the present invention;

FIG. 62 is a simplified block diagram illustrating the data structure of a PIM stored in runlength format, constructed and operative in accordance with a preferred embodiment of the present invention; and FIG. 63 is a simplified block diagram of the general structure of the PIM system, constructed and operative in accordance with a preferred embodiment of the present invention.

1. Introduction

The scanned area of an inspected object, such as a BGA panel, contains regions of varying importance, ranging from sensitive bonding regions and up to text regions that are to be ignored. The Image Processing procedure should treat each region with different criteria of sensitivity in order to obtain maximal detection and minimal false alarms. Two concepts of differentiating between areas are possible: filtering out information in non-interesting regions, and region-dependent type and sensitivity of inspection.

In accordance with a preferred embodiment of the present invention, image processing is composed of several phases: defect detection, defect, verification, and top-down windows. The defect detectors are realized both in hardware, like the nick-protrusion and surface defects channels, and in software, like the excess-missing and line-width channels. Each of these detectors produces suspicious events that might, or might notsignal, real defects; some of events may be certain defects and preferably need to be verified by a more carefdl inspection such as by CEL-to-CEL analysis as described with reference to FIGS. 30-30C in the specification. Another method of detecting suspicious events is by preparing in advance (during the Learn scan) top-down windows in areas of special interest, and examining them more carefhlly during Inspect.

In this appendix, two, apparently different, methods that realize region differentiating are discussed:

Filter—screens events according to their type and position, ignoring irrelevant areas such as text areas, areas known as "unstable", etc. Placing the filter at a critical position in the IP pipeline would also save slow processing of non-interesting areas and increase speed and efficiency.

Tolerance Setting—specifies the accuracy of inspection test of events, according to their type and geometric location with respect to regions of interest.

Both these methods rely on the same geometric query tool, namely Point In Map (PIM), that answers the following question: which region in a map contains a point (event).

FIG. 57. is an example of a BGA board. The thick black regions are exposed metal and the stippled regions and thin line regions are metal covered with solder mask. The exposed metal regions are important and preferably are inspected carefully, while covered areas, typically, are less critical.

2.1 Filter 2.1.1 Scope

The Filter, which will be realized as a SIP task, receives as input a list of events and produces a new list that contains only the "interesting" events. The filtering criteria are geometry and type, and can be either set by the user or automatically constructed during the Learn process.

Filtering is performed in several levels: filtering of raw data, namely CELs and features, filtering of events suspected as defects resulting from the defect detectors, and filtering of certain defects resulting from the verifiers.

Filtering raw data has two main drawbacks: it can be time consuming since it is realized in software, and in the case of GELs it generates "holes" in the incoming data, which can be harmful to other processes such as the connected components application. Filtering of suspected events is less damaging to the picture and reduces substantially the amount of features for filtering, however it compels redundant processing of ignoring areas by the defect detectors. Filtering of verified defects compels verification, which is a long and difficult process, of excessive events and thus is inferior to the other two.

The Filter uses the PIM geometric tool for map generation and point location queries. The format of input points is scan line format, ordered lines of events in increasing y-coordinate. This can be used to increase the efficiency of search by using the knowledge of the former point. More details are discussed in the PIiM description in section 3.3.

FIG. 58. is a close up of the lower end of the BGA picture, with a region to be ignored being marked. The marked region is misalignment between the solder mask and the metal which is not a defect, yet might cause false calls.

2.1.2 Input

The input of the filter task includes the following features:
filtering map—a planar subdivision of the scan area is generated by the PIM according to the filtering regions, where every point (x,y) is contained inside a single face. Each face represents a different filtering criterion, namely type(s). The map is given in "ideal" reference coordinates, meaning after adjustments of pixel size, shape, etc. If the scan area is composed of several duplicates of the same pattern, namely step and repeat, only a single-repeat map is needed.
registration—an alignment transformation between the ideal Learn coordinate system (filtering map) and the ideal Inspect system (on-line features). If no registration is given, as in the case of design-rule defects computed during the learn inspection process, the unit transformation is taken. The allowed transformation is affine, namely shift, rotation, and expansion.
events—a list of events in scan line format, characterized by type and position.

2.1.3 Output events—a partial group of the Input list of events in on-line coordinates, that contains only the ones that are not filtered.

2.2 Tolerance Setting 2.2.1 Scope

The verification test function performs an accurate measurement of "suspected" defects and decides, according to previously defined sensitivity criteria, whether it is a real defect or not. The sensitivity criteria depend on the exact location of the defect. Thus a geometric location tool is needed to determine the location of the defect and hence the accuracy of measurement necessary for verification.

The Tolerance Setting is a service function (func_defects_handler) that is used either before or after the actual test function is applied. If the type of test depends on the accuracy of measurement, this service is called before the test in order to determine its type. The type of test does not depend on the allowed tolerance, this service is used for sensitivity setting. It should be noted that one of the test functions possible is filtering. In this context filtering is performed for arbitrary positioned events, hence falling outside the Filter scope.

The Tolerance Setting function asks the same geometric location queries as the Filter, however the format of input events is position random instead of ordered. The PIM tool gives services of map generation and point queries also to the Tolerance Setting application.

FIG. 59 is a close up of a bond finger as an example of varying inspection sensitivity. Region 1 is unstable, meaning its exact location is may change, because of the edge of the solder mask. Region 2 is a critical bonding region. Region 3 is non-critical. Hence region 2 is the most sensitive, and then in descending order regions 3 and 1.

2.2.2 Input sensitivity map—a planar subdivision of the scan area generated by the PIM according to interest regions, where every point (x,y) is contained inside a single face. Each face represents a different defect sensitivity, namely allowed tolerance, represented by some type. The map can cover only part of the scan area, such as a trigger window or a single repeat in step and repeat panels. The map is given in ideal reference coordinates.
registration—an alignment transformation between the ideal Learn coordinate system (sensitivity map) and the ideal Inspect system (on-line features). If no registration is given, as in the case of design-rule defects computed during the learn inspection process, the unit transformation will be taken. The allowed transformation is affine, namely shift, rotation, and expansion.
event—"suspected" defect or trigger for inspection, in arbitrary position, with type of test function to be applied.
mask table—a Look Up Table (LUT) that associates the map types to a different inspection sensitivity.

2.2.3 Output inspection accuracy—sensitivity of inspection, such as maximal allowed nick size, that will determines whether a "suspected" defect is real or false.

Design 3.1 Filter

The filter includes the following operations:

1. Take a row or a set of rows of events.

2. Transform the events via registration to the Learn coordinate system. Every several rows the transformation is updated by a new dynamic registration.

3. Send each event and the filtering map to the PIM for a position and type query.

4. Receive from the PIM a positive answer for a position and type match between the event and the map, and a negative answer otherwise.

5. Filter out positive events.

6. Inverse transform the remaining events back to the on-line coordinate system.

7. Generate a data source containing the events that are not filtered.

3.2 Tolerance Setting

Outline of the tolerance setting service:

1. Receives a trigger, or a "suspected" defect+type of defect.

2. Apply registration to convert to Learn coordinates.

3. Send the trigger and the sensitivity map to the PIM for apposition query.

4. Receive from the PIM a type denoting the face that contains the trigger.

5. Return to on-line coordinate system.

6. Match an inspection tolerance to the trigger+type according to the mask table.

PIM—Point In Map

3.3.1 Scope

The PIM is a geometric tool designed for two distinct functions: generate a unified map from a set of regions, and locate a point in that map. The Map Generator creates a map, where each face is associated with a set of types. The Location Query determines which face contains the input point and either returns its type(s), or determines whether it matches the point's type and returns a boolean answer.

Editing and Display of the map are not in the scope of the PIM, and are the responsibility of the User Interface Application. Nevertheless, separate tools that support those functions will be developed for simulation purposes.

The two functions of the PIM are demonstrated in the following data flow sketch:

FIGS. 60A-60B are Examples of data flow during an inspection scan: (60A) map generator during Learn. (60B) Filtering during Inspect.

3.3.2 Map Generator

3.3.2.1 Input

The input for the map generator is a set of regions of general geometric shape, each identified by a single type or a union of types. The regions may be user defined or be learned automatically during the Learn scan according to areas of interest: The PIM accepts regions with the following properties:

Three possible formats: polygons (a set of points), circles, and run-length.

Closed and simply connected (for polygons only).

Overlap is allowed. The type set of the overlap area is determined by the user, and can be the union of the original overlapping type sets, one of the original sets, or any other combination.

Subtraction of regions is allowed. These "negative" regions are regions with no type, usually defined inside regular regions in order to simplify generation of complex areas. In that case the order of definition is important, namely the latest defined region overrides the former. The negative region is identified by the type to be subtracted from the former defined positive regions. The subtraction operation can also be determined by the user: difference of type sets, symmetric difference, etc.

FIG. 61. (a) is an example of filtering regions. (b) Importance of definition order: negative region #2 overrides positive region #1, while #3 overrides #2.

3.3.2.2 Output

The output is a unified map of all the regions, resulting in a planar subdivision of the area where every point (x,y) is contained inside a single face. Each face represents a different region or an intersection of regions, and is associated with either a single type or a union of types. The map can cover the whole scan area, or just a part such as a single repeat or a trigger window. The format of the output picture should optimize the storage space, difficulty of realization, and efficiency of location queries for the different input point formats. The first excludes raster and encourages some compressed format. The second supports run-length format, namely a format in which a run of pixels having the same values are represented in a compressed form, rather than a polygon format, since the definition of regions may come in both formats and converting a run-length picture to a set of polygons is significantly harder than the opposite. The third, efficiency of location queries, also supports the run-length option over the polygon one. To conclude, it seems that run-length is the preferred format for the output picture.

3.3.3 Location Query

3.3.3.1 Input unified regions map—a planar subdivision of the scan area, each face associated with type(s), in run-length format.

event—a point associated with a type.

3.3.3.2 Output

There are two types of location queries that produce different output:

1. boolean answer to a location and type match question.

2. set of types that are associated with the face containing the point.

3.3.3.3 Point Location Methods

Point location methods vary according to the exact format of the input points. Clearly, efficient search of an arbitrary point and an ordered set of points are different. First, an arbitrary point search is supplied, and a more efficient method for rows of data is added if necessary.

The fastest and most convenient location of a point can be performed by converting the regions map to a raster format, thereby reducing the query to a random access operation. The main drawback of course resides in the size of such a picture and memory access handling. Next is binary search in a run-length picture which is slower, of the order of log(n) where n is the length of the run-length average row, however it is much more efficient in terms of picture size. If the complexity of pictures is high and the speed of the binary search is not enough, another option is available: addition of an indexing system (Indexing of Ordered Data: SRS) to the run-length picture, enabling random access to small "zoom" areas of the run-length. This system enlarges the stored picture by the additional indexes, however reducing the average row length and hence log(n).

Data Structure of PIM

The PIM is stored in runlength format, illustrated in FIG. 62.

Additional tools The PIM is a generic geometrical tool. However, the SIP has specific requirements such as configuration files handling, interpretation of region types, etc. For that purpose some additional tools are needed as detailed in the next sections. The general structure of the whole PIM system is illustrated in FIG. 63.

3.4.1 PIM SIP

PIM SIP contains a PIM and has 2 additional features:

a translation table from string-types to integer-types.

a self building method from a regions' file.

The translation table is in order to keep the efficiency of integer-type PIM while providing the user with string-type, meaningful, region identification. The configuration file produced by the user is written in terms of regions' names, and the PIM SIP translates automatically to internal integer-types.

The self reading method provides the other SIP applications an easy interface for constructing a PIM. If the proper file exists (see section), no knowledge of PIM building methods is needed and the PIM SIP will read the file and build itself

3.4.2 Query Table

A translation table of regions' type to detailed regions' information. A query table is attached to a PIM, and translates its id's (of integer type in case of PIM SIP) to objects that hold quantities related to that region. For example in the case of nick threshold values: maximal allowed width and length. One PIM can be attached to many query tables, each representing a different aspect of interpretation of types: nick/protrusion thresholds, width defects, etc. Query table is templated to the data-objects, that can be one of the existing objects (NickProt, LWdefect, ExcessDif) or user defined.

3.4.3 "MIM"

Manager of a system of PIM and affached query tables. Main function is loading configuration files and construction of PIM plus query tables. Query methods also exist for extracting information of point in map, and more detailed regions' information.

3.4.4 Shape File Handling

A special shape file format, with file reader and file writer to support it, is provided for the purpose of transferring shape information between learn and inspect scans. The file reader/writer uses the double-type shapes of the SIP (Dpolyline, Drect, Dcircle). A Shape_base class, which all shapes inherit from, was also added. Shape_base inherits from Base_factory so that all shapes can be cloned when read from file.

File handling is a separate unit that can be replaced easily by a different format file handling, providing similar methods. Methods include open/clear, read/write, and shape information.

APPENDIX D

I Introduction

A camera model, as preferably implemented under the SIP in the Integrated Circuit packaging (ICP) project, is described. Two main issues are preferably resolved by the model: (a) any geometric information derived from the scanned image is preferably compensated for the distortions evolved in the image acquisition process (this is accomplished by the alignment transformation) to align the data, and (b) since several cameras acting together result in distributed and redundant data, merging and "stitching" of data is typically used.

The classes and tasks supporting the management of several cameras in the system are described, particularly new classes and tasks designated in specific to support the camera model, whereas other classes and tasks which have only a partial role in supporting the management of data in a system of several cameras, are mentioned in less detail.

2 The Model

The following is a discussion of the integral components of the system:

2.1 Classes 2.1.1 Coordinate System (CoordSys)

CoordSys structure is a fundamental component of the camera model, as it preserves the integrity of coordinate data in a system of several cameras. A coordinate system representation is attached to many different items in the system; transformations (AffineSdtrana), data sources (Data-source), tasks (Sip-task), SIP data (the many Sipdata structures) and windows (Sipwin). In order to accurately reflect coordinates throughout the system processing, coordinate systems need to go through the proper transition rules whenever they are changed. Integrity is preserved by endowing any transformation method, in specific, the Transform method, which transforms an object from one coordinate system into another, with a transition rule which defines accurately the change of coordinates: Domain coordinate system→Range coordinate system. In addition, a simple sanity check is done to make sure that the Domain coordinate system equals the coordinate system of the object to be transformed. Moreover, for a compound object, all its data members are in the same coordinate systems (e.g., all data sources of a task, or all sipdatas within a window need to be in the same coordinate system).

The CoordSys structure has three fields:
- type—can have one of the following values {Unknown, Camera, Aligned}.
- context—the context of the coordinate system represented by this object, can have one of the following values {None, Reference, Online }.
- ((camera-id—If Camera coordinate type, this indicates the Camera id number.

1. 1. Many items in the system are transformed by their Transform method 2.1.2 Single, camera environment (Single-camera)

Single-camera class handles information on the parameters defining the environment of a single camera. To mention only the integral ones: pixel size, camera-width, the camera-coverage region (i.e., the quadrilateral aligned region "seen" by that camera), the (Affine) transformation that converts the camera coordinates into aligned coordinates, and the parameters that can be derived from it (e.g., the camera's orientation with respect to the direction of scan). This class provides several methods of inclusion tests indicating whether or not a given geometric object is embedded in the camera's coverage region, and whether or not it resides within an overlap region of the camera. To support a fine discrimination among the several different geometrical relations a geometric entity can have with respect to the camera's coverage region, Single-camera provides the WinGeomInclusion status which can be one of the following:

- ALL_tNSIDE—Entity is inside camera not intersecting any overlap region.
- ALL_IN—Entity is inside camera and intersecting an overlap region.
- CLIPPED_SHARED_LEFT—Entity is clipped against edges covered by a left overlap region.
- CLIPPED-SHAREDJR.IGHT—Entity is clipped against edges covered by a right overlap region.
- CLIPPED_N'OT_SHARED—Entity is clipped against edges not covered by an overlap region.
- ALL-OUT—Entity does not intersect the camera region.
- NOTIN-A-CAMERA—The coordinate system of the entity does not correspond to a camera.
- UNKNOWN 2.1.3 System of several cameras (Multi-cameras) The Multi-cameras class handles information on several cameras.

Purpose: Handle information on several cameras.

Methods:
- Put/Get number of camerasto handle.
- Put/Get a single camera information (delivery of Single-camera's methods of a specific camera, given its id number).
- Y-offset: given the id numbers of two cameras, returns the y-offset between the two cameras.—Point Inclusion (Isin): given a point data items, returns information on all cameras in the system that contains the item in their coverage regions, using Single-camera.'.'lsin for each camera. The information can be given either by a vector of cameras (or camera id numbers) containing the point, or a boolean vector indicating for each camera whether or not it contains the point.

Polygonal Inclusion (Clip): given a quadrilateral (Dpolyline), clips it against the quadrilaterals representing the cameras coverage regions, using Single-camera:: Clip for each camera.

2.1.4 Sip Camera Model (Sip-camera-model)

The Sip-camera-model class is used to handle information on a system of several cameras under the SIP. This class enables loading of camera parameters from configuration files.

2.1.5 Sip General Data (Sip-general.dato)

Sip-general-data is a singleton aimed to provide access to general parameters and data, among which one can find access to the camera model related to the current scan, and the camera model related to the corresponding reference (methods Camera-Model( ) and Ref-Camera_Model( ), respectively).

2.1.6 Windows (Sipwin)

A Sipwin object represents a rectangular region consisting of a variety of Sipdata items. As this object is the basic unit in the SIP, we endow windows with coordinate systems, and since a window is a geometric entity, it also endowed, with WinGeomInclusion status.

2.2 Tasks 2.2.1 Reference Packing

Two kind of windows are processed during inspection: (a) top-down windows defined in aligned coordinates, and (b) on-line windows created around trigger in on-line camera coordinates. In either case, corresponding reference information need to be attached to on-line windows.

Top-Down (TD) Windows Management (Task-packer) Top-Down windows are given in aligned coordinates. For each execution graph, Task-packer creates camera coordinate TD window by first transforming the aligned window boundaries into camera coordinates. The correct transformation for the specific window is available to the Task-packer from its transformation Data-Source (ds-trans) computed for the line of window trigger. TD windows are given an id number. This id number indicates the origin of the window and will serve (at the final stage of merging information retrieved from several execution graphs) to identify windows with the same origin. TD reference information is transformed into on-line coordinates before being attached to windows and is held in that manner throughout the entire inspection processing.

Packing reference data "on the fly" (fiinc-winref-adaptor) For on-line windows created around a trigger during inspect, relevant reference data need to be extracted from camera-based CEL reference. The on-line window boundaries determine the boundaries of the window of data to be extracted as follows: the on-line boundaries are first transformed into reference aligned coordinates. Then, for each camera in the reference camera model, those reference aligned window boundaries are transformed into camera coordinates, and the window is clipped against the camera coverage region. The camera for which the window fully falls within its coverage region, is chosen, and CEL data is extracted using the corresponding camera-based windowing query. Because CELs cannot be transformed from one coordinate system to another without a significant impairment to their structure, the extracted data is used as it is by a composite of functions comparing the on-line with the reference CEL data.

2.2.2 Single Slice Management (Task.test-manager)

Task-test-manager is traditionally responsible for the management and control of an entire execution graph (corresponding, of-course, to a single slice). In its current version, this task has an input and output queues of windows. The output queue consists of unresolved windows—which are windows that cannot be completely resolved within a single slice management and need to be directed to multi-slice processing. Task-test-manager is responsible to execute the functions attached to a window on that window, and to control their result.

2.2.3 Multi Slice Management (Task-multi-slice-manager)

Task-multLsUce-manager is responsible for the management and control of windows arriving from several slices. The main difference between Task-test-manager and Task-multi-slice-manager is that the later is responsible for collecting windows having the same id (that is, windows with the same origin) as sub-windows of an overall window, and only then to Execute the corresponding multi-slice functions attached to that window on that window, and to control their result.

2.2.4 Split of Transformation Information (Task-split-trans)

Task-split-trans splits a transformation Cameras-Online→Aligned-Reference given for one camera into the corresponding transformations for each of the cameras available in the camera model. Online—Reference transformation should take into account two transformations: first, the alignment transformation, transforming data from camera into aligned coordinates, and the transformation resulted from the registration process, which transform online data into reference coordinates. Note: The current registration procedure finds a match between online data coming from the central camera with reference data coming from the same camera. Thus, the transformation given to the Task-split-trans as input is not Cameras-Online→Aligned-Reference as we would expect it, but Camera(l)-Online→.Camera(l)-Reference, and all multiplications are done accordingly.

APPENDIX E

Abstract

This appendix briefly explains the function of the registration and the Line-Width measurements in the SIP. Line-Width is typically based on the CELs and the morphological skeleton, while the registration is typically based on the skeleton features only.

The Registration

Most methods in the SIP compare a 'learned' panel to an actually scanned one (the 'inspect' phase). The frictions of the registration in the SIP, is to find linear transformation between points of the scanned panel to the reference coordinate system. The registration typically uses the output of the hardware morphological features extractor. It finds these transformations by using both features of the 'learn' and the 'inspect' different phases. Human intervention is not typically needed for this process, both for learning and inspecting.

The features are taken from the beginning of the panel, and are of limited number due to limitations in processing time determined by the computer speed, and the requirements from the SIP system. The numbers are typically around several hundreds.

It is also deals with limited movement, e.g. rotation. The shift form rigid transformation is preferably small (in the order of magnification up to 1% in x and y, and sheering angle preferably smaller than about 0.01 radian).

The registration is divided for two phases in the inspect. The first one is to find the initial transformation, and the next one, is to keep the panel in the best transformation during the scan. The second part is called the 'dynamic registration'.

The Initial Registration Transformation Method
learn process.

This process works on features of the learned panel, for illustration called group R.

Collect the first predetermined number of features from the beginning of the learned panel.

Sort the features of R according to x and y.

inspect process:

This process computes the registration transformation. It uses the features of R, and features which are collected at the inspection of the panel. These features are called herein for illustration, group I.

Collect the features in exact manner as in the learn phase.

Sort the features of I according to x and y.

Create a table with number of entries identical to the number of features in R, with entry N of the table representing feature N in R.

For each of the ordered features in I:

1. Push-back a copy of that features to all table entries which represent the features in R, which are in distance less the maximum miss registration (The table contains copies of features in I only).

For-each two pairs of features match between I to R combinations:

1. If the transformation is not rigid, move to next combination

2. If pairs are in S (set of pairs which will be defined below), move to next combination.

3. Find the transformation from I to R for this pair if transformation is not in mis-registration maximum allowed angle or movement, move to the next combination.

4. Find all features down in the table that conform with the table entry representative feature in R using the transformation (if distance is small up to noise between transformed I feature and its R).

5. The features address which conform with the transformation are in a group—all pairs of combination of them are put to the set S Move to next two pairs combination.

The registration transformation is the transformation which was computed with the maximum number of matches.

The Dynamic Registration.

Dynamic registration is a method for tracing the most correct transformation during panel scan. Initial transformation is already known. A 'Matcher' process sends pairs of matched features to it. The core of its activity is computation of the best transformation which exists between two sets of matched points. The best transformation is achieved using the least square method. Find the linear transformation which minimize the square distance of the pairs. Mathematically this can be described as shown in Equation 1.

Solving this minimization problem yields a simple solution, which is easy to handle. For each new matched pair some registers are update. Calculation of the best transformation is by using them.

Line-Width Measurements

Line-Width process measures the width of the conductors, and the space between them. It finds violations in their measures by comparing the sizes of the 'learn' to the 'inspect' panel. The amount of the deviation is given by the user, using a graphical human interface that allows one to tell for each region in the panel, what are the used limitations. Line-Width is using the CELs and is done by software. It is officious due to its simplicity.

The Measurements:

The measurement are taken in 4 directions: East, West, South-East, and South-West, i.e., they are typically taken each 360/8=45 degrees. The measure is taken perpendicularly to the morphological skeleton. A stream of CELs and Skeletons are the input for this method. The Skeleton typically holds the information of what is the perpendicular direction of width measurement. Each CEL or Skeleton feature belong to a certain state machine, in each of the directions. A state machine allows measurement if CEL, Skeleton, CEL combination found, otherwise no measure is output. The measurements uses the sub pixel CEL accuracy and tables exist for output information of the diagonals intersection with the cells.

Learn Process:

The 'learn' coordinate system is divided to a small square boxes. The task of this phase is eventually to tell for each of this box, what is the minimum and maximum allowed measure. The knowledge is gathered by measuring the learned panel and putting the measures to the boxes. A statistical analysis is done to determine if a box is legitimate, and in a legitimate case to determine whether it is good or bad. In other cases usually minimal measure is put for a reference box. A reference box contains statistics also of measures near it in order to resolve the 1 to 2 pixels accuracy of features after transformation.

Inspect Process.

The inspect process is more simple—each measure is checked against the appropriate learn box, for being in the [min, max] range. The learn box is found by transforming the inspection coordinate to learn coordinate system, using the registration transformation.

$$\min\left(\sum_{i=0}^{N}\left\|\vec{p}_i - Tx\vec{Q}_i\right\|^2\right)$$ EQUATION 1 where $p_I$ matches $Q_I$ belong to the sets P Q respectively.

APPENDIX F

Introduction

Appendix F will be understood and appreciated from the following detailed description, taken in conjuction with the drawings in which:

FIG. 64 is a simplified block diagram illustrating inputs and outputs of a task_trigger_handler, constructed and operative in accordance with a preferred embodiment of the present invention;

FIG. 65 is a simplified flow chart illustrating the function of a task_trigger_handler, constructed and operative in accordance with a preferred embodiment of the present invention;

FIG. 66 is a simplified illustration of the run length structure of a task_trigger_handler where the map region is the bounding rectangle enlarged by two pixels on either side, constructed and operative in accordance with a preferred embodiment of the present invention;

FIG. 67A is a simplified illustration of the snap rectangular regions cut according to the clusters defined in FIG. 66; and FIG. 67B is a simplified illustration of the snap rectangular windows possessing the cluster, and a rectangle with RGB data, after processing of the clusters defined in FIG. 66.

This appendix describes a task existing in the SIP, named Task_trigger_handler. The purpose of this task is a primary fast sorting of information that originally exists in separated structures in the snap channel, and combining the relevant data into a single structure which is ready for further processing. The task consumes two data sources—data source of Color_defects and data source of Snaps. The produced data source is of the type queue of windows. The operation of the task consists of three main parts: (i) on-line clustering of the Color-defect reports, (ii) cutting the appropriate rectangular areas which contain RGB-data out of the snap data source, and (iii) packing all of the relevant information into a form of a queue of sip windows. All of these sub-parts are applied on the data accumulated so far.

Reference is now made to FIG. 64 which is a block diagram of a Task_trigger_handler and its inputs of a data source of Color defects and a data source of Snaps, and producing a queue of windows as an output.

Scope

Task_trigger_handler is applied on the input data sources while they are built. The resulting output, i.e., queue of windows, is treated by the Window_test_manager, and each window is directed for further processing, according to the associated test function. Therefore, Task_trigger_handler is the first station in the post process procedure, and its main goal is an efficient gathering of associated pieces of data needed for the post process.

Basic Concepts

Color_defect report: Color_defect report is a general name for reports that enter the SIP through the snap channel. These defects may be reported either by the Color Multi-Resolution Area Defect detector (COMRADD) which is described in Applicant's copending Israel Patent Application IL 131092 entitled "Optical Inspection System", filed 25 Jul. 1999, or the Small Defect Detector (SDD), and may be associated with various types of surface defects, such as oxidations, stains, scratches, etc.

Snap: Snap is a rectangular or modular-rectangular region that contains RGB-information. Color_defect report causes a recording of the RGB data inside a square area around it. The minimal size of the RGB-square is 48=48 (pixels).

Data source: data source is one of the SIP building blocks, that carries data which is used by other SIP units. The reports that enter the SIP through the various channels are transformed into the format of data sources.

Queue of windows: queue of pointers to Sipwin objects. Each Sipwin objects is a rectangle of a given size and location which includes a vector of Sipdata objects and a function to be executed by the window test manager.

Input/Output

Task_trigger_handler treats data sources that are originated in the snap channel during the scan. The input consists of two data sources: (i) data source of Color_defect reports and (ii) data source of Snap reports. The task produces a single data source—queue of windows. The specification of the consumed and produced data sources will be given in the following.

Consumed Data Sources

Task_trigger_handler consumes data sources of two types:

Ds_array<Color_defect>—the source of reports to be clustered. Ds_array<Color_defect> contains an ordered (in (x,y)) vector of Color_defect reports. The Ds_array_lines keep the reports in a non-sparse way. A pointer to the beginning of each Ds_array line is available. Each report contains its x-location (12 bits) and other specifications like type, slice of origin, and various characterizations (24 bits).

Ds_array<Snap>—the source of the RGB data to be cut. Ds_array<Snap> contains an ordered vector of snap reports. Each snap report contains its x-location (8 bits), as produced by the hardware), and the red, green and blue values (8 bits each). In order to use the x-coordinate, it is typically converted from the 8-bit format into the regular 12-bit format. A pointer to the beginning of each ds_array_line is available.

Produced data source

Task_trigger_handler produces a single data source—a queue of windows.

Win_queue: the Win_queue is a data source of type Sipwin.

Sipwin: A general Sipwin object is a rectangular window that contains a vector of sipdata objects and a test function. The Sipwins that are produced by Task_trigger_handler contain two sip_data objects: sipdata_cluster and sipdata_RGB, and contains an appropriate test function—(presently it is an identity function).

sipdata_cluster: contains the reports that belong to the cluster.

sipdata_RGB: contains a rectangular piece of snap as an RGB image in a portable pixel map (ppm) format, and the coordinate of the top left point, relative to the global (0,0).

Method Structure

The method's spec of task trigger handler is the following: The following steps are preferably performed:
1) clustering of Color_defect reports.
2) cutting the appropriate RGB rectangles out of the snap data.
3) packing all of the relevant information in a form of queue of sip windows.

The method is preferably performed on line.

The method may be applied only upon consumed data sources that had already been produced.

The method preferably is efficient, since it serves only as a tool for a primary fast sorting of information that prepares the data for further and deeper processing.

Reference is now made to FIG. 65 which illustrates schematically the main blocks of the method, for a single loop over a bunch of scanned lines:

Clustering Method

The clustering method finds clusters that consist only of points that are connected to each other. In principle the clustering is according to a given distance criterion. The input of the clustering part is an ordered set of points (color defect reports) and the distance criterion, and the output is a list of clusters and their bounding rectangles.

The clustering of points is done line by line, and uses the assumption that the color defects are ordered according to their coordinates.

For each point in the line it is determined to which (and how many) cluster/s it belongs. In the case of connectivity criterion in two dimensions, the maximal number of clusters to which a point can belong, N_max, is 2. If the distance criterion is general, N_max 4.

N_max=0=> a new cluster is opened with the current point.
N_max=1=> the point is added to the appropriate existing cluster.
N_max=2=> the point is added to one of the two clusters, and a merging procedure between the two clusters is performed.

The determination of N_max uses a "history buffer" which keeps the last clustered line, such that at every site which was occupied by a color_defect there is a pointer to the appropriate cluster (to which the color_defect belongs). This is use for a random access search for neighboring color_defects. There is an associated structure that keeps only pointers to occupied sites, for a more efficient update.

Each time that a certain number of lines (determined in advance) are passed, the clusters are checked to be ready. Each cluster, includes the color_defect points and the bounding rectangle.

Cutting of Snaps

This part of the task, is performed by the Snap_cutter object, is responsible for the extraction of the RGB data in a given rectangular region, out of the full RGB-data existing in the data source of snaps. The Snap_cutter gets a set of sorted rectangles as an input (sorted according to the right-bottom point). These rectangles determine the regions in which the RGB data is typically filled. The outcome of this part is a set of rectangular RGB images, kept in a ppm format.

The method for cutting snap regions according to a given set of sorted rectangles is the following is performed in several steps.

As a first step, a conversion of the set of rectangles to a run-length structure is performed. The elements in each run-length line represent the boundaries of the rectangles (with indication of location and if it is left or right boundary and a pointer to the appropriate cluster).

As soon as the run-length structure is built, the RGB data is filled accordingly. The filling is done separately for each line, according to the following method:

1) Using the run-length data, one can determine the number of rectangles to which a segment between two consecutive run-length elements belongs.

2) A search in the data source of snaps for the pixels that belong to the segment is performed. The search uses the natural division of the data source of snaps into blocks of 16 pixels (all pixels inside such a block have the same value of x in 8 bits representation. As a first step of the search the relevant block is located, and then the exact pixel is found inside the block.

3) Fill the RGB data in the pixels on the segment between two successive run-length elements by continuously running over the appropriate line in the data source of snaps.

4) Keep a pointer to the last "used" element in the snap data source, so that it will serve as the starting point of the next search.

This method for cutting of snap regions is valid provided that the snap data is ordered, and the set of the rectangles is ordered.

Packing Method

The part in which the packing is performed is quite straight forward. The method makes a merge between the data of the clusters and the data of the cut snaps. The packing is typically performed only for clusters for which the associated snap regions already exist. For each rectangular snap the associated cluster is located, and a new sip xVindow (of the size of the snap) is opened. The cluster and the snap are written in the format of sipdata, as sipdata_cluster and sipdata_RGB, respectively, and added to the window. A test function is associated, and the window is added to the queue of windows and it is ready for further processing.

Summary

The task Task_trigger_handler gets as an input two data sources (data source of color defects and data source of snaps), and produces a queue of windows, that contains two sipdata objects—sipdata_cluster, and sipdata_RGB. Sipdata_ cluster contains a list of color_defects that belong to a cluster, and some information about the cluster, like its type. Sipdata_RGB contains the RGB pixels inside a rectangular region that contains the color_defects of a particular cluster, ordered by the location, stored as an image in ppm format. The location of the top-left corner of rectangular image is given in an absolute coordinate system.

Several issues may be added or changed in the future, according to specific needs:

Division into 3 tasks: Clusterer, Snap cutter, Packer.
Clustering according to a general distance criterion.
The shape of the cluster may be stored.
An example of the clustering method, provided below, may be understood with reference to FIGS. 66-67B.

APPENDIX G

Appendix G will be understood and appreciated from the following detailed description, taken in conjuction with the drawings in which:

FIG. 68 is a simplified illustration of the general configuration of a snap area treated by the task_snap2ppm, constructed and operative in accordance with a preferred, embodiment of the present invention; and FIG. 69 is a simplified illustration of examples of configurations of snap areas not treated by the task_snap2ppm, constructed and operative in accordance with a preferred embodiment of the present invention.

Purpose

Task_snap2ppm is a tool that enables to separate snap data that contains several disconnected areas in which snap data exists into separate ppm files, each contains only one connected snap.

Input

The input of task_snap2ppm is the data source that contains the snap data.

Output

The output of task_snap2ppm are ppm-files, the number of which equals the number of separated snaps. Another file contains information about the location of each separate snap relative to the global (0.0), and it is written in a TCL format. The general configuration of the snap area which is treated by task_snap2ppm is illustrated in FIG. 68.

Method

The method to separate the disconnected snap areas is the following:

Use a single loop to go over the data source of snaps, during which the separate output files are preferably either opened, or closed, or simply updated, according to the following rules:

If the current line is non empty while the previous line was empty a new ppm file is opened.

If both the current and the previous lines are non empty the buffer that contains the RGB data to be put in the current ppm file is updated.

If the current line is empty while the previous line was non empty the current ppm file is closed.

This simple method is valid under the following assumptions:

The connected snap areas are rectangular. The configuration shown in FIG. 68 is not treated by task_snap2ppm.

Each line contains RGB data that belongs to a single snap. The configuration shown in FIG. 69 is not treated by task_snap2ppm.

APPENDIX H

Appendix H will be understood and appreciated from the following detailed description, taken in conjuction with the drawings in which:

FIG. 70 is a simplified illustration of a chain of blocks structure in a windowing reference management tool, constructed and operative in accordance with a preferred embodiment of the present invention; and FIG. 71 is a simplified illustration of the indexing main structure of a windowing reference management tool, constructed and operative in accordance with a preferred embodiment of the present invention.

1. Introduction

I.I Scope

This tool for Windowing Reference Management aims to support efficient storage and retrieval operations of window data. The goal of this tool is to allow the storage of simple windowing data items which are inserted in order into an internal data structure, in such a way that allows their efficient retrieval.

Retrieving data efficiently is a common goal of many systems, especially those that call for a massive data processing and manipulation.

The motivation for the development of this specific tool arises from various application requirements arising from the inspection of BGAs and lead frames.

1.2 Glossary And Acronyms

Template—an automated way to generate customized classes and functions

STL—Standard Template Library—a template-based library of generic C++ data structures and methods.

Container—a class supporting data storage. Examples of STL containers include:

vectors lists <<queues and priority queues>>

A container adapter class—classes that encapsulate an existing container, while providing a new user interface.

A function object—(template) object class with an operator ( ) defined.

2. Concepts

A possible approach to the problem of efficient retrieval of windowing data from reference, in accordance with a preferred embodiment of the present invention is derived naturally from the observation that scanned image data is usually ordered; first, by lines (y coordinate value), then by the order within each line (the x coordinate value). Assuming data items have a key value according to which the items can be sorted, or ordered, the task of extracting information from windowing reference can be reduced to the task of extracting information from an ordered reference, as described herein. The basic prerequisites typically include:

Data items have key values according to which items can be sorted (ordered). The key can be the value of the data item itself, in case of numeric data types. Keys are of a scalar data type, e.g., int, double, char, accessible by a function object. This requirement aims to provide a uniform access to the key, independently of data type definition. Thus, the order by which data items are ordered is subject to the key function supplied by the user.

Data is given in order, that is, items are inserted in order into the local container either one by one, or an entire ordered container is inserted.

Thus the development of a reference tool arising from a preferred application needs to provide an efficient retrieval of data from containers that do not have an efficient method for data access: Various containers may not allow for an efficient data retrieval. One example of such container is the Chain (if Blocks container, a vector like container, for which memory is allocated in blocks, each containing a fixed number of elements). Blocks are allocated in chunks, each of which contains a fixed number of blocks (the Chain of Blocks structure is very similar to that of a linked list, see FIG. 70). A direct (random) access to items in the chain is not possible. An adapter that can wrap the Chain of Blocks, while allowing it to retain its insertion functionality (e.g., push_back), with the benefit of an efficient retrieval of items is clearly used.

Next a design may be considered for a tool for indexing of ordered data; The main goal of such a tool is to support efficient retrieval of ordered data from reference. The reference can be external, e.g. a file, or internal—reference data located in memory. Moreover, the use of such a tool may be directly, or indirectly—via a container adapter, wrapping the container while allowing efficient access to its data items. To allow for efficient access of data, the indexing system is based on a number of indices, defined on construction. Each index corresponds to another sub range of possible key values, or bin. The bounds of the range of key values is defined by the minimum and maximum of possible key values over the items in the container to be indexed. The range is then sub divided into equalsize bins, whose number is specified by the used number of indices. Each index directs towards the data item whose key is the first to reside in the corresponding sub range.

2.1 Interfaces

The indexing tool is an STL/C++ independed library, therefore it can only be used as part of a C++ program.

2.2 Data

The following is a description of the integral data members involved in the indexing tool:

unsigned int n_bins; The number of indices (bins) used for the indexing system.

Bins Index', The indexing system: A vector of n_bins indices, or bins, covering the used range of possible key values, as defined by the following parameters:

pair<Key::result_type, Key::result_iype> Xrange', The range over which the indexing system is defined, where Key is an object function allowing to access the data-item key. This range is defined by the minimum and maximum of possible key values over the items in the container to be indexed.

Bins size. For each bin, the number of data-item keys that reside in that bin is stored. Note that only the index of the first data item whose key resides in that sub range need to be stored at each bin because data is ordered, thus the Bins size does not really reflect storage usage, but a potential one, i.e., it indicates the distribution of data items over the entire indexing system.

2.3 Error Handling

Errors are handled by return codes. Possible errors and their return codes are given in Table 1.

TABLE 1

| Errors and Warnings Codes and Meanings | | |
|---|---|---|
| Function | Code | Error/Warning |
| Create index | Err(1) | Container data items are not ordered |
| load store | Err(2) | xternal device is not readable External device is not writeable |
| Create index | Err(3) | Empty Container - Nothing to index |

3. Design Description

The indexing of ordered data tool is a template class; Two versions of this class exist: (a) A Memory Indexing object class whose indices direct into a Container in memory, and (b) A File Indexing object class whose indices direct into a file containing the data items to be indexed. Note that in the latter case, the indices are actually offsets in file. The File Indexing version is templated with a Key function object, whereas the Memory Indexing class is also templated with the Container. The following are the methods provided by both classes:

Construction

Purpose—Construction and initialization.

Inputs—A resolution parameter which defines the number of indices (or bins) to be used by the internal indexing system.

Processing—The internal indexing system is initialized with the specified number of indices (bins).

Outputs—None.

Create

Purpose—Create the internal system

Inputs—None.

Processing—Define the range to cover using the minimum and maximum over key values over the items residing in the local container, calculate the range covered by each bin, and assign the value of the indices accordingly. For each bin, the corresponding index stores a reference to the first data item whose key is inside this specific bin range. The order of the data items is checked to verify that they are given in order. Note: the key values can only be accessed via the Key function object, with which the Indexing class is templated.

Outputs—None.

Update

Purpose—Update the internal system.

Inputs—The new number of bins to use for resolution over that same range.

Processing—Update the number of bins (indices) used by the internal, indexing system, and re-create the indices accordingly.

Outputs—None.

Query

Purpose—Efficient retrieval of information out of the local container.

Inputs—The query range.

Processing—Using the indices, calculate the first and last bins in which data items satisfying the query range may reside.

Outputs—A pair of bin numbers, between which data items are expected to satisfy the query criterion.

Storage Operations Serialization

Purpose—Store the indexing system information.

Inputs—The external device into which to direct the serialization and storage operation.

Processing—Since the indices of the File indexing object are offsets, storing them is straightforward. For the Indexing in Memory case, serialization is a prerequisite. Consequently, the Memindexing has also the serialize and deserialize methods, converting its indices into offsets that can be stored into and loaded from and external device.

Outputs—None.

Deserialization

Purpose—Deserialize and load indexing information from external device.

Inputs—The external device specification.

Processing—Deserialize data, and load the indexing system information from the specified external device and restore it into memory.

Outputs—None.

APPENDIX I

Appendix I will be understood and appreciated from the following detailed description, taken in conjuction with the drawings in which:

FIG. 72 is a simplified illustration of fast retrieval of data via a windowing query, constructed and operative in accordance with a preferred embodiment of the present invention.

1. Introduction

I.I Scope

Windowing queries play an important role in image processing applications in accordance with preferred embodiments of the present invention. A window is a rectangular region of the image. A windowing query, or a region query, is the task of determining the part of the image contained in a given window, and providing its data. The window concept is a fundamental building block of many tasks in methods according to preferred embodiments of the present invention; windows that define regions of interest for detection, or the defect windows, are created around defects reported by the hardware.

The need to support efficient windowing queries is motivated by the following scenarios:

Windowing queries during the Inspect scenario:

One method of inspection is based on the comparison of scanned data to reference data (data learned during a learn scan). In many cases however, only a part of the data (around regions of interest) is readily stored for future reference (via top-down windows). During an inspection scan scenario, on defect detection, there is a need to compare the window around the defect with the corresponding region as obtained at learn, even if that window is not a part of a previously stored window. Due to performance constraints, this comparison is preferably done as fast as possible.

Windowing queries for visualization applications: A similar scenario occurs in applications of data visualization. At the heart of such applications stands the possibility to draw data on the screen at user's request. That is, by marking an area of interest, or a window, the user triggers the application to re-draw the data of that window providing higher level of details. Such interactive applications preferably access their data efficiently and accurately.

1.2 Applicability

The Windowing Reference Manager (WinRef) aims to provide an independent library tool, and to serve as part of the SIP. The WinRef is expected to be applicable to a variety of SIP tasks and data types and structures, and to allow for an efficient data access and retrieval of reference data, e.g., scanned data contained in hardware reports (such as CELs, Color CELs, Features, Snaps, etc.), or in data structures that does not provide an efficient (direct) access to their data items (such as the Chain of Blocks data structure).

2. General Description 2.1 Product Perspective

The Windowing Reference Manager is conceived to be a general purpose, independent library tool, that supports tasks and data types and structures contained in the SIP. Consequently, the target application may impose several restrictions that reduce the tool generality. Preferably the design is as generic as possible, so that its adaptability to other systems will be as simple as possible.

2.2 Product Functions

The fundamental functions of the Windowing Reference Manager needs to support are the insertion of window data items into an internal window data structure, and the efficient retrieval of data items satisfying a given windowing query.

2.3 User Characteristics

The user of the Windowing Reference Manager should be well acquainted with the concepts of the working environment, that is, of C++ and STL. A general knowledge of the SIP system is used for a full understanding of possible applications, and the constraints imposed on the tool design.

3. Functional Requirements

Purpose—The Windowing Reference Manager (WinRef) is an object class aims to support storage and efficient retrieval operations of window data items.

Methods The following are the fundamental methods of the WinRef class:

Construction and Initialization.

Data Insertion.

Query operation; Allows for a fast retrieval of data according to some windowing query criterion. The query criterion provides the bounds of the used windowing range.

Serialization and Deserialization; The capability to store and retrieve information for backup purposes on an external device, such as file, or for transient purposes (e.g. transfer of data between computer systems via TCP/IP). At serialization, sufficient information is stored as to provide a reliable recovery (restore) of the whole window data (deserialization).

4. Interface Requirements The interface to the WinRef class is provided by its methods.

5. General Requirements 5.1 Performance

The tool performance requirements are dictated by those of the target application.

5.2 Error Handling Errors will be handled by return codes.

6. Design Aspects

The following are the design aspects imposed by the expected applications:

In accordance with a preferred embodiment of the present invention, a window may contain two basic types of data: (a) Simple data items such as CELs (Contour Elements), or Features, or, (b) Compound data types such as Polygons (e.g., connected components, or vectors). Simple data items provide local information over a pixel, or sub-pixel, thus, their amount in a single scan is large. Compound data types are fewer in number; nevertheless, each holds more detailed information, and their inter-relations are more complicated. The advantage of using simple data items over the compound ones is that the simple ones are always obtained in order from a scan: first, by lines (the y coordinate), and then by the order within each line (the x coordinate). This observation can be put to use by the future design. Thus, though being a major constraint forced by the target main application, the ordering constraint has the advantage of simplifying the implementation.

Providing that the WinRef tool is designated mainly to support efficient retrieval of simple data items, the order by which items are given can be used to store the items effectively for an efficient future extraction. In specific, if we further assume that data items have a key value according to which the items can be sorted, or ordered, the task of extracting information from windowing reference can be reduced to the task of extracting information from ordered reference.

APPENDIX J

Introduction

Scope

This appendix describes the processing of "balls" under the SIP in the ICP machine.

A "Ball" is a circular singles component; collections of "balls" can be found in many applications.

In the ICP machine, "balls" processing is only done in pre-defined "balls" areas.

Such processing aims to test the components found in those areas against design rules and some other pre-defined constraints, as will be discussed in details later.

Glossary

The following is a short list of terms and abbreviations used in the present appendix:

A "connected component" is a chain of CELs (Contour ELements), which can be either open or closed. In principle, each vertex of such a chain holds information on the CEL connecting this vertex to its neighbour along the chain.

A "generalized circle" is a structure defined over a single connected component.

A "generalized circle" holds information on the extent by which this circle can be considered a "good" one, based on both design rules and other pre-defined constraints.

The information stored in the generalized circle structure is such that a full and accurate report on all defects detected on that component, can be derived from it.

An "isolated circle" is a circle which was found to be "good". See section "Circles Sampling" for the definition of a "good" circle suggested by the implementation described here.

"Balls" Configuration Requirements

SIP

The ICP/SIP implementation of balls learning procedure expects as input a list of descriptions of radius ranges. A range is defined by min and max, values, within which a nominal radius value resides (the nominal radius value may or may not be provided as input).

In addition, some relevant test data is attached to each range. For example, to test circularity, a parameter relevant to the tolerance on fitness to circle is typically used.

Application

To go along with application needs, the specific format of data typically used by the SIP can be provided by the SIP Server, from various application formats. Note: the application typically only deals with diameter values, which are typically converted into radius values by the SIP Server.

The following combinations of parameter formats may be supported:

i. A list of nominals, cannot be null (derived, from Application parameter: balls_nominal_diameter, conversion by multiplication with 0.5).

ii. A list of pairs (min, max) defining each range, can be null (derived from Application parameter: balls_min_max_nominal_diameter, conversion by multiplication with 0.5).

iii. A list, or a single value of percentage_radius_deviation or absolute_radius_deviation (derived from Application parameters: balls_percentage_diameter_deviation, for which convertion is done by multiplication with 2.0, and balls_absolute_diameter_deviation—for which conversion is done by multiplication with 0.5).

iv. adjust_to_nominal_radius parameter (Expert parameter: balls_adjust_to_nominal), applicable in learning scenarios only, default is FALSE. If TRUE, radiuses of circles to be learned are adjusted to the closest matching nominal (if such exist).

v. A list, or a single value of test-data parameters:

Note: if both abs and percentage parameters are given, the stricter value of the two is taken as the parameter.

maximum_percentage_nick_depth/maximum_absolute_nick_depth, and maximum_percentage_protrusion_depth/maximum_absolute_protrusion_depth.

maximum_absolute_defect_area/maximum_percentage_defect_area.

maximum_absolute defect_length/maximum_percentage_ defect_length.

circle_fit_sensitivity and percentage_circle_fit.

Note: All the above, but the last two parameters (which are Expert parameters: balls_circle_fit_sensitivity, and balls_percentage_circle_fit)—are Application parameters. No conversion diameter-to-radius is typically used for none of the above.

A list of nominals is Preferably always provided. Providing a list of pairs (min, max) is optional.

If only nominals are given, at least one of the parameters defined above, is preferably provided. In that case, min and max values will be computed as follows:

min=nominal−absolute_radius_deviation, or, min=nominal*(1−percentage_radius_deviation)

max=nominal+absolute_radius_deviation, or, max=nominal*(1+percentage_radius_deviation).

In the above calculations, if both parameters (absolute_radius_deviation and percentage_radius_deviation) exist, the smaller value of the two is taken as the min, and the higher value of the two is taken as the max.

If a list of pairs (min, max) exist, the above calculation will serve to refine the boundaries of those ranges, only if the parameter allow range adjust is set to TRUE.

"Balls" Learning Scheme

Circles Sampling

Description of the "balls" learning procedure: The goal of this procedure is to process connected components found in a given "balls" area, and to produce all ball or circle information that can be derived from each component in that area. Note that this procedure processes information retrieved from one camera (slice) at a time.

Input: A connected component.
Output: A generalized circle.
Process:

1. The (camera coordinates) points defining a connected component are served to compute a circle parameters: center and radius (possibly in aligned coordinates).

2. Each point is examined against a robust estimator of the circle parameters, and the "best" points are identified (this is done using an internal parameter circle_fit_tolerance, on which the user has no control). Those "best" points are used to refine the circle estimated parameters.

3. At this point, a circle undergoes a test for a match to nominal radius range. The circle's estimated radius is examined against the available radius range list; A match to range i is set if the circle's radius resides within the i's range boundaries (min, max).

4. To complete the sampling procedure, some indicators of the quality of the estimation, and/or some other tests can be calculated and examined against internal tolerances. In accordance with a preferred embodiment of the present invention, a fitness to circle test is applied. The parameters circle_fit_sensitiviy and percentage_circle_fit are taken from the radius range table, where the estimated radius is served as the access key. If the estimated radius does not match any radius range in the table, default values are used for the parameters.

A "good" circle is thus a connected component for which all test results are above given thresholds, and whose radius matches one and only one radius range.

A match to more than one radius is a miss-definition of the radius ranges. A warning on this will be given at loading, and on circle sampling (execution).

No defect will be reported, and the circle will be learned.

Analysis of Unified Circle Information

The above procedure is applied to any "balls" window. At the final processing stage, all "balls" windows are processed together to eliminate duplicate appearances of circles in cameras' overlap regions (matching of two circles in this case is based on matching their centers up to max_alignment_shift tolerance, taken from the corresponding Expert parameter, and on matching their radiuses up to some radius_deviation tolerance, which is an internal parameter).

The circles are classified into two groups: "good" and "bad". Each such group undergoes a different handling and testing.

"Good" Circles Processing:

First, duplicate appearances of same "good" circles are removed, then each "good" circle undergoes the following tests:

Area reduction test.

The Area reduction test verifies that the area of the connected component underlying that circle is approximately the same as the expected area of the circle itself If there is a reduction in the circle's area which is above the defect_area parameter taken from the relevant entry in the radius_range table, a SHAPE_AREA_REDUCTION sip_defect is reported.

Nick-protrusion test.

The Nick-protrusion test examines the points on the contour of the circular component. A preferred nick-protrusion test is described in Applicant's copending Israel application 131092.

Those points are supposed to reside at a distance equals to the radius of the circle from the circle's center. A Nick is reported if a point on the contour is located at distance smaller than (radius−inner_threshold) from the circle center. A protrusion is reported if a point of the contour is located at distance larger than (radius+outer_threshold) from the circle center. The parameters inner_threshold and outer_threshold are taken from the entry in radius range table corresponding to the circle radius. They are derived from the Application parameters defining the criteria for nicks and protrusions, respectively.

Each Nick/Protrusion point is reported as NICK_PROT_ sip defect.

Clean area test.

This test verifies that the points on the contour of the circular component do not corrupt the "clean area" defined by a circle of radius clean_radius around the center of the sampled circle. At the moment, the parameter clean_radius is set to the value of min_radius of the radius range corresponding to the sampled circle radius. A point on the contour which violates the clean area criterion is reported as NICK_ PROT_ON_BALL sip_defect.

If adjust_to_nominal_radius is TRUE, the radius of each learned circle is set to the matching nominal radius. As mentioned before, the adjustment is applicable only if nominal radiuses were defined.

The reference circle are stored in aligned coordinates.

"Bad" Components Processing:

Defected components which are instances of "good" circle, resulting from camera slicing are removed. Other defective components are tested according to their polarity.

Same polarity as panel.

The length of the bad component is tested against max_exposed_metal_length threshold.

(The length of a connected component is defined as the, largest diagonal of its bounding box.) If length exceeds the threshold, a SHAPE_LENGTH_EXCEEDS_THRESHOLD sip_defect is reported, at the point which is the center of that bounding box.

Inverse Polarity: treat the bad circle as Pinhole.

To test the component as pinhole, we first find the circle within which this component resides. We use the radius of that circle to get thresholds from radius range table, and test length of the pinhole against defect_length parameter, and its area against defect_area parameter. If one of those tests proves this pinhole to be above threshold, it is reported as SHAPE_LENGTH_EXCEEDS_THRESHOLD, or SHAPE_AREA_EXCEEDS_THRESHOLD, and its center is reported as PINHOLE.

Inspection Scenario

In principle, the inspection scenario for circles is similar to the learning scenario. A delicate detail is the treatment of radius ranges; As in the learning scenario, a list of radius ranges issued, and the radius of an approximated online circle serves to access the list of radius ranges. Note that the radius range list provided can be the same list of radius ranges that was used during learning, or a new range list can be provided. If a totally new range list is used within which no radius of any reference circle resides, defects may encounter later on Excess-Missing tests. These test (see details below) are performed in "balls" inspection areas to verify that the appearance of circles on the panel matches the appearance of reference circles.

The inspection processing of connected components in "balls" window is the following:

Input: A connected component.
Output: Defect reports.
Process:

1. Compute a (possibly aligned) circle (center and radius) out of the online connected component.
2. Identify the "best" points, and refine the circle estimated parameters.
3. Examine the circle's radius against the available radius range list.
4. Calculate the quality of the estimation (or other tests), and examine it against given tolerances.
5. After unifying circle information from all slices, classify into two groups and test "good" and "bad" circles as in the learning scenario.
6. Perform extra tests specific to inspection scenario:

The goal of the two following tests is to verify that any reference circle has an online circle matching it exactly (position and radius in our case), and vice versa. Matching in this context means that there is a reference circle with the same radius (up to the internal radius_deviation tolerance) and at the same center location (up to the Expert parameter max_registration_shift tolerance) as the online circle.

Excess Test

This process prevents the appearance of unexpected circles, that is, connected components with circular shape, whose radius resides within the range of possible radii, but for which no matching reference circle exist.

Missing Test

This process verifies that there is no reference circle which does not have any matching online circle. Any appearance of online circle matching a reference circle is marked. The number of appearances serves to identify those for which no match was found. Overmatching is also reported.

Extra "Balls" Services

"Balls" Statistics

Statistical information is useful for estimating the parameters typically used at learning (Design-Rule test). Therefore, statistical information is provided at the end of a learning scenario by a special task named balls_measurenments. The information is presented in two forms: an histogram representing the distribution of radius values (a) in the given radius ranges, and (b) in sub-ranges of fixed pre-defined size. Thus, the user can apply an initial learning process with only one pair of min and max values representing the range (0, Inf), then use the resulting histogram of radius distribution in fixed sub-ranges over that range, to determine an exact setting of the radius range list.

In addition, information on all circles that were learned (before being adjusted to nominals, if such option is used) are outputted; This includes the circles center and radius, and its fit—rounded to the closest fit level. The fit levels typically used are determined by two parameters given to this task: minimum_circle_fit and n_circle_fit_levels; the task will accordingly output n_circle_fit_levels fit levels, from minimum_circle_fit and up.

Update "Balls" reference data

"Balls" reference data can be updated according to information retrieved from the application. The goal of this procedure is to allow the user to confirm the learning process. The user has the ability to select reference circles to be taken out from the reference, simply by providing a list of points which are close enough to the centers of the circles to be removed (those points can be, e.g., provided by the application from 'mouse clicks' on that circle).

The update procedure produces a new reference data (in SIP format) out of the given reference data and the list of points of removal.

Defect Information

TABLE 1

| DEFECT TYPE | DEFECT DESCRIPTION |
| --- | --- |
| EXCESS_CELS = 1 | Deviation of points residing on the contour of a connected component (cels) from a circular contour. |
| SHAPE_MISMATCH = 10. | Online shape exists but cannot be matched t any reference circle. |
| SHAPE_EXCESS = 12 | Excess circle with the same polarity as the panel |
| SHAPE_MISSING = 13 | Reference circle was expected at this point but was not found. |
| SHAPE_OVERMATCH = 14 | More than one online circles match a single reference circle at this point. |
| PINHOLE = 15 | Excess shape with polarity opposite to panel. |
| SHAPE_LENGTH_EXCEEDS_THRESHOLD = 16 | Excess shape with length (long diagonal axis) that exceeds threshold. |
| SHAPE_AREA_EXCEEDS_THRESHOLD = 17 | Excess shape with area that exceeds threshold. |
| SHAPE_AREA_REDUCTION =18 | Circle for which a massive reduction (over a threshold) in area has occurred. |
| OPEN_SHAPE = 19 | A non-closed shape. |
| NO_RADIUS_MATCH = 50 | A connected component for which no matching radius was found in the radius-range table. |
| NO_FIT_TO_CIRCLE = 51 | A connected component which does not fit to a circle. |
| NICK_PROT = 40 | A point of nick or protrusion (located on a circular contour). |
| NICK_PROT_ON_BALL = 41 | A point of nick or protrusion inside clean area of a circle. |
| MISSING_DATA_FOR_COMPUTATION = 201 | No reference circles found in :balls" window, or Failure in creating connected components for that window, or No radius range test data was found. |
| UNKNOWN = 250 | Unknown circle defect. |

APPENDIX K

Appendix K will be understood and appreciated from the following detailed description, taken in conjuction with the drawings in which:

FIG. 73 is a simplified illustration of aboard whose image is to be analyzed; and FIG. 74 is two simplified illustrations of a board whose image is being analyzed.

INTRODUCTION

A key problem in computer vision is the extraction of meaningful features from images. A popular approach is based on edge data.

A method for production of connected components composed of CELs (lists of edge elements generated using edge detection method producing single pixel contour elements or CELs) is now described.

OVERVIEW OF THE METHOD

General

The vector of CELCELs is arranged in a format called run length which means that the data is arranged in the sequence of scanning (sorted by y coordinate and then by x coordinate for every line). We can look at the run length format is a some kind of sparse raster format.

Reference is now made to FIG. 73 which is useful in understanding a preferred embodiment of the present invention.

Raster to Vector of Edges Image Properties of CELCELs (Basic Cel)

A CEL (contour element) is a zero crossing vector which is defined on a pixel size rectangle that has four binary image pixels at its four corners.

The four pixels are assumed to be centered around the origin having coodinates P0,P1, P2 and P3.

The X and Y coordinates of the CEL are derived from the image coordinate system and are set according to the coordinates of the center of pixel P3.

In addition to the pixel grid coordinates there is also a sub pixel resolution coordinate system for each axis which is represented by an integer having n=CEL_SUB_PiXEL_BITS bits. Thus the representable sub pixel coordinates are from 0 (representing 0.0) to 2n−1 (which is SMALLER than 1.0, that is represented by 2n.

It is appreciated that 1.0 can not be represented in this number of bits since we typically need n+1 bits of representation in order to be able to represent all integers from 0 up to 2n.

The CELReport structure preferably contain the following bit fields:

dir;
last;
first;
edge_code;
where:

edge_code:
defines the orientation of the CEL which goes from first_edge
to last_edge:

Case 6 corresponds to a saddle situation(s) which is described below.

Case 7 is used for special cases of entities, which is discussed below.

first:
is the intersection point (in a cyclic coordinate system) of the cel with edge first_edge.

last:
is the intersection point (in a cyclic coordinate system) of the cel with edge_last edge.

The elements first and last are stored in a cyclic storage scheme.

The sub_pixel location of a point on an edge is determined by the edge on which that point lies. Thus a point on edge 0 with the coordinate 1 is above the point on edge 3 with a coordinate M—1 The advantage of this scheme is that it allows us to represent ALL points in the sub-pixel with CEL_SUB_PIXEL_BITS bits since each vertex of the pixel corresponds to one edge with a coordinate of M (which CAN NOT be represented using only CEL_SUB_PIXEL_BITS bits) and to another edge with a coordinate of 0 (which is representable).

dir:
0 if the area of white material (elsewhere referred as negative DOG signs) to the left of the oriented cel line going from first_edge to last_edge.

1 if the area of white material (elsewhere referred as negative DOG signs) is to the right of the oriented cel line going from first_edge to last_edge.

Input and Output

The input to the method is a vector of Contour Elements (or CELCELs) which are single pixel edge elements generated using edge detection method. The output of the method is a connected components object which is a collection of highly sampled contours of the shapes in the input image. The connected components are the first form of hill vector representation of edges of the input image in the system.

Parameters

The method has two input parameters that control its operation:

The first parameter is the Close connected segments or Edge connection flag that instructs the method whether or not to perform chains association along the edges of the window. Chain association is used for further processing in the system in order to perform operations on groups of chains that describe a specific entity in the image.

The second parameter Enclose white regions or Connect dir flag, which is relevant when the edge connection option is used, instructs the method about the way association is preferably performed.

Operation

In general the operation of the method can be summarized as reordering of scanline data to polygonal data. In addition to that the method m performs some other topological operations to add information to the understanding of the input edges data.

The input to the method is a vector of Contour Elements (or CELs) which are single pixel edge elements generated using edge detection method. The output of the method is a connected components object which is a collection of highly sampled contours of the shapes in the input image. The connected components are the first form of full vector representation of edges of the input image in the system.

APPENDIX L

Appendix L will be understood and appreciated from the following detailed description, taken in conjuction with the drawings in which:

FIG. 75 is a polyline object illustrating the deviation parameter of a process for straight line approximation of connected components composed of CELs, constructed and operative in accordance with a preferred embodiment of the present invention;

FIG. 76 is a polyline object illustrating the deflection parameter of a process for straight line approximation of connected components composed of GELs, constructed and operative in accordance with a preferred embodiment of the present invention;

FIG. 77 is a graph illustrating the small_cel length parameter of a process for straight line approximation of connected components composed of CELs, constructed and operative in accordance with a preferred embodiment of the present invention;

FIG. 78 is a polyline object illustrating a 'quality assurance' mechanism in a process for straight line approximation of connected components composed of GELs, constructed and operative in accordance with a preferred embodiment of the present invention;

FIG. 79 is a polyline object illustrating an advanced 'quality assurance' mechanism in a process for straight line approximation of connected components composed of CELs, constructed and operative in accordance with a preferred embodiment of the present invention;

FIG. 80 is a graph illustrating the results of a performance test in a process for straight line approximation of connected components composed of CELs, constructed and operative in accordance with a preferred embodiment of the present invention;

FIG. 81 is a graph derived from the graph of FIG. 80 by examining the situation where the compression ratio (as a function of deflection angle) becomes constant for every vectorization style; and FIG. 82 is a graph derived from the graph of FIG. 80 by examining the deflection angle where the compression ratio (as a function of deflection angle) becomes constant for every vectorization style, and the deflection angle that produces minimum time vectorization.

INTRODUCTION

A key problem in computer vision is the extraction of meaningful features from images. A popular approach is based on edge data which, though useful itself, is better represented in a more manageable form. The type of description can be application dependent but is usually based on a combination of straight line approximations and if possible approximations with higher order curves such as circular arcs, conic sections, splines, and curvature primitives. Straight lines are standard inputs to model matching systems, but higher order features are becoming more popular since they permit more constraints on model identification.

In this Appendix, a method is described for straight line approximation of connected components composed of CEL-CELs (lists of edge elements generated using edge detection method producing single pixel contour elements [CELCELs] followed by edge linking). Among the properties of the method we find:

Efficiency—Good representation of the data up to a desired tolerance along with substantial data reduction, so that higher order geometric representations can be easily fitted to the data. All this is done with relatively low time consumption.

Low dependence on parameters—The method has a small number of parameters which affect its operation, some affect the time and memory consumption, and another independent one affects the output data quality (preservation of the shape).

OVERVIEW OF THE METHOD

General

At present the method is designed to work on highly sampled contours of a shape, constructed of single pixel contour elements (CELs) connected into chains. All the preparation processes are done by a series of binarization and raster to vector methods. In general we can look at the problem as getting a contour of a shape and producing another (compressed, more efficient) description as output.

The main goal of the method is to produce a good and efficient representation of the input data for later processing (reference for change detection ,shape recognition etc.). A "good representation" can be defined as a representation preserving the original shape up to a desired tolerance and removing redundant data as much as possible.

In general, the operation of the method is based on running on the input contour and searching for significant points or vertices for the description of the shape. The significance of a vertex is determined using angle difference criteria of an examined CEL of the input contour with respect to its environment. When a significant vertex is found the method starts a strong examination of "preservation of the original shape" and improves the vectorization, by adding more vertices, to achieve a desired deviation tolerance. The method has also a simple noise reduction criterion that improves data reduction by ignoring small contour elements that add little information to the description of the shape. The following sections describe in detail the method's input, output, parameters and operation mechanisms.

Input and Output

The input to the method is a connected components object which is a collection of highly sampled contours of the shapes in the input image. As mentioned earlier the input connected components object is a list of edge elements generated using edge detection method (producing single pixel contour elements or CELs) followed by edge linking method. The connected components are the first form of vector representation of edges of the input image in the system.

The output of the method is a polylines object which is a collection of contours of shapes of the input image. The polylines object is the basis for all shape modeling and shape comparison in the system.

Parameters

The method has three input parameters that control its operation:

The most important parameter that controls the output data quality is the deviation (in pixels length units) tolerance of the output contour from the input contour. This parameter influences the smoothing of the input contour and also the data compression ratio.

Reference is now made to FIG. 75 which aids in the understanding of one preferred embodiment of the present invention.

The next parameter is the deflection (in degrees units) threshold, which is used to determine the importance of the examined vertex for the description of the shape. The main influence of this parameter is in the determination of the speed and memory consumption during the process. All the aspects of this parameter are discussed below in the performance test and results section.

Reference is now made to FIG. 76 which aids in the understanding of one preferred embodiment of the present invention.

The third parameter which is used to reduce noise is the small_cel length (in pixels length units) which is used to filter out short contour elements that have a highly unstable angular nature with respect to their neighbourhood. The small contribution of the small cels to the description of the shape allows us to automatically discard them ,as non important vertices, from further analysis.

Reference is now made to FIG. 77 which aids in the understanding of one preferred embodiment of the present invention.

Adaptors for the function parameters are used to improve efficiency.

1. The deflection angle is converted from degrees to radians in order to save the transformation in the angle calculation function of the examined segment.
2. The deviation and small_cel sizes are converted to square of the size to save the sqrt( ) function all the time a distance has to be calculated.

rdeflection=deflection*(PI/180);

minus_rdeflection=2*PI−rdeflection;

sq_small_cel=small_cel*small_cel;

sq_deviation=deviation*deviation;

Operation

The main iteration of the method is performed on the connected components object where every chain of CELs is processed sequentially. The main loop first declares a new polyline in the output polylines data object and then executes the Vectorize_chain function, which prepares the desired result in the output data object. At the end of vectorization function the new polyline is closed and marked with some additional system data for further use.

Execute code
// run over all chains and vectorize each one of them
for (unsigned int i=0; i<c_components→size( ); ++i)
{
data→BeginPolyline( );
VectorizeChain(data, (c_components)[i],
rdeflection,
sq_small_cel,
sq_deviation);
data→EndPolyline((c_components)[i].IsClosed( ),
(c_components)[i].Id( ),
(c_components)[i].MtrlType( ));
}
Vectorize_chain The Vectorize_chain function receives as parameters, pointers to the input and output objects and the three operational parameters described above. The function simply runs on the input chain (of CELs) and looks for "significant" vertices for the description of the shape. If such an important vertex is found, it is added to the output object.

It is appreciated that some exceptional cases exist, e.g. an empty. chain of cels that can not be processed so the function exits. Also if, for some reason, the chain includes only one vertex, there is no need for processing so the function inserts the first vertex into the output object and exits.

Another convention that should be mentioned here concerns the geometric properties of vertices and segments of connected components and polylines in the system:

Angle(i) is the angle of i'th segment (first endpoint of CEL or line) pol[i]→pol[i+1]
Length(i) is the length of i'th segment (first endpoint of CEL or line) pol[i]→pol[i1]
Sq_length(i) is the Squared length of i'th segment.

After the first special cases checking the function initialises the angle variable to the angle of the first segment, and resets an index for further use. At this time we are ready to start running along the chain and find "important" vertices. For each vertex we have the segment angle and length and the angle difference to the entrance angle of the examined group of segments (a group of segments is defined between every two "important" vertices in the output polyline).

If the examined CEL's angle_difference is larger then the deflection threshold it is considered an important vertex for the description of the shape.

When examining this "vertex importance" special cases are considered for segments with north azimuth that jumps from small angles (around 0 degrees) to large angles (around 360 degrees). Additional part of the question includes the "small cels" filter which bypasses the cases where a segment (a very short CEL) is accompanied by very large deflection angles on both his sides that crosses the deflection threshold and adds vertices which do not add important information to the description of the shape and substantially reduces the compression ratio.

If it was found that the examined vertex is "important for the description of the shape" it is typically inserted it into the output data structure. As a result of this insertion a new line will be created between the previously inserted and the newly found vertices. For some reasons it could happen that the newly created segment substantially deviates from the original contour. This incident is common along low curvature and smooth contours. In order to avoid the loss of information caused by these cases, the proposed vectorization are typically rechecked for deviations with respect to a given tolerance. This checking is done by the Improve_segment function before adding the new "important" vertex into the output object.

In general, the Improve_segment function checks that the proposed segment does not deviate from the original contour more then the permitted distance, and adds additional vertices if used. After improvement is done the new proposed vertex is inserted into the output vector and some more data is updated to continue the iteration. After the whole chain is processed we typically conclude by inserting the last vertex, of course with improvement of segment before insertion. The detailed operation of the improvement function is described below.

Vectorize_chain Code
{
unsigned improve_sample=2; // index
if(ipol.size( )==0) return; // connected component contains no vertices
data.push_back(ipol[0]);
if(ipol.size( )==1) return; // connected component contains only 1 vertex
double entrance=ipol.Angle(0);
unsigned starting=0;
for (unsigned i=1; i<ipol.size( )−1; ++i)
{
// Get azimuth and square length of the tested segment
// and calculate angle difference.
double angle=ipol.Angle(i);
double diffangle=fabs(angle−entrance);
double sq_length=ipol.Sq_length(i);
// Check significance of current vertex
if((diffangle>rdeflection)          andand
(diffangle<minus_rdeflection) andand
(sq_length>sq_small_cel))
{
// About to add a vertex
// Improve the new segment sapling
Improve_segment(ipol, startind, i, improve_sample,
sq_deviation, data, cel_touch);
data.push_back(ipol[i]);
entrance=angle;
startind=i;
}
}
// About to add a last vertex
// Improve the new segment sampling
Improve_segment(ipol, startind, ipol.size( )−1, improve sample,

```
sq_deviation, data, cel_touch);
data.push_back(ipol[ipol.size( )-1]);
return;
}
```
Improve Segment The decision rules used to define "important vertices" along the chain has some weakness in detecting very low deflections of the contour, a problem that could result in a low quality description of the shape. As a result of this, and other possible deficiencies, some mechanism for quality assurance of the vectorized result is typically used. The mechanism used is a very simple examination of the difference between the proposed vectorized resulting segment and the input chain of cels which it is meant to replace.

The Improve Segment function works on a predefined segment of the input Connected chain of cels (starting and ending indices of the desired cels in the chain, defined by the upper level Vectorize Chain function). The examination is performed along the whole input segment and the vertex with maximum distance is pointed out. If the distance is larger then the allowed parameter then the most distant vertex is also added to the output polyline.

The measurement of the distance between the examined cel the proposed output segment is based on the measurement of the area of the triangle between the two proposed end points and the point on the segment of cels which is bounded by these points, as described in Equation 2.

The desired length is equal to (2* Area of the triangle)/(length of the base) where the length of the base is the distance between points p0 and p1 (FIG. 78). Since the base length is constant during the whole improvement iteration we can first calculate the base length term and save some calculations. Since the improvement iteration adds another touch to every cel in the input chain there is a big motivation to reduce the number of measurements. In the improvement iteration on the chain of cels a sampling parameter is used which skips a desired number of CEL distance measurements. The assumption behind this sampling parameter is that there is a relatively smooth contour of CELs between the starting and ending points that for some reason was not detected by the vectorize chain function and any high curvature features are not lost so a sparser quality checking is allowed.

It was mentioned hereinabove that the Improve segment function is preferably called before insertion of every new vertex into the output polygon in order to keep the right order of vertices of the output shape. Since the improve segment function inserts vertices itself preferably are called recursively call it before inserting additional vertices and also call it after the insertion in order to refine the output polygon according to the desired quality parameter.

Improve Segment Code
```
{
if ((endind-startind)<improve_sample) return;
Dpoint2 p0=ipol[startind], p1=ipol[endind];
double area2, sq_dist, maxdist=0;
double sq_seg_length=p0.Sq_dist(p1); // base length
unsigned maxind=0;
for (unsigned j=startind; j<endind; j+=improve_sample)
{
area2=(p1.y-ipol[j].y)*(p0.x-ipol[j].x)-(p0.y-ipol[j].y)*(p1.x-ipol[j].x);
sq_dist=area2*area2/sq_seg_length;
if (sq_dist>maxdist)
{
maxdist=sq_dist;
maxind=j;
}
cel_touch++;
}
if (maxdist>sq_deviation)
{
Improve segment(ipol, startind, maxind, improve_sample,
sq_deviation, data, cel_touch);
data.push_back(ipol[maxind]);
Improve_segment(ipol, maxind, endind, improve_sample,
sq_deviation, data cel_touch);
}
return;
}
```

3. PERFORMANCE TEST AND RESULTS

When trying to estimate the performance of the method we preferably define the relevant quality parameters which are:

preservation of the shape compression ratio of redundant data time consumption in the specific scenario Some quality parameters are very rigid and are dictated by the user application, for example the preservation of the shape, while other parameters influence the operation of the method but not the output result that the user receives.

The compression of redundant data is the ratio between the number of contour elements in the input connected components data object and the output number of vertices in the output polylines object while the time consumption was measured using a timer object.

It is appreciated that the two last quality parameters can influence the operation of the whole system on conditions where time is a very important parameter that should be satisfied on some operational specifications, For example an unwise selection of the deflection parameter in learn scan can result with a low compression ratio which can degrade the performance of test functions in inspect scan.

For the performance test of the method a sample panel is used containing about 93000 contour elements (CELs) that are connected to contour chains using a separate connected components method. For this panel, the influence of the various input parameters on the output quality is tested.

In every test phase it is assumed that the preservation of the shape parameter is rigidly dictated by the user (this quality parameter is directly controlled by the deviation input parameter described above) and the deflection parameter is varied while testing its influence on the compression ratio and the time consumption of the method execution. During the whole test the small_cels length parameter is typically fixed to 0.3 pixel and the improvement resampling index parameter is typically fixed to 2 (every second CEL is examined in the improvement iteration). The whole set of deflection variations is fested using three deviation conditions: "tight" (0.1 pixel deviation) "medium" (0.3 pixel deviation) and "loose" (0.6 pixel deviation). The whole test is carried out on a Intel Pentium pro (dual processor) computer which was completely devoted for the analysis with out any users or processes.

The test results are displayed on FIG. 80. On the results we first notice the inverse relation between the compression ratio and the time consumption as changing from tight to loose vectorization (tighter vectorization consumes more time and delivers lower compression ratio). We can also see the logarithmic nature of the compression ratio as a function of the deflection parameter and that every vectorization style has an a constant compression level after some deflection limit, which implies that the final compression ratio is mainly controlled by the deviation parameter.

Observation of the time consumption data reveals the existence of a minimum value of execution time. Examining the code it can be seen that the time consumption is directly related to the number of CELs in the Connected components structure because the Vectorize chain function touches every CEL once (constant time consumption) and the Improve segment function touches the CELs some more times according to the necessary improvements. The overhead of the Improve segment function is added in any case no matter if the improvement is found necessary or not during a specific iteration.

In the performance tests done with the function, an improvement skip parameter of 2 is typically used which means that the number of touches added by the Improve segment function is 0.5 of the number of CELs in the case where no improvement is needed. This parameter remains constant during the whole operation test and its influence was not tested.

After all these explanations it can be concluded that the minimal number, of CEL touches (of any kind) done by the function is 1.5 times the number of CELs in the input Connected components object one touch by the Vectorize chain function and at least 0.5 touch (in the usually used configuration) by the Improve segment function.

The "real" number of CEL touches was measured by counting the overall number of touches performed by the Improve segment function and is found to vary significantly as a function of the deflection parameter. For example if using the "0.3pixel deviation" vectorizer and setting the deflection parameter to 10 degrees the result shows that the number of touches performed by Improve segment is 0.74 (resulting with 1.74 touches) of the number of CELs in the input. The excess touches (above ratio of 0.5) are caused because of the recursive calls to the Improve segment function.

Changing the deflection parameter to 20 degrees resulted with an overall GEL touches of 2.84 (1+1.84) of the GELs number in the input. A deflection parameter of 30 degrees for example causes an overall ratio of 3.34 because of many recursive improvement operations.

The overhead value of 0.508 is found when used a value of 7 degrees is used a the deflection parameter which means that almost no recursive operations were used in this iteration.

When the deflection parameter value is reduced to 3 degrees the resulting overhead is found to be 0.32 which means that not all the CELs are inspected by the improve segment function. This result is found because the improvement is requested for segments with length smaller then 2 CELs (see the first line in the Improve_segment code).

It can thus be concluded that the overhead touches result, which is controlled by the deflection parameter, strongly affects the time consumption of the function.

It is appreciated that the whole performance analysis was performed using a fixed small cel filter of 0.3 pixel. The influence of this parameter on the operation of the method is considered minor on the basis of the accumulated operational experience with the system.

CONCLUSIONS

When coming to select parameters for the operation of the method, if it is assumed that the deviation parameter (or the requested preservation of the shape) is dictated by the application, it can be concluded that the deflection parameter is the main control on the .compression ratio and the time consumption of the method.

In the currently common use of the method (preparation of reference vector data for shape change detection) the main goal is to supply the maximum compressed result without unnecessary usage of time. This is especially true in the preparation of reference data of areas which can not be characterised during learn scan, forcing the necessity to perform vectorization during inspection scan.

In the following graphs it can be concluded that the operational recominendation for parameters setting of the method. The first graph shows the maximum compression ratio as a function of the deviation tolerance parameter. This is the first piece of information that has to be considered when coming to design vectorization for a specific application.

From the graphs in FIG. 80 it is obvious that requesting a tighter vectorization (better preservation of the shape) will cost extra time and reduce compression ratio, so preferably figures out the optimal shape preservation for a given application to meet time consumption constraints.

FIG. 81, which is derived from FIG. 80, is a graph created by examining the situation where the compression ratio (as a function of deflection angle) becomes constant for every vectorization style (or for a specific deviation parameter setting). The nearly linear nature of this function in the examined range (between 0.1 to 0.6 pixel deviation) is evident from the graph. The performance of the method was not tested beyond this range because in the 0.1 pixel deviation tolerance condition was found to produce a highly redundant result for our application and the 0.6 pixel condition produced poor and useless "preservation of the shape" results.

In accordance with a preferred embodiment of the present invention, a deviation value of 0.3 pixel which is used (with typical defect tolerances of several applications). If for some applications the proposed vectorization is not adequate for the preservation of the original shapes, the parameter may be changed, remembering that the maximum compression ratio produced by the vectorizer will change accordingly.

The next piece of information that has to be considered is the deflection angle that has to be used for every deviation setting that will result in an optimal vectorization (best compression with no unnecessary time consumption).

FIG. 82, which is a graph derived from FIG. 80 was created by examining the actual deflection angle where the compression ratio (as a function of deflection angle) becomes constant for every vectorization style (or for a specific deviation parameter setting). The nearly linear nature of this function is also evident from the graph.

In addition to the optimal compression recominendation I showed in the graph a deflection angle that will produce minimum time vectorization as derived from the local minima in the time consumption graphs for every deviation parameter setting.

Even though there is a "minimum time consumption" situation for every vectorization style (ore deviation tolerance) it is typically not recominended to perform such "minimum time consumption" vectorizations ,even with very tight time constraints scenarios, because of the poor output compression ratios, that may have to be paid later in the operation of further methods (such as shape change detection).

It is appreciated that the whole performance analysis was performed using a fixed small cel filter of 0.3 pixel and an improve resampling step of 2. The influence of these parameters on the operation of the method is considered minor on the basis of accumulated operational experience with the system.

It is anticipated that automatic tools may be able to automatically produce the necessary data for calibration of the parameters for optimal vectorization as dictated for every, application the system will meet. In general the tool has to produce the two dimensional functions of compression ratio and time consumption as a function of the deviation and the deflection parameters.

$$2*area = \begin{vmatrix} p0.x & p0.y \\ p1.x & p1.y \\ pi.x & pi.y \end{vmatrix} \quad \text{EQUATION 2}$$

(11 operations: 6 multiply, 3 subtract, 2 add)
which can be reduced to:

$$2*Area=(p1.y-pi.y)*(p0.x-pi.x)-(p0.y-pi.y)*(p1.x-pi.x)$$

The invention claimed is:

1. An electrical circuitry inspection method comprising:
performing reference based inspection of electrical circuitry to be inspected, including:
for each of a plurality of types of local characteristics, each type occurring at least once within said electrical circuitry to be inspected, identifying at least one portion of interest within the electrical circuitry whereat said local characteristic is expected to occur; and
inspecting an image of each of said at least one portion of interest, using a selected inspection task employing information defining said portion of interest and additional inspection information relevant to said portion of interest, said inspection task being selected from among a plurality of different inspection tasks in response to the type of local characteristic expected to occur in the portion of interest,
said information defining said portion of interest comprising at least one of:
binary Contour Element (CEL) data, identifying contour elements which correspond to borders between different regions in a pattern; and
color CEL data, identifying contour elements which correspond to borders between different regions in a pattern and identifying a type of region on either side of a CEL.

2. Electrical circuitry apparatus comprising:
a reference based inspector performing reference based inspection of electrical circuitry to be inspected, said reference based inspector including:
a portion of interest identifier operative, for each of a plurality of types of local characteristics, each type occurring at least once within said electrical circuitry to be inspected, to identify at least one portion of interest within the electrical circuitry whereat said local characteristic is expected to occur; and
an image inspector inspecting an image of each of said at least one portion of interest, using a selected inspection task employing information defining said portion of interest and additional inspection information relevant to said portion of interest, said inspection task being selected from among a plurality of different inspection tasks in response to the type of local characteristic expected to occur in the portion of interest,
said information defining said portion of interest comprising at least one of:
binary Contour Element (CEL) data, identifying contour elements which correspond to borders between different regions in a patter; and
color CEL data, identifying contour elements which correspond to borders between different regions in a pattern and identifying a type of region on either side of a CEL.

3. A method according to claim 1, wherein said information defining said portion of interest further comprises:
morphological feature inspection triggers; and
color defect inspection triggers.

4. A method according to claim 1 and wherein said information defining said portion of interest comprises said binary CEL data.

5. A method according to claim 4 and wherein said binary CEL data is calculated as a function of a zero crossing point of Difference of Gaussians (DoGs).

6. A method according to claim 4 and wherein said binary CEL data is calculated for pattern edges in the Red band of an RGB image.

7. A method according to claim 1 and wherein said information defining said portion of interest comprises said color CEL data.

8. A method according to claim 7 and wherein said color CEL data includes representations of at least one of: x coordinate of a CEL, orientation of a CEL, direction of a CEL, a first endpoint location of a CEL along a pixel edge and a last endpoint location of a CEL along a pixel edge.

9. A method according to claim 7 and wherein said color CEL data includes representations of a color junction.

10. A method according to claim 1 and wherein said information defining said portion of interest comprises said morphological feature inspection triggers.

11. A method according to claim 1 and wherein said information defining said portion of interest comprises said color defect inspection triggers.

12. A method according to claim 1 and wherein said inspecting an image of each of said at least one portion of interest comprises:
designing a rule scenario including inspecting said electrical circuitry with reference to a set of general design rules;
learning a rule scenario including:
learning the contents and structure of the design of said electrical circuitry; and
generating a reference representation of said electrical circuitry having known desired attributes for use during the inspection of said electrical circuitry; and
inspecting a rule scenario including inspecting electrical circuitry to determine defects with reference to said reference representation.

13. Apparatus according to claim 2, wherein said information defining said portion of interest further comprises:
morphological feature inspection triggers; and
color defect inspection triggers.

14. Apparatus according to claim 2 and wherein said information defining said portion of interest comprises said binary CEL data.

15. Apparatus according to claim 14 and wherein said binary CEL data is calculated as a function of a zero crossing point of Difference of Gaussians (DoGs).

16. Apparatus according to claim 14 and wherein said binary CEL data is calculated for pattern edges in the Red band of an RGB image.

17. Apparatus according to claim 2 and wherein said information defining said portion of interest comprises said color CEL data.

18. Apparatus according to claim 17 and wherein said color CEL data includes representations of at least one of: x coordinate of a CEL, orientation of a CEL and direction of a CEL, endpoint location of a CEL along a pixel edge.

19. Apparatus according to claim 17 and wherein said color CEL data includes representations of a color junction.

20. Apparatus according to claim 2 and wherein said image inspector comprises:

a rule scenario designing functionality including inspection functionality operative to inspect said electrical circuitry with reference to a set of general design rules;

a rule scenario learning functionality operative to learn the contents and structure of the design of said electrical circuitry and to generate a reference representation of said electrical circuitry having known desired attributes for use during the inspection of said electrical circuitry; and a rule scenario inspection functionality operative to inspect electrical circuitry to determine defects with reference to said reference representation.

* * * * *